(12) United States Patent
Kaminade et al.

(10) Patent No.: US 8,211,514 B2
(45) Date of Patent: Jul. 3, 2012

(54) REVERSE DISPERSION RETARDATION FILM AND LIQUID CRYSTAL DISPLAY DEVICE USING THE SAME

(75) Inventors: Tadahiro Kaminade, Yokohama (JP); Shinichi Komatsu, Yokohama (JP); Hisashi Sone, Yokohama (JP); Takeshi Koike, Yokohama (JP); Sayako Kawahama, Yokohama (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/145,826

(22) PCT Filed: Dec. 24, 2009

(86) PCT No.: PCT/JP2009/071428
§ 371 (c)(1),
(2), (4) Date: Aug. 31, 2011

(87) PCT Pub. No.: WO2010/084689
PCT Pub. Date: Jul. 29, 2010

(65) Prior Publication Data
US 2011/0313121 A1    Dec. 22, 2011

(30) Foreign Application Priority Data
Jan. 23, 2009  (JP) .................... 2009-013115

(51) Int. Cl.
*C09K 19/00* (2006.01)
*C08G 61/06* (2006.01)
*C08F 8/04* (2006.01)

(52) U.S. Cl. ......... 428/1.1; 349/117; 526/259; 526/270; 526/279; 526/281; 526/348.1; 525/326.7; 525/326.8; 525/327.2; 525/333.1

(58) Field of Classification Search .......... 526/259, 526/270, 281, 348.1, 279; 428/1.1; 349/117; 525/326.7, 326.8, 327.2, 333, 3
See application file for complete search history.

(56) References Cited

U.S. PATENT DOCUMENTS 7,541,411 B2 *   6/2009   Miyamoto et al. ............ 525/539

FOREIGN PATENT DOCUMENTS

| JP | 2003-255102 A | 9/2003 |
|---|---|---|
| JP | 2004-176051 A | 6/2004 |
| JP | 2004-323489 A | 11/2004 |
| JP | 2005-290048 A | 10/2005 |
| JP | 2006-189474 A | 7/2006 |
| JP | 2007-131702 A | 5/2007 |
| JP | 2008-007733 A | 1/2008 |
| JP | 2008-222663 A | 1/2008 |
| JP | 2008-031319 A | 2/2008 |
| JP | 2008-052119 A | 3/2008 |
| JP | 2009-046615 A | 3/2009 |
| WO | WO 2009/017100 A1 | 2/2009 |

OTHER PUBLICATIONS

Machine translation of JP 2006-189474 A; pub. date: Jul. 2006.*
Machine translation of JP 2008-052119 A; pub. date: Mar. 2008.*
International Search Report corresponding with International Application No. PCT/JP2009/071428 dated Mar. 16, 2010.

* cited by examiner

*Primary Examiner* — Fred M Teskin
(74) *Attorney, Agent, or Firm* — Fitch, Even, Tabin & Flannery, LLP

(57) ABSTRACT

A reverse dispersion retardation film is formed by stretching a film containing a norbornene-based ring-opening copolymer containing a structural unit (A) represented by a general formula (1) and a structural unit (B) represented by a general formula (2), wherein a total amount of the structural unit (A) and an exo-form structural unit, among the structural units (B), is not less than 20 mol % but not more than 65 mol % of all the structural units.

9 Claims, 1 Drawing Sheet

REVERSE DISPERSION RETARDATION FILM AND LIQUID CRYSTAL DISPLAY DEVICE USING THE SAME

CROSS-REFERENCE TO RELATED APPLICATIONS

This Application is a U.S. National Phase Application filed under 35 U.S.C. §371 of International Application PCT/JP2009/071428, filed Dec. 24, 2009, designating the United States, which claims priority from Japanese Patent Application 2009-013115, filed Jan. 23, 2009, the complete disclosures of which are hereby incorporated herein by reference in their entirety for all purposes.

TECHNICAL FIELD

The present invention relates to a reverse dispersion retardation film and a liquid crystal display device using the same, and, in particular, relates to: a reverse dispersion retardation film which is suitably applicable to a ½λ plate, a ¼λ plate, a protection film, an anti-reflection film, and the like; and a liquid crystal display device using the reverse dispersion retardation film.

BACKGROUND ART

In liquid crystal display devices, such as liquid crystal displays (LCD), a retardation film having a controlled optical anisotropy is used for the purpose of optical compensation. As such a retardation film, attention has been focused on a reverse dispersion retardation film capable of, for example, providing a ¼ wavelength retardation in a wide wavelength range of the entire visible light region (400 to 800 nm). Moreover, as such a retardation film, retardation films using a norbornene-based ring-opening polymer have been developed.

For example, Japanese Unexamined Patent Application Publication No. 2003-255102 (Patent Literature 1), Japanese Unexamined Patent Application Publication No. 2004-176051 (Patent Literature 2), and Japanese Unexamined Patent Application Publication No. 2004-323489 (Patent Literature 3) each disclose an optical film made of a specific norbornene-based ring-opening polymer. However, in such conventional optical films made of a norbornene-based ring-opening polymer as described in Patent Literatures 1 and 2, the norbornene-based ring-opening polymer contains an ester group or an imide group which causes the ring-opening polymer to have a low hydrolysis resistance, and the optical film is deteriorated by water content in air. Meanwhile, for conventional optical films made of a norbornene-based ring-opening polymer as described in Patent Literature 3, a very low temperature condition such as −78° C. is required when a raw-material monomer is synthesized. Thus, a dedicated refrigeration equipment is needed to create such a very low temperature state. This brings about a problem of excessive size of the production facilities in considering industrial production.

Moreover, Japanese Unexamined Patent Application Publication No. 2008-52119 (Patent Literature 4) discloses a reverse dispersion retardation film containing a norbornene-based ring-opening polymer obtained from a specific norbornene derivative with an adjusted endo/exo ratio. Further, Japanese Unexamined Patent Application Publication No. 2006-189474 (Patent Literature 5) discloses a retardation film containing a norbornene-based ring-opening polymer obtained by using a norbornene derivative containing spiro rings. Furthermore, Japanese Unexamined Patent Application Publication No. 2005-290048 (Patent Literature 6) and Japanese Unexamined Patent Application Publication No. 2008-7733 (Patent Literature 6) each disclose a norbornene-based ring-opening polymer obtained by using a norbornene derivative containing spiro rings. However, conventional retardation films using a norbornene-based ring-opening polymer as described in Patent Literatures 4 to 7 are not necessarily sufficient from the perspective of achieving both heat resistance and reverse dispersion characteristics.

CITATION LIST

Patent Literature

[PTL 1] Japanese Unexamined Patent Application Publication No. 2003-255102
[PTL 2] Japanese Unexamined Patent Application Publication No. 2004-176051
[PTL 3] Japanese Unexamined Patent Application Publication No. 2004-323489
[PTL 4] Japanese Unexamined Patent Application Publication No. 2008-52119
[PTL 5] Japanese Unexamined Patent Application Publication No. 2006-189474
[PTL 6] Japanese Unexamined Patent Application Publication No. 2005-290048
[PTL 7] Japanese Unexamined Patent Application Publication No. 2008-7733

SUMMARY OF INVENTION

Technical Problems

The present invention has been made in consideration of the above-described problems in the conventional techniques. An object of the present invention is to provide: a reverse dispersion retardation film exhibiting reverse dispersion of birefringence wavelength dispersion characteristics and being capable of sufficiently preventing deterioration caused by water content in air and capable of exhibiting the reverse dispersion characteristics and heat resistance at high levels in a balanced manner even in a single layer; and a liquid crystal display device using the reverse dispersion retardation film.

Solution to Problem

The present inventors have earnestly studied in order to achieve the above object. As a result, the inventors have revealed that a retardation film formed by stretching a film comprising a norbornene-based ring-opening copolymer becomes capable of exhibiting reverse dispersion characteristics and heat resistance at high levels in a balanced manner by using, as the norbornene-based ring-opening copolymer, a norbornene-based ring-opening copolymer containing a specific structural unit (A) represented by the following general formula (1) including spiro rings and a specific structural unit (B) represented by the following general formula (2) including an exo isomer and an endo isomer, and by setting a total amount of the structural unit (A) and the exo isomer of the structural unit (B) to be not less than 20 mol % but not more than 65 mol % of all the structural units. This discovery has led the inventors to complete the present invention.

To be more specific, a reverse dispersion retardation film of the present invention is the one formed by stretching a film comprising a norbornene-based ring-opening copolymer containing a structural unit (A) represented by the following general formula (1):

[Chem. 1]

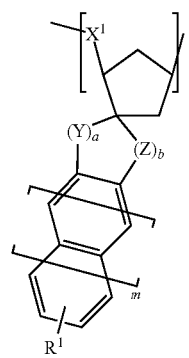

(1)

[in the formula (1), m represents an integer of any one of 0 and 1, $R^1$ represents any one of atoms and groups selected from the group consisting of: a hydrogen atom; halogen atoms; substituted or unsubstituted hydrocarbon groups, each of which may include at least one linking group selected from the group consisting of an oxygen atom, a nitrogen atom, a sulfur atom, and a silicon atom, and which has 1 to 30 carbon atoms; and polar groups, $X^1$ represents anyone of groups selected from the group consisting of a group represented by a formula: —CH=CH— and a group represented by a formula: —$CH_2CH_2$—, a and b each independently represent an integer of 0 to 6, Y, which may be the same or different when provided in plurality in the single structural unit, represents at least one group selected from the group consisting of a methylene group, a carbonyl group, an oxy group, and alkylimino groups having 1 to 5 carbon atoms, and Z, which may be the same or different when provided in plurality in the single structural unit, represents at least one group selected from the group consisting of a methylene group, a carbonyl group, an oxy group, and alkylimino groups having 1 to 5 carbon atoms, and a structural unit (B) represented by the following general formula (2):

[Chem. 2]

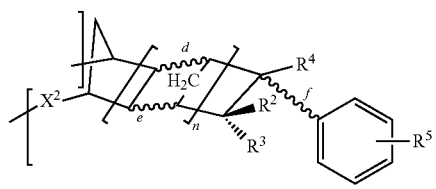

(2)

[in the formula (2), n represents an integer of any one of 0 and 1, $X^2$ represents anyone of groups selected from the group consisting of a group represented by a formula: —CH=CH— and a group represented by a formula: —$CH_2CH_2$—, $R^2$, $R^3$, $R^4$, and $R^5$ each independently represent any one of atoms and groups selected from the group consisting of: a hydrogen atom; halogen atoms; substituted or unsubstituted hydrocarbon groups, each of which may include at least one linking group selected from the group consisting of an oxygen atom, a nitrogen atom, a sulfur atom, and a silicon atom, and which has 1 to 30 carbon atoms; and polar groups, wavy lines d and e each represent a configuration of any one of an endo and an exo, and a wavy line f represents a configuration of any one of an endo and an exo], wherein a total amount of the structural unit (A) and an exo-form structural unit, in which the wavy line f represents the exo configuration, among the structural units (B) ([the structural units (A)]+[the exo-form structural units]) is not less than 20 mol % but not more than 65 mol % of all the structural units.

In the above reverse dispersion retardation film of the present invention, in the general formula (1), it is preferable that m be 0 and $R^1$ be at least one selected from the group consisting of a hydrogen atom and alkyl groups having 1 to 6 carbon atoms. Moreover, in the above reverse dispersion retardation film of the present invention, in the general formula (1), it is more preferable that m be 0 and $R^1$ be a hydrogen atom.

In the above reverse dispersion retardation film of the present invention, in the general formula (2), $R^2$, $R^3$, and $R^4$ are preferably each independently at least one selected from the group consisting of a hydrogen atom, a methyl group, and a phenyl group. In addition, in the general formula (2), $R^5$ is preferably at least one selected from the group consisting of a methyl group, a propyl group, a butyl group, a 2-methyl propan-2-yl group (t-butyl group), a cyclohexyl group, and a phenyl group.

In the above reverse dispersion retardation film of the present invention, a content of the structural unit (A) is preferably not less than 6 mol % but not more than 40 mol % of all the structural units.

Moreover, in the above reverse dispersion retardation film of the present invention, a total amount of a structural unit, in which $X^1$ is a group represented by a formula: —$CH_2CH_2$—, among the structural units (A) and a structural unit, in which $X^2$ is a group represented by a formula: —$CH_2CH_2$—, among the structural units (B) is preferably not less than 90 mol % of all the structural units in the norbornene-based ring-opening polymer.

Further, in the above reverse dispersion retardation film of the present invention, the total amount of the structural unit (A) and the exo-form structural unit, in which the wavy line f represents the exo configuration, among the structural units (B) is preferably not less than 25 mol % but not more than 50 mol % of all the structural units.

Furthermore, a liquid crystal display device of the present invention is the one comprising the above reverse dispersion retardation film of the present invention.

Advantageous Effects of Invention

According to the present invention, it is possible to provide: a reverse dispersion retardation film exhibiting reverse dispersion of birefringence wavelength dispersion characteristics and being capable of sufficiently preventing deterioration caused by water content in air and capable of exhibiting the reverse dispersion characteristics and heat resistance at high levels in a balanced manner even in a single layer; and a liquid crystal display device using the reverse dispersion retardation film.

Moreover, such a retardation film of the present invention can be made into a thin film. In addition, the production process is simplified, and the retardation film can be produced in good yield and at low cost.

BRIEF DESCRIPTION OF DRAWINGS

The drawing is a graph showing an NMR chart of a hydrogenated ring-opening copolymer of 5-(p-t-butylphenyl)bicyclo[2.2.1]-2-heptane/spiro[3,4-dihydronaphthalen-1-one-2,5'-2'-norbornene].

DESCRIPTION OF EMBODIMENTS

The present invention will be described in detail below according to preferred embodiments thereof.

Firstly, the reverse dispersion retardation film of the present invention will be described. To be more specific, the reverse dispersion retardation film of the present invention is the one formed by stretching a film comprising a norbornene-based ring-opening copolymer containing a structural unit (A) represented by the following general formula (1):

[Chem. 3]

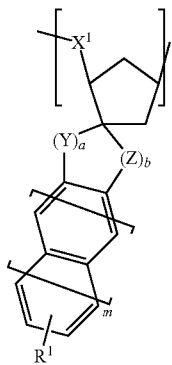

(1)

[in the formula (1), m represents an integer of any one of 0 and 1, $R^1$ represents any one of atoms and groups selected from the group consisting of: a hydrogen atom; halogen atoms; substituted or unsubstituted hydrocarbon groups, each of which may include at least one linking group selected from the group consisting of an oxygen atom, a nitrogen atom, a sulfur atom, and a silicon atom, and which has 1 to 30 carbon atoms; and polar groups, $X^1$ represents anyone of groups selected from the group consisting of a group represented by a formula: —CH=CH— and a group represented by a formula: —CH$_2$CH$_2$—, a and b each independently represent an integer of 0 to 6, Y, which may be the same or different when provided in plurality in the single structural unit, represents at least one group selected from the group consisting of a methylene group, a carbonyl group, an oxy group, and alkylimino groups having 1 to 5 carbon atoms, and Z, which may be the same or different when provided in plurality in the single structural unit, represents at least one group selected from the group consisting of a methylene group, a carbonyl group, an oxy group, and alkylimino groups having 1 to 5 carbon atoms] and a structural unit (B) represented by the following general formula (2):

[Chem. 4]

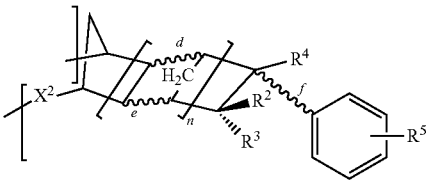

(2)

[in the formula (2), n represents an integer of any one of 0 and 1, $X^2$ represents anyone of groups selected from the group consisting of a group represented by a formula: —CH=CH— and a group represented by a formula: —CH$_2$CH$_2$—, $R^2$, $R^3$, $R^4$, and $R^5$ each independently represent any one of atoms and groups selected from the group consisting of: a hydrogen atom; halogen atoms; substituted or unsubstituted hydrocarbon groups, each of which may include at least one linking group selected from the group consisting of an oxygen atom, a nitrogen atom, a sulfur atom, and a silicon atom, and which has 1 to 30 carbon atoms; and polar groups, wavy lines d and e each represent a configuration of any one of an endo and an exo, and a wavy line f represents a configuration of any one of an endo and an exo], wherein a total amount of the structural unit (A) and an exo-form structural unit, in which the wavy line f represents the exo configuration, among the structural units (B) is not less than 20 mol % but not more than 65 mol % of all the structural units.

The norbornene-based ring-opening copolymer according to the present invention contains the structural unit (A) represented by the general formula (1) and the structural unit (B) represented by the general formula (2).

Such a structural unit (A) has a spiro skeleton as represented by the general formula (1). Moreover, in such a structural unit (A), a cyclopentane ring obtained by ring-opening polymerization of a norbornene monomer and a cyclic compound containing (Y) a, (Z) b, and an aromatic ring are linked with each other through a spiroatom. Further, in such a structural unit (A), m in the formula (1) represents an integer of any one of 0 and 1. In other words, as such a structural unit (A), homogeneous structural units in each of which the m value is 0 or 1 may be contained in the norbornene-based ring-opening copolymer. Alternatively, both a structural unit in which the m value is 0 and a structural unit in which the m value is 1 may be coexisted therein. The m value can be adjusted appropriately according to an intended design in order to control various properties such as optical characteristics, heat resistance and film processability in a balanced manner. From the perspective of easiness of synthesizing the norbornene monomer, the value is preferably 0.

In the general formula (1), Y is at least one group selected from the group consisting of a methylene group (—CH$_2$—), a carbonyl group (>CO), an oxy group (—O—), and alkylimino groups having 1 to 5 carbon atoms (>NR [R represents an alkyl group having 1 to 5 carbon atoms]). Meanwhile, in the general formula (1), Z is at least one group selected from the group consisting of a methylene group (—CH$_2$—), a carbonyl group (>CO), an oxy group (—O—), and alkylimino groups having 1 to 5 carbon atoms (>NR [R represents an alkyl group having 1 to 5 carbon atoms]). As such Y or Z, from the perspective of availability and easiness of synthesizing the raw-material monomer, a methylene group, a carbonyl group, and an oxy group are preferable. Among these, a methylene group and a carbonyl group are more preferable.

Moreover, a representing the number of Y is an integer of 0 to 6 (more preferably 1 to 5). Further, b representing the number of Z is an integer of 0 to 6 (more preferably 1 to 5). Thus, each of Y and Z may be provided in plurality in the structural unit (A). In this manner, when Y is provided in plurality in the single structural unit represented by the general formula (1), in other words, when a is two or larger, Ys provided in the single structural unit may be the same or different. Additionally, when Z is provided in plurality in the single structural unit represented by the general formula (1), in other words, when b is two or larger, Zs provided in the single structural unit may be the same or different. Furthermore, groups comprising such a plurality of Ys or groups comprising a plurality of Zs are preferably groups including a methylene group and at least one selected from the group consisting of a carbonyl group and an oxy group, and more preferably groups including a methylene group and one carbonyl group and/or one oxy group.

Moreover, in the general formula (1), $X^1$ is any one of a group represented by a formula: —CH=CH— and a group represented by a formula: —CH$_2$CH$_2$—. Further, the structural unit (A) may be homogeneous structural units in each of which $X^1$ is only one of the above-described groups. Alternatively, a structural unit in which the $X^1$ is a group represented by a formula: —CH=CH— and a structural unit in which $X^1$ is a group represented by a formula: —CH$_2$CH$_2$— may coexist as the structural unit (A).

Furthermore, in the general formula (1), $R^1$ is any one of atoms and groups selected from the group consisting of a hydrogen atom; halogen atoms; substituted or unsubstituted hydrocarbon groups, each of which may include at least one linking group selected from the group consisting of an oxygen atom, a nitrogen atom, a sulfur atom, and a silicon atom, and which has 1 to 30 (more preferably 1 to 10) carbon atoms; and polar groups. Examples of such a polar group include a hydroxyl group, a mercapto group, a cyano group, an amino group, a carboxyl group, a sulfonic group, and the like. Further, the substituent represented by such $R^1$ in the general formula (1) is preferably a hydrogen atom and alkyl groups having 1 to 6 carbon atoms, and especially preferably a hydrogen atom, from the perspective of availability of the raw-material monomer. Incidentally, as the structural unit (A) in the norbornene-based ring-opening polymer, the structural unit (A) may be contained one kind alone or in combination of two or more kinds.

In the meantime, the structural unit (B) represented by the general formula (2) is the one which has an aromatic ring as a substituent thereof, and in which further a cyclopentane ring obtained by ring-opening polymerization of a norbornene monomer and the aromatic ring are linked with each other directly or by a bicyclo ring.

In such a structural unit (B), n in the formula (2) represents an integer of any one of 0 and 1. As such a structural unit (B), homogeneous structural units in each of which the n value is 0 or 1 may be contained in the norbornene-based ring-opening copolymer. Alternatively, a structural unit in which the n value is 0 and a structural unit in which the n value is 1 may coexist therein. The n value can be adjusted appropriately according to an intended design in order to control various properties such as optical characteristics, heat resistance and film processability in a balanced manner. From the perspective of easiness of synthesizing the norbornene monomer, the value is preferably 0.

Moreover, in the general formula (2), the wavy line d and the wavy line e each represent a configuration of any one of an endo and an exo. Further, in the general formula (2), the wavy line f also represents a configuration of any one of an endo and an exo. In the present invention, a structural unit, in which the wavy line f represents the endo configuration, among the structural units (B) refers to an "endo-form structural unit," while a structural unit, in which the wavy line f represents the exo configuration refers to an "exo-form structural unit."

Configurations respectively represented by such wavy lines d, e and f in the general formula (2) can be adjusted appropriately by reaction conditions in the production of monomer, reaction processing after the production, or the like. For example, the configurations represented by the wavy lines d and e can be easily controlled by isomerization treatment after the production, while the configuration represented by the wavy line f can be controlled by reaction conditions in the production of monomer or heat treatment after the production.

Further, the substituents represented by $R^2$, $R^3$, $R^4$, and $R^5$ in the general formula (2), which may be the same or different, are each any one of atoms and groups selected from the group consisting of: a hydrogen atom; halogen atoms; substituted or unsubstituted hydrocarbon groups, each of which may include at least one linking group selected from the group consisting of an oxygen atom, a nitrogen atom, a sulfur atom, and a silicon atom, and which has 1 to 30 (more preferably 1 to 10) carbon atoms; and polar groups. Note that examples of such a polar group include a hydroxyl group, a mercapto group, a cyano group, an amino group, a carboxyl group, a sulfonic group, and the like. Further, the substituents represented by such $R^2$, $R^3$, and $R^4$ in the general formula (2) are preferably a hydrogen atom, a methyl group, a phenyl group, and the like, from the perspective of availability of the raw-material monomer. Additionally, the substituent represented by $R^5$ is preferably a methyl group, a propyl group, a butyl group, a 2-methyl propan-2-yl group (t-butyl group), a cyclohexyl group, and phenyl group, and especially preferably a t-butyl group, from the perspective of being capable of providing higher heat resistance to a retardation film to be obtained.

Moreover, in the general formula (2), $X^2$ is any one of a group represented by a formula: —CH=CH— and a group represented by a formula: —CH$_2$CH$_2$—. Further, the structural unit (B) may be homogeneous structural units in each of which $X^2$ is only one of the above-described groups. Alternatively, a structural unit in which $X^2$ is a group represented by a formula: —CH=CH— and a structural unit in which $X^2$ is a group represented by a formula: —CH$_2$CH$_2$— may coexist as the structural unit (B). In this manner, as the structural unit (B) in the norbornene-based ring-opening polymer, the structural unit (B) may be contained one kind alone or in combination of two or more kinds.

In the meantime, in the norbornene-based ring-opening copolymer containing such a structural unit (A) and a structural unit (B), the total amount of the structural unit (A) and the exo-form structural unit, in which the wavy line f represents the exo configuration, among the structural units (B) ([the structural units (A)]+[the exo-form structural units]) is not less than 20 mol % but not more than 65 mol % of all the structural units. If the total amount (sum) of the structural unit (A) and the exo-form structural unit falls below 20 mol % of all the structural units (a total amount of the structural units (A) and the structural units (B)), a glass transition temperature of the norbornene ring-opening copolymer falls below 110° C., and a heat resistance of the retardation film becomes insufficient. Meanwhile, if the total amount of the structural unit (A) and the exo-form structural unit exceeds 65 mol % of all the structural units, a wavelength dispersion value (D=Δn (λ=481 nm)/Δn(λ=589 nm)) falls in a range of not less than 1.0. Thereby, since the wavelength dispersion characteristics become normal dispersion, it is impossible to obtain a film exhibiting unique optical characteristics. Meanwhile, from the perspective of achieving both reverse dispersion characteristics and heat resistance at higher levels, the total amount of the structural unit (A) and the exo-form structural unit is more preferably not less than 25 mol % but not more than 50 mol %, especially preferably not less than 30 mol % but not more than 45 mol %, of all the structural units.

Moreover, in the norbornene-based ring-opening copolymer, a content of the structural unit (A) is preferably not less than 6 mol % but not more than 40 mol %, more preferably not less than 10 mol % but not more than 40 mol %, and further preferably not less than 15 mol % but not more than 30 mol %, of all the structural units. If the content of the structural unit (A) falls below the lower limit, the retardation film of the present invention tends not to have a sufficiently high heat resistance. On the other hand, if the content exceeds the upper limit, reverse dispersion characteristics are likely not to be exhibited.

Further, in the norbornene-based ring-opening copolymer, a content of structural units in which configurations represented by the wavy line d and the wavy line e are the exo configuration is preferably not less than 35 mol % but not more than 65 mol % (more preferably not less than 40 mol % but not more than 50 mol %) of a total amount of the structural units (B). If a content percentage of the structural unit in which the configurations represented by the wavy lines d and e are exo falls below 35 mol % or exceeds 65 mol %, it tends to be difficult to achieve the sufficient reverse dispersion characteristics.

In addition, in the norbornene-based ring-opening copolymer, a content of the exo-form structural unit, in which the wavy line f represents the exo configuration, is preferably not less than 10 mol % but not more than 40 mol %, more preferably not less than 15 mol % but not more than 30 mol %, of the total amount of the structural units (B). If the content of the exo-form structural unit among the structural units (B) falls below the lower limit, this makes the monomer synthesis difficult, and yield in synthesizing the monomer tends to be lowered. On the other hand, if the content exceeds the upper limit, reverse dispersion characteristics and heat resistance of the retardation film of the present invention tend to be lowered.

Meanwhile, when a degree of hydrogenation relative to the main chain is higher, in other words, when the number of double bonds in the main chain is smaller, the norbornene-based ring-opening copolymer is a more stable polymer. Accordingly, as a norbornene-based ring-opening polymer according to the present invention, a polymer to which sufficient hydrogen is added and which has a smaller number of double bonds in the main chain is preferable. From such a perspective, a total amount of a structural unit, in which $X^1$ is a group represented by a formula: —$CH_2CH_2$—, among the structural units (A) and a structural unit, in which $X^2$ is a group represented by a formula: —$CH_2CH_2$—, among the structural units (B) is preferably not less than 90 mol % (more preferably not less than 95 mol %, and especially preferably not less than 98 mol %), of all the structural units in the norbornene-based ring-opening polymer. If the proportion falls below 90 mol %, the stability of polymer is lowered, and it tends to be difficult to prevent coloring and deterioration caused by heat.

Moreover, a weight-average molecular weight of the norbornene-based ring-opening polymer is preferably 1000 to 10000000, and more preferably 10000 to 1000000. If the weight-average molecular weight of the norbornene-based ring-opening polymer represented by the general formula (6) falls below the lower limit, the strength of an obtained aromatic norbornene-based ring-opening polymer tends to be lowered. On the other hand, if the weight-average molecular weight exceeds the upper limit, the melt viscosity of an obtained norbornene-based ring-opening polymer is too high, and the processability in preparing a retardation film tends to be lowered.

Further, a glass transition temperature (Tg) of the norbornene-based ring-opening polymer is preferably not lower than 110° C., and more preferably 115 to 130° C. If the glass transition temperature falls below the lower limit, it tends to be unable to provide a sufficiently high heat resistance to an obtained retardation film. On the other hand, if the glass transition temperature exceeds the upper limit, the film processability tends to be lowered.

A method for producing such a norbornene-based ring-opening polymer is not particularly limited. For example, it is possible to preferably adopt a method in which a spiro-form norbornene monomer represented by the following general formula (3):

[Chem. 5]

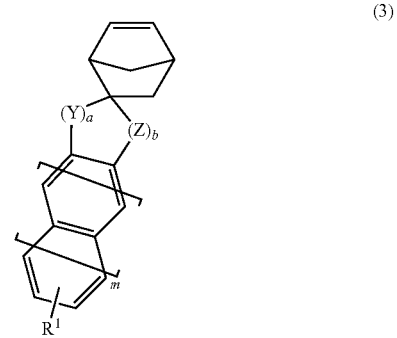

(3)

[in the formula (3), $R^1$, Y, Z, a, b, and m are respectively synonymous with $R^1$, Y, Z, a, b, and m in the general formula (1)] and an aromatic norbornene monomer represented by the following general formula (4):

[Chem. 6]

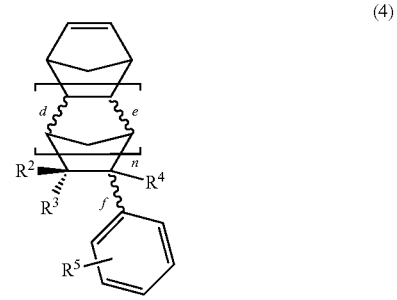

(4)

[in the formula (4), $R^2$, $R^3$, $R^4$, $R^5$, d, e, f, and n are respectively synonymous with $R^2$, $R^3$, $R^4$, $R^5$, d, e, f, and n in the general formula (2)] are subjected to ring-opening polymerization to obtain a norbornene-based ring-opening copolymer containing a structural unit (A) represented by the general formula (1) and a structural unit (B) represented by the general formula (2). In such a method for producing a norbornene-based ring-opening copolymer, when the spiro-form norbornene monomer and the aromatic norbornene monomer are subjected to the ring-opening polymerization, a norbornene-based ring-opening copolymer containing a structural unit (A) in which $X^1$ in the general formula (1) is a group represented by a formula: —CH=CH— and a structural unit (B) in which $X^2$ in the general formula (2) is a group represented by a formula: —CH=CH— is obtained. Accordingly, after the ring-opening polymerization, hydrogenation may be further conducted to obtain a norbornene-based ring-opening copolymer containing a structural unit (A) in which $X^1$ in the general formula (1) is a group represented by a formula: —$CH_2CH_2$— and a structural unit (B) in which $X^2$ in the general formula (2) is a group represented by a formula: —$CH_2CH_2$—.

Examples of such a spiro-form norbornene monomer represented by the general formula (3) include monomers listed in the following (i) to (xv).

(i)
1,2-benzocyclopentene-3-spiro-5'-bicyclo[2.2.1]-2'-heptene,
1,2-(3"-methylbenzo)cyclopentene-3-spiro-5'-bicyclo [2.2.1]-2'-heptene,
1,2-(4"-methylbenzo)cyclopentene-3-spiro-5'-bicyclo [2.2.1]-2'-heptene,
1,2-(5"-methylbenzo)cyclopentene-3-spiro-5'-bicyclo [2.2.1]-2'-heptene,
1,2-(6"-methylbenzo)cyclopentene-3-spiro-5'-bicyclo [2.2.1]-2'-heptene,
1,2-(3"-ethylbenzo)cyclopentene-3-spiro-5'-bicyclo[2.2.1]- 2'-heptene,
1,2-(4"-ethylbenzo)cyclopentene-3-spiro-5'-bicyclo[2.2.1]- 2'-heptene,
1,2-(5"-ethylbenzo)cyclopentene-3-spiro-5'-bicyclo[2.2.1]- 2'-heptene,
1,2-(6"-ethylbenzo)cyclopentene-3-spiro-5'-bicyclo[2.2.1]- 2'-heptene,
1,2-(3'-n-propylbenzo)cyclopentene-3-spiro-5'-bicyclo [2.2.1]-2'-heptene,
1,2-(4"-n-propylbenzo)cyclopentene-3-spiro-5'-bicyclo [2.2.1]-2'-heptene,
1,2-(5'-n-propylbenzo)cyclopentene-3-spiro-5'-bicyclo [2.2.1]-2'-heptene,
1,2-(6"-n-propylbenzo)cyclopentene-3-spiro-5'-bicyclo [2.2.1]-2'-heptene,
1,2-(3"-iso-propylbenzo)cyclopentene-3-spiro-5'-bicyclo [2.2.1]-2'-heptene,
1,2-(4"-iso-propylbenzo)cyclopentene-3-spiro-5'-bicyclo [2.2.1]-2'-heptene,
1,2-(5"-iso-propylbenzo)cyclopentene-3-spiro-5'-bicyclo [2.2.1]-2'-heptene,
1,2-(6"-iso-propylbenzo)cyclopentene-3-spiro-5'-bicyclo [2.2.1]-2'-heptene,
1,2-(3"-n-butylbenzo)cyclopentene-3-spiro-5'-bicyclo [2.2.1]-2'-heptene,
1,2-(4"-n-butylbenzo)cyclopentene-3-spiro-5'-bicyclo [2.2.1]-2'-heptene,
1,2-(5"-n-butylbenzo)cyclopentene-3-spiro-5'-bicyclo [2.2.1]-2'-heptene,
1,2-(6"-n-butylbenzo)cyclopentene-3-spiro-5'-bicyclo [2.2.1]-2'-heptene,
1,2-(3"-iso-butylbenzo)cyclopentene-3-spiro-5'-bicyclo [2.2.1]-2'-heptene,
1,2-(4"-iso-butylbenzo)cyclopentene-3-spiro-5'-bicyclo [2.2.1]-2'-heptene,
1,2-(5"-iso-butylbenzo)cyclopentene-3-spiro-5'-bicyclo [2.2.1]-2'-heptene,
1,2-(6"-iso-butylbenzo)cyclopentene-3-spiro-5'-bicyclo [2.2.1]-2'-heptene,
1,2-(3"-sec-butylbenzo)cyclopentene-3-spiro-5'-bicyclo [2.2.1]-2'-heptene,
1,2-(4"-sec-butylbenzo)cyclopentene-3-spiro-5'-bicyclo [2.2.1]-2'-heptene,
1,2-(5"-sec-butylbenzo)cyclopentene-3-spiro-5'-bicyclo [2.2.1]-2'-heptene,
1,2-(6"-sec-butylbenzo)cyclopentene-3-spiro-5'-bicyclo [2.2.1]-2'-heptene,
1,2-(3"-t-butylbenzo)cyclopentene-3-spiro-5'-bicyclo [2.2.1]-2'-heptene,
1,2-(4"-t-butylbenzo)cyclopentene-3-spiro-5'-bicyclo [2.2.1]-2'-heptene,
1,2-(5"-t-butylbenzo)cyclopentene-3-spiro-5'-bicyclo [2.2.1]-2'-heptene,
1,2-(6"-t-butylbenzo)cyclopentene-3-spiro-5'-bicyclo [2.2.1]-2'-heptene,
1,2-(3"-cyclohexylbenzo)cyclopentene-3-spiro-5'-bicyclo [2.2.1]-2'-heptene,
1,2-(4"-cyclohexylbenzo)cyclopentene-3-spiro-5'-bicyclo [2.2.1]-2'-heptene,
1,2-(5"-cyclohexylbenzo)cyclopentene-3-spiro-5'-bicyclo [2.2.1]-2'-heptene,
1,2-(6"-cyclohexylbenzo)cyclopentene-3-spiro-5'-bicyclo [2.2.1]-2'-heptene,
1,2-(3"-phenylbenzo)cyclopentene-3-spiro-5'-bicyclo [2.2.1]-2'-heptene,
1,2-(4"-phenylbenzo)cyclopentene-3-spiro-5'-bicyclo [2.2.1]-2'-heptene,
1,2-(5"-phenylbenzo)cyclopentene-3-spiro-5'-bicyclo [2.2.1]-2'-heptene,
1,2-(6"-phenylbenzo)cyclopentene-3-spiro-5'-bicyclo [2.2.1]-2'-heptene,
1,2-(3"-chlorobenzo)cyclopentene-3-spiro-5'-bicyclo [2.2.1]-2'-heptene,
1,2-(4"-chlorobenzo)cyclopentene-3-spiro-5'-bicyclo [2.2.1]-2'-heptene,
1,2-(5"-chlorobenzo)cyclopentene-3-spiro-5'-bicyclo [2.2.1]-2'-heptene,
1,2-(6"-chlorobenzo)cyclopentene-3-spiro-5'-bicyclo [2.2.1]-2'-heptene,
1,2-(3"-aminobenzo)cyclopentene-3-spiro-5'-bicyclo [2.2.1]-2'-heptene,
1,2-(4"-aminobenzo)cyclopentene-3-spiro-5'-bicyclo [2.2.1]-2'-heptene,
1,2-(5"-aminobenzo)cyclopentene-3-spiro-5'-bicyclo [2.2.1]-2'-heptene,
1,2-(6"-aminobenzo)cyclopentene-3-spiro-5'-bicyclo [2.2.1]-2'-heptene,
1,2-(3"-methoxybenzo)cyclopentene-3-spiro-5'-bicyclo [2.2.1]-2'-heptene,
1,2-(4"-methoxybenzo)cyclopentene-3-spiro-5'-bicyclo [2.2.1]-2'-heptene,
1,2-(5"-methoxybenzo)cyclopentene-3-spiro-5'-bicyclo [2.2.1]-2'-heptene,
1,2-(6"-methoxybenzo)cyclopentene-3-spiro-5'-bicyclo [2.2.1]-2'-heptene, 1,2-benzocyclopentene-4-spiro-5'-bicyclo[2.2.1]-2'-heptene,
1,2-(3"-methylbenzo)cyclopentene-4-spiro-5'-bicyclo[2.2.1]-2'-heptene,
1,2-(4"-methylbenzo)cyclopentene-4-spiro-5'-bicyclo[2.2.1]-2'-heptene,
1,2-(3"-ethylbenzo)cyclopentene-4-spiro-5'-bicyclo[2.2.1]-2'-heptene,
1,2-(4"-ethylbenzo)cyclopentene-4-spiro-5'-bicyclo[2.2.1]-2'-heptene,
1,2-(3"-n-propylbenzo)cyclopentene-4-spiro-5'-bicyclo[2.2.1]-2'-heptene,
1,2-(4"-n-propylbenzo)cyclopentene-4-spiro-5'-bicyclo[2.2.1]-2'-heptene,
1,2-(3"-iso-propylbenzo)cyclopentene-4-spiro-5'-bicyclo[2.2.1]-2'-heptene,
1,2-(4"-iso-propylbenzo)cyclopentene-4-spiro-5'-bicyclo[2.2.1]-2'-heptene,
1,2-(3"-n-butylbenzo)cyclopentene-4-spiro-5'-bicyclo[2.2.1]-2'-heptene,
1,2-(4"-n-butylbenzo)cyclopentene-4-spiro-5'-bicyclo[2.2.1]-2'-heptene,
1,2-(3"-iso-butylbenzo)cyclopentene-4-spiro-5'-bicyclo[2.2.1]-2'-heptene,
1,2-(4"-iso-butylbenzo)cyclopentene-4-spiro-5'-bicyclo[2.2.1]-2'-heptene,
1,2-(3"-sec-butylbenzo)cyclopentene-4-spiro-5'-bicyclo[2.2.1]-2'-heptene,
1,2-(4"-sec-butylbenzo)cyclopentene-4-spiro-5'-bicyclo[2.2.1]-2'-heptene,
1,2-(3"-t-butylbenzo)cyclopentene-4-spiro-5'-bicyclo[2.2.1]-2'-heptene,
1,2-(4"-t-butylbenzo)cyclopentene-4-spiro-5'-bicyclo[2.2.1]-2'-heptene,
1,2-(3'-cyclohexylbenzo)cyclopentene-4-spiro-5'-bicyclo[2.2.1]-2'-heptene,
1,2-(4"-cyclohexylbenzo)cyclopentene-4-spiro-5'-bicyclo[2.2.1]-2'-heptene,
1,2-(3"-phenylbenzo)cyclopentene-4-spiro-5'-bicyclo[2.2.1]-2'-heptene,
1,2-(4"-phenylbenzo)cyclopentene-4-spiro-5'-bicyclo[2.2.1]-2'-heptene,
1,2-(3"-chlorobenzo)cyclopentene-4-spiro-5'-bicyclo[2.2.1]-2'-heptene,
1,2-(4"-chlorobenzo)cyclopentene-4-spiro-5'-bicyclo[2.2.1]-2'-heptene,
1,2-(3"-aminobenzo)cyclopentene-4-spiro-5'-bicyclo[2.2.1]-2'-heptene,
1,2-(4"-aminobenzo)cyclopentene-4-spiro-5'-bicyclo[2.2.1]-2'-heptene,
1,2-(3"-methoxybenzo)cyclopentene-4-spiro-5'-bicyclo[2.2.1]-2'-heptene,
1,2-(4"-methoxybenzo)cyclopentene-4-spiro-5'-bicyclo[2.2.1]-2'-heptene.
(ii)
spiro[3,4-dihydro-2H-naphthalene-1,5'-2'-norbornene],
spiro[5-methyl-3,4-dihydro-2H-naphthalene-1,5'-2'-norbornene],
spiro[6-methyl-3,4-dihydro-2H-naphthalene-1,5'-2'-norbornene],
spiro[7-methyl-3,4-dihydro-2H-naphthalene-1,5'-2'-norbornene],
spiro[8-methyl-3,4-dihydro-2H-naphthalene-1,5'-2'-norbornene],
spiro[5-ethyl-3,4-dihydro-2H-naphthalene-1,5'-2'-norbornene],
spiro[6-ethyl-3,4-dihydro-2H-naphthalene-1,5'-2'-norbornene],
spiro[7-ethyl-3,4-dihydro-2H-naphthalene-1,5'-2'-norbornene],
spiro[8-ethyl-3,4-dihydro-2H-naphthalene-1,5'-2'-norbornene],
spiro[5-n-propyl-3,4-dihydro-2H-naphthalene-1,5'-2'-norbornene],
spiro[6-n-propyl-3,4-dihydro-2H-naphthalene-1,5'-2'-norbornene],
spiro[7-n-propyl-3,4-dihydro-2H-naphthalene-1,5'-2'-norbornene],
spiro[8-n-propyl-3,4-dihydro-2H-naphthalene-1,5'-2'-norbornene],
spiro[5-iso-propyl-3,4-dihydro-2H-naphthalene-1,5'-2'-norbornene],
spiro[6-iso-propyl-3,4-dihydro-2H-naphthalene-1,5'-2'-norbornene],
spiro[7-iso-propyl-3,4-dihydro-2H-naphthalene-1,5'-2'-norbornene],
spiro[8-iso-propyl-3,4-dihydro-2H-naphthalene-1,5'-2'-norbornene],
spiro[5-n-butyl-3,4-dihydro-2H-naphthalene-1,5'-2'-norbornene],
spiro[6-n-butyl-3,4-dihydro-2H-naphthalene-1,5'-2'-norbornene],
spiro[7-n-butyl-3,4-dihydro-2H-naphthalene-1,5'-2'-norbornene],
spiro[8-n-butyl-3,4-dihydro-2H-naphthalene-1,5'-2'-norbornene],
spiro[5-iso-butyl-3,4-dihydro-2H-naphthalene-1,5'-2'-norbornene],
spiro[6-iso-butyl-3,4-dihydro-2H-naphthalene-1,5'-2'-norbornene],
spiro[7-iso-butyl-3,4-dihydro-2H-naphthalene-1,5'-2'-norbornene],
spiro[8-iso-butyl-3,4-dihydro-2H-naphthalene-1,5'-2'-norbornene],
spiro[5-sec-butyl-3,4-dihydro-2H-naphthalene-1,5'-2'-norbornene],
spiro[6-sec-butyl-3,4-dihydro-2H-naphthalene-1,5'-2'-norbornene],
spiro[7-sec-butyl-3,4-dihydro-2H-naphthalene-1,5'-2'-norbornene],
spiro[8-sec-butyl-3,4-dihydro-2H-naphthalene-1,5'-2'-norbornene],
spiro[5-t-butyl-3,4-dihydro-2H-naphthalene-1,5'-2'-norbornene],
spiro[6-t-butyl-3,4-dihydro-2H-naphthalene-1,5'-2'-norbornene],
spiro[7-t-butyl-3,4-dihydro-2H-naphthalene-1,5'-2'-norbornene],
spiro[8-t-butyl-3,4-dihydro-2H-naphthalene-1,5'-2'-norbornene],
spiro[5-cyclohexyl-3,4-dihydro-2H-naphthalene-1,5'-2'-norbornene],
spiro[6-cyclohexyl-3,4-dihydro-2H-naphthalene-1,5'-2'-norbornene],
spiro[7-cyclohexyl-3,4-dihydro-2H-naphthalene-1,5'-2'-norbornene],
spiro[8-cyclohexyl-3,4-dihydro-2H-naphthalene-1,5'-2'-norbornene],
spiro[5-phenyl-3,4-dihydro-2H-naphthalene-1,5'-2'-norbornene],
spiro[6-phenyl-3,4-dihydro-2H-naphthalene-1,5'-2'-norbornene], spiro[7-phenyl-3,4-dihydro-2H-naphthalene-1,5'-2'-norbornene],
spiro[8-phenyl-3,4-dihydro-2H-naphthalene-1,5'-2'-norbornene],
spiro[5-chloro-3,4-dihydro-2H-naphthalene-1,5'-2'-norbornene],
spiro[6-chloro-3,4-dihydro-2H-naphthalene-1,5'-2'-norbornene],
spiro[7-chloro-3,4-dihydro-2H-naphthalene-1,5'-2'-norbornene],
spiro[8-chloro-3,4-dihydro-2H-naphthalene-1,5'-2'-norbornene],
spiro[5-phenyl-3,4-dihydro-2H-naphthalene-1,5'-2'-norbornene],
spiro[6-phenyl-3,4-dihydro-2H-naphthalene-1,5'-2'-norbornene],
spiro[7-phenyl-3,4-dihydro-2H-naphthalene-1,5'-2'-norbornene],
spiro[8-phenyl-3,4-dihydro-2H-naphthalene-1,5'-2'-norbornene],
spiro[5-amino-3,4-dihydro-2H-naphthalene-1,5'-2'-norbornene],
spiro[6-amino-3,4-dihydro-2H-naphthalene-1,5'-2'-norbornene],
spiro[7-amino-3,4-dihydro-2H-naphthalene-1,5'-2'-norbornene],
spiro[8-amino-3,4-dihydro-2H-naphthalene-1,5'-2'-norbornene],
spiro[5-methoxy-3,4-dihydro-2H-naphthalene-1,5'-2'-norbornene],
spiro[6-methoxy-3,4-dihydro-2H-naphthalene-1,5'-2'-norbornene],
spiro[7-methoxy-3,4-dihydro-2H-naphthalene-1,5'-2'-norbornene],
spiro[8-methoxy-3,4-dihydro-2H-naphthalene-1,5'-2'-norbornene],
spiro[3,4-dihydro-1H-naphthalene-2,5'-2'-norbornene],
spiro[5-methyl-3,4-dihydro-1H-naphthalene-2,5'-2'-norbornene],
spiro[6-methyl-3,4-dihydro-2H-naphthalene-2,5'-2'-norbornene],
spiro[7-methyl-3,4-dihydro-1H-naphthalene-2,5'-2'-norbornene],
spiro[8-methyl-3,4-dihydro-1H-naphthalene-2,5'-2'-norbornene],
spiro[5-ethyl-3,4-dihydro-1H-naphthalene-2,5'-2'-norbornene],
spiro[6-ethyl-3,4-dihydro-1H-naphthalene-2,5'-2'-norbornene],
spiro[7-ethyl-3,4-dihydro-1H-naphthalene-2,5'-2'-norbornene],
spiro[8-ethyl-3,4-dihydro-1H-naphthalene-2,5'-2'-norbornene],
spiro[5-n-propyl-3,4-dihydro-1H-naphthalene-2,5'-2'-norbornene],
spiro[6-n-propyl-3,4-dihydro-1H-naphthalene-2,5'-2'-norbornene],
spiro[7-n-propyl-3,4-dihydro-1H-naphthalene-2,5'-2'-norbornene],
spiro[8-n-propyl-3,4-dihydro-1H-naphthalene-2,5'-2'-norbornene],
spiro[5-iso-propyl-3,4-dihydro-1H-naphthalene-2,5'-2'-norbornene],
spiro[6-iso-propyl-3,4-dihydro-1H-naphthalene-2,5'-2'-norbornene],
spiro[7-iso-propyl-3,4-dihydro-1H-naphthalene-2,5'-2'-norbornene],
spiro[8-iso-propyl-3,4-dihydro-1H-naphthalene-2,5'-5'-norbornene],
spiro[5-n-butyl-3,4-dihydro-1H-naphthalene-2,5'-2'-norbornene],
spiro[6-n-butyl-3,4-dihydro-1H-naphthalene-2,5'-2'-norbornene],
spiro[7-n-butyl-3,4-dihydro-1H-naphthalene-2,5'-2'-norbornene],
spiro[8-n-butyl-3,4-dihydro-1H-naphthalene-2,5'-2'-norbornene],
spiro[5-iso-butyl-3,4-dihydro-1H-naphthalene-2,5'-2'-norbornene],
spiro[6-iso-butyl-3,4-dihydro-1H-naphthalene-2,5'-2'-norbornene],
spiro[7-iso-butyl-3,4-dihydro-1H-naphthalene-2,5'-2'-norbornene],
spiro[8-iso-butyl-3,4-dihydro-1H-naphthalene-2,5'-2'-norbornene],
spiro[5-sec-butyl-3,4-dihydro-1H-naphthalene-2,5'-2'-norbornene],
spiro[6-sec-butyl-3,4-dihydro-1H-naphthalene-2,5'-2'-norbornene],
spiro[7-sec-butyl-3,4-dihydro-1H-naphthalene-2,5'-2'-norbornene],
spiro[8-sec-butyl-3,4-dihydro-1H-naphthalene-2,5'-2'-norbornene],
spiro[5-t-butyl-3,4-dihydro-1H-naphthalene-2,5'-2'-norbornene],
spiro[6-t-butyl-3,4-dihydro-1H-naphthalene-2,5'-2'-norbornene],
spiro[7-t-butyl-3,4-dihydro-1H-naphthalene-2,5'-2'-norbornene],
spiro[8-t-butyl-3,4-dihydro-1H-naphthalene-2,5'-2'-norbornene],
spiro[5-cyclohexyl-3,4-dihydro-1H-naphthalene-2,5'-2'-norbornene],
spiro[6-cyclohexyl-3,4-dihydro-1H-naphthalene-2,5'-2'-norbornene],
spiro[7-cyclohexyl-3,4-dihydro-1H-naphthalene-2,5'-2'-norbornene],
spiro[8-cyclohexyl-3,4-dihydro-1H-naphthalene-2,5'-2'-norbornene],
spiro[5-phenyl-3,4-dihydro-1H-naphthalene-2,5'-2'-norbornene],
spiro[6-phenyl-3,4-dihydro-1H-naphthalene-2,5'-2'-norbornene],
spiro[7-phenyl-3,4-dihydro-1H-naphthalene-2,5'-2'-norbornene],
spiro[8-phenyl-3,4-dihydro-1H-naphthalene-2,5'-2'-norbornene],
spiro[5-chloro-3,4-dihydro-1H-naphthalene-2,5'-2'-norbornene],
spiro[6-chloro-3,4-dihydro-1H-naphthalene-2,5'-2'-norbornene],
spiro[7-chloro-3,4-dihydro-1H-naphthalene-2,5'-2'-norbornene],
spiro[8-chloro-3,4-dihydro-1H-naphthalene-2,5'-2'-norbornene],
spiro[5-phenyl-3,4-dihydro-1H-naphthalene-2,5'-2'-norbornene],
spiro[6-phenyl-3,4-dihydro-1H-naphthalene-2,5'-2'-norbornene],
spiro[7-phenyl-3,4-dihydro-1H-naphthalene-2,5'-2'-norbornene],
spiro[8-phenyl-3,4-dihydro-1H-naphthalene-2,5'-2'-norbornene], spiro[5-amino-3,4-dihydro-1H-naphthalene-2,5'-2'-norbornene],
spiro[6-amino-3,4-dihydro-1H-naphthalene-2,5'-2'-norbornene],
spiro[7-amino-3,4-dihydro-1H-naphthalene-2,5'-2'-norbornene],
spiro[8-amino-3,4-dihydro-1H-naphthalene-2,5'-2'-norbornene],
spiro[5-methoxy-3,4-dihydro-1H-naphthalene-2,5'-2'-norbornene],
spiro[6-methoxy-3,4-dihydro-1H-naphthalene-2,5'-2'-norbornene],
spiro[7-methoxy-3,4-dihydro-1H-naphthalene-2,5'-2'-norbornene],
spiro[8-methoxy-3,4-dihydro-1H-naphthalene-2,5'-2'-norbornene].

(iii)
1,2-benzocycloheptene-3-spiro-5'-bicyclo[2.2.1]-2'-heptene,
1,2-(3"-methylbenzo)cycloheptene-3-spiro-5'-bicyclo[2.2.1]-2'-heptene,
1,2-(4"-methylbenzo)cycloheptene-3-spiro-5'-bicyclo[2.2.1]-2'-heptene,
1,2-(3"-ethylbenzo)cycloheptene-3-spiro-5'-bicyclo[2.2.1]-2'-heptene,
1,2-(4"-ethylbenzo)cycloheptene-3-spiro-5'-bicyclo[2.2.1]-2'-heptene,
1,2-(3"-n-propylbenzo)cycloheptene-3-spiro-5'-bicyclo[2.2.1]-2'-heptene,
1,2-(4"-n-propylbenzo)cycloheptene-3-spiro-5'-bicyclo[2.2.1]-2'-heptene,
1,2-(3"-iso-propylbenzo)cycloheptene-3-spiro-5'-bicyclo[2.2.1]-2'-heptene,
1,2-(4"-iso-propylbenzo)cycloheptene-3-spiro-5'-bicyclo[2.2.1]-2'-heptene,
1,2-(3"-n-butylbenzo)cycloheptene-3-spiro-5'-bicyclo[2.2.1]-2'-heptene,
1,2-(4"-n-butylbenzo)cycloheptene-3-spiro-5'-bicyclo[2.2.1]-2'-heptene,
1,2-(3"-iso-butylbenzo)cycloheptene-3-spiro-5'-bicyclo[2.2.1]-2'-heptene,
1,2-(4"-iso-butylbenzo)cycloheptene-3-4-spiro-5'-bicyclo[2.2.1]-2'-heptene,
1,2-(3"-sec-butylbenzo)cycloheptene-3-spiro-5'-bicyclo[2.2.1]-2'-heptene,
1,2-(4"-sec-butylbenzo)cycloheptene-3-spiro-5'-bicyclo[2.2.1]-2'-heptene,
1,2-(3"-t-butylbenzo)cycloheptene-3-spiro-5'-bicyclo[2.2.1]-2'-heptene,
1,2-(4"-t-butylbenzo)cycloheptene-3-spiro-5'-bicyclo[2.2.1]-2'-heptene,
1,2-(3'-cyclohexylbenzo)cycloheptene-3-spiro-5'-bicyclo[2.2.1]-2'-heptene,
1,2-(4"-cyclohexylbenzo)cycloheptene-3-spiro-5'-bicyclo[2.2.1]-2'-heptene,
1,2-(3"-phenylbenzo)cycloheptene-3-spiro-5'-bicyclo[2.2.1]-2'-heptene,
1,2-(4"-phenylbenzo)cycloheptene-3-spiro-5'-bicyclo[2.2.1]-2'-heptene,
1,2-(3"-chlorobenzo)cycloheptene-3-spiro-5'-bicyclo[2.2.1]-2'-heptene,
1,2-(4"-chlorobenzo)cycloheptene-3-spiro-5'-bicyclo[2.2.1]-2'-heptene,
1,2-(3"-aminobenzo)cycloheptene-3-spiro-5'-bicyclo[2.2.1]-2'-heptene,
1,2-(4"-aminobenzo)cycloheptene-3-spiro-5'-bicyclo[2.2.1]-2'-heptene,
1,2-(3"-methoxybenzo)cycloheptene-3-spiro-5'-bicyclo[2.2.1]-2'-heptene,
1,2-(4"-methoxybenzo)cycloheptene-3-spiro-5'-bicyclo[2.2.1]-2'-heptene,
1,2-benzocycloheptene-4-spiro-5'-bicyclo[2.2.1]-2'-heptene,
1,2-(3"-methylbenzo)cycloheptene-4-spiro-5'-bicyclo[2.2.1]-2'-heptene,
1,2-(4"-methylbenzo)cycloheptene-4-spiro-5'-bicyclo[2.2.1]-2'-heptene,
1,2-(5"-methylbenzo)cycloheptene-4-spiro-5'-bicyclo[2.2.1]-2'-heptene,
1,2-(5"-methylbenzo)cycloheptene-4-spiro-5'-bicyclo[2.2.1]-2'-heptene,
1,2-(3"-ethylbenzo)cycloheptene-4-spiro-5'-bicyclo[2.2.1]-2'-heptene,
1,2-(4"-ethylbenzo)cycloheptene-4-spiro-5'-bicyclo[2.2.1]-2'-heptene,
1,2-(5"-ethylbenzo)cycloheptene-4-spiro-5'-bicyclo[2.2.1]-2'-heptene,
1,2-(6"-ethylbenzo)cycloheptene-4-spiro-5'-bicyclo[2.2.1]-2'-heptene,
1,2-(3"-n-propylbenzo)cycloheptene-4-spiro-5'-bicyclo[2.2.1]-2'-heptene,
1,2-(4"-n-propylbenzo)cycloheptene-4-spiro-5'-bicyclo[2.2.1]-2'-heptene,
1,2-(5"-n-propylbenzo)cycloheptene-4-spiro-5'-bicyclo[2.2.1]-2'-heptene,
1,2-(6"-n-propylbenzo)cycloheptene-4-spiro-5'-bicyclo[2.2.1]-2'-heptene,
1,2-(3"-iso-propylbenzo)cycloheptene-4-spiro-5'-bicyclo[2.2.1]-2'-heptene,
1,2-(4"-iso-propylbenzo)cycloheptene-4-spiro-5'-bicyclo[2.2.1]-2'-heptene,
1,2-(5"-iso-propylbenzo)cycloheptene-4-spiro-5'-bicyclo[2.2.1]-2'-heptene,
1,2-(6"-iso-propylbenzo)cycloheptene-4-spiro-5'-bicyclo[2.2.1]-2'-heptene,
1,2-(3"-n-butylbenzo)cycloheptene-4-spiro-5'-bicyclo[2.2.1]-2'-heptene,
1,2-(4"-n-butylbenzo)cycloheptene-4-spiro-5'-bicyclo[2.2.1]-2'-heptene,
1,2-(5"-n-butylbenzo)cycloheptene-4-spiro-5'-bicyclo[2.2.1]-2'-heptene,
1,2-(6"-n-butylbenzo)cycloheptene-4-spiro-5'-bicyclo[2.2.1]-2'-heptene,
1,2-(3"-iso-butylbenzo)cycloheptene-4-spiro-5'-bicyclo[2.2.1]-2'-heptene,
1,2-(4"-iso-butylbenzo)cycloheptene-4-spiro-5'-bicyclo[2.2.1]-2'-heptene,
1,2-(5"-iso-butylbenzo)cycloheptene-4-spiro-5'-bicyclo[2.2.1]-2'-heptene,
1,2-(6"-iso-butylbenzo)cycloheptene-4-spiro-5'-bicyclo[2.2.1]-2'-heptene,
1,2-(3"-sec-butylbenzo)cycloheptene-4-spiro-5'-bicyclo[2.2.1]-2'-heptene,
1,2-(4"-sec-butylbenzo)cycloheptene-4-spiro-5'-bicyclo[2.2.1]-2'-heptene,
1,2-(5"-sec-butylbenzo)cycloheptene-4-spiro-5'-bicyclo[2.2.1]-2'-heptene,
1,2-(6"-sec-butylbenzo)cycloheptene-4-spiro-5'-bicyclo[2.2.1]-2'-heptene,
1,2-(3"-t-butylbenzo)cycloheptene-4-spiro-5'-bicyclo[2.2.1]-2'-heptene,
1,2-(4"-t-butylbenzo)cycloheptene-4-spiro-5'-bicyclo[2.2.1]-2'-heptene, 1,2-(5"-t-butylbenzo)cycloheptene-4-spiro-5'-bicyclo[2.2.1]-2'-heptene,
1,2-(6"-t-butylbenzo)cycloheptene-4-spiro-5'-bicyclo[2.2.1]-2'-heptene,
1,2-(3'-cyclohexylbenzo)cycloheptene-4-spiro-5'-bicyclo[2.2.1]-2'-heptene,
1,2-(4"-cyclohexylbenzo)cycloheptene-4-spiro-5'-bicyclo[2.2.1]-2'-heptene,
1,2-(5"-cyclohexylbenzo)cycloheptene-4-spiro-5'-bicyclo[2.2.1]-2'-heptene,
1,2-(6"-cyclohexylbenzo)cycloheptene-4-spiro-5'-bicyclo[2.2.1]-2'-heptene,
1,2-(3"-phenylbenzo)cycloheptene-4-spiro-5'-bicyclo[2.2.1]-2'-heptene,
1,2-(4"-phenylbenzo)cycloheptene-4-spiro-5'-bicyclo[2.2.1]-2'-heptene,
1,2-(5"-phenylbenzo)cycloheptene-4-spiro-5'-bicyclo[2.2.1]-2'-heptene,
1,2-(6"-phenylbenzo)cycloheptene-4-spiro-5'-bicyclo[2.2.1]-2'-heptene,
1,2-(3"-chlorobenzo)cycloheptene-4-spiro-5'-bicyclo[2.2.1]-2'-heptene,
1,2-(4"-chlorobenzo)cycloheptene-4-spiro-5'-bicyclo[2.2.1]-2'-heptene,
1,2-(5"-chlorobenzo)cycloheptene-4-spiro-5'-bicyclo[2.2.1]-2'-heptene,
1,2-(6"-chlorobenzo)cycloheptene-4-spiro-5'-bicyclo[2.2.1]-2'-heptene,
1,2-(3"-aminobenzo)cycloheptene-4-spiro-5'-bicyclo[2.2.1]-2'-heptene,
1,2-(4"-aminobenzo)cycloheptene-4-spiro-5'-bicyclo[2.2.1]-2'-heptene,
1,2-(5"-aminobenzo)cycloheptene-4-spiro-5'-bicyclo[2.2.1]-2'-heptene,
1,2-(6"-aminobenzo)cycloheptene-4-spiro-5'-bicyclo[2.2.1]-2'-heptene,
1,2-(3"-methoxybenzo)cycloheptene-4-spiro-5'-bicyclo[2.2.1]-2'-heptene,
1,2-(4"-methoxybenzo)cycloheptene-4-spiro-5'-bicyclo[2.2.1]-2'-heptene,
1,2-(5"-methoxybenzo)cycloheptene-4-spiro-5'-bicyclo[2.2.1]-2'-heptene,
1,2-(6"-methoxybenzo)cycloheptene-4-spiro-5'-bicyclo[2.2.1]-2'-heptene,
1,2-benzocycloheptene-5-spiro-5'-bicyclo[2.2.1]-2'-heptene,
1,2-(3"-methylbenzo)cycloheptene-5-spiro-5'-bicyclo[2.2.1]-2'-heptene,
1,2-(4"-methylbenzo)cycloheptene-5-spiro-5'-bicyclo[2.2.1]-2'-heptene,
1,2-(3"-ethylbenzo)cycloheptene-5-spiro-5'-bicyclo[2.2.1]-2'-heptene,
1,2-(4"-ethylbenzo)cycloheptene-5-spiro-5'-bicyclo[2.2.1]-2'-heptene,
1,2-(3"-n-propylbenzo)cycloheptene-5-spiro-5'-bicyclo[2.2.1]-2'-heptene,
1,2-(4"-n-propylbenzo)cycloheptene-4-spiro-5'-bicyclo[2.2.1]-2'-heptene,
1,2-(3"-iso-propylbenzo)cycloheptene-5-spiro-5'-bicyclo[2.2.1]-2'-heptene,
1,2-(4"-iso-propylbenzo)cycloheptene-5-spiro-5'-bicyclo[2.2.1]-2'-heptene,
1,2-(3"-n-butylbenzo)cycloheptene-5-spiro-5'-bicyclo[2.2.1]-2'-heptene,
1,2-(4"-n-butylbenzo)cycloheptene-5-spiro-5'-bicyclo[2.2.1]-2'-heptene,
1,2-(3"-iso-butylbenzo)cycloheptene-5-spiro-5'-bicyclo[2.2.1]-2'-heptene,
1,2-(4"-iso-butylbenzo)cycloheptene-5-spiro-5'-bicyclo[2.2.1]-2'-heptene,
1,2-(3"-sec-butylbenzo)cycloheptene-5-spiro-5'-bicyclo[2.2.1]-2'-heptene,
1,2-(4"-sec-butylbenzo)cycloheptene-5-spiro-5'-bicyclo[2.2.1]-2'-heptene,
1,2-(3"-t-butylbenzo)cycloheptene-5-spiro-5'-bicyclo[2.2.1]-2'-heptene,
1,2-(4"-t-butylbenzo)cycloheptene-5-spiro-5'-bicyclo[2.2.1]-2'-heptene,
1,2-(3"-cyclohexylbenzo)cycloheptene-5-spiro-5'-bicyclo[2.2.1]-2'-heptene,
1,2-(4"-cyclohexylbenzo)cycloheptene-5-spiro-5'-bicyclo[2.2.1]-2'-heptene,
1,2-(3"-phenylbenzo)cycloheptene-5-spiro-5'-bicyclo[2.2.1]-2'-heptene,
1,2-(4"-phenylbenzo)cycloheptene-5-spiro-5'-bicyclo[2.2.1]-2'-heptene,
1,2-(3"-chlorobenzo)cycloheptene-5-spiro-5'-bicyclo[2.2.1]-2'-heptene,
1,2-(4"-chlorobenzo)cycloheptene-5-spiro-5'-bicyclo[2.2.1]-2'-heptene,
1,2-(3"-aminobenzo)cycloheptene-5-spiro-5'-bicyclo[2.2.1]-2'-heptene,
1,2-(4"-aminobenzo)cycloheptene-5-spiro-5'-bicyclo[2.2.1]-2'-heptene,
1,2-(3"-methoxybenzo)cycloheptene-5-spiro-5'-bicyclo[2.2.1]-2'-heptene,
1,2-(4"-methoxybenzo)cycloheptene-5-spiro-5'-bicyclo[2.2.1]-2'-heptene.

(iv)
1,2-benzocyclooctene-3-spiro-5'-bicyclo[2.2.1]-2'-heptene,
1,2-(3"-methylbenzo)cyclooctene-3-spiro-5'-bicyclo[2.2.1]-2'-heptene,
1,2-(4"-methylbenzo)cyclooctene-3-spiro-5'-bicyclo[2.2.1]-2'-heptene,
1,2-(5"-methylbenzo)cyclooctene-3-spiro-5'-bicyclo[2.2.1]-2'-heptene,
1,2-(6"-methylbenzo)cyclooctene-3-spiro-5'-bicyclo[2.2.1]-2'-heptene,
1,2-(3"-ethylbenzo)cyclooctene-3-spiro-5'-bicyclo[2.2.1]-2'-heptene,
1,2-(4"-ethylbenzo)cycloheptene-3-spiro-5'-bicyclo[2.2.1]-2'-heptene,
1,2-(3"-n-propylbenzo)cycloheptene-3-spiro-5'-bicyclo[2.2.1]-2'-heptene,
1,2-(4"-n-propylbenzo)cyclooctene-3-spiro-5'-bicyclo[2.2.1]-2'-heptene,
1,2-(5"-n-propylbenzo)cyclooctene-3-spiro-5'-bicyclo[2.2.1]-2'-heptene,
1,2-(6"-n-propylbenzo)cyclooctene-3-spiro-5'-bicyclo[2.2.1]-2'-heptene,
1,2-(3"-iso-propylbenzo)cyclooctene-3-spiro-5'-bicyclo[2.2.1]-2'-heptene,
1,2-(4"-iso-propylbenzo)cyclooctene-3-spiro-5'-bicyclo[2.2.1]-2'-heptene,
1,2-(5"-iso-propylbenzo)cyclooctene-3-spiro-5'-bicyclo[2.2.1]-2'-heptene,
1,2-(6"-iso-propylbenzo)cyclooctene-3-spiro-5'-bicyclo[2.2.1]-2'-heptene,
1,2-(3"-n-butylbenzo)cyclooctene-3-spiro-5'-bicyclo[2.2.1]-2'-heptene,
1,2-(4"-n-butylbenzo)cyclooctene-3-spiro-5'-bicyclo[2.2.1]-2'-heptene, 1,2-(3"-iso-butylbenzo)cyclooctene-3-spiro-5'-bicyclo[2.2.1]-2'-heptene,
1,2-(4"-iso-butylbenzo)cyclooctene-3-spiro-5'-bicyclo[2.2.1]-2'-heptene,
1,2-(5"-iso-butylbenzo)cyclooctene-3-spiro-5'-bicyclo[2.2.1]-2'-heptene,
1,2-(6"-iso-butylbenzo)cyclooctene-3-spiro-5'-bicyclo[2.2.1]-2'-heptene,
1,2-(3"-sec-butylbenzo)cycloheptene-3-spiro-5'-bicyclo[2.2.1]-2'-heptene,
1,2-(4"-sec-butylbenzo)cyclooctene-3-spiro-5'-bicyclo[2.2.1]-2'-heptene,
1,2-(3"-t-butylbenzo)cyclooctene-3-spiro-5'-bicyclo[2.2.1]-2'-heptene,
1,2-(4"-t-butylbenzo)cyclooctene-3-spiro-5'-bicyclo[2.2.1]-2'-heptene,
1,2-(3'-cyclohexylbenzo)cyclooctene-3-spiro-5'-bicyclo[2.2.1]-2'-heptene,
1,2-(4"-cyclohexylbenzo)cyclooctene-3-spiro-5'-bicyclo[2.2.1]-2'-heptene,
1,2-(5"-cyclohexylbenzo)cyclooctene-3-spiro-5'-bicyclo[2.2.1]-2'-heptene,
1,2-(6"-cyclohexylbenzo)cyclooctene-3-spiro-5'-bicyclo[2.2.1]-2'-heptene,
1,2-(3"-phenylbenzo)cyclooctene-3-spiro-5'-bicyclo[2.2.1]-2'-heptene,
1,2-(4"-phenylbenzo)cyclooctene-3-spiro-5'-bicyclo[2.2.1]-2'-heptene,
1,2-(3"-chlorobenzo)cyclooctene-3-spiro-5'-bicyclo[2.2.1]-2'-heptene,
1,2-(4"-chlorobenzo)cyclooctene-3-spiro-5'-bicyclo[2.2.1]-2'-heptene,
1,2-(5"-chlorobenzo)cyclooctene-3-spiro-5'-bicyclo[2.2.1]-2'-heptene,
1,2-(6"-chlorobenzo)cyclooctene-3-spiro-5'-bicyclo[2.2.1]-2'-heptene,
1,2-(3"-aminobenzo)cyclooctene-3-spiro-5'-bicyclo[2.2.1]-2'-heptene,
1,2-(4"-aminobenzo)cyclooctene-3-spiro-5'-bicyclo[2.2.1]-2'-heptene,
1,2-(3"-methoxybenzo)cyclooctene-3-spiro-5'-bicyclo[2.2.1]-2'-heptene,
1,2-(4"-methoxybenzo)cyclooctene-3-spiro-5'-bicyclo[2.2.1]-2'-heptene,
1,2-(5"-methoxybenzo)cyclooctene-3-spiro-5'-bicyclo[2.2.1]-2'-heptene,
1,2-(6"-methoxybenzo)cyclooctene-3-spiro-5'-bicyclo[2.2.1]-2'-heptene,
1,2-benzocyclooctene-4-spiro-5'-bicyclo[2.2.1]-2'-heptene,
1,2-(3"-methylbenzo)cyclooctene-4-spiro-5'-bicyclo[2.2.1]-2'-heptene,
1,2-(4"-methylbenzo)cyclooctene-4-spiro-5'-bicyclo[2.2.1]-2'-heptene,
1,2-(5"-methylbenzo)cyclooctene-4-spiro-5'-bicyclo[2.2.1]-2'-heptene,
1,2-(6"-methylbenzo)cyclooctene-4-spiro-5'-bicyclo[2.2.1]-2'-heptene,
1,2-(3"-ethylbenzo)cyclooctene-4-spiro-5'-bicyclo[2.2.1]-2'-heptene,
1,2-(4"-ethylbenzo)cycloheptene-4-spiro-5'-bicyclo[2.2.1]-2'-heptene,
1,2-(3"-n-propylbenzo)cycloheptene-4-spiro-5'-bicyclo[2.2.1]-2'-heptene,
1,2-(4"-n-propylbenzo)cyclooctene-4-spiro-5'-bicyclo[2.2.1]-2'-heptene,
1,2-(5"-n-propylbenzo)cyclooctene-4-spiro-5'-bicyclo[2.2.1]-2'-heptene,
1,2-(6"-n-propylbenzo)cyclooctene-4-spiro-5'-bicyclo[2.2.1]-2'-heptene,
1,2-(3"-iso-propylbenzo)cyclooctene-4-spiro-5'-bicyclo[2.2.1]-2'-heptene,
1,2-(4"-iso-propylbenzo)cyclooctene-4-spiro-5'-bicyclo[2.2.1]-2'-heptene,
1,2-(5"-iso-propylbenzo)cyclooctene-4-spiro-5'-bicyclo[2.2.1]-2'-heptene,
1,2-(6"-iso-propylbenzo)cyclooctene-4-spiro-5'-bicyclo[2.2.1]-2'-heptene,
1,2-(3"-n-butylbenzo)cyclooctene-4-spiro-5'-bicyclo[2.2.1]-2'-heptene,
1,2-(4"-n-butylbenzo)cyclooctene-4-spiro-5'-bicyclo[2.2.1]-2'-heptene,
1,2-(3"-iso-butylbenzo)cyclooctene-3-spiro-5'-bicyclo[2.2.1]-2'-heptene,
1,2-(4"-iso-butylbenzo)cyclooctene-4-spiro-5'-bicyclo[2.2.1]-2'-heptene,
1,2-(5"-iso-butylbenzo)cyclooctene-4-spiro-5'-bicyclo[2.2.1]-2'-heptene,
1,2-(6"-iso-butylbenzo)cyclooctene-4-spiro-5'-bicyclo[2.2.1]-2'-heptene,
1,2-(3"-sec-butylbenzo)cycloheptene-4-spiro-5'-bicyclo[2.2.1]-2'-heptene,
1,2-(4"-sec-butylbenzo)cyclooctene-4-spiro-5'-bicyclo[2.2.1]-2'-heptene,
1,2-(3"-t-butylbenzo)cyclooctene-4-spiro-5'-bicyclo[2.2.1]-2'-heptene,
1,2-(4"-t-butylbenzo)cyclooctene-4-spiro-5'-bicyclo[2.2.1]-2'-heptene,
1,2-(3'-cyclohexylbenzo)cyclooctene-4-spiro-5'-bicyclo[2.2.1]-2'-heptene,
1,2-(4"-cyclohexylbenzo)cyclooctene-4-spiro-5'-bicyclo[2.2.1]-2'-heptene,
1,2-(5"-cyclohexylbenzo)cyclooctene-4-spiro-5'-bicyclo[2.2.1]-2'-heptene,
1,2-(6"-cyclohexylbenzo)cyclooctene-4-spiro-5'-bicyclo[2.2.1]-2'-heptene,
1,2-(3"-phenylbenzo)cyclooctene-3-spiro-5'-bicyclo[2.2.1]-2'-heptene,
1,2-(4"-phenylbenzo)cyclooctene-4-spiro-5'-bicyclo[2.2.1]-2'-heptene,
1,2-(3"-chlorobenzo)cyclooctene-4-spiro-5'-bicyclo[2.2.1]-2'-heptene,
1,2-(4"-chlorobenzo)cyclooctene-4-spiro-5'-bicyclo[2.2.1]-2'-heptene,
1,2-(5"-chlorobenzo)cyclooctene-4-spiro-5'-bicyclo[2.2.1]-2'-heptene,
1,2-(6"-chlorobenzo)cyclooctene-4-spiro-5'-bicyclo[2.2.1]-2'-heptene,
1,2-(3"-aminobenzo)cyclooctene-4-spiro-5'-bicyclo[2.2.1]-2'-heptene,
1,2-(4"-aminobenzo)cyclooctene-4-spiro-5'-bicyclo[2.2.1]-2'-heptene,
1,2-(3"-methoxybenzo)cyclooctene-4-spiro-5'-bicyclo[2.2.1]-2'-heptene,
1,2-(4"-methoxybenzo)cyclooctene-4-spiro-5'-bicyclo[2.2.1]-2'-heptene,
1,2-(5"-methoxybenzo)cyclooctene-4-spiro-5'-bicyclo[2.2.1]-2'-heptene,
1,2-(6"-methoxybenzo)cyclooctene-4-spiro-5'-bicyclo[2.2.1]-2'-heptene,
1,2-benzocyclooctene-5-spiro-5'-bicyclo[2.2.1]-2'-heptene,
1,2-(3"-methylbenzo)cyclooctene-5-spiro-5'-bicyclo[2.2.1]-2'-heptene,
1,2-(4"-methylbenzo)cyclooctene-5-spiro-5'-bicyclo[2.2.1]-2'-heptene, 1,2-(5"-methylbenzo)cyclooctene-5-spiro-5'-bicyclo[2.2.1]-2'-heptene,
1,2-(6"-methylbenzo)cyclooctene-5-spiro-5'-bicyclo[2.2.1]-2'-heptene,
1,2-(3"-ethylbenzo)cyclooctene-5-spiro-5'-bicyclo[2.2.1]-2'-heptene,
1,2-(4"-ethylbenzo)cycloheptene-5-spiro-5'-bicyclo[2.2.1]-2'-heptene,
1,2-(3"-n-propylbenzo)cycloheptene-5-spiro-5'-bicyclo[2.2.1]-2'-heptene,
1,2-(4"-n-propylbenzo)cyclooctene-5-spiro-5'-bicyclo[2.2.1]-2'-heptene,
1,2-(5"-n-propylbenzo)cyclooctene-5-spiro-5'-bicyclo[2.2.1]-2'-heptene,
1,2-(6"-n-propylbenzo)cyclooctene-5-spiro-5'-bicyclo[2.2.1]-2'-heptene,
1,2-(3"-iso-propylbenzo)cyclooctene-5-spiro-5'-bicyclo[2.2.1]-2'-heptene,
1,2-(4"-iso-propylbenzo)cyclooctene-5-spiro-5'-bicyclo[2.2.1]-2'-heptene,
1,2-(5"-iso-propylbenzo)cyclooctene-5-spiro-5'-bicyclo[2.2.1]-2'-heptene,
1,2-(6"-iso-propylbenzo)cyclooctene-5-spiro-5'-bicyclo[2.2.1]-2'-heptene,
1,2-(3"-n-butylbenzo)cyclooctene-5-spiro-5'-bicyclo[2.2.1]-2'-heptene,
1,2-(4"-n-butylbenzo)cyclooctene-5-spiro-5'-bicyclo[2.2.1]-2'-heptene,
1,2-(3"-iso-butylbenzo)cyclooctene-5-spiro-5'-bicyclo[2.2.1]-2'-heptene,
1,2-(4"-iso-butylbenzo)cyclooctene-5-spiro-5'-bicyclo[2.2.1]-2'-heptene,
1,2-(5"-iso-butylbenzo)cyclooctene-5-spiro-5'-bicyclo[2.2.1]-2'-heptene,
1,2-(6"-iso-butylbenzo)cyclooctene-5-spiro-5'-bicyclo[2.2.1]-2'-heptene,
1,2-(3"-sec-butylbenzo)cycloheptene-5-spiro-5'-bicyclo[2.2.1]-2'-heptene,
1,2-(4"-sec-butylbenzo)cyclooctene-5-spiro-5'-bicyclo[2.2.1]-2'-heptene,
1,2-(3"-t-butylbenzo)cyclooctene-5-spiro-5'-bicyclo[2.2.1]-2'-heptene,
1,2-(4"-t-butylbenzo)cyclooctene-5-spiro-5'-bicyclo[2.2.1]-2'-heptene,
1,2-(3'-cyclohexylbenzo)cyclooctene-5-spiro-5'-bicyclo[2.2.1]-2'-heptene,
1,2-(4"-cyclohexylbenzo)cyclooctene-5-spiro-5'-bicyclo[2.2.1]-2'-heptene,
1,2-(5"-cyclohexylbenzo)cyclooctene-5-spiro-5'-bicyclo[2.2.1]-2'-heptene,
1,2-(6"-cyclohexylbenzo)cyclooctene-5-spiro-5'-bicyclo[2.2.1]-2'-heptene,
1,2-(3"-phenylbenzo)cyclooctene-5-spiro-5'-bicyclo[2.2.1]-2'-heptene,
1,2-(4"-phenylbenzo)cyclooctene-5-spiro-5'-bicyclo[2.2.1]-2'-heptene,
1,2-(3"-chlorobenzo)cyclooctene-4-spiro-5'-bicyclo[2.2.1]-2'-heptene,
1,2-(4"-chlorobenzo)cyclooctene-5-spiro-5'-bicyclo[2.2.1]-2'-heptene,
1,2-(5"-chlorobenzo)cyclooctene-5-spiro-5'-bicyclo[2.2.1]-2'-heptene,
1,2-(6"-chlorobenzo)cyclooctene-5-spiro-5'-bicyclo[2.2.1]-2'-heptene,
1,2-(3"-aminobenzo)cyclooctene-5-spiro-5'-bicyclo[2.2.1]-2'-heptene,
1,2-(4"-aminobenzo)cyclooctene-5-spiro-5'-bicyclo[2.2.1]-2'-heptene,
1,2-(3"-methoxybenzo)cyclooctene-5-spiro-5'-bicyclo[2.2.1]-2'-heptene,
1,2-(4"-methoxybenzo)cyclooctene-5-spiro-5'-bicyclo[2.2.1]-2'-heptene,
1,2-(5"-methoxybenzo)cyclooctene-5-spiro-5'-bicyclo[2.2.1]-2'-heptene,
1,2-(6"-methoxybenzo)cyclooctene-5-spiro-5'-bicyclo[2.2.1]-2'-heptene.
(v)
2,3-benzocyclopenten-1-one-4-spiro-5'-bicyclo[2.2.1]-2'-heptene,
2,3-(3"-methylbenzo)cyclopenten-1-one-4-spiro-5'-bicyclo[2.2.1]-2'-heptene,
2,3-(4"-methylbenzo)cyclopenten-1-one-4-spiro-5'-bicyclo[2.2.1]-2'-heptene,
2,3-(5"-methylbenzo)cyclopenten-1-one-4-spiro-5'-bicyclo[2.2.1]-2'-heptene,
2,3-(6"-methylbenzo)cyclopenten-1-one-4-spiro-5'-bicyclo[2.2.1]-2'-heptene,
2,3-(3"-ethylbenzo)cyclopenten-1-one-4-spiro-5'-bicyclo[2.2.1]-2'-heptene,
2,3-(4"-ethylbenzo)cyclopenten-1-one-4-spiro-5'-bicyclo[2.2.1]-2'-heptene,
2,3-(5"-ethylbenzo)cyclopenten-1-one-4-spiro-5'-bicyclo[2.2.1]-2'-heptene,
2,3-(6"-ethylbenzo)cyclopenten-1-one-4-spiro-5'-bicyclo[2.2.1]-2'-heptene,
2,3-(3"-n-propylbenzo)cyclopenten-1-one-4-spiro-5'-bicyclo[2.2.1]-2'-heptene,
2,3-(4"-n-propylbenzo)cyclopenten-1-one-4-spiro-5'-bicyclo[2.2.1]-2'-heptene,
2,3-(5"-n-propylbenzo)cyclopenten-1-one-4-spiro-5'-bicyclo[2.2.1]-2'-heptene,
2,3-(6"-n-propylbenzo)cyclopenten-1-one-4-spiro-5'-bicyclo[2.2.1]-2'-heptene,
2,3-(3"-iso-propylbenzo)cyclopenten-1-one-4-spiro-5'-bicyclo[2.2.1]-2'-heptene,
2,3-(4"-iso-propylbenzo)cyclopenten-1-one-4-spiro-5'-bicyclo[2.2.1]-2'-heptene,
2,3-(5"-iso-propylbenzo)cyclopenten-1-one-4-spiro-5'-bicyclo[2.2.1]-2'-heptene,
2,3-(6"-iso-propylbenzo)cyclopenten-1-one-4-spiro-5'-bicyclo[2.2.1]-2'-heptene,
2,3-(3"-n-butylbenzo)cyclopenten-1-one-4-spiro-5'-bicyclo[2.2.1]-2'-heptene,
2,3-(4"-n-butylbenzo)cyclopenten-1-one-4-spiro-5'-bicyclo[2.2.1]-2'-heptene,
2,3-(5"-n-butylbenzo)cyclopenten-1-one-4-spiro-5'-bicyclo[2.2.1]-2'-heptene,
2,3-(6"-n-butylbenzo)cyclopenten-1-one-4-spiro-5'-bicyclo[2.2.1]-2'-heptene,
2,3-(3"-iso-butylbenzo)cyclopenten-1-one-4-spiro-5'-bicyclo[2.2.1]-2'-heptene,
2,3-(4"-iso-butylbenzo)cyclopenten-1-one-4-spiro-5'-bicyclo[2.2.1]-2'-heptene,
2,3-(5"-iso-butylbenzo)cyclopenten-1-one-4-spiro-5'-bicyclo[2.2.1]-2'-heptene,
2,3-(6"-iso-butylbenzo)cyclopenten-1-one-4-spiro-5'-bicyclo[2.2.1]-2'-heptene,
2,3-(3"-sec-butylbenzo)cyclopenten-1-one-4-spiro-5'-bicyclo[2.2.1]-2'-heptene,
2,3-(4"-sec-butylbenzo)cyclopenten-1-one-4-spiro-5'-bicyclo[2.2.1]-2'-heptene,
2,3-(5"-sec-butylbenzo)cyclopenten-1-one-4-spiro-5'-bicyclo[2.2.1]-2'-heptene, 2,3-(6"-sec-butylbenzo)cyclopenten-1-one-4-spiro-5'-bicyclo[2.2.1]-2'-heptene,
2,3-(3"-t-butylbenzo)cyclopenten-1-one-4-spiro-5'-bicyclo[2.2.1]-2'-heptene,
2,3-(4"-t-butylbenzo)cyclopenten-1-one-4-spiro-5'-bicyclo[2.2.1]-2'-heptene,
2,3-(5"-t-butylbenzo)cyclopenten-1-one-4-spiro-5'-bicyclo[2.2.1]-2'-heptene,
2,3-(6"-t-butylbenzo)cyclopenten-1-one-4-spiro-5'-bicyclo[2.2.1]-2'-heptene,
2,3-(3"-cyclohexylbenzo)cyclopenten-1-one-4-spiro-5'-bicyclo[2.2.1]-2'-heptene,
1,2-(4"-cyclohexylbenzo)cyclopenten-1-one-4-spiro-5'-bicyclo[2.2.1]-2'-heptene,
2,3-(5"-cyclohexylbenzo)cyclopenten-1-one-4-spiro-5'-bicyclo[2.2.1]-2'-heptene,
2,3-(6"-cyclohexylbenzo)cyclopenten-1-one-4-spiro-5'-bicyclo[2.2.1]-2'-heptene,
2,3-(3"-phenylbenzo)cyclopenten-1-one-4-spiro-5'-bicyclo[2.2.1]-2'-heptene,
2,3-(4"-phenylbenzo)cyclopenten-1-one-4-spiro-5'-bicyclo[2.2.1]-2'-heptene,
2,3-(5"-phenylbenzo)cyclopenten-1-one-4-spiro-5'-bicyclo[2.2.1]-2'-heptene,
2,3-(6"-phenylbenzo)cyclopenten-1-one-4-spiro-5'-bicyclo[2.2.1]-2'-heptene,
2,3-(3"-chlorobenzo)cyclopenten-1-one-4-spiro-5'-bicyclo[2.2.1]-2'-heptene,
2,3-(4"-chlorobenzo)cyclopenten-1-one-4-spiro-5'-bicyclo[2.2.1]-2'-heptene,
2,3-(5"-chlorobenzo)cyclopenten-1-one-4-spiro-5'-bicyclo[2.2.1]-2'-heptene,
2,3-(6"-chlorobenzo)cyclopenten-1-one-4-spiro-5'-bicyclo[2.2.1]-2'-heptene,
2,3-(3"-aminobenzo)cyclopenten-1-one-4-spiro-5'-bicyclo[2.2.1]-2'-heptene,
2,3-(4"-aminobenzo)cyclopenten-1-one-4-spiro-5'-bicyclo[2.2.1]-2'-heptene,
2,3-(5"-aminobenzo)cyclopenten-1-one-4-spiro-5'-bicyclo[2.2.1]-2'-heptene,
2,3-(6"-aminobenzo)cyclopenten-1-one-4-spiro-5'-bicyclo[2.2.1]-2'-heptene,
2,3-(3"-methoxybenzo)cyclopenten-1-one-4-spiro-5'-bicyclo[2.2.1]-2'-heptene,
2,3-(4"-methoxybenzo)cyclopenten-1-one-4-spiro-5'-bicyclo[2.2.1]-2'-heptene,
2,3-(5"-methoxybenzo)cyclopenten-1-one-4-spiro-5'-bicyclo[2.2.1]-2'-heptene,
2,3-(6"-methoxybenzo)cyclopenten-1-one-4-spiro-5'-bicyclo[2.2.1]-2'-heptene,
2,3-benzocyclopenten-1-one-5-spiro-5'-bicyclo[2.2.1]-2'-heptene,
2,3-(3"-methylbenzo)cyclopenten-1-one-5-spiro-5'-bicyclo[2.2.1]-2'-heptene,
2,3-(4"-methylbenzo)cyclopenten-1-one-5-spiro-5'-bicyclo[2.2.1]-2'-heptene,
2,3-(5"-methylbenzo)cyclopenten-1-one-5-spiro-5'-bicyclo[2.2.1]-2'-heptene,
2,3-(6"-methylbenzo)cyclopenten-1-one-5-spiro-5'-bicyclo[2.2.1]-2'-heptene,
2,3-(3"-ethylbenzo)cyclopenten-1-one-5-spiro-5'-bicyclo[2.2.1]-2'-heptene,
2,3-(4"-ethylbenzo)cyclopenten-1-one-5-spiro-5'-bicyclo[2.2.1]-2'-heptene,
2,3-(5"-ethylbenzo)cyclopenten-1-one-5-spiro-5'-bicyclo[2.2.1]-2'-heptene,
2,3-(6"-ethylbenzo)cyclopenten-1-one-5-spiro-5'-bicyclo[2.2.1]-2'-heptene,
2,3-(3"-n-propylbenzo)cyclopenten-1-one-5-spiro-5'-bicyclo[2.2.1]-2'-heptene,
2,3-(4"-n-propylbenzo)cyclopenten-1-one-5-spiro-5'-bicyclo[2.2.1]-2'-heptene,
2,3-(5"-n-propylbenzo)cyclopenten-1-one-5-spiro-5'-bicyclo[2.2.1]-2'-heptene,
2,3-(6"-n-propylbenzo)cyclopenten-1-one-5-spiro-5'-bicyclo[2.2.1]-2'-heptene,
2,3-(3"-iso-propylbenzo)cyclopenten-1-one-5-spiro-5'-bicyclo[2.2.1]-2'-heptene,
2,3-(4"-iso-propylbenzo)cyclopenten-1-one-5-spiro-5'-bicyclo[2.2.1]-2'-heptene,
2,3-(5"-iso-propylbenzo)cyclopenten-1-one-5-spiro-5'-bicyclo[2.2.1]-2'-heptene,
2,3-(6"-iso-propylbenzo)cyclopenten-1-one-5-spiro-5'-bicyclo[2.2.1]-2'-heptene,
2,3-(3"-n-butylbenzo)cyclopenten-1-one-5-spiro-5'-bicyclo[2.2.1]-2'-heptene,
2,3-(4"-n-butylbenzo)cyclopenten-1-one-5-spiro-5'-bicyclo[2.2.1]-2'-heptene,
2,3-(5"-n-butylbenzo)cyclopenten-1-one-5-spiro-5'-bicyclo[2.2.1]-2'-heptene,
2,3-(6"-n-butylbenzo)cyclopenten-1-one-5-spiro-5'-bicyclo[2.2.1]-2'-heptene,
2,3-(3"-iso-butylbenzo)cyclopenten-1-one-5-spiro-5'-bicyclo[2.2.1]-2'-heptene,
2,3-(4"-iso-butylbenzo)cyclopenten-1-one-5-spiro-5'-bicyclo[2.2.1]-2'-heptene,
2,3-(5"-iso-butylbenzo)cyclopenten-1-one-5-spiro-5'-bicyclo[2.2.1]-2'-heptene,
2,3-(6"-iso-butylbenzo)cyclopenten-1-one-5-spiro-5'-bicyclo[2.2.1]-2'-heptene,
2,3-(3"-sec-butylbenzo)cyclopenten-1-one-5-spiro-5'-bicyclo[2.2.1]-2'-heptene,
2,3-(4"-sec-butylbenzo)cyclopenten-1-one-5-spiro-5'-bicyclo[2.2.1]-2'-heptene,
2,3-(5"-sec-butylbenzo)cyclopenten-1-one-5-spiro-5'-bicyclo[2.2.1]-2'-heptene,
2,3-(6"-sec-butylbenzo)cyclopenten-1-one-5-spiro-5'-bicyclo[2.2.1]-2'-heptene,
2,3-(3"-t-butylbenzo)cyclopenten-1-one-5-spiro-5'-bicyclo[2.2.1]-2'-heptene,
2,3-(4"-t-butylbenzo)cyclopenten-1-one-5-spiro-5'-bicyclo[2.2.1]-2'-heptene,
2,3-(5"-t-butylbenzo)cyclopenten-1-one-5-spiro-5'-bicyclo[2.2.1]-2'-heptene,
2,3-(6"-t-butylbenzo)cyclopenten-1-one-5-spiro-5'-bicyclo[2.2.1]-2'-heptene,
2,3-(3"-cyclohexylbenzo)cyclopenten-1-one-5-spiro-5'-bicyclo[2.2.1]-2'-heptene,
2,3-(4"-cyclohexylbenzo)cyclopenten-1-one-5-spiro-5'-bicyclo[2.2.1]-2'-heptene,
2,3-(5"-cyclohexylbenzo)cyclopenten-1-one-5-spiro-5'-bicyclo[2.2.1]-2'-heptene,
2,3-(6"-cyclohexylbenzo)cyclopenten-1-one-5-spiro-5'-bicyclo[2.2.1]-2'-heptene,
2,3-(3"-phenylbenzo)cyclopenten-1-one-5-spiro-5'-bicyclo[2.2.1]-2'-heptene,
2,3-(4"-phenylbenzo)cyclopenten-1-one-5-spiro-5'-bicyclo[2.2.1]-2'-heptene,
2,3-(5"-phenylbenzo)cyclopenten-1-one-5-spiro-5'-bicyclo[2.2.1]-2'-heptene,
2,3-(6"-phenylbenzo)cyclopenten-1-one-5-spiro-5'-bicyclo[2.2.1]-2'-heptene, 2,3-(3"-chlorobenzo)cyclopenten-1-one-5-spiro-5'-bicyclo[2.2.1]-2'-heptene,
2,3-(4"-chlorobenzo)cyclopenten-1-one-5-spiro-5'-bicyclo[2.2.1]-2'-heptene,
2,3-(5"-chlorobenzo)cyclopenten-1-one-5-spiro-5'-bicyclo[2.2.1]-2'-heptene,
2,3-(6"-chlorobenzo)cyclopenten-1-one-5-spiro-5'-bicyclo[2.2.1]-2'-heptene,
2,3-(3"-aminobenzo)cyclopenten-1-one-5-spiro-5'-bicyclo[2.2.1]-2'-heptene,
2,3-(4"-aminobenzo)cyclopenten-1-one-5-spiro-5'-bicyclo[2.2.1]-2'-heptene,
2,3-(5"-aminobenzo)cyclopenten-1-one-5-spiro-5'-bicyclo[2.2.1]-2'-heptene,
2,3-(6"-aminobenzo)cyclopenten-1-one-5-spiro-5'-bicyclo[2.2.1]-2'-heptene,
2,3-(3"-methoxybenzo)cyclopenten-1-one-5-spiro-5'-bicyclo[2.2.1]-2'-heptene,
2,3-(4"-methoxybenzo)cyclopenten-1-one-5-spiro-5'-bicyclo[2.2.1]-2'-heptene,
2,3-(5"-methoxybenzo)cyclopenten-1-one-5-spiro-5'-bicyclo[2.2.1]-2'-heptene,
2,3-(6"-methoxybenzo)cyclopenten-1-one-5-spiro-5'-bicyclo[2.2.1]-2'-heptene,
3,4-benzocyclopenten-1-one-2-spiro-5'-bicyclo[2.2.1]-2'-heptene,
3,4-(3"-methylbenzo)cyclopenten-1-one-2-spiro-5'-bicyclo[2.2.1]-2'-heptene,
3,4-(4"-methylbenzo)cyclopenten-1-one-2-spiro-5'-bicyclo[2.2.1]-2'-heptene,
3,4-(5"-methylbenzo)cyclopenten-1-one-2-spiro-5'-bicyclo[2.2.1]-2'-heptene,
3,4-(6"-methylbenzo)cyclopenten-1-one-2-spiro-5'-bicyclo[2.2.1]-2'-heptene,
3,4-(3"-ethylbenzo)cyclopenten-1-one-2-spiro-5'-bicyclo[2.2.1]-2'-heptene,
3,4-(4"-ethylbenzo)cyclopenten-1-one-2-spiro-5'-bicyclo[2.2.1]-2'-heptene,
3,4-(5"-ethylbenzo)cyclopenten-1-one-2-spiro-5'-bicyclo[2.2.1]-2'-heptene,
3,4-(6"-ethylbenzo)cyclopenten-1-one-2-spiro-5'-bicyclo[2.2.1]-2'-heptene,
3,4-(3"-n-propylbenzo)cyclopenten-1-one-2-spiro-5'-bicyclo[2.2.1]-2'-heptene,
3,4-(4"-n-propylbenzo)cyclopenten-1-one-2-spiro-5'-bicyclo[2.2.1]-2'-heptene,
3,4-(5"-n-propylbenzo)cyclopenten-1-one-2-spiro-5'-bicyclo[2.2.1]-2'-heptene,
3,4-(6"-n-propylbenzo)cyclopenten-1-one-2-spiro-5'-bicyclo[2.2.1]-2'-heptene,
3,4-(3"-iso-propylbenzo)cyclopenten-1-one-2-spiro-5'-bicyclo[2.2.1]-2'-heptene,
3,4-(4"-iso-propylbenzo)cyclopenten-1-one-2-spiro-5'-bicyclo[2.2.1]-2'-heptene,
3,4-(5"-iso-propylbenzo)cyclopenten-1-one-2-spiro-5'-bicyclo[2.2.1]-2'-heptene,
2,3-(6"-iso-propylbenzo)cyclopenten-1-one-2-spiro-5'-bicyclo[2.2.1]-2'-heptene,
3,4-(3"-n-butylbenzo)cyclopenten-1-one-2-spiro-5'-bicyclo[2.2.1]-2'-heptene,
3,4-(4"-n-butylbenzo)cyclopenten-1-one-2-spiro-5'-bicyclo[2.2.1]-2'-heptene,
3,4-(5"-n-butylbenzo)cyclopenten-1-one-2-spiro-5'-bicyclo[2.2.1]-2'-heptene,
3,4-(6"-n-butylbenzo)cyclopenten-1-one-2-spiro-5'-bicyclo[2.2.1]-2'-heptene,
3,42,3-(3"-iso-butylbenzo)cyclopenten-1-one-2-spiro-5'-bicyclo[2.2.1]-2'-heptene,
3,42,3-(4"-iso-butylbenzo)cyclopenten-1-one-2-spiro-5'-bicyclo[2.2.1]-2'-heptene,
3,4-(5"-iso-butylbenzo)cyclopenten-1-one-2-spiro-5'-bicyclo[2.2.1]-2'-heptene,
3,4-(6"-iso-butylbenzo)cyclopenten-1-one-2-spiro-5'-bicyclo[2.2.1]-2'-heptene,
3,4-(3"-sec-butylbenzo)cyclopenten-1-one-2-spiro-5'-bicyclo[2.2.1]-2'-heptene,
3,4-(4"-sec-butylbenzo)cyclopenten-1-one-2-spiro-5'-bicyclo[2.2.1]-2'-heptene,
3,4-(5"-sec-butylbenzo)cyclopenten-1-one-2-spiro-5'-bicyclo[2.2.1]-2'-heptene,
3,4-(6"-sec-butylbenzo)cyclopenten-1-one-2-spiro-5'-bicyclo[2.2.1]-2'-heptene,
3,4-(3"-t-butylbenzo)cyclopenten-1-one-2-spiro-5'-bicyclo[2.2.1]-2'-heptene,
3,4-(4"-t-butylbenzo)cyclopenten-1-one-2-spiro-5'-bicyclo[2.2.1]-2'-heptene,
3,4-(5"-t-butylbenzo)cyclopenten-1-one-2-spiro-5'-bicyclo[2.2.1]-2'-heptene,
3,4-(6"-t-butylbenzo)cyclopenten-1-one-2-spiro-5'-bicyclo[2.2.1]-2'-heptene,
3,4-(3"-cyclohexylbenzo)cyclopenten-1-one-2-spiro-5'-bicyclo[2.2.1]-2'-heptene,
3,4-(4"-cyclohexylbenzo)cyclopenten-1-one-2-spiro-5'-bicyclo[2.2.1]-2'-heptene,
3,4-(5"-cyclohexylbenzo)cyclopenten-1-one-5-spiro-5'-bicyclo[2.2.1]-2'-heptene,
3,4-(6"-cyclohexylbenzo)cyclopenten-1-one-2-spiro-5'-bicyclo[2.2.1]-2'-heptene,
3,4-(3"-phenylbenzo)cyclopenten-1-one-2-spiro-5'-bicyclo[2.2.1]-2'-heptene,
3,4-(4"-phenylbenzo)cyclopenten-1-one-2-spiro-5'-bicyclo[2.2.1]-2'-heptene,
3,4-(5"-phenylbenzo)cyclopenten-1-one-2-spiro-5'-bicyclo[2.2.1]-2'-heptene,
3,4-(6"-phenylbenzo)cyclopenten-1-one-2-spiro-5'-bicyclo[2.2.1]-2'-heptene,
3,4-(3"-chlorobenzo)cyclopenten-1-one-2-spiro-5'-bicyclo[2.2.1]-2'-heptene,
3,4-(4"-chlorobenzo)cyclopenten-1-one-2-spiro-5'-bicyclo[2.2.1]-2'-heptene,
3,4-(5"-chlorobenzo)cyclopenten-1-one-2-spiro-5'-bicyclo[2.2.1]-2'-heptene,
3,4-(6"-chlorobenzo)cyclopenten-1-one-2-spiro-5'-bicyclo[2.2.1]-2'-heptene,
3,4-(3"-aminobenzo)cyclopenten-1-one-2-spiro-5'-bicyclo[2.2.1]-2'-heptene,
3,4-(4"-aminobenzo)cyclopenten-1-one-2-spiro-5'-bicyclo[2.2.1]-2'-heptene,
3,4-(5"-aminobenzo)cyclopenten-1-one-2-spiro-5'-bicyclo[2.2.1]-2'-heptene,
3,4-(6"-aminobenzo)cyclopenten-1-one-2-spiro-5'-bicyclo[2.2.1]-2'-heptene,
3,4-(3"-methoxybenzo)cyclopenten-1-one-2-spiro-5'-bicyclo[2.2.1]-2'-heptene,
3,4-(4"-methoxybenzo)cyclopenten-1-one-2-spiro-5'-bicyclo[2.2.1]-2'-heptene,
3,4-(5"-methoxybenzo)cyclopenten-1-one-2-spiro-5'-bicyclo[2.2.1]-2'-heptene,
3,4-(6"-methoxybenzo)cyclopenten-1-one-2-spiro-5'-bicyclo[2.2.1]-2'-heptene.
(vi)
spiro[3,4-dihydronaphthalen-1-one-2,5'-2'-norbornene], spiro[5-methyl-3,4-dihydronaphthalen-1-one-2,5'-2'-norbornene],
spiro[6-methyl-3,4-dihydronaphthalen-1-one-2,5'-2'-norbornene],
spiro[7-methyl-3,4-dihydronaphthalen-1-one-2,5'-2'-norbornene],
spiro[8-methyl-3,4-dihydronaphthalen-1-one-2,5'-2'-norbornene],
spiro[5-ethyl-3,4-dihydronaphthalen-1-one-2,5'-2'-norbornene],
spiro[6-ethyl-3,4-dihydronaphthalen-1-one-2,5'-2'-norbornene],
spiro[7-ethyl-3,4-dihydronaphthalen-1-one-2,5'-2'-norbornene],
spiro[8-ethyl-3,4-dihydronaphthalen-1-one-2,5'-2'-norbornene],
spiro[5-n-propyl-3,4-dihydronaphthalen-1-one-2,5'-2'-norbornene],
spiro[6-n-propyl-3,4-dihydronaphthalen-1-one-2,5'-2'-norbornene],
spiro[7-n-propyl-3,4-dihydronaphthalen-1-one-2,5'-2'-norbornene],
spiro[8-n-propyl-3,4-dihydronaphthalen-1-one-2,5'-2'-norbornene],
spiro[5-iso-propyl-3,4-dihydronaphthalen-1-one-2,5'-2'-norbornene],
spiro[6-iso-propyl-3,4-dihydronaphthalen-1-one-2,5'-2'-norbornene],
spiro[7-iso-propyl-3,4-dihydronaphthalen-1-one-2,5'-2'-norbornene],
spiro[8-iso-propyl-3,4-dihydronaphthalen-1-one-2,5'-2'-norbornene],
spiro[5-n-butyl-3,4-dihydronaphthalen-1-one-2,5'-2'-norbornene],
spiro[6-n-butyl-3,4-dihydronaphthalen-1-one-2,5'-2'-norbornene],
spiro[7-n-butyl-3,4-dihydronaphthalen-1-one-2,5'-2'-norbornene],
spiro[8-n-butyl-3,4-dihydronaphthalen-1-one-2,5'-2'-norbornene],
spiro[5-iso-butyl-3,4-dihydronaphthalen-1-one-2,5'-2'-norbornene],
spiro[6-iso-butyl-3,4-dihydronaphthalen-1-one-2,5'-2'-norbornene],
spiro[7-iso-butyl-3,4-dihydronaphthalen-1-one-2,5'-2'-norbornene],
spiro[8-iso-butyl-3,4-dihydronaphthalen-1-one-2,5'-2'-norbornene],
spiro[5-sec-butyl-3,4-dihydronaphthalen-1-one-2,5'-2'-norbornene],
spiro[6-sec-butyl-3,4-dihydronaphthalen-1-one-2,5'-2'-norbornene],
spiro[7-sec-butyl-3,4-dihydronaphthalen-1-one-2,5'-2'-norbornene],
spiro[8-sec-butyl-3,4-dihydronaphthalen-1-one-2,5'-2'-norbornene],
spiro[5-t-butyl-3,4-dihydronaphthalen-1-one-2,5'-2'-norbornene],
spiro[6-t-butyl-3,4-dihydronaphthalen-1-one-2,5'-2'-norbornene],
spiro[7-t-butyl-3,4-dihydronaphthalen-1-one-2,5'-2'-norbornene],
spiro[8-t-butyl-3,4-dihydronaphthalen-1-one-2,5'-2'-norbornene],
spiro[5-cyclohexyl-3,4-dihydronaphthalen-1-one-2,5'-2'-norbornene],
spiro[6-cyclohexyl-3,4-dihydronaphthalen-1-one-2,5'-2'-norbornene],
spiro[7-cyclohexyl-3,4-dihydronaphthalen-1-one-2,5'-2'-norbornene],
spiro[8-cyclohexyl-3,4-dihydronaphthalen-1-one-2,5'-2'-norbornene],
spiro[5-phenyl-3,4-dihydronaphthalen-1-one-2,5'-2'-norbornene],
spiro[6-phenyl-3,4-dihydronaphthalen-1-one-2,5'-2'-norbornene],
spiro[7-phenyl-3,4-dihydronaphthalen-1-one-2,5'-2'-norbornene],
spiro[8-phenyl-3,4-dihydronaphthalen-1-one-2,5'-2'-norbornene],
spiro[5-chloro-3,4-dihydronaphthalen-1-one-2,5'-2'-norbornene],
spiro[6-chloro-3,4-dihydronaphthalen-1-one-2,5'-2'-norbornene],
spiro[7-chloro-3,4-dihydronaphthalen-1-one-2,5'-2'-norbornene],
spiro[8-chloro-3,4-dihydronaphthalen-1-one-2,5'-2'-norbornene],
spiro[5-phenyl-3,4-dihydronaphthalen-1-one-2,5'-2'-norbornene],
spiro[6-phenyl-3,4-dihydronaphthalen-1-one-2,5'-2'-norbornene],
spiro[7-phenyl-3,4-dihydronaphthalen-1-one-2,5'-2'-norbornene],
spiro[8-phenyl-3,4-dihydronaphthalen-1-one-2,5'-2'-norbornene],
spiro[5-amino-3,4-dihydronaphthalen-1-one-2,5'-2'-norbornene],
spiro[6-amino-3,4-dihydronaphthalen-1-one-2,5'-2'-norbornene],
spiro[7-amino-3,4-dihydronaphthalen-1-one-2,5'-2'-norbornene],
spiro[8-amino-3,4-dihydronaphthalen-1-one-2,5'-2'-norbornene],
spiro[5-methoxy-3,4-dihydronaphthalen-1-one-2,5'-2'-norbornene],
spiro[6-methoxy-3,4-dihydronaphthalen-1-one-2,5'-2'-norbornene],
spiro[7-methoxy-3,4-dihydronaphthalen-1-one-2,5'-2'-norbornene],
spiro[8-methoxy-3,4-dihydronaphthalen-1-one-2,5'-2'-norbornene],
spiro[2,4-dihydronaphthalen-1-one-3,5'-2'-norbornene],
spiro[5-methyl-2,4-dihydronaphthalen-1-one-3,5'-2'-norbornene],
spiro[6-methyl-2,4-dihydronaphthalen-1-one-3,5'-2'-norbornene],
spiro[7-methyl-2,4-dihydronaphthalen-1-one-3,5'-2'-norbornene],
spiro[8-methyl-2,4-dihydronaphthalen-1-one-3,5'-2'-norbornene],
spiro[5-ethyl-2,4-dihydronaphthalen-1-one-3,5'-2'-norbornene],
spiro[6-ethyl-2,4-dihydronaphthalen-1-one-3,5'-2'-norbornene],
spiro[7-ethyl-2,4-dihydronaphthalen-1-one-3,5'-2'-norbornene],
spiro[8-ethyl-2,4-dihydronaphthalen-1-one-3,5'-2'-norbornene],
spiro[5-n-propyl-2,4-dihydronaphthalen-1-one-3,5'-2'-norbornene],
spiro[6-n-propyl-2,4-dihydronaphthalen-1-one-3,5'-2'-norbornene], spiro[7-n-propyl-2,4-dihydronaphthalen-1-one-3,5'-2'-norbornene],
spiro[8-n-propyl-2,4-dihydronaphthalen-1-one-3,5'-2'-norbornene],
spiro[5-iso-propyl-2,4-dihydronaphthalen-1-one-3,5'-2'-norbornene],
spiro[6-iso-propyl-2,4-dihydronaphthalen-1-one-3,5'-2'-norbornene],
spiro[7-iso-propyl-2,4-dihydronaphthalen-1-one-3,5'-2'-norbornene],
spiro[8-iso-propyl-2,4-dihydronaphthalen-1-one-3,5'-2'-norbornene],
spiro[5-n-butyl-2,4-dihydronaphthalen-1-one-3,5'-2'-norbornene],
spiro[6-n-butyl-2,4-dihydronaphthalen-1-one-3,5'-2'-norbornene],
spiro[7-n-butyl-2,4-dihydronaphthalen-1-one-3,5'-2'-norbornene],
spiro[8-n-butyl-2,4-dihydronaphthalen-1-one-3,5'-2'-norbornene],
spiro[5-iso-butyl-2,4-dihydronaphthalen-1-one-3,5'-2'-norbornene],
spiro[6-iso-butyl-2,4-dihydronaphthalen-1-one-3,5'-2'-norbornene],
spiro[7-iso-butyl-2,4-dihydronaphthalen-1-one-3,5'-2'-norbornene],
spiro[8-iso-butyl-2,4-dihydronaphthalen-1-one-3,5'-2'-norbornene],
spiro[5-sec-butyl-2,4-dihydronaphthalen-1-one-3,5'-2'-norbornene],
spiro[6-sec-butyl-2,4-dihydronaphthalen-1-one-3,5'-2'-norbornene],
spiro[7-sec-butyl-2,4-dihydronaphthalen-1-one-3,5'-2'-norbornene],
spiro[8-sec-butyl-2,4-dihydronaphthalen-1-one-3,5'-2'-norbornene],
spiro[5-t-butyl-2,4-dihydronaphthalen-1-one-3,5'-2'-norbornene],
spiro[6-t-butyl-2,4-dihydronaphthalen-1-one-3,5'-2'-norbornene],
spiro[7-t-butyl-2,4-dihydronaphthalen-1-one-3,5'-2'-norbornene],
spiro[8-t-butyl-2,4-dihydronaphthalen-1-one-3,5'-2'-norbornene],
spiro[5-cyclohexyl-2,4-dihydronaphthalen-1-one-3,5'-2'-norbornene],
spiro[6-cyclohexyl-2,4-dihydronaphthalen-1-one-3,5'-2'-norbornene],
spiro[7-cyclohexyl-2,4-dihydronaphthalen-1-one-3,5'-2'-norbornene],
spiro[8-cyclohexyl-2,4-dihydronaphthalen-1-one-3,5'-2'-norbornene],
spiro[5-phenyl-2,4-dihydronaphthalen-1-one-3,5'-2'-norbornene],
spiro[6-phenyl-2,4-dihydronaphthalen-1-one-3,5'-2'-norbornene],
spiro[7-phenyl-2,4-dihydronaphthalen-1-one-3,5'-2'-norbornene],
spiro[8-phenyl-2,4-dihydronaphthalen-1-one-3,5'-2'-norbornene],
spiro[5-chloro-2,4-dihydronaphthalen-1-one-3,5'-2'-norbornene],
spiro[6-chloro-2,4-dihydronaphthalen-1-one-3,5'-2'-norbornene],
spiro[7-chloro-2,4-dihydronaphthalen-1-one-3,5'-2'-norbornene],
spiro[8-chloro-2,4-dihydronaphthalen-1-one-3,5'-2'-norbornene],
spiro[5-phenyl-2,4-dihydronaphthalen-1-one-3,5'-2'-norbornene],
spiro[6-phenyl-2,4-dihydronaphthalen-1-one-3,5'-2'-norbornene],
spiro[7-phenyl-2,4-dihydronaphthalen-1-one-3,5'-2'-norbornene],
spiro[8-phenyl-2,4-dihydronaphthalen-1-one-3,5'-2'-norbornene],
spiro[5-amino-2,4-dihydronaphthalen-1-one-3,5'-2'-norbornene],
spiro[6-amino-2,4-dihydronaphthalen-1-one-3,5'-2'-norbornene],
spiro[7-amino-2,4-dihydronaphthalen-1-one-3,5'-2'-norbornene],
spiro[8-amino-2,4-dihydronaphthalen-1-one-3,5'-2'-norbornene],
spiro[5-methoxy-2,4-dihydronaphthalen-1-one-3,5'-2'-norbornene],
spiro[6-methoxy-2,4-dihydronaphthalen-1-one-3,5'-2'-norbornene],
spiro[7-methoxy-2,4-dihydronaphthalen-1-one-3,5'-2'-norbornene],
spiro[8-methoxy-2,4-dihydronaphthalen-1-one-3,5'-2'-norbornene],
spiro[2,3-dihydronaphthalen-1-one-4,5'-2'-norbornene],
spiro[5-methyl-2,3-dihydronaphthalen-1-one-4,5'-2'-norbornene],
spiro[6-methyl-2,3-dihydronaphthalen-1-one-4,5'-2'-norbornene],
spiro[7-methyl-2,3-dihydronaphthalen-1-one-4,5'-2'-norbornene],
spiro[8-methyl-2,3-dihydronaphthalen-1-one-4,5'-2'-norbornene],
spiro[5-ethyl-2,3-dihydronaphthalen-1-one-4,5'-2'-norbornene],
spiro[6-ethyl-2,3-dihydronaphthalen-1-one-4,5'-2'-norbornene],
spiro[7-ethyl-2,3-dihydronaphthalen-1-one-4,5'-2'-norbornene],
spiro[8-ethyl-2,3-dihydronaphthalen-1-one-4,5'-2'-norbornene],
spiro[5-n-propyl-2,3-dihydronaphthalen-1-one-4,5'-2'-norbornene],
spiro[6-n-propyl-2,3-dihydronaphthalen-1-one-4,5'-2'-norbornene],
spiro[7-n-propyl-2,3-dihydronaphthalen-1-one-4,5'-2'-norbornene],
spiro[8-n-propyl-2,3-dihydronaphthalen-1-one-4,5'-2'-norbornene],
spiro[5-iso-propyl-2,3-dihydronaphthalen-1-one-4,5'-2'-norbornene],
spiro[6-iso-propyl-2,3-dihydronaphthalen-1-one-4,5'-2'-norbornene],
spiro[7-iso-propyl-2,3-dihydronaphthalen-1-one-4,5'-2'-norbornene],
spiro[8-iso-propyl-2,3-dihydronaphthalen-1-one-4,5'-2'-norbornene],
spiro[5-n-butyl-2,3-dihydronaphthalen-1-one-4,5'-2'-norbornene],
spiro[6-n-butyl-2,3-dihydronaphthalen-1-one-4,5'-2'-norbornene],
spiro[7-n-butyl-2,3-dihydronaphthalen-1-one-4,5'-2'-norbornene],
spiro[8-n-butyl-2,3-dihydronaphthalen-1-one-4,5'-2'-norbornene], spiro[5-iso-butyl-2,3-dihydronaphthalen-1-one-4,5'-2'-norbornene],
spiro[6-iso-butyl-2,3-dihydronaphthalen-1-one-4,5'-2'-norbornene],
spiro[7-iso-butyl-2,3-dihydronaphthalen-1-one-4,5'-2'-norbornene],
spiro[8-iso-butyl-2,3-dihydronaphthalen-1-one-4,5'-2'-norbornene],
spiro[5-sec-butyl-2,3-dihydronaphthalen-1-one-4,5'-2'-norbornene],
spiro[6-sec-butyl-2,3-dihydronaphthalen-1-one-4,5'-2'-norbornene],
spiro[7-sec-butyl-2,3-dihydronaphthalen-1-one-4,5'-2'-norbornene],
spiro[8-sec-butyl-2,3-dihydronaphthalen-1-one-4,5'-2'-norbornene],
spiro[5-t-butyl-2,3-dihydronaphthalen-1-one-4,5'-2'-norbornene],
spiro[6-t-butyl-2,3-dihydronaphthalen-1-one-4,5'-2'-norbornene],
spiro[7-t-butyl-2,3-dihydronaphthalen-1-one-4,5'-2'-norbornene],
spiro[8-t-butyl-2,3-dihydronaphthalen-1-one-4,5'-2'-norbornene],
spiro[5-cyclohexyl-2,3-dihydronaphthalen-1-one-4,5'-2'-norbornene],
spiro[6-cyclohexyl-2,3-dihydronaphthalen-1-one-4,5'-2'-norbornene],
spiro[7-cyclohexyl-2,3-dihydronaphthalen-1-one-4,5'-2'-norbornene],
spiro[8-cyclohexyl-2,3-dihydronaphthalen-1-one-4,5'-2'-norbornene],
spiro[5-phenyl-2,3-dihydronaphthalen-1-one-4,5'-2'-norbornene],
spiro[6-phenyl-2,3-dihydronaphthalen-1-one-4,5'-2'-norbornene],
spiro[7-phenyl-2,3-dihydronaphthalen-1-one-4,5'-2'-norbornene],
spiro[8-phenyl-2,3-dihydronaphthalen-1-one-4,5'-2'-norbornene],
spiro[5-chloro-2,3-dihydronaphthalen-1-one-4,5'-2'-norbornene],
spiro[6-chloro-2,3-dihydronaphthalen-1-one-4,5'-2'-norbornene],
spiro[7-chloro-2,3-dihydronaphthalen-1-one-4,5'-2'-norbornene],
spiro[8-chloro-2,3-dihydronaphthalen-1-one-4,5'-2'-norbornene],
spiro[5-phenyl-2,3-dihydronaphthalen-1-one-4,5'-2'-norbornene],
spiro[6-phenyl-2,3-dihydronaphthalen-1-one-4,5'-2'-norbornene],
spiro[7-phenyl-2,3-dihydronaphthalen-1-one-4,5'-2'-norbornene],
spiro[8-phenyl-2,3-dihydronaphthalen-1-one-4,5'-2'-norbornene],
spiro[5-amino-2,3-dihydronaphthalen-1-one-4,5'-2'-norbornene],
spiro[6-amino-2,3-dihydronaphthalen-1-one-4,5'-2'-norbornene],
spiro[7-amino-2,3-dihydronaphthalen-1-one-4,5'-2'-norbornene],
spiro[8-amino-2,3-dihydronaphthalen-1-one-4,5'-2'-norbornene],
spiro[5-methoxy-2,3-dihydronaphthalen-1-one-4,5'-2'-norbornene],
spiro[6-methoxy-2,3-dihydronaphthalen-1-one-4,5'-2'-norbornene],
spiro[7-methoxy-2,3-dihydronaphthalen-1-one-4,5'-2'-norbornene],
spiro[8-methoxy-2,3-dihydronaphthalen-1-one-4,5'-2'-norbornene],
spiro[3,4-dihydronaphthalen-2-one-1,5'-2'-norbornene],
spiro[5-methyl-3,4-dihydronaphthalen-2-one-1,5'-2'-norbornene],
spiro[6-methyl-3,4-dihydronaphthalen-2-one-1,5'-2'-norbornene],
spiro[7-methyl-3,4-dihydronaphthalen-2-one-1,5'-2'-norbornene],
spiro[8-methyl-3,4-dihydronaphthalen-2-one-1,5'-2'-norbornene],
spiro[5-ethyl-3,4-dihydronaphthalen-2-one-1,5'-2'-norbornene],
spiro[6-ethyl-3,4-dihydronaphthalen-2-one-1,5'-2'-norbornene],
spiro[7-ethyl-3,4-dihydronaphthalen-2-one-1,5'-2'-norbornene],
spiro[8-ethyl-3,4-dihydronaphthalen-2-one-1,5'-2'-norbornene],
spiro[5-n-propyl-3,4-dihydronaphthalen-2-one-1,5'-2'-norbornene],
spiro[6-n-propyl-3,4-dihydronaphthalen-2-one-1,5'-2'-norbornene],
spiro[7-n-propyl-3,4-dihydronaphthalen-2-one-1,5'-2'-norbornene],
spiro[8-n-propyl-3,4-dihydronaphthalen-2-one-1,5'-2'-norbornene],
spiro[5-iso-propyl-3,4-dihydronaphthalen-2-one-1,5'-2'-norbornene],
spiro[6-iso-propyl-3,4-dihydronaphthalen-2-one-1,5'-2'-norbornene],
spiro[7-iso-propyl-3,4-dihydronaphthalen-2-one-1,5'-2'-norbornene],
spiro[8-iso-propyl-3,4-dihydronaphthalen-2-one-1,5'-2'-norbornene],
spiro[5-n-butyl-3,4-dihydronaphthalen-2-one-1,5'-2'-norbornene],
spiro[6-n-butyl-3,4-dihydronaphthalen-2-one-1,5'-2'-norbornene],
spiro[7-n-butyl-3,4-dihydronaphthalen-2-one-1,5-f-2'-norbornene],
spiro[8-n-butyl-3,4-dihydronaphthalen-2-one-1,5-f-2'-norbornene],
spiro[5-iso-butyl-3,4-dihydronaphthalen-2-one-1,5'-2'-norbornene],
spiro[6-iso-butyl-3,4-dihydronaphthalen-2-one-1,5'-2'-norbornene],
spiro[7-iso-butyl-3,4-dihydronaphthalen-2-one-1,5'-2'-norbornene],
spiro[8-iso-butyl-3,4-dihydronaphthalen-2-one-1,5-f-2'-norbornene],
spiro[5-sec-butyl-3,4-dihydronaphthalen-2-one-1,5'-2'-norbornene],
spiro[6-sec-butyl-3,4-dihydronaphthalen-2-one-1,5'-2'-norbornene],
spiro[7-sec-butyl-3,4-dihydronaphthalen-2-one-1,5'-2'-norbornene],
spiro[8-sec-butyl-3,4-dihydronaphthalen-2-one-1,5'-2'-norbornene],
spiro[5-t-butyl-3,4-dihydronaphthalen-2-one-1,5'-2'-norbornene],
spiro[6-t-butyl-3,4-dihydronaphthalen-2-one-1,5'-2'-norbornene], spiro[7-t-butyl-3,4-dihydronaphthalen-2-one-1,5'-2'-norbornene],
spiro[8-t-butyl-3,4-dihydronaphthalen-2-one-1,5'-2'-norbornene],
spiro[5-cyclohexyl-3,4-dihydronaphthalen-2-one-1,5'-2'-norbornene],
spiro[6-cyclohexyl-3,4-dihydronaphthalen-2-one-1,5'-2'-norbornene],
spiro[7-cyclohexyl-3,4-dihydronaphthalen-2-one-1,5'-2'-norbornene],
spiro[8-cyclohexyl-3,4-dihydronaphthalen-2-one-1,5'-2'-norbornene],
spiro[5-phenyl-3,4-dihydronaphthalen-2-one-1,5'-2'-norbornene],
spiro[6-phenyl-3,4-dihydronaphthalen-2-one-1,5'-2'-norbornene],
spiro[7-phenyl-3,4-dihydronaphthalen-2-one-1,5'-2'-norbornene],
spiro[8-phenyl-3,4-dihydronaphthalen-2-one-1,5'-2'-norbornene],
spiro[5-chloro-3,4-dihydronaphthalen-2-one-1,5'-2'-norbornene],
spiro[6-chloro-3,4-dihydronaphthalen-2-one-1,5'-2'-norbornene],
spiro[7-chloro-3,4-dihydronaphthalen-2-one-1,5'-2'-norbornene],
spiro[8-chloro-3,4-dihydronaphthalen-2-one-1,5'-2'-norbornene],
spiro[5-phenyl-3,4-dihydronaphthalen-2-one-1,5'-2'-norbornene],
spiro[6-phenyl-3,4-dihydronaphthalen-2-one-1,5'-2'-norbornene],
spiro[7-phenyl-3,4-dihydronaphthalen-2-one-1,5'-2'-norbornene],
spiro[8-phenyl-3,4-dihydronaphthalen-2-one-1,5'-2'-norbornene],
spiro[5-amino-3,4-dihydronaphthalen-2-one-1,5'-2'-norbornene],
spiro[6-amino-3,4-dihydronaphthalen-2-one-1,5'-2'-norbornene],
spiro[7-amino-3,4-dihydronaphthalen-2-one-1,5'-2'-norbornene],
spiro[8-amino-3,4-dihydronaphthalen-2-one-1,5'-2'-norbornene],
spiro[5-methoxy-3,4-dihydronaphthalen-2-one-1,5'-2'-norbornene],
spiro[6-methoxy-3,4-dihydronaphthalen-2-one-1,5'-2'-norbornene],
spiro[7-methoxy-3,4-dihydronaphthalen-2-one-1,5'-2'-norbornene],
spiro[8-methoxy-3,4-dihydronaphthalen-2-one-1,5'-2'-norbornene],
spiro[1,4-dihydronaphthalen-2-one-3,5'-2'-norbornene],
spiro[5-methyl-1,4-dihydronaphthalen-2-one-3,5'-2'-norbornene],
spiro[6-methyl-1,4-dihydronaphthalen-2-one-3,5'-2'-norbornene],
spiro[7-methyl-1,4-dihydronaphthalen-2-one-3,5'-2'-norbornene],
spiro[8-methyl-1,4-dihydronaphthalen-2-one-3,5'-2'-norbornene],
spiro[5-ethyl-1,4-dihydronaphthalen-2-one-3,5'-2'-norbornene],
spiro[6-ethyl-1,4-dihydronaphthalen-2-one-3,5'-2'-norbornene],
spiro[7-ethyl-1,4-dihydronaphthalen-2-one-3,5'-2'-norbornene],
spiro[8-ethyl-1,4-dihydronaphthalen-2-one-3,5'-2'-norbornene],
spiro[5-n-propyl-1,4-dihydronaphthalen-2-one-3,5'-2'-norbornene],
spiro[6-n-propyl-1,4-dihydronaphthalen-2-one-3,5'-2'-norbornene],
spiro[7-n-propyl-1,4-dihydronaphthalen-2-one-3,5'-2'-norbornene],
spiro[8-n-propyl-1,4-dihydronaphthalen-2-one-3,5'-2'-norbornene],
spiro[5-iso-propyl-1,4-dihydronaphthalen-2-one-3,5'-2'-norbornene],
spiro[6-iso-propyl-1,4-dihydronaphthalen-2-one-3,5'-2'-norbornene],
spiro[7-iso-propyl-1,4-dihydronaphthalen-2-one-3,5'-2'-norbornene],
spiro[8-iso-propyl-1,4-dihydronaphthalen-2-one-3,5'-2'-norbornene],
spiro[5-n-butyl-1,4-dihydronaphthalen-2-one-3,5'-2'-norbornene],
spiro[6-n-butyl-1,4-dihydronaphthalen-2-one-3,5'-2'-norbornene],
spiro[7-n-butyl-1,4-dihydronaphthalen-2-one-3,5'-2'-norbornene],
spiro[8-n-butyl-1,4-dihydronaphthalen-2-one-3,5'-2'-norbornene],
spiro[5-iso-butyl-1,4-dihydronaphthalen-2-one-3,5'-2'-norbornene],
spiro[6-iso-butyl-1,4-dihydronaphthalen-2-one-3,5'-2'-norbornene],
spiro[7-iso-butyl-1,4-dihydronaphthalen-2-one-3,5'-2'-norbornene],
spiro[8-iso-butyl-1,4-dihydronaphthalen-2-one-3,5'-2'-norbornene],
spiro[5-sec-butyl-1,4-dihydronaphthalen-2-one-3,5'-2'-norbornene],
spiro[6-sec-butyl-1,4-dihydronaphthalen-2-one-3,5'-2'-norbornene],
spiro[7-sec-butyl-1,4-dihydronaphthalen-2-one-3,5'-2'-norbornene],
spiro[8-sec-butyl-1,4-dihydronaphthalen-2-one-3,5'-2'-norbornene],
spiro[5-t-butyl-1,4-dihydronaphthalen-2-one-3,5'-2'-norbornene],
spiro[6-t-butyl-1,4-dihydronaphthalen-2-one-3,5'-2'-norbornene],
spiro[7-t-butyl-1,4-dihydronaphthalen-2-one-3,5'-2'-norbornene],
spiro[8-t-butyl-1,4-dihydronaphthalen-2-one-3,5'-2'-norbornene],
spiro[5-cyclohexyl-1,4-dihydronaphthalen-2-one-3,5'-2'-norbornene],
spiro[6-cyclohexyl-1,4-dihydronaphthalen-2-one-3,5'-2'-norbornene],
spiro[7-cyclohexyl-1,4-dihydronaphthalen-2-one-3,5'-2'-norbornene],
spiro[8-cyclohexyl-1,4-dihydronaphthalen-2-one-3,5'-2'-norbornene],
spiro[5-phenyl-1,4-dihydronaphthalen-2-one-3,5'-2'-norbornene],
spiro[6-phenyl-1,4-dihydronaphthalen-2-one-3,5'-2'-norbornene],
spiro[7-phenyl-1,4-dihydronaphthalen-2-one-3,5'-2'-norbornene],
spiro[8-phenyl-1,4-dihydronaphthalen-2-one-3,5'-2'-norbornene], spiro[5-chloro-1,4-dihydronaphthalen-2-one-3,5'-2'-norbornene],
spiro[6-chloro-1,4-dihydronaphthalen-2-one-3,5'-2'-norbornene],
spiro[7-chloro-1,4-dihydronaphthalen-2-one-3,5'-2'-norbornene],
spiro[8-chloro-1,4-dihydronaphthalen-2-one-3,5'-2'-norbornene],
spiro[5-phenyl-1,4-dihydronaphthalen-2-one-3,5'-2'-norbornene],
spiro[6-phenyl-1,4-dihydronaphthalen-2-one-3,5'-2'-norbornene],
spiro[7-phenyl-1,4-dihydronaphthalen-2-one-3,5'-2'-norbornene],
spiro[8-phenyl-1,4-dihydronaphthalen-2-one-3,5'-2'-norbornene],
spiro[5-amino-1,4-dihydronaphthalen-2-one-3,5'-2'-norbornene],
spiro[6-amino-1,4-dihydronaphthalen-2-one-3,5'-2'-norbornene],
spiro[7-amino-1,4-dihydronaphthalen-2-one-3,5'-2'-norbornene],
spiro[8-amino-1,4-dihydronaphthalen-2-one-3,5'-2'-norbornene],
spiro[5-methoxy-1,4-dihydronaphthalen-2-one-3,5'-2'-norbornene],
spiro[6-methoxy-1,4-dihydronaphthalen-2-one-3,5'-2'-norbornene],
spiro[7-methoxy-1,4-dihydronaphthalen-2-one-3,5'-2'-norbornene],
spiro[8-methoxy-1,4-dihydronaphthalen-2-one-3,5'-2'-norbornene],
spiro[1,3-dihydronaphthalen-2-one-4,5'-2'-norbornene],
spiro[5-methyl-1,3-dihydronaphthalen-2-one-4,5'-2'-norbornene],
spiro[6-methyl-1,3-dihydronaphthalen-2-one-4,5'-2'-norbornene],
spiro[7-methyl-1,3-dihydronaphthalen-2-one-4,5'-2'-norbornene],
spiro[8-methyl-1,3-dihydronaphthalen-2-one-4,5'-2'-norbornene],
spiro[5-ethyl-1,3-dihydronaphthalen-2-one-4,5'-2'-norbornene],
spiro[6-ethyl-1,3-dihydronaphthalen-2-one-4,5'-2'-norbornene],
spiro[7-ethyl-1,3-dihydronaphthalen-2-one-4,5'-2'-norbornene],
spiro[8-ethyl-1,3-dihydronaphthalen-2-one-4,5'-2'-norbornene],
spiro[5-n-propyl-1,3-dihydronaphthalen-2-one-4,5'-2'-norbornene],
spiro[6-n-propyl-1,3-dihydronaphthalen-2-one-4,5'-2'-norbornene],
spiro[7-n-propyl-1,3-dihydronaphthalen-2-one-4,5'-2'-norbornene],
spiro[8-n-propyl-1,3-dihydronaphthalen-2-one-4,5'-2'-norbornene],
spiro[5-iso-propyl-1,3-dihydronaphthalen-2-one-4,5'-2'-norbornene],
spiro[6-iso-propyl-1,3-dihydronaphthalen-2-one-4,5'-2'-norbornene],
spiro[7-iso-propyl-1,3-dihydronaphthalen-2-one-4,5'-2'-norbornene],
spiro[8-iso-propyl-1,3-dihydronaphthalen-2-one-4,5'-2'-norbornene],
spiro[5-n-butyl-1,3-dihydronaphthalen-2-one-4,5'-2'-norbornene],
spiro[6-n-butyl-1,3-dihydronaphthalen-2-one-4,5'-2'-norbornene],
spiro[7-n-butyl-1,3-dihydronaphthalen-2-one-4,5'-2'-norbornene],
spiro[8-n-butyl-1,3-dihydronaphthalen-2-one-4,5'-2'-norbornene],
spiro[5-iso-butyl-1,3-dihydronaphthalen-2-one-4,5'-2'-norbornene],
spiro[6-iso-butyl-1,3-dihydronaphthalen-2-one-4,5'-2'-norbornene],
spiro[7-iso-butyl-1,3-dihydronaphthalen-2-one-4,5'-2'-norbornene],
spiro[8-iso-butyl-1,3-dihydronaphthalen-2-one-4,5'-2'-norbornene],
spiro[5-sec-butyl-1,3-dihydronaphthalen-2-one-4,5'-2'-norbornene],
spiro[6-sec-butyl-1,3-dihydronaphthalen-2-one-4,5'-2'-norbornene],
spiro[7-sec-butyl-1,3-dihydronaphthalen-2-one-4,5'-2'-norbornene],
spiro[8-sec-butyl-1,3-dihydronaphthalen-2-one-4,5'-2'-norbornene],
spiro[5-t-butyl-1,3-dihydronaphthalen-2-one-4,5'-2'-norbornene],
spiro[6-t-butyl-1,3-dihydronaphthalen-2-one-4,5'-2'-norbornene],
spiro[7-t-butyl-1,3-dihydronaphthalen-2-one-4,5'-2'-norbornene],
spiro[8-t-butyl-1,3-dihydronaphthalen-2-one-4,5'-2'-norbornene],
spiro[5-cyclohexyl-1,3-dihydronaphthalen-2-one-4,5'-2'-norbornene],
spiro[6-cyclohexyl-1,3-dihydronaphthalen-2-one-4,5'-2'-norbornene],
spiro[7-cyclohexyl-1,3-dihydronaphthalen-2-one-4,5'-2'-norbornene],
spiro[8-cyclohexyl-1,3-dihydronaphthalen-2-one-4,5'-2'-norbornene],
spiro[5-phenyl-1,3-dihydronaphthalen-2-one-4,5'-2'-norbornene],
spiro[6-phenyl-1,3-dihydronaphthalen-2-one-4,5'-2'-norbornene],
spiro[7-phenyl-1,3-dihydronaphthalen-2-one-4,5'-2'-norbornene],
spiro[8-phenyl-1,3-dihydronaphthalen-2-one-4,5'-2'-norbornene],
spiro[5-chloro-1,3-dihydronaphthalen-2-one-4,5'-2'-norbornene],
spiro[6-chloro-1,3-dihydronaphthalen-2-one-4,5'-2'-norbornene],
spiro[7-chloro-1,3-dihydronaphthalen-2-one-4,5'-2'-norbornene],
spiro[8-chloro-1,3-dihydronaphthalen-2-one-4,5'-2'-norbornene],
spiro[5-phenyl-1,3-dihydronaphthalen-2-one-4,5'-2'-norbornene],
spiro[6-phenyl-1,3-dihydronaphthalen-2-one-4,5'-2'-norbornene],
spiro[7-phenyl-1,3-dihydronaphthalen-2-one-4,5'-2'-norbornene],
spiro[8-phenyl-1,3-dihydronaphthalen-2-one-4,5'-2'-norbornene],
spiro[5-amino-1,3-dihydronaphthalen-2-one-4,5'-2'-norbornene],
spiro[6-amino-1,3-dihydronaphthalen-2-one-4,5'-2'-norbornene], spiro[7-amino-1,3-dihydronaphthalen-2-one-4,5'-2'-norbornene],
spiro[8-amino-1,3-dihydronaphthalen-2-one-4,5'-2'-norbornene],
spiro[5-methoxy-1,3-dihydronaphthalen-2-one-4,5'-2'-norbornene],
spiro[6-methoxy-1,3-dihydronaphthalen-2-one-4,5'-2'-norbornene],
spiro[7-methoxy-1,3-dihydronaphthalen-2-one-4,5'-2'-norbornene],
spiro[8-methoxy-1,3-dihydronaphthalen-2-one-4,5'-2'-norbornene].

(vii)
2,3-benzocyclohepten-1-one-4-spiro-5'-bicyclo[2.2.1]-2'-heptene,
2,3-(3"-methylbenzo)cyclohepten-1-one-4-spiro-5'-bicyclo[2.2.1]-2'-heptene,
2,3-(4"-methylbenzo)cyclohepten-1-one-4-spiro-5'-bicyclo[2.2.1]-2'-heptene,
2,3-(5"-methylbenzo)cyclohepten-1-one-4-spiro-5'-bicyclo[2.2.1]-2'-heptene,
2,3-(6"-methylbenzo)cyclohepten-1-one-4-spiro-5'-bicyclo[2.2.1]-2'-heptene,
2,3-(3"-ethylbenzo)cyclohepten-1-one-4-spiro-5'-bicyclo[2.2.1]-2'-heptene,
2,3-(4"-ethylbenzo)cyclohepten-1-one-4-spiro-5'-bicyclo[2.2.1]-2'-heptene,
2,3-(5"-ethylbenzo)cyclohepten-1-one-4-spiro-5'-bicyclo[2.2.1]-2'-heptene,
2,3-(6"-ethylbenzo)cyclohepten-1-one-4-spiro-5'-bicyclo[2.2.1]-2'-heptene,
2,3-(3"-n-propylbenzo)cyclohepten-1-one-4-spiro-5'-bicyclo[2.2.1]-2'-heptene,
2,3-(4"-n-propylbenzo)cyclohepten-1-one-4-spiro-5'-bicyclo[2.2.1]-2'-heptene,
2,3-(5"-n-propylbenzo)cyclohepten-1-one-4-spiro-5'-bicyclo[2.2.1]-2'-heptene,
2,3-(6"-n-propylbenzo)cyclohepten-1-one-4-spiro-5'-bicyclo[2.2.1]-2'-heptene,
2,3-(3"-iso-propylbenzo)cyclohepten-1-one-4-spiro-5'-bicyclo[2.2.1]-2'-heptene,
2,3-(4"-iso-propylbenzo)cyclohepten-1-one-4-spiro-5'-bicyclo[2.2.1]-2'-heptene,
2,3-(5"-iso-propylbenzo)cyclohepten-1-one-4-spiro-5'-bicyclo[2.2.1]-2'-heptene,
2,3-(6"-iso-propylbenzo)cyclohepten-1-one-4-spiro-5'-bicyclo[2.2.1]-2'-heptene,
2,3-(3"-n-butylbenzo)cyclohepten-1-one-4-spiro-5'-bicyclo[2.2.1]-2'-heptene,
2,3-(4"-n-butylbenzo)cyclohepten-1-one-4-spiro-5'-bicyclo[2.2.1]-2'-heptene,
2,3-(5"-n-butylbenzo)cyclohepten-1-one-4-spiro-5'-bicyclo[2.2.1]-2'-heptene,
2,3-(6"-n-butylbenzo)cyclohepten-1-one-4-spiro-5'-bicyclo[2.2.1]-2'-heptene,
2,3-(3"-iso-butylbenzo)cyclohepten-1-one-4-spiro-5'-bicyclo[2.2.1]-2'-heptene,
2,3-(4"-iso-butylbenzo)cyclohepten-1-one-4-spiro-5'-bicyclo[2.2.1]-2'-heptene,
2,3-(5"-iso-butylbenzo)cyclohepten-1-one-4-spiro-5'-bicyclo[2.2.1]-2'-heptene,
2,3-(6"-iso-butylbenzo)cyclohepten-1-one-4-spiro-5'-bicyclo[2.2.1]-2'-heptene,
2,3-(3"-sec-butylbenzo)cyclohepten-1-one-4-spiro-5'-bicyclo[2.2.1]-2'-heptene,
2,3-(4"-sec-butylbenzo)cyclohepten-1-one-4-spiro-5'-bicyclo[2.2.1]-2'-heptene,
2,3-(5"-sec-butylbenzo)cyclohepten-1-one-4-spiro-5'-bicyclo[2.2.1]-2'-heptene,
2,3-(6"-sec-butylbenzo)cyclohepten-1-one-4-spiro-5'-bicyclo[2.2.1]-2'-heptene,
2,3-(3"-t-butylbenzo)cyclohepten-1-one-4-spiro-5'-bicyclo[2.2.1]-2'-heptene,
2,3-(4"-t-butylbenzo)cyclohepten-1-one-4-spiro-5'-bicyclo[2.2.1]-2'-heptene,
2,3-(5"-t-butylbenzo)cyclohepten-1-one-4-spiro-5'-bicyclo[2.2.1]-2'-heptene,
2,3-(6"-t-butylbenzo)cyclohepten-1-one-4-spiro-5'-bicyclo[2.2.1]-2'-heptene,
2,3-(3"-cyclohexylbenzo)cyclohepten-1-one-4-spiro-5'-bicyclo[2.2.1]-2'-heptene,
2,3-(4"-cyclohexylbenzo)cyclohepten-1-one-4-spiro-5'-bicyclo[2.2.1]-2'-heptene,
2,3-(5"-cyclohexylbenzo)cyclohepten-1-one-4-spiro-5'-bicyclo[2.2.1]-2'-heptene,
2,3-(6"-cyclohexylbenzo)cyclohepten-1-one-4-spiro-5'-bicyclo[2.2.1]-2'-heptene,
2,3-(3"-phenylbenzo)cyclohepten-1-one-4-spiro-5'-bicyclo[2.2.1]-2'-heptene,
2,3-(4"-phenylbenzo)cyclohepten-1-one-4-spiro-5'-bicyclo[2.2.1]-2'-heptene,
2,3-(5"-phenylbenzo)cyclohepten-1-one-4-spiro-5'-bicyclo[2.2.1]-2'-heptene,
2,3-(6"-phenylbenzo)cyclohepten-1-one-4-spiro-5'-bicyclo[2.2.1]-2'-heptene,
2,3-(3"-chlorobenzo)cyclohepten-1-one-4-spiro-5'-bicyclo[2.2.1]-2'-heptene,
2,3-(4"-chlorobenzo)cyclohepten-1-one-4-spiro-5'-bicyclo[2.2.1]-2'-heptene,
2,3-(4"-chlorobenzo)cyclohepten-1-one-4-spiro-5'-bicyclo[2.2.1]-2'-heptene,
2,3-(4"-chlorobenzo)cyclohepten-1-one-4-spiro-5'-bicyclo[2.2.1]-2'-heptene,
2,3-(5"-chlorobenzo)cyclohepten-1-one-4-spiro-5'-bicyclo[2.2.1]-2'-heptene,
2,3-(6"-chlorobenzo)cyclohepten-1-one-4-spiro-5'-bicyclo[2.2.1]-2'-heptene,
2,3-(3"-aminobenzo)cyclohepten-1-one-4-spiro-5'-bicyclo[2.2.1]-2'-heptene,
2,3-(4"-aminobenzo)cyclohepten-1-one-4-spiro-5'-bicyclo[2.2.1]-2'-heptene,
2,3-(5"-aminobenzo)cyclohepten-1-one-4-spiro-5'-bicyclo[2.2.1]-2'-heptene,
2,3-(6"-aminobenzo)cyclohepten-1-one-4-spiro-5'-bicyclo[2.2.1]-2'-heptene,
2,3-(3"-methoxybenzo)cyclohepten-1-one-4-spiro-5'-bicyclo[2.2.1]-2'-heptene,
2,3-(4"-methoxybenzo)cyclohepten-1-one-4-spiro-5'-bicyclo[2.2.1]-2'-heptene,
2,3-(5"-methoxybenzo)cyclohepten-1-one-4-spiro-5'-bicyclo[2.2.1]-2'-heptene,
2,3-(6"-methoxybenzo)cyclohepten-1-one-4-spiro-5'-bicyclo[2.2.1]-2'-heptene,
2,3-benzocyclohepten-1-one-5-spiro-5'-bicyclo[2.2.1]-2'-heptene,
2,3-(3"-methylbenzo)cyclohepten-1-one-5-spiro-5'-bicyclo[2.2.1]-2'-heptene,
2,3-(4"-methylbenzo)cyclohepten-1-one-5-spiro-5'-bicyclo[2.2.1]-2'-heptene,
2,3-(5"-methylbenzo)cyclohepten-1-one-5-spiro-5'-bicyclo[2.2.1]-2'-heptene,
2,3-(6"-methylbenzo)cyclohepten-1-one-5-spiro-5'-bicyclo[2.2.1]-2'-heptene, 2,3-(3"-ethylbenzo)cyclohepten-1-one-5-spiro-5'-bicyclo[2.2.1]-2'-heptene,
2,3-(4"-ethylbenzo)cyclohepten-1-one-5-spiro-5'-bicyclo[2.2.1]-2'-heptene,
2,3-(5"-ethylbenzo)cyclohepten-1-one-5-spiro-5'-bicyclo[2.2.1]-2'-heptene,
2,3-(6"-ethylbenzo)cyclohepten-1-one-5-spiro-5'-bicyclo[2.2.1]-2'-heptene,
2,3-(3"-n-propylbenzo)cyclohepten-1-one-5-spiro-5'-bicyclo[2.2.1]-2'-heptene,
2,3-(4"-n-propylbenzo)cyclohepten-1-one-5-spiro-5'-bicyclo[2.2.1]-2'-heptene,
2,3-(5"-n-propylbenzo)cyclohepten-1-one-5-spiro-5'-bicyclo[2.2.1]-2'-heptene,
2,3-(6"-n-propylbenzo)cyclohepten-1-one-5-spiro-5'-bicyclo[2.2.1]-2'-heptene,
2,3-(3"-iso-propylbenzo)cyclohepten-1-one-5-spiro-5'-bicyclo[2.2.1]-2'-heptene,
2,3-(4"-iso-propylbenzo)cyclohepten-1-one-5-spiro-5'-bicyclo[2.2.1]-2'-heptene,
2,3-(5"-iso-propylbenzo)cyclohepten-1-one-5-spiro-5'-bicyclo[2.2.1]-2'-heptene,
2,3-(6"-iso-propylbenzo)cyclohepten-1-one-5-spiro-5'-bicyclo[2.2.1]-2'-heptene,
2,3-(3"-n-butylbenzo)cyclohepten-1-one-5-spiro-5'-bicyclo[2.2.1]-2'-heptene,
2,3-(4"-n-butylbenzo)cyclohepten-1-one-5-spiro-5'-bicyclo[2.2.1]-2'-heptene,
2,3-(5"-n-butylbenzo)cyclohepten-1-one-5-spiro-5'-bicyclo[2.2.1]-2'-heptene,
2,3-(6"-n-butylbenzo)cyclohepten-1-one-5-spiro-5'-bicyclo[2.2.1]-2'-heptene,
2,3-(3"-iso-butylbenzo)cyclohepten-1-one-5-spiro-5'-bicyclo[2.2.1]-2'-heptene,
2,3-(4"-iso-butylbenzo)cyclohepten-1-one-4-spiro-5'-bicyclo[2.2.1]-2'-heptene,
2,3-(5"-iso-butylbenzo)cyclohepten-1-one-5-spiro-5'-bicyclo[2.2.1]-2'-heptene,
2,3-(6"-iso-butylbenzo)cyclohepten-1-one-5-spiro-5'-bicyclo[2.2.1]-2'-heptene,
2,3-(3"-sec-butylbenzo)cyclohepten-1-one-5-spiro-5'-bicyclo[2.2.1]-2'-heptene,
2,3-(4"-sec-butylbenzo)cyclohepten-1-one-5-spiro-5'-bicyclo[2.2.1]-2'-heptene,
2,3-(5"-sec-butylbenzo)cyclohepten-1-one-5-spiro-5'-bicyclo[2.2.1]-2'-heptene,
2,3-(6"-sec-butylbenzo)cyclohepten-1-one-5-spiro-5'-bicyclo[2.2.1]-2'-heptene,
2,3-(3"-t-butylbenzo)cyclohepten-1-one-5-spiro-5'-bicyclo[2.2.1]-2'-heptene,
2,3-(4"-t-butylbenzo)cyclohepten-1-one-5-spiro-5'-bicyclo[2.2.1]-2'-heptene,
2,3-(5"-t-butylbenzo)cyclohepten-1-one-5-spiro-5'-bicyclo[2.2.1]-2'-heptene,
2,3-(6"-t-butylbenzo)cyclohepten-1-one-5-spiro-5'-bicyclo[2.2.1]-2'-heptene,
2,3-(3"-cyclohexylbenzo)cyclohepten-1-one-5-spiro-5'-bicyclo[2.2.1]-2'-heptene,
2,3-(4"-cyclohexylbenzo)cyclohepten-1-one-5-spiro-5'-bicyclo[2.2.1]-2'-heptene,
2,3-(5"-cyclohexylbenzo)cyclohepten-1-one-5-spiro-5'-bicyclo[2.2.1]-2'-heptene,
2,3-(6"-cyclohexylbenzo)cyclohepten-1-one-5-spiro-5'-bicyclo[2.2.1]-2'-heptene,
2,3-(3"-phenylbenzo)cyclohepten-1-one-5-spiro-5'-bicyclo[2.2.1]-2'-heptene,
2,3-(4"-phenylbenzo)cyclohepten-1-one-5-spiro-5'-bicyclo[2.2.1]-2'-heptene,
2,3-(5"-phenylbenzo)cyclohepten-1-one-5-spiro-5'-bicyclo[2.2.1]-2'-heptene,
2,3-(6"-phenylbenzo)cyclohepten-1-one-5-spiro-5'-bicyclo[2.2.1]-2'-heptene,
2,3-(3"-chlorobenzo)cyclohepten-1-one-5-spiro-5'-bicyclo[2.2.1]-2'-heptene,
2,3-(4"-chlorobenzo)cyclohepten-1-one-5-spiro-5'-bicyclo[2.2.1]-2'-heptene,
2,3-(4"-chlorobenzo)cyclohepten-1-one-5-spiro-5'-bicyclo[2.2.1]-2'-heptene,
2,3-(4"-chlorobenzo)cyclohepten-1-one-5-spiro-5'-bicyclo[2.2.1]-2'-heptene,
2,3-(5"-chlorobenzo)cyclohepten-1-one-5-spiro-5'-bicyclo[2.2.1]-2'-heptene,
2,3-(6"-chlorobenzo)cyclohepten-1-one-5-spiro-5'-bicyclo[2.2.1]-2'-heptene,
2,3-(3"-aminobenzo)cyclohepten-1-one-5-spiro-5'-bicyclo[2.2.1]-2'-heptene,
2,3-(4"-aminobenzo)cyclohepten-1-one-5-spiro-5'-bicyclo[2.2.1]-2'-heptene,
2,3-(5"-aminobenzo)cyclohepten-1-one-5-spiro-5'-bicyclo[2.2.1]-2'-heptene,
2,3-(6"-aminobenzo)cyclohepten-1-one-5-spiro-5'-bicyclo[2.2.1]-2'-heptene,
2,3-(3"-methoxybenzo)cyclohepten-1-one-5-spiro-5'-bicyclo[2.2.1]-2'-heptene,
2,3-(4"-methoxybenzo)cyclohepten-1-one-5-spiro-5'-bicyclo[2.2.1]-2'-heptene,
2,3-(5"-methoxybenzo)cyclohepten-1-one-5-spiro-5'-bicyclo[2.2.1]-2'-heptene,
2,3-(6"-methoxybenzo)cyclohepten-1-one-5-spiro-5'-bicyclo[2.2.1]-2'-heptene,
2,3-benzocyclohepten-1-one-6-spiro-5'-bicyclo[2.2.1]-2'-heptene,
2,3-(3"-methylbenzo)cyclohepten-1-one-6-spiro-5'-bicyclo[2.2.1]-2'-heptene,
2,3-(4"-methylbenzo)cyclohepten-1-one-6-spiro-5'-bicyclo[2.2.1]-2'-heptene,
2,3-(5"-methylbenzo)cyclohepten-1-one-6-spiro-5'-bicyclo[2.2.1]-2'-heptene,
2,3-(6"-methylbenzo)cyclohepten-1-one-6-spiro-5'-bicyclo[2.2.1]-2'-heptene,
2,3-(3"-ethylbenzo)cyclohepten-1-one-6-spiro-5'-bicyclo[2.2.1]-2'-heptene,
2,3-(4"-ethylbenzo)cyclohepten-1-one-6-spiro-5'-bicyclo[2.2.1]-2'-heptene,
2,3-(5"-ethylbenzo)cyclohepten-1-one-6-spiro-5'-bicyclo[2.2.1]-2'-heptene,
2,3-(6"-ethylbenzo)cyclohepten-1-one-6-spiro-5'-bicyclo[2.2.1]-2'-heptene,
2,3-(3"-n-propylbenzo)cyclohepten-1-one-6-spiro-5'-bicyclo[2.2.1]-2'-heptene,
2,3-(4"-n-propylbenzo)cyclohepten-1-one-6-spiro-5'-bicyclo[2.2.1]-2'-heptene,
2,3-(5"-n-propylbenzo)cyclohepten-1-one-6-spiro-5'-bicyclo[2.2.1]-2'-heptene,
2,3-(6"-n-propylbenzo)cyclohepten-1-one-6-spiro-5'-bicyclo[2.2.1]-2'-heptene,
2,3-(3"-iso-propylbenzo)cyclohepten-1-one-6-spiro-5'-bicyclo[2.2.1]-2'-heptene,
2,3-(4"-iso-propylbenzo)cyclohepten-1-one-6-spiro-5'-bicyclo[2.2.1]-2'-heptene,
2,3-(5"-iso-propylbenzo)cyclohepten-1-one-6-spiro-5'-bicyclo[2.2.1]-2'-heptene, 2,3-(6"-iso-propylbenzo)cyclohepten-1-one-6-spiro-5'-bicyclo[2.2.1]-2'-heptene,
2,3-(3"-n-butylbenzo)cyclohepten-1-one-6-spiro-5'-bicyclo[2.2.1]-2'-heptene,
2,3-(4"-n-butylbenzo)cyclohepten-1-one-6-spiro-5'-bicyclo[2.2.1]-2'-heptene,
2,3-(5"-n-butylbenzo)cyclohepten-1-one-6-spiro-5'-bicyclo[2.2.1]-2'-heptene,
2,3-(6"-n-butylbenzo)cyclohepten-1-one-6-spiro-5'-bicyclo[2.2.1]-2'-heptene,
2,3-(3"-iso-butylbenzo)cyclohepten-1-one-6-spiro-5'-bicyclo[2.2.1]-2'-heptene,
2,3-(4"-iso-butylbenzo)cyclohepten-1-one-6-spiro-5'-bicyclo[2.2.1]-2'-heptene,
2,3-(5"-iso-butylbenzo)cyclohepten-1-one-6-spiro-5'-bicyclo[2.2.1]-2'-heptene,
2,3-(6"-iso-butylbenzo)cyclohepten-1-one-6-spiro-5'-bicyclo[2.2.1]-2'-heptene,
2,3-(3"-sec-butylbenzo)cyclohepten-1-one-6-spiro-5'-bicyclo[2.2.1]-2'-heptene,
2,3-(4"-sec-butylbenzo)cyclohepten-1-one-6-spiro-5'-bicyclo[2.2.1]-2'-heptene,
2,3-(5"-sec-butylbenzo)cyclohepten-1-one-6-spiro-5'-bicyclo[2.2.1]-2'-heptene,
2,3-(6"-sec-butylbenzo)cyclohepten-1-one-6-spiro-5'-bicyclo[2.2.1]-2'-heptene,
2,3-(3"-t-butylbenzo)cyclohepten-1-one-6-spiro-5'-bicyclo[2.2.1]-2'-heptene,
2,3-(4"-t-butylbenzo)cyclohepten-1-one-6-spiro-5'-bicyclo[2.2.1]-2'-heptene,
2,3-(5"-t-butylbenzo)cyclohepten-1-one-6-spiro-5'-bicyclo[2.2.1]-2'-heptene,
2,3-(6"-t-butylbenzo)cyclohepten-1-one-6-spiro-5'-bicyclo[2.2.1]-2'-heptene,
2,3-(3"-cyclohexylbenzo)cyclohepten-1-one-6-spiro-5'-bicyclo[2.2.1]-2'-heptene,
2,3-(4"-cyclohexylbenzo)cyclohepten-1-one-6-spiro-5'-bicyclo[2.2.1]-2'-heptene,
2,3-(5"-cyclohexylbenzo)cyclohepten-1-one-6-spiro-5'-bicyclo[2.2.1]-2'-heptene,
2,3-(6"-cyclohexylbenzo)cyclohepten-1-one-6-spiro-5'-bicyclo[2.2.1]-2'-heptene,
2,3-(3"-phenylbenzo)cyclohepten-1-one-6-spiro-5'-bicyclo[2.2.1]-2'-heptene,
2,3-(4"-phenylbenzo)cyclohepten-1-one-6-spiro-5'-bicyclo[2.2.1]-2'-heptene,
2,3-(5"-phenylbenzo)cyclohepten-1-one-6-spiro-5'-bicyclo[2.2.1]-2'-heptene,
2,3-(6"-phenylbenzo)cyclohepten-1-one-6-spiro-5'-bicyclo[2.2.1]-2'-heptene,
2,3-(3"-chlorobenzo)cyclohepten-1-one-6-spiro-5'-bicyclo[2.2.1]-2'-heptene,
2,3-(4"-chlorobenzo)cyclohepten-1-one-6-spiro-5'-bicyclo[2.2.1]-2'-heptene,
2,3-(4"-chlorobenzo)cyclohepten-1-one-6-spiro-5'-bicyclo[2.2.1]-2'-heptene,
2,3-(4"-chlorobenzo)cyclohepten-1-one-6-spiro-5'-bicyclo[2.2.1]-2'-heptene,
2,3-(5"-chlorobenzo)cyclohepten-1-one-6-spiro-5'-bicyclo[2.2.1]-2'-heptene,
2,3-(6"-chlorobenzo)cyclohepten-1-one-6-spiro-5'-bicyclo[2.2.1]-2'-heptene,
2,3-(3"-aminobenzo)cyclohepten-1-one-6-spiro-5'-bicyclo[2.2.1]-2'-heptene,
2,3-(4"-aminobenzo)cyclohepten-1-one-6-spiro-5'-bicyclo[2.2.1]-2'-heptene,
2,3-(5"-aminobenzo)cyclohepten-1-one-6-spiro-5'-bicyclo[2.2.1]-2'-heptene,
2,3-(6"-aminobenzo)cyclohepten-1-one-6-spiro-5'-bicyclo[2.2.1]-2'-heptene,
2,3-(3"-methoxybenzo)cyclohepten-1-one-6-spiro-5'-bicyclo[2.2.1]-2'-heptene,
2,3-(4"-methoxybenzo)cyclohepten-1-one-6-spiro-5'-bicyclo[2.2.1]-2'-heptene,
2,3-(5"-methoxybenzo)cyclohepten-1-one-6-spiro-5'-bicyclo[2.2.1]-2'-heptene,
2,3-(6"-methoxybenzo)cyclohepten-1-one-6-spiro-5'-bicyclo[2.2.1]-2'-heptene,
2,3-benzocyclohepten-1-one-7-spiro-5'-bicyclo[2.2.1]-2'-heptene,
2,3-(3"-methylbenzo)cyclohepten-1-one-7-spiro-5'-bicyclo[2.2.1]-2'-heptene,
2,3-(4"-methylbenzo)cyclohepten-1-one-7-spiro-5'-bicyclo[2.2.1]-2'-heptene,
2,3-(5"-methylbenzo)cyclohepten-1-one-7-spiro-5'-bicyclo[2.2.1]-2'-heptene,
2,3-(6"-methylbenzo)cyclohepten-1-one-7-spiro-5'-bicyclo[2.2.1]-2'-heptene,
2,3-(3"-ethylbenzo)cyclohepten-1-one-7-spiro-5'-bicyclo[2.2.1]-2'-heptene,
2,3-(4"-ethylbenzo)cyclohepten-1-one-7-spiro-5'-bicyclo[2.2.1]-2'-heptene,
2,3-(5"-ethylbenzo)cyclohepten-1-one-7-spiro-5'-bicyclo[2.2.1]-2'-heptene,
2,3-(6"-ethylbenzo)cyclohepten-1-one-7-spiro-5'-bicyclo[2.2.1]-2'-heptene,
2,3-(3"-n-propylbenzo)cyclohepten-1-one-7-spiro-5'-bicyclo[2.2.1]-2'-heptene,
2,3-(4"-n-propylbenzo)cyclohepten-1-one-7-spiro-5'-bicyclo[2.2.1]-2'-heptene,
2,3-(5"-n-propylbenzo)cyclohepten-1-one-7-spiro-5'-bicyclo[2.2.1]-2'-heptene,
2,3-(6"-n-propylbenzo)cyclohepten-1-one-7-spiro-5'-bicyclo[2.2.1]-2'-heptene,
2,3-(3"-iso-propylbenzo)cyclohepten-1-one-7-spiro-5'-bicyclo[2.2.1]-2'-heptene,
2,3-(4"-iso-propylbenzo)cyclohepten-1-one-7-spiro-5'-bicyclo[2.2.1]-2'-heptene,
2,3-(5"-iso-propylbenzo)cyclohepten-1-one-7-spiro-5'-bicyclo[2.2.1]-2'-heptene,
2,3-(6"-iso-propylbenzo)cyclohepten-1-one-7-spiro-5'-bicyclo[2.2.1]-2'-heptene,
2,3-(3"-n-butylbenzo)cyclohepten-1-one-7-spiro-5'-bicyclo[2.2.1]-2'-heptene,
2,3-(4"-n-butylbenzo)cyclohepten-1-one-7-spiro-5'-bicyclo[2.2.1]-2'-heptene,
2,3-(5"-n-butylbenzo)cyclohepten-1-one-7-spiro-5'-bicyclo[2.2.1]-2'-heptene,
2,3-(6"-n-butylbenzo)cyclohepten-1-one-7-spiro-5'-bicyclo[2.2.1]-2'-heptene,
2,3-(3"-iso-butylbenzo)cyclohepten-1-one-7-spiro-5'-bicyclo[2.2.1]-2'-heptene,
2,3-(4"-iso-butylbenzo)cyclohepten-1-one-7-spiro-5'-bicyclo[2.2.1]-2'-heptene,
2,3-(5"-iso-butylbenzo)cyclohepten-1-one-7-spiro-5'-bicyclo[2.2.1]-2'-heptene,
2,3-(6"-iso-butylbenzo)cyclohepten-1-one-7-spiro-5'-bicyclo[2.2.1]-2'-heptene,
2,3-(3"-sec-butylbenzo)cyclohepten-1-one-7-spiro-5'-bicyclo[2.2.1]-2'-heptene,
2,3-(4"-sec-butylbenzo)cyclohepten-1-one-7-spiro-5'-bicyclo[2.2.1]-2'-heptene, 2,3-(5"-sec-butylbenzo)cyclohepten-1-one-7-spiro-5'-bicyclo[2.2.1]-2'-heptene,
2,3-(6"-sec-butylbenzo)cyclohepten-1-one-7-spiro-5'-bicyclo[2.2.1]-2'-heptene,
2,3-(3"-t-butylbenzo)cyclohepten-1-one-7-spiro-5'-bicyclo[2.2.1]-2'-heptene,
2,3-(4"-t-butylbenzo)cyclohepten-1-one-7-spiro-5'-bicyclo[2.2.1]-2'-heptene,
2,3-(5"-t-butylbenzo)cyclohepten-1-one-7-spiro-5'-bicyclo[2.2.1]-2'-heptene,
2,3-(6"-t-butylbenzo)cyclohepten-1-one-7-spiro-5'-bicyclo[2.2.1]-2'-heptene,
2,3-(3"-cyclohexylbenzo)cyclohepten-1-one-7-spiro-5'-bicyclo[2.2.1]-2'-heptene,
2,3-(4"-cyclohexylbenzo)cyclohepten-1-one-7-spiro-5'-bicyclo[2.2.1]-2'-heptene,
2,3-(5"-cyclohexylbenzo)cyclohepten-1-one-7-spiro-5'-bicyclo[2.2.1]-2'-heptene,
2,3-(6"-cyclohexylbenzo)cyclohepten-1-one-7-spiro-5'-bicyclo[2.2.1]-2'-heptene,
2,3-(3"-phenylbenzo)cyclohepten-1-one-7-spiro-5'-bicyclo[2.2.1]-2'-heptene,
2,3-(4"-phenylbenzo)cyclohepten-1-one-7-spiro-5'-bicyclo[2.2.1]-2'-heptene,
2,3-(5"-phenylbenzo)cyclohepten-1-one-7-spiro-5'-bicyclo[2.2.1]-2'-heptene,
2,3-(6"-phenylbenzo)cyclohepten-1-one-7-spiro-5'-bicyclo[2.2.1]-2'-heptene,
2,3-(3"-chlorobenzo)cyclohepten-1-one-7-spiro-5'-bicyclo[2.2.1]-2'-heptene,
2,3-(4"-chlorobenzo)cyclohepten-1-one-7-spiro-5'-bicyclo[2.2.1]-2'-heptene,
2,3-(4"-chlorobenzo)cyclohepten-1-one-7-spiro-5'-bicyclo[2.2.1]-2'-heptene,
2,3-(4"-chlorobenzo)cyclohepten-1-one-7-spiro-5'-bicyclo[2.2.1]-2'-heptene,
2,3-(5"-chlorobenzo)cyclohepten-1-one-7-spiro-5'-bicyclo[2.2.1]-2'-heptene,
2,3-(6"-chlorobenzo)cyclohepten-1-one-7-spiro-5'-bicyclo[2.2.1]-2'-heptene,
2,3-(3"-aminobenzo)cyclohepten-1-one-7-spiro-5'-bicyclo[2.2.1]-2'-heptene,
2,3-(4"-aminobenzo)cyclohepten-1-one-7-spiro-5'-bicyclo[2.2.1]-2'-heptene,
2,3-(5"-aminobenzo)cyclohepten-1-one-7-spiro-5'-bicyclo[2.2.1]-2'-heptene,
2,3-(6"-aminobenzo)cyclohepten-1-one-7-spiro-5'-bicyclo[2.2.1]-2'-heptene,
2,3-(3"-methoxybenzo)cyclohepten-1-one-7-spiro-5'-bicyclo[2.2.1]-2'-heptene,
2,3-(4"-methoxybenzo)cyclohepten-1-one-7-spiro-5'-bicyclo[2.2.1]-2'-heptene,
2,3-(5"-methoxybenzo)cyclohepten-1-one-7-spiro-5'-bicyclo[2.2.1]-2'-heptene,
2,3-(6"-methoxybenzo)cyclohepten-1-one-7-spiro-5'-bicyclo[2.2.1]-2'-heptene,
3,4-benzocyclohepten-1-one-2-spiro-5'-bicyclo[2.2.1]-2'-heptene,
3,4-(3"-methylbenzo)cyclohepten-1-one-2-spiro-5'-bicyclo[2.2.1]-2'-heptene,
3,4-(4"-methylbenzo)cyclohepten-1-one-2-spiro-5'-bicyclo[2.2.1]-2'-heptene,
3,4-(5"-methylbenzo)cyclohepten-1-one-2-spiro-5'-bicyclo[2.2.1]-2'-heptene,
3,4-(6"-methylbenzo)cyclohepten-1-one-2-spiro-5'-bicyclo[2.2.1]-2'-heptene,
3,4-(3"-ethylbenzo)cyclohepten-1-one-2-spiro-5'-bicyclo[2.2.1]-2'-heptene,
3,4-(4"-ethylbenzo)cyclohepten-1-one-2-spiro-5'-bicyclo[2.2.1]-2'-heptene,
3,4-(5"-ethylbenzo)cyclohepten-1-one-2-spiro-5'-bicyclo[2.2.1]-2'-heptene,
3,4-(6"-ethylbenzo)cyclohepten-1-one-2-spiro-5'-bicyclo[2.2.1]-2'-heptene,
3,4-(3"-n-propylbenzo)cyclohepten-1-one-2-spiro-5'-bicyclo[2.2.1]-2'-heptene,
3,4-(4"-n-propylbenzo)cyclohepten-1-one-2-spiro-5'-bicyclo[2.2.1]-2'-heptene,
3,4-(5"-n-propylbenzo)cyclohepten-1-one-2-spiro-5'-bicyclo[2.2.1]-2'-heptene,
3,4-(6"-n-propylbenzo)cyclohepten-1-one-2-spiro-5'-bicyclo[2.2.1]-2'-heptene,
3,4-(3"-iso-propylbenzo)cyclohepten-1-one-2-spiro-5'-bicyclo[2.2.1]-2'-heptene,
3,4-(4"-iso-propylbenzo)cyclohepten-1-one-2-spiro-5'-bicyclo[2.2.1]-2'-heptene,
3,4-(5"-iso-propylbenzo)cyclohepten-1-one-2-spiro-5'-bicyclo[2.2.1]-2'-heptene,
3,4-(6"-iso-propylbenzo)cyclohepten-1-one-2-spiro-5'-bicyclo[2.2.1]-2'-heptene,
3,4-(3"-n-butylbenzo)cyclohepten-1-one-2-spiro-5'-bicyclo[2.2.1]-2'-heptene,
3,4-(4"-n-butylbenzo)cyclohepten-1-one-2-spiro-5'-bicyclo[2.2.1]-2'-heptene,
3,4-(5"-n-butylbenzo)cyclohepten-1-one-2-spiro-5'-bicyclo[2.2.1]-2'-heptene,
3,4-(6"-n-butylbenzo)cyclohepten-1-one-2-spiro-5'-bicyclo[2.2.1]-2'-heptene,
3,4-(3"-iso-butylbenzo)cyclohepten-1-one-2-spiro-5'-bicyclo[2.2.1]-2'-heptene,
3,4-(4"-iso-butylbenzo)cyclohepten-1-one-2-spiro-5'-bicyclo[2.2.1]-2'-heptene,
3,4-(5"-iso-butylbenzo)cyclohepten-1-one-2-spiro-5'-bicyclo[2.2.1]-2'-heptene,
3,4-(6"-iso-butylbenzo)cyclohepten-1-one-2-spiro-5'-bicyclo[2.2.1]-2'-heptene,
3,4-(3"-sec-butylbenzo)cyclohepten-1-one-2-spiro-5'-bicyclo[2.2.1]-2'-heptene,
3,4-(4"-sec-butylbenzo)cyclohepten-1-one-2-spiro-5'-bicyclo[2.2.1]-2'-heptene,
3,4-(5"-sec-butylbenzo)cyclohepten-1-one-2-spiro-5'-bicyclo[2.2.1]-2'-heptene,
3,4-(6"-sec-butylbenzo)cyclohepten-1-one-2-spiro-5'-bicyclo[2.2.1]-2'-heptene,
3,4-(3"-t-butylbenzo)cyclohepten-1-one-2-spiro-5'-bicyclo[2.2.1]-2'-heptene,
3,4-(4"-t-butylbenzo)cyclohepten-1-one-2-spiro-5'-bicyclo[2.2.1]-2'-heptene,
3,4-(5"-t-butylbenzo)cyclohepten-1-one-2-spiro-5'-bicyclo[2.2.1]-2'-heptene,
3,4-(6"-t-butylbenzo)cyclohepten-1-one-2-spiro-5'-bicyclo[2.2.1]-2'-heptene,
3,4-(3"-cyclohexylbenzo)cyclohepten-1-one-2-spiro-5'-bicyclo[2.2.1]-2'-heptene,
3,4-(4"-cyclohexylbenzo)cyclohepten-1-one-2-spiro-5'-bicyclo[2.2.1]-2'-heptene,
3,4-(5"-cyclohexylbenzo)cyclohepten-1-one-2-spiro-5'-bicyclo[2.2.1]-2'-heptene,
3,4-(6"-cyclohexylbenzo)cyclohepten-1-one-2-spiro-5'-bicyclo[2.2.1]-2'-heptene,
3,4-(3"-phenylbenzo)cyclohepten-1-one-2-spiro-5'-bicyclo[2.2.1]-2'-heptene, 3,4-(4"-phenylbenzo)cyclohepten-1-one-2-spiro-5'-bicyclo[2.2.1]-2'-heptene,
3,4-(5"-phenylbenzo)cyclohepten-1-one-2-spiro-5'-bicyclo[2.2.1]-2'-heptene,
3,4-(6"-phenylbenzo)cyclohepten-1-one-2-spiro-5'-bicyclo[2.2.1]-2'-heptene,
3,4-(3"-chlorobenzo)cyclohepten-1-one-2-spiro-5'-bicyclo[2.2.1]-2'-heptene,
3,4-(4"-chlorobenzo)cyclohepten-1-one-2-spiro-5'-bicyclo[2.2.1]-2'-heptene,
3,4-(4"-chlorobenzo)cyclohepten-1-one-2-spiro-5'-bicyclo[2.2.1]-2'-heptene,
3,4-(4"-chlorobenzo)cyclohepten-1-one-2-spiro-5'-bicyclo[2.2.1]-2'-heptene,
3,4-(5"-chlorobenzo)cyclohepten-1-one-2-spiro-5'-bicyclo[2.2.1]-2'-heptene,
3,4-(6"-chlorobenzo)cyclohepten-1-one-2-spiro-5'-bicyclo[2.2.1]-2'-heptene,
3,4-(3"-aminobenzo)cyclohepten-1-one-2-spiro-5'-bicyclo[2.2.1]-2'-heptene,
3,4-(4"-aminobenzo)cyclohepten-1-one-2-spiro-5'-bicyclo[2.2.1]-2'-heptene,
3,4-(5"-aminobenzo)cyclohepten-1-one-2-spiro-5'-bicyclo[2.2.1]-2'-heptene,
3,4-(6"-aminobenzo)cyclohepten-1-one-2-spiro-5'-bicyclo[2.2.1]-2'-heptene,
3,4-(3"-methoxybenzo)cyclohepten-1-one-2-spiro-5'-bicyclo[2.2.1]-2'-heptene,
3,4-(4"-methoxybenzo)cyclohepten-1-one-2-spiro-5'-bicyclo[2.2.1]-2'-heptene,
3,4-(5"-methoxybenzo)cyclohepten-1-one-2-spiro-5'-bicyclo[2.2.1]-2'-heptene,
3,4-(6"-methoxybenzo)cyclohepten-1-one-2-spiro-5'-bicyclo[2.2.1]-2'-heptene,
3,4-benzocyclohepten-1-one-5-spiro-5'-bicyclo[2.2.1]-2'-heptene,
3,4-(3"-methylbenzo)cyclohepten-1-one-5-spiro-5'-bicyclo[2.2.1]-2'-heptene,
3,4-(4"-methylbenzo)cyclohepten-1-one-5-spiro-5'-bicyclo[2.2.1]-2'-heptene,
3,4-(5"-methylbenzo)cyclohepten-1-one-5-spiro-5'-bicyclo[2.2.1]-2'-heptene,
3,4-(6"-methylbenzo)cyclohepten-1-one-5-spiro-5'-bicyclo[2.2.1]-2'-heptene,
3,4-(3"-ethylbenzo)cyclohepten-1-one-5-spiro-5'-bicyclo[2.2.1]-2'-heptene,
3,4-(4"-ethylbenzo)cyclohepten-1-one-5-spiro-5'-bicyclo[2.2.1]-2'-heptene,
3,4-(5"-ethylbenzo)cyclohepten-1-one-5-spiro-5'-bicyclo[2.2.1]-2'-heptene,
3,4-(6"-ethylbenzo)cyclohepten-1-one-5-spiro-5'-bicyclo[2.2.1]-2'-heptene,
3,4-(3"-n-propylbenzo)cyclohepten-1-one-5-spiro-5'-bicyclo[2.2.1]-2'-heptene,
3,4-(4"-n-propylbenzo)cyclohepten-1-one-5-spiro-5'-bicyclo[2.2.1]-2'-heptene,
3,4-(5"-n-propylbenzo)cyclohepten-1-one-5-spiro-5'-bicyclo[2.2.1]-2'-heptene,
3,4-(6"-n-propylbenzo)cyclohepten-1-one-5-spiro-5'-bicyclo[2.2.1]-2'-heptene,
3,4-(3"-iso-propylbenzo)cyclohepten-1-one-5-spiro-5'-bicyclo[2.2.1]-2'-heptene,
3,4-(4"-iso-propylbenzo)cyclohepten-1-one-5-spiro-5'-bicyclo[2.2.1]-2'-heptene,
3,4-(5"-iso-propylbenzo)cyclohepten-1-one-5-spiro-5'-bicyclo[2.2.1]-2'-heptene,
3,4-(6"-iso-propylbenzo)cyclohepten-1-one-5-spiro-5'-bicyclo[2.2.1]-2'-heptene,
3,4-(3"-n-butylbenzo)cyclohepten-1-one-5-spiro-5'-bicyclo[2.2.1]-2'-heptene,
3,4-(4"-n-butylbenzo)cyclohepten-1-one-5-spiro-5'-bicyclo[2.2.1]-2'-heptene,
3,4-(5"-n-butylbenzo)cyclohepten-1-one-5-spiro-5'-bicyclo[2.2.1]-2'-heptene,
3,4-(6"-n-butylbenzo)cyclohepten-1-one-5-spiro-5'-bicyclo[2.2.1]-2'-heptene,
3,4-(3"-iso-butylbenzo)cyclohepten-1-one-5-spiro-5'-bicyclo[2.2.1]-2'-heptene,
3,4-(4"-iso-butylbenzo)cyclohepten-1-one-5-spiro-5'-bicyclo[2.2.1]-2'-heptene,
3,4-(5"-iso-butylbenzo)cyclohepten-1-one-5-spiro-5'-bicyclo[2.2.1]-2'-heptene,
3,4-(6"-iso-butylbenzo)cyclohepten-1-one-5-spiro-5'-bicyclo[2.2.1]-2'-heptene,
3,4-(3"-sec-butylbenzo)cyclohepten-1-one-5-spiro-5'-bicyclo[2.2.1]-2'-heptene,
3,4-(4"-sec-butylbenzo)cyclohepten-1-one-5-spiro-5'-bicyclo[2.2.1]-2'-heptene,
3,4-(5"-sec-butylbenzo)cyclohepten-1-one-5-spiro-5'-bicyclo[2.2.1]-2'-heptene,
3,4-(6"-sec-butylbenzo)cyclohepten-1-one-5-spiro-5'-bicyclo[2.2.1]-2'-heptene,
3,4-(3"-t-butylbenzo)cyclohepten-1-one-5-spiro-5'-bicyclo[2.2.1]-2'-heptene,
3,4-(4"-t-butylbenzo)cyclohepten-1-one-5-spiro-5'-bicyclo[2.2.1]-2'-heptene,
3,4-(5"-t-butylbenzo)cyclohepten-1-one-5-spiro-5'-bicyclo[2.2.1]-2'-heptene,
3,4-(6"-t-butylbenzo)cyclohepten-1-one-5-spiro-5'-bicyclo[2.2.1]-2'-heptene,
3,4-(3"-cyclohexylbenzo)cyclohepten-1-one-5-spiro-5'-bicyclo[2.2.1]-2'-heptene,
3,4-(4"-cyclohexylbenzo)cyclohepten-1-one-5-spiro-5'-bicyclo[2.2.1]-2'-heptene,
3,4-(5"-cyclohexylbenzo)cyclohepten-1-one-5-spiro-5'-bicyclo[2.2.1]-2'-heptene,
3,4-(6"-cyclohexylbenzo)cyclohepten-1-one-5-spiro-5'-bicyclo[2.2.1]-2'-heptene,
3,4-(3"-phenylbenzo)cyclohepten-1-one-5-spiro-5'-bicyclo[2.2.1]-2'-heptene,
3,4-(4"-phenylbenzo)cyclohepten-1-one-5-spiro-5'-bicyclo[2.2.1]-2'-heptene,
3,4-(5"-phenylbenzo)cyclohepten-1-one-5-spiro-5'-bicyclo[2.2.1]-2'-heptene,
3,4-(6"-phenylbenzo)cyclohepten-1-one-5-spiro-5'-bicyclo[2.2.1]-2'-heptene,
3,4-(3"-chlorobenzo)cyclohepten-1-one-5-spiro-5'-bicyclo[2.2.1]-2'-heptene,
3,4-(4"-chlorobenzo)cyclohepten-1-one-5-spiro-5'-bicyclo[2.2.1]-2'-heptene,
3,4-(4"-chlorobenzo)cyclohepten-1-one-5-spiro-5'-bicyclo[2.2.1]-2'-heptene,
3,4-(4"-chlorobenzo)cyclohepten-1-one-5-spiro-5'-bicyclo[2.2.1]-2'-heptene,
3,4-(5"-chlorobenzo)cyclohepten-1-one-5-spiro-5'-bicyclo[2.2.1]-2'-heptene,
3,4-(6"-chlorobenzo)cyclohepten-1-one-5-spiro-5'-bicyclo[2.2.1]-2'-heptene,
3,4-(3"-aminobenzo)cyclohepten-1-one-5-spiro-5'-bicyclo[2.2.1]-2'-heptene,
3,4-(4"-aminobenzo)cyclohepten-1-one-5-spiro-5'-bicyclo[2.2.1]-2'-heptene, 3,4-(5"-aminobenzo)cyclohepten-1-one-5-spiro-5'-bicyclo[2.2.1]-2'-heptene,
3,4-(6"-aminobenzo)cyclohepten-1-one-5-spiro-5'-bicyclo[2.2.1]-2'-heptene,
3,4-(3"-methoxybenzo)cyclohepten-1-one-5-spiro-5'-bicyclo[2.2.1]-2'-heptene,
3,4-(4"-methoxybenzo)cyclohepten-1-one-5-spiro-5'-bicyclo[2.2.1]-2'-heptene,
3,4-(5"-methoxybenzo)cyclohepten-1-one-5-spiro-5'-bicyclo[2.2.1]-2'-heptene,
3,4-(6"-methoxybenzo)cyclohepten-1-one-5-spiro-5'-bicyclo[2.2.1]-2'-heptene,
3,4-benzocyclohepten-1-one-6-spiro-5'-bicyclo[2.2.1]-2'-heptene,
3,4-(3"-methylbenzo)cyclohepten-1-one-6-spiro-5'-bicyclo[2.2.1]-2'-heptene,
3,4-(4"-methylbenzo)cyclohepten-1-one-6-spiro-5'-bicyclo[2.2.1]-2'-heptene,
3,4-(5"-methylbenzo)cyclohepten-1-one-6-spiro-5'-bicyclo[2.2.1]-2'-heptene,
3,4-(6"-methylbenzo)cyclohepten-1-one-6-spiro-5'-bicyclo[2.2.1]-2'-heptene,
3,4-(3"-ethylbenzo)cyclohepten-1-one-6-spiro-5'-bicyclo[2.2.1]-2'-heptene,
3,4-(4"-ethylbenzo)cyclohepten-1-one-6-spiro-5'-bicyclo[2.2.1]-2'-heptene,
3,4-(5"-ethylbenzo)cyclohepten-1-one-6-spiro-5'-bicyclo[2.2.1]-2'-heptene,
3,4-(6"-ethylbenzo)cyclohepten-1-one-6-spiro-5'-bicyclo[2.2.1]-2'-heptene,
3,4-(3"-n-propylbenzo)cyclohepten-1-one-6-spiro-5'-bicyclo[2.2.1]-2'-heptene,
3,4-(4"-n-propylbenzo)cyclohepten-1-one-6-spiro-5'-bicyclo[2.2.1]-2'-heptene,
3,4-(5"-n-propylbenzo)cyclohepten-1-one-6-spiro-5'-bicyclo[2.2.1]-2'-heptene,
3,4-(6"-n-propylbenzo)cyclohepten-1-one-6-spiro-5'-bicyclo[2.2.1]-2'-heptene,
3,4-(3"-iso-propylbenzo)cyclohepten-1-one-6-spiro-5'-bicyclo[2.2.1]-2'-heptene,
3,4-(4"-iso-propylbenzo)cyclohepten-1-one-6-spiro-5'-bicyclo[2.2.1]-2'-heptene,
3,4-(5"-iso-propylbenzo)cyclohepten-1-one-6-spiro-5'-bicyclo[2.2.1]-2'-heptene,
3,4-(6"-iso-propylbenzo)cyclohepten-1-one-6-spiro-5'-bicyclo[2.2.1]-2'-heptene,
3,4-(3"-n-butylbenzo)cyclohepten-1-one-6-spiro-5'-bicyclo[2.2.1]-2'-heptene,
3,4-(4"-n-butylbenzo)cyclohepten-1-one-6-spiro-5'-bicyclo[2.2.1]-2'-heptene,
3,4-(5"-n-butylbenzo)cyclohepten-1-one-6-spiro-5'-bicyclo[2.2.1]-2'-heptene,
3,4-(6"-n-butylbenzo)cyclohepten-1-one-6-spiro-5'-bicyclo[2.2.1]-2'-heptene,
3,4-(3"-iso-butylbenzo)cyclohepten-1-one-6-spiro-5'-bicyclo[2.2.1]-2'-heptene,
3,4-(4"-iso-butylbenzo)cyclohepten-1-one-6-spiro-5'-bicyclo[2.2.1]-2'-heptene,
3,4-(5"-iso-butylbenzo)cyclohepten-1-one-6-spiro-5'-bicyclo[2.2.1]-2'-heptene,
3,4-(6"-iso-butylbenzo)cyclohepten-1-one-6-spiro-5'-bicyclo[2.2.1]-2'-heptene,
3,4-(3"-sec-butylbenzo)cyclohepten-1-one-6-spiro-5'-bicyclo[2.2.1]-2'-heptene,
3,4-(4"-sec-butylbenzo)cyclohepten-1-one-6-spiro-5'-bicyclo[2.2.1]-2'-heptene,
3,4-(5"-sec-butylbenzo)cyclohepten-1-one-6-spiro-5'-bicyclo[2.2.1]-2'-heptene,
3,4-(6"-sec-butylbenzo)cyclohepten-1-one-6-spiro-5'-bicyclo[2.2.1]-2'-heptene,
3,4-(3"-t-butylbenzo)cyclohepten-1-one-6-spiro-5'-bicyclo[2.2.1]-2'-heptene,
3,4-(4"-t-butylbenzo)cyclohepten-1-one-6-spiro-5'-bicyclo[2.2.1]-2'-heptene,
3,4-(5"-t-butylbenzo)cyclohepten-1-one-6-spiro-5'-bicyclo[2.2.1]-2'-heptene,
3,4-(6"-t-butylbenzo)cyclohepten-1-one-6-spiro-5'-bicyclo[2.2.1]-2'-heptene,
3,4-(3"-cyclohexylbenzo)cyclohepten-1-one-6-spiro-5'-bicyclo[2.2.1]-2'-heptene,
3,4-(4"-cyclohexylbenzo)cyclohepten-1-one-6-spiro-5'-bicyclo[2.2.1]-2'-heptene,
3,4-(5"-cyclohexylbenzo)cyclohepten-1-one-6-spiro-5'-bicyclo[2.2.1]-2'-heptene,
3,4-(6"-cyclohexylbenzo)cyclohepten-1-one-6-spiro-5'-bicyclo[2.2.1]-2'-heptene,
3,4-(3"-phenylbenzo)cyclohepten-1-one-6-spiro-5'-bicyclo[2.2.1]-2'-heptene,
3,4-(4"-phenylbenzo)cyclohepten-1-one-6-spiro-5'-bicyclo[2.2.1]-2'-heptene,
3,4-(5"-phenylbenzo)cyclohepten-1-one-6-spiro-5'-bicyclo[2.2.1]-2'-heptene,
3,4-(6"-phenylbenzo)cyclohepten-1-one-6-spiro-5'-bicyclo[2.2.1]-2'-heptene,
3,4-(3"-chlorobenzo)cyclohepten-1-one-6-spiro-5'-bicyclo[2.2.1]-2'-heptene,
3,4-(4"-chlorobenzo)cyclohepten-1-one-6-spiro-5'-bicyclo[2.2.1]-2'-heptene,
3,4-(4"-chlorobenzo)cyclohepten-1-one-6-spiro-5'-bicyclo[2.2.1]-2'-heptene,
3,4-(4"-chlorobenzo)cyclohepten-1-one-6-spiro-5'-bicyclo[2.2.1]-2'-heptene,
3,4-(5"-chlorobenzo)cyclohepten-1-one-6-spiro-5'-bicyclo[2.2.1]-2'-heptene,
3,4-(6"-chlorobenzo)cyclohepten-1-one-6-spiro-5'-bicyclo[2.2.1]-2'-heptene,
3,4-(3"-aminobenzo)cyclohepten-1-one-6-spiro-5'-bicyclo[2.2.1]-2'-heptene,
3,4-(4"-aminobenzo)cyclohepten-1-one-6-spiro-5'-bicyclo[2.2.1]-2'-heptene,
3,4-(5"-aminobenzo)cyclohepten-1-one-6-spiro-5'-bicyclo[2.2.1]-2'-heptene,
3,4-(6"-aminobenzo)cyclohepten-1-one-6-spiro-5'-bicyclo[2.2.1]-2'-heptene,
3,4-(3"-methoxybenzo)cyclohepten-1-one-6-spiro-5'-bicyclo[2.2.1]-2'-heptene,
3,4-(4"-methoxybenzo)cyclohepten-1-one-6-spiro-5'-bicyclo[2.2.1]-2'-heptene,
3,4-(5"-methoxybenzo)cyclohepten-1-one-6-spiro-5'-bicyclo[2.2.1]-2'-heptene,
3,4-(6"-methoxybenzo)cyclohepten-1-one-6-spiro-5'-bicyclo[2.2.1]-2'-heptene,
3,4-benzocyclohepten-1-one-7-spiro-5'-bicyclo[2.2.1]-2'-heptene,
3,4-(3"-methylbenzo)cyclohepten-1-one-7-spiro-5'-bicyclo[2.2.1]-2'-heptene,
3,4-(4"-methylbenzo)cyclohepten-1-one-7-spiro-5'-bicyclo[2.2.1]-2'-heptene,
3,4-(5"-methylbenzo)cyclohepten-1-one-7-spiro-5'-bicyclo[2.2.1]-2'-heptene,
3,4-(6"-methylbenzo)cyclohepten-1-one-7-spiro-5'-bicyclo[2.2.1]-2'-heptene, 3,4-(3"-ethylbenzo)cyclohepten-1-one-7-spiro-5'-bicyclo[2.2.1]-2'-heptene,
3,4-(4"-ethylbenzo)cyclohepten-1-one-7-spiro-5'-bicyclo[2.2.1]-2'-heptene,
3,4-(5"-ethylbenzo)cyclohepten-1-one-7-spiro-5'-bicyclo[2.2.1]-2'-heptene,
3,4-(6"-ethylbenzo)cyclohepten-1-one-7-spiro-5'-bicyclo[2.2.1]-2'-heptene,
3,4-(3"-n-propylbenzo)cyclohepten-1-one-7-spiro-5'-bicyclo[2.2.1]-2'-heptene,
3,4-(4"-n-propylbenzo)cyclohepten-1-one-7-spiro-5'-bicyclo[2.2.1]-2'-heptene,
3,4-(5"-n-propylbenzo)cyclohepten-1-one-7-spiro-5'-bicyclo[2.2.1]-2'-heptene,
3,4-(6"-n-propylbenzo)cyclohepten-1-one-7-spiro-5'-bicyclo[2.2.1]-2'-heptene,
3,4-(3"-iso-propylbenzo)cyclohepten-1-one-7-spiro-5'-bicyclo[2.2.1]-2'-heptene,
3,4-(4"-iso-propylbenzo)cyclohepten-1-one-7-spiro-5'-bicyclo[2.2.1]-2'-heptene,
3,4-(5"-iso-propylbenzo)cyclohepten-1-one-7-spiro-5'-bicyclo[2.2.1]-2'-heptene,
3,4-(6"-iso-propylbenzo)cyclohepten-1-one-7-spiro-5'-bicyclo[2.2.1]-2'-heptene,
3,4-(3"-n-butylbenzo)cyclohepten-1-one-7-spiro-5'-bicyclo[2.2.1]-2'-heptene,
3,4-(4"-n-butylbenzo)cyclohepten-1-one-7-spiro-5'-bicyclo[2.2.1]-2'-heptene,
3,4-(5"-n-butylbenzo)cyclohepten-1-one-7-spiro-5'-bicyclo[2.2.1]-2'-heptene,
3,4-(6"-n-butylbenzo)cyclohepten-1-one-7-spiro-5'-bicyclo[2.2.1]-2'-heptene,
3,4-(3"-iso-butylbenzo)cyclohepten-1-one-7-spiro-5'-bicyclo[2.2.1]-2'-heptene,
3,4-(4"-iso-butylbenzo)cyclohepten-1-one-7-spiro-5'-bicyclo[2.2.1]-2'-heptene,
3,4-(5"-iso-butylbenzo)cyclohepten-1-one-7-spiro-5'-bicyclo[2.2.1]-2'-heptene,
3,4-(6"-iso-butylbenzo)cyclohepten-1-one-7-spiro-5'-bicyclo[2.2.1]-2'-heptene,
3,4-(3"-sec-butylbenzo)cyclohepten-1-one-7-spiro-5'-bicyclo[2.2.1]-2'-heptene,
3,4-(4"-sec-butylbenzo)cyclohepten-1-one-7-spiro-5'-bicyclo[2.2.1]-2'-heptene,
3,4-(5"-sec-butylbenzo)cyclohepten-1-one-7-spiro-5'-bicyclo[2.2.1]-2'-heptene,
3,4-(6"-sec-butylbenzo)cyclohepten-1-one-7-spiro-5'-bicyclo[2.2.1]-2'-heptene,
3,4-(3"-t-butylbenzo)cyclohepten-1-one-7-spiro-5'-bicyclo[2.2.1]-2'-heptene,
3,4-(4"-t-butylbenzo)cyclohepten-1-one-7-spiro-5'-bicyclo[2.2.1]-2'-heptene,
3,4-(5"-t-butylbenzo)cyclohepten-1-one-7-spiro-5'-bicyclo[2.2.1]-2'-heptene,
3,4-(6"-t-butylbenzo)cyclohepten-1-one-7-spiro-5'-bicyclo[2.2.1]-2'-heptene,
3,4-(3"-cyclohexylbenzo)cyclohepten-1-one-7-spiro-5'-bicyclo[2.2.1]-2'-heptene,
3,4-(4"-cyclohexylbenzo)cyclohepten-1-one-7-spiro-5'-bicyclo[2.2.1]-2'-heptene,
3,4-(5"-cyclohexylbenzo)cyclohepten-1-one-7-spiro-5'-bicyclo[2.2.1]-2'-heptene,
3,4-(6"-cyclohexylbenzo)cyclohepten-1-one-7-spiro-5'-bicyclo[2.2.1]-2'-heptene,
3,4-(3"-phenylbenzo)cyclohepten-1-one-7-spiro-5'-bicyclo[2.2.1]-2'-heptene,
3,4-(4"-phenylbenzo)cyclohepten-1-one-7-spiro-5'-bicyclo[2.2.1]-2'-heptene,
3,4-(5"-phenylbenzo)cyclohepten-1-one-7-spiro-5'-bicyclo[2.2.1]-2'-heptene,
3,4-(6"-phenylbenzo)cyclohepten-1-one-7-spiro-5'-bicyclo[2.2.1]-2'-heptene,
3,4-(3"-chlorobenzo)cyclohepten-1-one-7-spiro-5'-bicyclo[2.2.1]-2'-heptene,
3,4-(4"-chlorobenzo)cyclohepten-1-one-7-spiro-5'-bicyclo[2.2.1]-2'-heptene,
3,4-(4"-chlorobenzo)cyclohepten-1-one-7-spiro-5'-bicyclo[2.2.1]-2'-heptene,
3,4-(4"-chlorobenzo)cyclohepten-1-one-7-spiro-5'-bicyclo[2.2.1]-2'-heptene,
3,4-(5"-chlorobenzo)cyclohepten-1-one-7-spiro-5'-bicyclo[2.2.1]-2'-heptene,
3,4-(6"-chlorobenzo)cyclohepten-1-one-7-spiro-5'-bicyclo[2.2.1]-2'-heptene,
3,4-(3"-aminobenzo)cyclohepten-1-one-7-spiro-5'-bicyclo[2.2.1]-2'-heptene,
3,4-(4"-aminobenzo)cyclohepten-1-one-7-spiro-5'-bicyclo[2.2.1]-2'-heptene,
3,4-(5"-aminobenzo)cyclohepten-1-one-7-spiro-5'-bicyclo[2.2.1]-2'-heptene,
3,4-(6"-aminobenzo)cyclohepten-1-one-7-spiro-5'-bicyclo[2.2.1]-2'-heptene,
3,4-(3"-methoxybenzo)cyclohepten-1-one-7-spiro-5'-bicyclo[2.2.1]-2'-heptene,
3,4-(4"-methoxybenzo)cyclohepten-1-one-7-spiro-5'-bicyclo[2.2.1]-2'-heptene,
3,4-(5"-methoxybenzo)cyclohepten-1-one-7-spiro-5'-bicyclo[2.2.1]-2'-heptene,
3,4-(6"-methoxybenzo)cyclohepten-1-one-7-spiro-5'-bicyclo[2.2.1]-2'-heptene,
4,5-benzocyclohepten-1-one-2-spiro-5'-bicyclo[2.2.1]-2'-heptene,
4,5-(3"-methylbenzo)cyclohepten-1-one-2-spiro-5'-bicyclo[2.2.1]-2'-heptene,
4,5-(4"-methylbenzo)cyclohepten-1-one-2-spiro-5'-bicyclo[2.2.1]-2'-heptene,
4,5-(5"-methylbenzo)cyclohepten-1-one-2-spiro-5'-bicyclo[2.2.1]-2'-heptene,
4,5-(6"-methylbenzo)cyclohepten-1-one-2-spiro-5'-bicyclo[2.2.1]-2'-heptene,
4,5-(3"-ethylbenzo)cyclohepten-1-one-2-spiro-5'-bicyclo[2.2.1]-2'-heptene,
4,5-(4"-ethylbenzo)cyclohepten-1-one-2-spiro-5'-bicyclo[2.2.1]-2'-heptene,
4,5-(5"-ethylbenzo)cyclohepten-1-one-2-spiro-5'-bicyclo[2.2.1]-2'-heptene,
4,5-(6"-ethylbenzo)cyclohepten-1-one-2-spiro-5'-bicyclo[2.2.1]-2'-heptene,
4,5-(3"-n-propylbenzo)cyclohepten-1-one-2-spiro-5'-bicyclo[2.2.1]-2'-heptene,
4,5-(4"-n-propylbenzo)cyclohepten-1-one-2-spiro-5'-bicyclo[2.2.1]-2'-heptene,
4,5-(5"-n-propylbenzo)cyclohepten-1-one-2-spiro-5'-bicyclo[2.2.1]-2'-heptene,
4,5-(6"-n-propylbenzo)cyclohepten-1-one-2-spiro-5'-bicyclo[2.2.1]-2'-heptene,
4,5-(3"-iso-propylbenzo)cyclohepten-1-one-2-spiro-5'-bicyclo[2.2.1]-2'-heptene,
4,5-(4"-iso-propylbenzo)cyclohepten-1-one-2-spiro-5'-bicyclo[2.2.1]-2'-heptene,
4,5-(5"-iso-propylbenzo)cyclohepten-1-one-2-spiro-5'-bicyclo[2.2.1]-2'-heptene, 4,5-(6''-iso-propylbenzo)cyclohepten-1-one-2-spiro-5'-bicyclo[2.2.1]-2'-heptene,
4,5-(3''-n-butylbenzo)cyclohepten-1-one-2-spiro-5'-bicyclo[2.2.1]-2'-heptene,
4,5-(4''-n-butylbenzo)cyclohepten-1-one-2-spiro-5'-bicyclo[2.2.1]-2'-heptene,
4,5-(5''-n-butylbenzo)cyclohepten-1-one-2-spiro-5'-bicyclo[2.2.1]-2'-heptene,
4,5-(6''-n-butylbenzo)cyclohepten-1-one-2-spiro-5'-bicyclo[2.2.1]-2'-heptene,
4,5-(3''-iso-butylbenzo)cyclohepten-1-one-2-spiro-5'-bicyclo[2.2.1]-2'-heptene,
4,5-(4''-iso-butylbenzo)cyclohepten-1-one-2-spiro-5'-bicyclo[2.2.1]-2'-heptene,
4,5-(5''-iso-butylbenzo)cyclohepten-1-one-2-spiro-5'-bicyclo[2.2.1]-2'-heptene,
4,5-(6''-iso-butylbenzo)cyclohepten-1-one-2-spiro-5'-bicyclo[2.2.1]-2'-heptene,
4,5-(3''-sec-butylbenzo)cyclohepten-1-one-2-spiro-5'-bicyclo[2.2.1]-2'-heptene,
4,5-(4''-sec-butylbenzo)cyclohepten-1-one-2-spiro-5'-bicyclo[2.2.1]-2'-heptene,
4,5-(5''-sec-butylbenzo)cyclohepten-1-one-2-spiro-5'-bicyclo[2.2.1]-2'-heptene,
4,5-(6''-sec-butylbenzo)cyclohepten-1-one-2-spiro-5'-bicyclo[2.2.1]-2'-heptene,
4,5-(3''-t-butylbenzo)cyclohepten-1-one-2-spiro-5'-bicyclo[2.2.1]-2'-heptene,
4,5-(4''-t-butylbenzo)cyclohepten-1-one-2-spiro-5'-bicyclo[2.2.1]-2'-heptene,
4,5-(5''-t-butylbenzo)cyclohepten-1-one-2-spiro-5'-bicyclo[2.2.1]-2'-heptene,
4,5-(6''-t-butylbenzo)cyclohepten-1-one-2-spiro-5'-bicyclo[2.2.1]-2'-heptene,
4,5-(3''-cyclohexylbenzo)cyclohepten-1-one-2-spiro-5'-bicyclo[2.2.1]-2'-heptene,
4,5-(4''-cyclohexylbenzo)cyclohepten-1-one-2-spiro-5'-bicyclo[2.2.1]-2'-heptene,
4,5-(5''-cyclohexylbenzo)cyclohepten-1-one-2-spiro-5'-bicyclo[2.2.1]-2'-heptene,
4,5-(6''-cyclohexylbenzo)cyclohepten-1-one-2-spiro-5'-bicyclo[2.2.1]-2'-heptene,
4,5-(3''-phenylbenzo)cyclohepten-1-one-2-spiro-5'-bicyclo[2.2.1]-2'-heptene,
4,5-(4''-phenylbenzo)cyclohepten-1-one-2-spiro-5'-bicyclo[2.2.1]-2'-heptene,
4,5-(5''-phenylbenzo)cyclohepten-1-one-2-spiro-5'-bicyclo[2.2.1]-2'-heptene,
4,5-(6''-phenylbenzo)cyclohepten-1-one-2-spiro-5'-bicyclo[2.2.1]-2'-heptene,
4,5-(3''-chlorobenzo)cyclohepten-1-one-2-spiro-5'-bicyclo[2.2.1]-2'-heptene,
4,5-(4''-chlorobenzo)cyclohepten-1-one-2-spiro-5'-bicyclo[2.2.1]-2'-heptene,
4,5-(4''-chlorobenzo)cyclohepten-1-one-2-spiro-5'-bicyclo[2.2.1]-2'-heptene,
4,5-(4''-chlorobenzo)cyclohepten-1-one-2-spiro-5'-bicyclo[2.2.1]-2'-heptene,
4,5-(5''-chlorobenzo)cyclohepten-1-one-2-spiro-5'-bicyclo[2.2.1]-2'-heptene,
4,5-(6''-chlorobenzo)cyclohepten-1-one-2-spiro-5'-bicyclo[2.2.1]-2'-heptene,
4,5-(3''-aminobenzo)cyclohepten-1-one-2-spiro-5'-bicyclo[2.2.1]-2'-heptene,
4,5-(4''-aminobenzo)cyclohepten-1-one-2-spiro-5'-bicyclo[2.2.1]-2'-heptene,
4,5-(5''-aminobenzo)cyclohepten-1-one-2-spiro-5'-bicyclo[2.2.1]-2'-heptene,
4,5-(6''-aminobenzo)cyclohepten-1-one-2-spiro-5'-bicyclo[2.2.1]-2'-heptene,
4,5-(3''-methoxybenzo)cyclohepten-1-one-2-spiro-5'-bicyclo[2.2.1]-2'-heptene,
4,5-(4''-methoxybenzo)cyclohepten-1-one-2-spiro-5'-bicyclo[2.2.1]-2'-heptene,
4,5-(5''-methoxybenzo)cyclohepten-1-one-2-spiro-5'-bicyclo[2.2.1]-2'-heptene,
4,5-(6''-methoxybenzo)cyclohepten-1-one-2-spiro-5'-bicyclo[2.2.1]-2'-heptene,
4,5-benzocyclohepten-1-one-3-spiro-5'-bicyclo[2.2.1]-2'-heptene,
4,5-(3''-methylbenzo)cyclohepten-1-one-3-spiro-5'-bicyclo[2.2.1]-2'-heptene,
4,5-(4''-methylbenzo)cyclohepten-1-one-3-spiro-5'-bicyclo[2.2.1]-2'-heptene,
4,5-(5''-methylbenzo)cyclohepten-1-one-3-spiro-5'-bicyclo[2.2.1]-2'-heptene,
4,5-(6''-methylbenzo)cyclohepten-1-one-2-spiro-5'-bicyclo[2.2.1]-2'-heptene,
4,5-(3''-ethylbenzo)cyclohepten-1-one-3-spiro-5'-bicyclo[2.2.1]-2'-heptene,
4,5-(4''-ethylbenzo)cyclohepten-1-one-3-spiro-5'-bicyclo[2.2.1]-2'-heptene,
4,5-(5''-ethylbenzo)cyclohepten-1-one-3-spiro-5'-bicyclo[2.2.1]-2'-heptene,
4,5-(6''-ethylbenzo)cyclohepten-1-one-3-spiro-5'-bicyclo[2.2.1]-2'-heptene,
4,5-(3''-n-propylbenzo)cyclohepten-1-one-3-spiro-5'-bicyclo[2.2.1]-2'-heptene,
4,5-(4''-n-propylbenzo)cyclohepten-1-one-3-spiro-5'-bicyclo[2.2.1]-2'-heptene,
4,5-(5''-n-propylbenzo)cyclohepten-1-one-3-spiro-5'-bicyclo[2.2.1]-2'-heptene,
4,5-(6''-n-propylbenzo)cyclohepten-1-one-3-spiro-5'-bicyclo[2.2.1]-2'-heptene,
4,5-(3''-iso-propylbenzo)cyclohepten-1-one-3-spiro-5'-bicyclo[2.2.1]-2'-heptene,
4,5-(4''-iso-propylbenzo)cyclohepten-1-one-3-spiro-5'-bicyclo[2.2.1]-2'-heptene,
4,5-(5''-iso-propylbenzo)cyclohepten-1-one-3-spiro-5'-bicyclo[2.2.1]-2'-heptene,
4,5-(6''-iso-propylbenzo)cyclohepten-1-one-3-spiro-5'-bicyclo[2.2.1]-2'-heptene,
4,5-(3''-n-butylbenzo)cyclohepten-1-one-3-spiro-5'-bicyclo[2.2.1]-2'-heptene,
4,5-(4''-n-butylbenzo)cyclohepten-1-one-3-spiro-5'-bicyclo[2.2.1]-2'-heptene,
4,5-(5''-n-butylbenzo)cyclohepten-1-one-3-spiro-5'-bicyclo[2.2.1]-2'-heptene,
4,5-(6''-n-butylbenzo)cyclohepten-1-one-3-spiro-5'-bicyclo[2.2.1]-2'-heptene,
4,5-(3''-iso-butylbenzo)cyclohepten-1-one-3-spiro-5'-bicyclo[2.2.1]-2'-heptene,
4,5-(4''-iso-butylbenzo)cyclohepten-1-one-3-spiro-5'-bicyclo[2.2.1]-2'-heptene,
4,5-(5''-iso-butylbenzo)cyclohepten-1-one-3-spiro-5'-bicyclo[2.2.1]-2'-heptene,
4,5-(6''-iso-butylbenzo)cyclohepten-1-one-3-spiro-5'-bicyclo[2.2.1]-2'-heptene,
4,5-(3''-sec-butylbenzo)cyclohepten-1-one-3-spiro-5'-bicyclo[2.2.1]-2'-heptene,
4,5-(4''-sec-butylbenzo)cyclohepten-1-one-3-spiro-5'-bicyclo[2.2.1]-2'-heptene, 4,5-(5"-sec-butylbenzo)cyclohepten-1-one-3-spiro-5'-bicyclo[2.2.1]-2'-heptene,
4,5-(6"-sec-butylbenzo)cyclohepten-1-one-3-spiro-5'-bicyclo[2.2.1]-2'-heptene,
4,5-(3"-t-butylbenzo)cyclohepten-1-one-3-spiro-5'-bicyclo[2.2.1]-2'-heptene,
4,5-(4"-t-butylbenzo)cyclohepten-1-one-3-spiro-5'-bicyclo[2.2.1]-2'-heptene,
4,5-(5"-t-butylbenzo)cyclohepten-1-one-3-spiro-5'-bicyclo[2.2.1]-2'-heptene,
4,5-(6"-t-butylbenzo)cyclohepten-1-one-3-spiro-5'-bicyclo[2.2.1]-2'-heptene,
4,5-(3"-cyclohexylbenzo)cyclohepten-1-one-3-spiro-5'-bicyclo[2.2.1]-2'-heptene,
4,5-(4"-cyclohexylbenzo)cyclohepten-1-one-3-spiro-5'-bicyclo[2.2.1]-2'-heptene,
4,5-(5"-cyclohexylbenzo)cyclohepten-1-one-3-spiro-5'-bicyclo[2.2.1]-2'-heptene,
4,5-(6"-cyclohexylbenzo)cyclohepten-1-one-3-spiro-5'-bicyclo[2.2.1]-2'-heptene,
4,5-(3"-phenylbenzo)cyclohepten-1-one-3-spiro-5'-bicyclo[2.2.1]-2'-heptene,
4,5-(4"-phenylbenzo)cyclohepten-1-one-3-spiro-5'-bicyclo[2.2.1]-2'-heptene,
4,5-(5"-phenylbenzo)cyclohepten-1-one-3-spiro-5'-bicyclo[2.2.1]-2'-heptene,
4,5-(6"-phenylbenzo)cyclohepten-1-one-3-spiro-5'-bicyclo[2.2.1]-2'-heptene,
4,5-(3"-chlorobenzo)cyclohepten-1-one-3-spiro-5'-bicyclo[2.2.1]-2'-heptene,
4,5-(4"-chlorobenzo)cyclohepten-1-one-3-spiro-5'-bicyclo[2.2.1]-2'-heptene,
4,5-(4"-chlorobenzo)cyclohepten-1-one-3-spiro-5'-bicyclo[2.2.1]-2'-heptene,
4,5-(4"-chlorobenzo)cyclohepten-1-one-3-spiro-5'-bicyclo[2.2.1]-2'-heptene,
4,5-(5"-chlorobenzo)cyclohepten-1-one-3-spiro-5'-bicyclo[2.2.1]-2'-heptene,
4,5-(6"-chlorobenzo)cyclohepten-1-one-3-spiro-5'-bicyclo[2.2.1]-2'-heptene,
4,5-(3"-aminobenzo)cyclohepten-1-one-3-spiro-5'-bicyclo[2.2.1]-2'-heptene,
4,5-(4"-aminobenzo)cyclohepten-1-one-3-spiro-5'-bicyclo[2.2.1]-2'-heptene,
4,5-(5"-aminobenzo)cyclohepten-1-one-3-spiro-5'-bicyclo[2.2.1]-2'-heptene,
4,5-(6"-aminobenzo)cyclohepten-1-one-3-spiro-5'-bicyclo[2.2.1]-2'-heptene,
4,5-(3"-methoxybenzo)cyclohepten-1-one-3-spiro-5'-bicyclo[2.2.1]-2'-heptene,
4,5-(4"-methoxybenzo)cyclohepten-1-one-3-spiro-5'-bicyclo[2.2.1]-2'-heptene,
4,5-(5"-methoxybenzo)cyclohepten-1-one-3-spiro-5'-bicyclo[2.2.1]-2'-heptene,
4,5-(6"-methoxybenzo)cyclohepten-1-one-3-spiro-5'-bicyclo[2.2.1]-2'-heptene,
2,3-benzocycloocten-1-one-4-spiro-5'-bicyclo[2.2.1]-2'-heptene,
2,3-(3"-methylbenzo)cycloocten-1-one-4-spiro-5'-bicyclo[2.2.1]-2'-heptene,
2,3-(4"-methylbenzo)cycloocten-1-one-4-spiro-5'-bicyclo[2.2.1]-2'-heptene,
2,3-(5"-methylbenzo)cycloocten-1-one-4-spiro-5'-bicyclo[2.2.1]-2'-heptene,
2,3-(6"-methylbenzo)cycloocten-1-one-4-spiro-5'-bicyclo[2.2.1]-2'-heptene,
2,3-(3"-ethylbenzo)cycloocten-1-one-4-spiro-5'-bicyclo[2.2.1]-2'-heptene,
2,3-(4"-ethylbenzo)cycloocten-1-one-4-spiro-5'-bicyclo[2.2.1]-2'-heptene,
2,3-(5"-ethylbenzo)cycloocten-1-one-4-spiro-5'-bicyclo[2.2.1]-2'-heptene,
2,3-(6"-ethylbenzo)cycloocten-1-one-4-spiro-5'-bicyclo[2.2.1]-2'-heptene,
2,3-(3"-n-propylbenzo)cycloocten-1-one-4-spiro-5'-bicyclo[2.2.1]-2'-heptene,
2,3-(4"-n-propylbenzo)cycloocten-1-one-4-spiro-5'-bicyclo[2.2.1]-2'-heptene,
2,3-(5"-n-propylbenzo)cycloocten-1-one-4-spiro-5'-bicyclo[2.2.1]-2'-heptene,
2,3-(6"-n-propylbenzo)cycloocten-1-one-4-spiro-5'-bicyclo[2.2.1]-2'-heptene,
2,3-(3"-iso-propylbenzo)cyclohepten-1-one-4-spiro-5'-bicyclo[2.2.1]-2'-heptene,
2,3-(4"-iso-propylbenzo)cycloocten-1-one-4-spiro-5'-bicyclo[2.2.1]-2'-heptene,
2,3-(5"-iso-propylbenzo)cycloocten-1-one-4-spiro-5'-bicyclo[2.2.1]-2'-heptene,
2,3-(6"-iso-propylbenzo)cycloocten-1-one-4-spiro-5'-bicyclo[2.2.1]-2'-heptene,
2,3-(3"-n-butylbenzo)cycloocten-1-one-4-spiro-5'-bicyclo[2.2.1]-2'-heptene,
2,3-(4"-n-butylbenzo)cycloocten-1-one-4-spiro-5'-bicyclo[2.2.1]-2'-heptene,
2,3-(5"-n-butylbenzo)cycloocten-1-one-4-spiro-5'-bicyclo[2.2.1]-2'-heptene,
2,3-(6"-n-butylbenzo)cycloocten-1-one-4-spiro-5'-bicyclo[2.2.1]-2'-heptene,
2,3-(3"-iso-butylbenzo)cycloocten-1-one-4-spiro-5'-bicyclo[2.2.1]-2'-heptene,
2,3-(4"-iso-butylbenzo)cycloocten-1-one-4-spiro-5'-bicyclo[2.2.1]-2'-heptene,
2,3-(5"-iso-butylbenzo)cycloocten-1-one-4-spiro-5'-bicyclo[2.2.1]-2'-heptene,
2,3-(6"-iso-butylbenzo)cycloocten-1-one-4-spiro-5'-bicyclo[2.2.1]-2'-heptene,
2,3-(3"-sec-butylbenzo)cycloocten-1-one-4-spiro-5'-bicyclo[2.2.1]-2'-heptene,
2,3-(4"-sec-butylbenzo)cycloocten-1-one-4-spiro-5'-bicyclo[2.2.1]-2'-heptene,
2,3-(5"-sec-butylbenzo)cycloocten-1-one-4-spiro-5'-bicyclo[2.2.1]-2'-heptene,
2,3-(6"-sec-butylbenzo)cycloocten-1-one-4-spiro-5'-bicyclo[2.2.1]-2'-heptene,
2,3-(3"-t-butylbenzo)cycloocten-1-one-4-spiro-5'-bicyclo[2.2.1]-2'-heptene,
2,3-(4"-t-butylbenzo)cycloocten-1-one-4-spiro-5'-bicyclo[2.2.1]-2'-heptene,
2,3-(5"-t-butylbenzo)cycloocten-1-one-4-spiro-5'-bicyclo[2.2.1]-2'-heptene,
2,3-(6"-t-butylbenzo)cycloocten-1-one-4-spiro-5'-bicyclo[2.2.1]-2'-heptene,
2,3-(3"-cyclohexylbenzo)cycloocten-1-one-4-spiro-5'-bicyclo[2.2.1]-2'-heptene,
2,3-(4"-cyclohexylbenzo)cycloocten-1-one-4-spiro-5'-bicyclo[2.2.1]-2'-heptene,
2,3-(5"-cyclohexylbenzo)cycloocten-1-one-4-spiro-5'-bicyclo[2.2.1]-2'-heptene,
2,3-(6"-cyclohexylbenzo)cycloocten-1-one-4-spiro-5'-bicyclo[2.2.1]-2'-heptene,
2,3-(3"-phenylbenzo)cycloocten-1-one-4-spiro-5'-bicyclo[2.2.1]-2'-heptene, 2,3-(4"-phenylbenzo)cycloocten-1-one-4-spiro-5'-bicyclo[2.2.1]-2'-heptene,
2,3-(5"-phenylbenzo)cycloocten-1-one-4-spiro-5'-bicyclo[2.2.1]-2'-heptene,
2,3-(6"-phenylbenzo)cycloocten-1-one-4-spiro-5'-bicyclo[2.2.1]-2'-heptene,
2,3-(3"-chlorobenzo)cycloocten-1-one-4-spiro-5'-bicyclo[2.2.1]-2'-heptene,
2,3-(4"-chlorobenzo)cycloocten-1-one-4-spiro-5'-bicyclo[2.2.1]-2'-heptene,
2,3-(4"-chlorobenzo)cycloocten-1-one-4-spiro-5'-bicyclo[2.2.1]-2'-heptene,
2,3-(4"-chlorobenzo)cycloocten-1-one-4-spiro-5'-bicyclo[2.2.1]-2'-heptene,
2,3-(5"-chlorobenzo)cycloocten-1-one-4-spiro-5'-bicyclo[2.2.1]-2'-heptene,
2,3-(6"-chlorobenzo)cycloocten-1-one-4-spiro-5'-bicyclo[2.2.1]-2'-heptene,
2,3-(3"-aminobenzo)cycloocten-1-one-4-spiro-5'-bicyclo[2.2.1]-2'-heptene,
2,3-(4"-aminobenzo)cycloocten-1-one-4-spiro-5'-bicyclo[2.2.1]-2'-heptene,
2,3-(5"-aminobenzo)cycloocten-1-one-4-spiro-5'-bicyclo[2.2.1]-2'-heptene,
2,3-(6"-aminobenzo)cycloocten-1-one-4-spiro-5'-bicyclo[2.2.1]-2'-heptene,
2,3-(3"-methoxybenzo)cycloocten-1-one-4-spiro-5'-bicyclo[2.2.1]-2'-heptene,
2,3-(4"-methoxybenzo)cycloocten-1-one-4-spiro-5'-bicyclo[2.2.1]-2'-heptene,
2,3-(5"-methoxybenzo)cycloocten-1-one-4-spiro-5'-bicyclo[2.2.1]-2'-heptene,
2,3-(6"-methoxybenzo)cycloocten-1-one-4-spiro-5'-bicyclo[2.2.1]-2'-heptene.
(viii)
2,3-benzocycloocten-1-one-5-spiro-5'-bicyclo[2.2.1]-2'-heptene,
2,3-(3"-methylbenzo)cycloocten-1-one-5-spiro-5'-bicyclo[2.2.1]-2'-heptene,
2,3-(4"-methylbenzo)cycloocten-1-one-5-spiro-5'-bicyclo[2.2.1]-2'-heptene,
2,3-(5"-methylbenzo)cycloocten-1-one-5-spiro-5'-bicyclo[2.2.1]-2'-heptene,
2,3-(6"-methylbenzo)cycloocten-1-one-5-spiro-5'-bicyclo[2.2.1]-2'-heptene,
2,3-(3"-ethylbenzo)cycloocten-1-one-5-spiro-5'-bicyclo[2.2.1]-2'-heptene,
2,3-(4"-ethylbenzo)cycloocten-1-one-5-spiro-5'-bicyclo[2.2.1]-2'-heptene,
2,3-(5"-ethylbenzo)cycloocten-1-one-5-spiro-5'-bicyclo[2.2.1]-2'-heptene,
2,3-(6"-ethylbenzo)cycloocten-1-one-5-spiro-5'-bicyclo[2.2.1]-2'-heptene,
2,3-(3"-n-propylbenzo)cycloocten-1-one-5-spiro-5'-bicyclo[2.2.1]-2'-heptene,
2,3-(4"-n-propylbenzo)cycloocten-1-one-5-spiro-5'-bicyclo[2.2.1]-2'-heptene,
2,3-(5"-n-propylbenzo)cycloocten-1-one-5-spiro-5'-bicyclo[2.2.1]-2'-heptene,
2,3-(6"-n-propylbenzo)cycloocten-1-one-5-spiro-5'-bicyclo[2.2.1]-2'-heptene,
2,3-(3"-iso-propylbenzo)cyclohepten-1-one-5-spiro-5'-bicyclo[2.2.1]-2'-heptene,
2,3-(4"-iso-propylbenzo)cycloocten-1-one-5-spiro-5'-bicyclo[2.2.1]-2'-heptene,
2,3-(5"-iso-propylbenzo)cycloocten-1-one-5-spiro-5'-bicyclo[2.2.1]-2'-heptene,
2,3-(6"-iso-propylbenzo)cycloocten-1-one-5-spiro-5'-bicyclo[2.2.1]-2'-heptene,
2,3-(3"-n-butylbenzo)cycloocten-1-one-5-spiro-5'-bicyclo[2.2.1]-2'-heptene,
2,3-(4"-n-butylbenzo)cycloocten-1-one-5-spiro-5'-bicyclo[2.2.1]-2'-heptene,
2,3-(5"-n-butylbenzo)cycloocten-1-one-5-spiro-5'-bicyclo[2.2.1]-2'-heptene,
2,3-(6"-n-butylbenzo)cycloocten-1-one-5-spiro-5'-bicyclo[2.2.1]-2'-heptene,
2,3-(3"-iso-butylbenzo)cycloocten-1-one-5-spiro-5'-bicyclo[2.2.1]-2'-heptene,
2,3-(4"-iso-butylbenzo)cycloocten-1-one-5-spiro-5'-bicyclo[2.2.1]-2'-heptene,
2,3-(5"-iso-butylbenzo)cycloocten-1-one-5-spiro-5'-bicyclo[2.2.1]-2'-heptene,
2,3-(6"-iso-butylbenzo)cycloocten-1-one-5-spiro-5'-bicyclo[2.2.1]-2'-heptene,
2,3-(3"-sec-butylbenzo)cycloocten-1-one-5-spiro-5'-bicyclo[2.2.1]-2'-heptene,
2,3-(4"-sec-butylbenzo)cycloocten-1-one-5-spiro-5'-bicyclo[2.2.1]-2'-heptene,
2,3-(5"-sec-butylbenzo)cycloocten-1-one-5-spiro-5'-bicyclo[2.2.1]-2'-heptene,
2,3-(6"-sec-butylbenzo)cycloocten-1-one-5-spiro-5'-bicyclo[2.2.1]-2'-heptene,
2,3-(3"-t-butylbenzo)cycloocten-1-one-5-spiro-5'-bicyclo[2.2.1]-2'-heptene,
2,3-(4"-t-butylbenzo)cycloocten-1-one-5-spiro-5'-bicyclo[2.2.1]-2'-heptene,
2,3-(5"-t-butylbenzo)cycloocten-1-one-5-spiro-5'-bicyclo[2.2.1]-2'-heptene,
2,3-(6"-t-butylbenzo)cycloocten-1-one-5-spiro-5'-bicyclo[2.2.1]-2'-heptene,
2,3-(3"-cyclohexylbenzo)cycloocten-1-one-5-spiro-5'-bicyclo[2.2.1]-2'-heptene,
2,3-(4"-cyclohexylbenzo)cycloocten-1-one-5-spiro-5'-bicyclo[2.2.1]-2'-heptene,
2,3-(5"-cyclohexylbenzo)cycloocten-1-one-5-spiro-5'-bicyclo[2.2.1]-2'-heptene,
2,3-(6"-cyclohexylbenzo)cycloocten-1-one-5-spiro-5'-bicyclo[2.2.1]-2'-heptene,
2,3-(3"-phenylbenzo)cycloocten-1-one-5-spiro-5'-bicyclo[2.2.1]-2'-heptene,
2,3-(4"-phenylbenzo)cycloocten-1-one-5-spiro-5'-bicyclo[2.2.1]-2'-heptene,
2,3-(5"-phenylbenzo)cycloocten-1-one-5-spiro-5'-bicyclo[2.2.1]-2'-heptene,
2,3-(6"-phenylbenzo)cycloocten-1-one-5-spiro-5'-bicyclo[2.2.1]-2'-heptene,
2,3-(3"-chlorobenzo)cycloocten-1-one-5-spiro-5'-bicyclo[2.2.1]-2'-heptene,
2,3-(4"-chlorobenzo)cycloocten-1-one-5-spiro-5'-bicyclo[2.2.1]-2'-heptene,
2,3-(4"-chlorobenzo)cycloocten-1-one-5-spiro-5'-bicyclo[2.2.1]-2'-heptene,
2,3-(4"-chlorobenzo)cycloocten-1-one-5-spiro-5'-bicyclo[2.2.1]-2'-heptene,
2,3-(5"-chlorobenzo)cycloocten-1-one-5-spiro-5'-bicyclo[2.2.1]-2'-heptene,
2,3-(6"-chlorobenzo)cycloocten-1-one-5-spiro-5'-bicyclo[2.2.1]-2'-heptene,
2,3-(3"-aminobenzo)cycloocten-1-one-5-spiro-5'-bicyclo[2.2.1]-2'-heptene,
2,3-(4"-aminobenzo)cycloocten-1-one-5-spiro-5'-bicyclo[2.2.1]-2'-heptene, 2,3-(5"-aminobenzo)cycloocten-1-one-5-spiro-5'-bicyclo[2.2.1]-2'-heptene,
2,3-(6"-aminobenzo)cycloocten-1-one-5-spiro-5'-bicyclo[2.2.1]-2'-heptene,
2,3-(3"-methoxybenzo)cycloocten-1-one-5-spiro-5'-bicyclo[2.2.1]-2'-heptene,
2,3-(4"-methoxybenzo)cycloocten-1-one-5-spiro-5'-bicyclo[2.2.1]-2'-heptene,
2,3-(5"-methoxybenzo)cycloocten-1-one-5-spiro-5'-bicyclo[2.2.1]-2'-heptene,
2,3-(6"-methoxybenzo)cycloocten-1-one-5-spiro-5'-bicyclo[2.2.1]-2'-heptene,
2,3-benzocycloocten-1-one-6-spiro-5'-bicyclo[2.2.1]-2'-heptene,
2,3-(3"-methylbenzo)cycloocten-1-one-6-spiro-5'-bicyclo[2.2.1]-2'-heptene,
2,3-(4"-methylbenzo)cycloocten-1-one-6-spiro-5'-bicyclo[2.2.1]-2'-heptene,
2,3-(5"-methylbenzo)cycloocten-1-one-6-spiro-5'-bicyclo[2.2.1]-2'-heptene,
2,3-(6"-methylbenzo)cycloocten-1-one-6-spiro-5'-bicyclo[2.2.1]-2'-heptene,
2,3-(3"-ethylbenzo)cycloocten-1-one-6-spiro-5'-bicyclo[2.2.1]-2'-heptene,
2,3-(4"-ethylbenzo)cycloocten-1-one-6-spiro-5'-bicyclo[2.2.1]-2'-heptene,
2,3-(5"-ethylbenzo)cycloocten-1-one-6-spiro-5'-bicyclo[2.2.1]-2'-heptene,
2,3-(6"-ethylbenzo)cycloocten-1-one-6-spiro-5'-bicyclo[2.2.1]-2'-heptene,
2,3-(3"-n-propylbenzo)cycloocten-1-one-6-spiro-5'-bicyclo[2.2.1]-2'-heptene,
2,3-(4"-n-propylbenzo)cycloocten-1-one-6-spiro-5'-bicyclo[2.2.1]-2'-heptene,
2,3-(5"-n-propylbenzo)cycloocten-1-one-6-spiro-5'-bicyclo[2.2.1]-2'-heptene,
2,3-(6"-n-propylbenzo)cycloocten-1-one-6-spiro-5'-bicyclo[2.2.1]-2'-heptene,
2,3-(3"-iso-propylbenzo)cyclohepten-1-one-6-spiro-5'-bicyclo[2.2.1]-2'-heptene,
2,3-(4"-iso-propylbenzo)cycloocten-1-one-6-spiro-5'-bicyclo[2.2.1]-2'-heptene,
2,3-(5"-iso-propylbenzo)cycloocten-1-one-6-spiro-5'-bicyclo[2.2.1]-2'-heptene,
2,3-(6"-iso-propylbenzo)cycloocten-1-one-6-spiro-5'-bicyclo[2.2.1]-2'-heptene,
2,3-(3"-n-butylbenzo)cycloocten-1-one-6-spiro-5'-bicyclo[2.2.1]-2'-heptene,
2,3-(4"-n-butylbenzo)cycloocten-1-one-6-spiro-5'-bicyclo[2.2.1]-2'-heptene,
2,3-(5"-n-butylbenzo)cycloocten-1-one-6-spiro-5'-bicyclo[2.2.1]-2'-heptene,
2,3-(6"-n-butylbenzo)cycloocten-1-one-6-spiro-5'-bicyclo[2.2.1]-2'-heptene,
2,3-(3"-iso-butylbenzo)cycloocten-1-one-6-spiro-5'-bicyclo[2.2.1]-2'-heptene,
2,3-(4"-iso-butylbenzo)cycloocten-1-one-6-spiro-5'-bicyclo[2.2.1]-2'-heptene,
2,3-(5"-iso-butylbenzo)cycloocten-1-one-6-spiro-5'-bicyclo[2.2.1]-2'-heptene,
2,3-(6"-iso-butylbenzo)cycloocten-1-one-6-spiro-5'-bicyclo[2.2.1]-2'-heptene,
2,3-(3"-sec-butylbenzo)cycloocten-1-one-6-spiro-5'-bicyclo[2.2.1]-2'-heptene,
2,3-(4"-sec-butylbenzo)cycloocten-1-one-6-spiro-5'-bicyclo[2.2.1]-2'-heptene,
2,3-(5"-sec-butylbenzo)cycloocten-1-one-6-spiro-5'-bicyclo[2.2.1]-2'-heptene,
2,3-(6"-sec-butylbenzo)cycloocten-1-one-6-spiro-5'-bicyclo[2.2.1]-2'-heptene,
2,3-(3"-t-butylbenzo)cycloocten-1-one-6-spiro-5'-bicyclo[2.2.1]-2'-heptene,
2,3-(4"-t-butylbenzo)cycloocten-1-one-6-spiro-5'-bicyclo[2.2.1]-2'-heptene,
2,3-(5"-t-butylbenzo)cycloocten-1-one-6-spiro-5'-bicyclo[2.2.1]-2'-heptene,
2,3-(6"-t-butylbenzo)cycloocten-1-one-6-spiro-5'-bicyclo[2.2.1]-2'-heptene,
2,3-(3"-cyclohexylbenzo)cycloocten-1-one-6-spiro-5'-bicyclo[2.2.1]-2'-heptene,
2,3-(4"-cyclohexylbenzo)cycloocten-1-one-6-spiro-5'-bicyclo[2.2.1]-2'-heptene,
2,3-(5"-cyclohexylbenzo)cycloocten-1-one-6-spiro-5'-bicyclo[2.2.1]-2'-heptene,
2,3-(6"-cyclohexylbenzo)cycloocten-1-one-6-spiro-5'-bicyclo[2.2.1]-2'-heptene,
2,3-(3"-phenylbenzo)cycloocten-1-one-6-spiro-5'-bicyclo[2.2.1]-2'-heptene,
2,3-(4"-phenylbenzo)cycloocten-1-one-6-spiro-5'-bicyclo[2.2.1]-2'-heptene,
2,3-(5"-phenylbenzo)cycloocten-1-one-6-spiro-5'-bicyclo[2.2.1]-2'-heptene,
2,3-(6"-phenylbenzo)cycloocten-1-one-6-spiro-5'-bicyclo[2.2.1]-2'-heptene,
2,3-(3"-chlorobenzo)cycloocten-1-one-6-spiro-5'-bicyclo[2.2.1]-2'-heptene,
2,3-(4"-chlorobenzo)cycloocten-1-one-6-spiro-5'-bicyclo[2.2.1]-2'-heptene,
2,3-(4"-chlorobenzo)cycloocten-1-one-6-spiro-5'-bicyclo[2.2.1]-2'-heptene,
2,3-(4"-chlorobenzo)cycloocten-1-one-6-spiro-5'-bicyclo[2.2.1]-2'-heptene,
2,3-(5"-chlorobenzo)cycloocten-1-one-6-spiro-5'-bicyclo[2.2.1]-2'-heptene,
2,3-(6"-chlorobenzo)cycloocten-1-one-6-spiro-5'-bicyclo[2.2.1]-2'-heptene,
2,3-(3"-aminobenzo)cycloocten-1-one-6-spiro-5'-bicyclo[2.2.1]-2'-heptene,
2,3-(4"-aminobenzo)cycloocten-1-one-6-spiro-5'-bicyclo[2.2.1]-2'-heptene,
2,3-(5"-aminobenzo)cycloocten-1-one-6-spiro-5'-bicyclo[2.2.1]-2'-heptene,
2,3-(6"-aminobenzo)cycloocten-1-one-6-spiro-5'-bicyclo[2.2.1]-2'-heptene,
2,3-(3"-methoxybenzo)cycloocten-1-one-6-spiro-5'-bicyclo[2.2.1]-2'-heptene,
2,3-(4"-methoxybenzo)cycloocten-1-one-6-spiro-5'-bicyclo[2.2.1]-2'-heptene,
2,3-(5"-methoxybenzo)cycloocten-1-one-6-spiro-5'-bicyclo[2.2.1]-2'-heptene,
2,3-(6"-methoxybenzo)cycloocten-1-one-6-spiro-5'-bicyclo[2.2.1]-2'-heptene,
2,3-benzocycloocten-1-one-7-spiro-5'-bicyclo[2.2.1]-2'-heptene,
2,3-(3"-methylbenzo)cycloocten-1-one-7-spiro-5'-bicyclo[2.2.1]-2'-heptene,
2,3-(4"-methylbenzo)cycloocten-1-one-7-spiro-5'-bicyclo[2.2.1]-2'-heptene,
2,3-(5"-methylbenzo)cycloocten-1-one-7-spiro-5'-bicyclo[2.2.1]-2'-heptene,
2,3-(6"-methylbenzo)cycloocten-1-one-7-spiro-5'-bicyclo[2.2.1]-2'-heptene, 2,3-(3"-ethylbenzo)cycloocten-1-one-7-spiro-5'-bicyclo[2.2.1]-2'-heptene,
2,3-(4"-ethylbenzo)cycloocten-1-one-7-spiro-5'-bicyclo[2.2.1]-2'-heptene,
2,3-(5"-ethylbenzo)cycloocten-1-one-7-spiro-5'-bicyclo[2.2.1]-2'-heptene,
2,3-(6"-ethylbenzo)cycloocten-1-one-7-spiro-5'-bicyclo[2.2.1]-2'-heptene,
2,3-(3"-n-propylbenzo)cycloocten-1-one-7-spiro-5'-bicyclo[2.2.1]-2'-heptene,
2,3-(4"-n-propylbenzo)cycloocten-1-one-7-spiro-5'-bicyclo[2.2.1]-2'-heptene,
2,3-(5"-n-propylbenzo)cycloocten-1-one-7-spiro-5'-bicyclo[2.2.1]-2'-heptene,
2,3-(6"-n-propylbenzo)cycloocten-1-one-7-spiro-5'-bicyclo[2.2.1]-2'-heptene,
2,3-(3"-iso-propylbenzo)cyclohepten-1-one-7-spiro-5'-bicyclo[2.2.1]-2'-heptene,
2,3-(4"-iso-propylbenzo)cycloocten-1-one-7-spiro-5'-bicyclo[2.2.1]-2'-heptene,
2,3-(5"-iso-propylbenzo)cycloocten-1-one-7-spiro-5'-bicyclo[2.2.1]-2'-heptene,
2,3-(6"-iso-propylbenzo)cycloocten-1-one-7-spiro-5'-bicyclo[2.2.1]-2'-heptene,
2,3-(3"-n-butylbenzo)cycloocten-1-one-7-spiro-5'-bicyclo[2.2.1]-2'-heptene,
2,3-(4"-n-butylbenzo)cycloocten-1-one-7-spiro-5'-bicyclo[2.2.1]-2'-heptene,
2,3-(5"-n-butylbenzo)cycloocten-1-one-7-spiro-5'-bicyclo[2.2.1]-2'-heptene,
2,3-(6"-n-butylbenzo)cycloocten-1-one-7-spiro-5'-bicyclo[2.2.1]-2'-heptene,
2,3-(3"-iso-butylbenzo)cycloocten-1-one-7-spiro-5'-bicyclo[2.2.1]-2'-heptene,
2,3-(4"-iso-butylbenzo)cycloocten-1-one-7-spiro-5'-bicyclo[2.2.1]-2'-heptene,
2,3-(5"-iso-butylbenzo)cycloocten-1-one-7-spiro-5'-bicyclo[2.2.1]-2'-heptene,
2,3-(6"-iso-butylbenzo)cycloocten-1-one-7-spiro-5'-bicyclo[2.2.1]-2'-heptene,
2,3-(3"-sec-butylbenzo)cycloocten-1-one-7-spiro-5'-bicyclo[2.2.1]-2'-heptene,
2,3-(4"-sec-butylbenzo)cycloocten-1-one-7-spiro-5'-bicyclo[2.2.1]-2'-heptene,
2,3-(5"-sec-butylbenzo)cycloocten-1-one-7-spiro-5'-bicyclo[2.2.1]-2'-heptene,
2,3-(6"-sec-butylbenzo)cycloocten-1-one-7-spiro-5'-bicyclo[2.2.1]-2'-heptene,
2,3-(3"-t-butylbenzo)cycloocten-1-one-7-spiro-5'-bicyclo[2.2.1]-2'-heptene,
2,3-(4"-t-butylbenzo)cycloocten-1-one-7-spiro-5'-bicyclo[2.2.1]-2'-heptene,
2,3-(5"-t-butylbenzo)cycloocten-1-one-7-spiro-5'-bicyclo[2.2.1]-2'-heptene,
2,3-(6"-t-butylbenzo)cycloocten-1-one-7-spiro-5'-bicyclo[2.2.1]-2'-heptene,
2,3-(3"-cyclohexylbenzo)cycloocten-1-one-7-spiro-5'-bicyclo[2.2.1]-2'-heptene,
2,3-(4"-cyclohexylbenzo)cycloocten-1-one-7-spiro-5'-bicyclo[2.2.1]-2'-heptene,
2,3-(5"-cyclohexylbenzo)cycloocten-1-one-7-spiro-5'-bicyclo[2.2.1]-2'-heptene,
2,3-(6"-cyclohexylbenzo)cycloocten-1-one-7-spiro-5'-bicyclo[2.2.1]-2'-heptene,
2,3-(3"-phenylbenzo)cycloocten-1-one-7-spiro-5'-bicyclo[2.2.1]-2'-heptene,
2,3-(4"-phenylbenzo)cycloocten-1-one-7-spiro-5'-bicyclo[2.2.1]-2'-heptene,
2,3-(5"-phenylbenzo)cycloocten-1-one-7-spiro-5'-bicyclo[2.2.1]-2'-heptene,
2,3-(6"-phenylbenzo)cycloocten-1-one-7-spiro-5'-bicyclo[2.2.1]-2'-heptene,
2,3-(3"-chlorobenzo)cycloocten-1-one-7-spiro-5'-bicyclo[2.2.1]-2'-heptene,
2,3-(4"-chlorobenzo)cycloocten-1-one-7-spiro-5'-bicyclo[2.2.1]-2'-heptene,
2,3-(4"-chlorobenzo)cycloocten-1-one-7-spiro-5'-bicyclo[2.2.1]-2'-heptene,
2,3-(4"-chlorobenzo)cycloocten-1-one-7-spiro-5'-bicyclo[2.2.1]-2'-heptene,
2,3-(5"-chlorobenzo)cycloocten-1-one-7-spiro-5'-bicyclo[2.2.1]-2'-heptene,
2,3-(6"-chlorobenzo)cycloocten-1-one-7-spiro-5'-bicyclo[2.2.1]-2'-heptene,
2,3-(3"-aminobenzo)cycloocten-1-one-7-spiro-5'-bicyclo[2.2.1]-2'-heptene,
2,3-(4"-aminobenzo)cycloocten-1-one-7-spiro-5'-bicyclo[2.2.1]-2'-heptene,
2,3-(5"-aminobenzo)cycloocten-1-one-7-spiro-5'-bicyclo[2.2.1]-2'-heptene,
2,3-(6"-aminobenzo)cycloocten-1-one-7-spiro-5'-bicyclo[2.2.1]-2'-heptene,
2,3-(3"-methoxybenzo)cycloocten-1-one-7-spiro-5'-bicyclo[2.2.1]-2'-heptene,
2,3-(4"-methoxybenzo)cycloocten-1-one-7-spiro-5'-bicyclo[2.2.1]-2'-heptene,
2,3-(5"-methoxybenzo)cycloocten-1-one-7-spiro-5'-bicyclo[2.2.1]-2'-heptene,
2,3-(6"-methoxybenzo)cycloocten-1-one-7-spiro-5'-bicyclo[2.2.1]-2'-heptene,
2,3-benzocycloocten-1-one-8-spiro-5'-bicyclo[2.2.1]-2'-heptene,
2,3-(3"-methylbenzo)cycloocten-1-one-8-spiro-5'-bicyclo[2.2.1]-2'-heptene,
2,3-(4"-methylbenzo)cycloocten-1-one-8-spiro-5'-bicyclo[2.2.1]-2'-heptene,
2,3-(5"-methylbenzo)cycloocten-1-one-8-spiro-5'-bicyclo[2.2.1]-2'-heptene,
2,3-(6"-methylbenzo)cycloocten-1-one-8-spiro-5'-bicyclo[2.2.1]-2'-heptene,
2,3-(3"-ethylbenzo)cycloocten-1-one-8-spiro-5'-bicyclo[2.2.1]-2'-heptene,
2,3-(4"-ethylbenzo)cycloocten-1-one-8-spiro-5'-bicyclo[2.2.1]-2'-heptene,
2,3-(5"-ethylbenzo)cycloocten-1-one-8-spiro-5'-bicyclo[2.2.1]-2'-heptene,
2,3-(6"-ethylbenzo)cycloocten-1-one-8-spiro-5'-bicyclo[2.2.1]-2'-heptene,
2,3-(3"-n-propylbenzo)cycloocten-1-one-8-spiro-5'-bicyclo[2.2.1]-2'-heptene,
2,3-(4"-n-propylbenzo)cycloocten-1-one-8-spiro-5'-bicyclo[2.2.1]-2'-heptene,
2,3-(5"-n-propylbenzo)cycloocten-1-one-8-spiro-5'-bicyclo[2.2.1]-2'-heptene,
2,3-(6"-n-propylbenzo)cycloocten-1-one-8-spiro-5'-bicyclo[2.2.1]-2'-heptene,
2,3-(3"-iso-propylbenzo)cyclohepten-1-one-8-spiro-5'-bicyclo[2.2.1]-2'-heptene,
2,3-(4"-iso-propylbenzo)cycloocten-1-one-8-spiro-5'-bicyclo[2.2.1]-2'-heptene,
2,3-(5"-iso-propylbenzo)cycloocten-1-one-8-spiro-5'-bicyclo[2.2.1]-2'-heptene, 2,3-(6"-iso-propylbenzo)cycloocten-1-one-8-spiro-5'-bicyclo[2.2.1]-2'-heptene,
2,3-(3"-n-butylbenzo)cycloocten-1-one-8-spiro-5'-bicyclo[2.2.1]-2'-heptene,
2,3-(4"-n-butylbenzo)cycloocten-1-one-8-spiro-5'-bicyclo[2.2.1]-2'-heptene,
2,3-(5"-n-butylbenzo)cycloocten-1-one-8-spiro-5'-bicyclo[2.2.1]-2'-heptene,
2,3-(6"-n-butylbenzo)cycloocten-1-one-8-spiro-5'-bicyclo[2.2.1]-2'-heptene,
2,3-(3"-iso-butylbenzo)cycloocten-1-one-8-spiro-5'-bicyclo[2.2.1]-2'-heptene,
2,3-(4"-iso-butylbenzo)cycloocten-1-one-8-spiro-5'-bicyclo[2.2.1]-2'-heptene,
2,3-(5"-iso-butylbenzo)cycloocten-1-one-8-spiro-5'-bicyclo[2.2.1]-2'-heptene,
2,3-(6"-iso-butylbenzo)cycloocten-1-one-8-spiro-5'-bicyclo[2.2.1]-2'-heptene,
2,3-(3"-sec-butylbenzo)cycloocten-1-one-8-spiro-5'-bicyclo[2.2.1]-2'-heptene,
2,3-(4"-sec-butylbenzo)cycloocten-1-one-8-spiro-5'-bicyclo[2.2.1]-2'-heptene,
2,3-(5"-sec-butylbenzo)cycloocten-1-one-8-spiro-5'-bicyclo[2.2.1]-2'-heptene,
2,3-(6"-sec-butylbenzo)cycloocten-1-one-8-spiro-5'-bicyclo[2.2.1]-2'-heptene,
2,3-(3"-t-butylbenzo)cycloocten-1-one-8-spiro-5'-bicyclo[2.2.1]-2'-heptene,
2,3-(4"-t-butylbenzo)cycloocten-1-one-7-spiro-5'-bicyclo[2.2.1]-2'-heptene,
2,3-(5"-t-butylbenzo)cycloocten-1-one-8-spiro-5'-bicyclo[2.2.1]-2'-heptene,
2,3-(6"-t-butylbenzo)cycloocten-1-one-8-spiro-5'-bicyclo[2.2.1]-2'-heptene,
2,3-(3"-cyclohexylbenzo)cycloocten-1-one-8-spiro-5'-bicyclo[2.2.1]-2'-heptene,
2,3-(4"-cyclohexylbenzo)cycloocten-1-one-8-spiro-5'-bicyclo[2.2.1]-2'-heptene,
2,3-(5"-cyclohexylbenzo)cycloocten-1-one-8-spiro-5'-bicyclo[2.2.1]-2'-heptene,
2,3-(6"-cyclohexylbenzo)cycloocten-1-one-8-spiro-5'-bicyclo[2.2.1]-2'-heptene,
2,3-(3"-phenylbenzo)cycloocten-1-one-8-spiro-5'-bicyclo[2.2.1]-2'-heptene,
2,3-(4"-phenylbenzo)cycloocten-1-one-8-spiro-5'-bicyclo[2.2.1]-2'-heptene,
2,3-(5"-phenylbenzo)cycloocten-1-one-8-spiro-5'-bicyclo[2.2.1]-2'-heptene,
2,3-(6"-phenylbenzo)cycloocten-1-one-8-spiro-5'-bicyclo[2.2.1]-2'-heptene,
2,3-(3"-chlorobenzo)cycloocten-1-one-8-spiro-5'-bicyclo[2.2.1]-2'-heptene,
2,3-(4"-chlorobenzo)cycloocten-1-one-8-spiro-5'-bicyclo[2.2.1]-2'-heptene,
2,3-(4"-chlorobenzo)cycloocten-1-one-8-spiro-5'-bicyclo[2.2.1]-2'-heptene,
2,3-(4"-chlorobenzo)cycloocten-1-one-8-spiro-5'-bicyclo[2.2.1]-2'-heptene,
2,3-(5"-chlorobenzo)cycloocten-1-one-8-spiro-5'-bicyclo[2.2.1]-2'-heptene,
2,3-(6"-chlorobenzo)cycloocten-1-one-8-spiro-5'-bicyclo[2.2.1]-2'-heptene,
2,3-(3"-aminobenzo)cycloocten-1-one-8-spiro-5'-bicyclo[2.2.1]-2'-heptene,
2,3-(4"-aminobenzo)cycloocten-1-one-8-spiro-5'-bicyclo[2.2.1]-2'-heptene,
2,3-(5"-aminobenzo)cycloocten-1-one-8-spiro-5'-bicyclo[2.2.1]-2'-heptene,
2,3-(6"-aminobenzo)cycloocten-1-one-8-spiro-5'-bicyclo[2.2.1]-2'-heptene,
2,3-(3"-methoxybenzo)cycloocten-1-one-8-spiro-5'-bicyclo[2.2.1]-2'-heptene,
2,3-(4"-methoxybenzo)cycloocten-1-one-8-spiro-5'-bicyclo[2.2.1]-2'-heptene,
2,3-(5"-methoxybenzo)cycloocten-1-one-7-spiro-5'-bicyclo[2.2.1]-2'-heptene,
2,3-(6"-methoxybenzo)cycloocten-1-one-8-spiro-5'-bicyclo[2.2.1]-2'-heptene,
3,4-benzocycloocten-1-one-2-spiro-5'-bicyclo[2.2.1]-2'-heptene,
3,4-(3"-methylbenzo)cycloocten-1-one-2-spiro-5'-bicyclo[2.2.1]-2'-heptene,
3,4-(4"-methylbenzo)cycloocten-1-one-2-spiro-5'-bicyclo[2.2.1]-2'-heptene,
3,4-(5"-methylbenzo)cycloocten-1-one-2-spiro-5'-bicyclo[2.2.1]-2'-heptene,
3,4-(6"-methylbenzo)cycloocten-1-one-2-spiro-5'-bicyclo[2.2.1]-2'-heptene,
3,4-(3"-ethylbenzo)cycloocten-1-one-2-spiro-5'-bicyclo[2.2.1]-2'-heptene,
3,4-(4"-ethylbenzo)cycloocten-1-one-2-spiro-5'-bicyclo[2.2.1]-2'-heptene,
3,4-(5"-ethylbenzo)cycloocten-1-one-2-spiro-5'-bicyclo[2.2.1]-2'-heptene,
3,4-(6"-ethylbenzo)cycloocten-1-one-2-spiro-5'-bicyclo[2.2.1]-2'-heptene,
3,4-(3"-n-propylbenzo)cycloocten-1-one-2-spiro-5'-bicyclo[2.2.1]-2'-heptene,
3,4-(4"-n-propylbenzo)cycloocten-1-one-2-spiro-5'-bicyclo[2.2.1]-2'-heptene,
3,4-(5"-n-propylbenzo)cycloocten-1-one-2-spiro-5'-bicyclo[2.2.1]-2'-heptene,
3,4-(6"-n-propylbenzo)cycloocten-1-one-2-spiro-5'-bicyclo[2.2.1]-2'-heptene,
3,4-(3"-iso-propylbenzo)cycloocten-1-one-2-spiro-5'-bicyclo[2.2.1]-2'-heptene,
3,4-(4"-iso-propylbenzo)cycloocten-1-one-2-spiro-5'-bicyclo[2.2.1]-2'-heptene,
3,4-(5"-iso-propylbenzo)cycloocten-1-one-2-spiro-5'-bicyclo[2.2.1]-2'-heptene,
3,4-(6"-iso-propylbenzo)cycloocten-1-one-2-spiro-5'-bicyclo[2.2.1]-2'-heptene,
3,4-(3"-n-butylbenzo)cycloocten-1-one-2-spiro-5'-bicyclo[2.2.1]-2'-heptene,
3,4-(4"-n-butylbenzo)cycloocten-1-one-2-spiro-5'-bicyclo[2.2.1]-2'-heptene,
3,4-(5"-n-butylbenzo)cycloocten-1-one-2-spiro-5'-bicyclo[2.2.1]-2'-heptene,
3,4-(6"-n-butylbenzo)cycloocten-1-one-2-spiro-5'-bicyclo[2.2.1]-2'-heptene,
3,4-(3"-iso-butylbenzo)cycloocten-1-one-2-spiro-5'-bicyclo[2.2.1]-2'-heptene,
3,4-(4"-iso-butylbenzo)cycloocten-1-one-2-spiro-5'-bicyclo[2.2.1]-2'-heptene,
3,4-(5"-iso-butylbenzo)cycloocten-1-one-2-spiro-5'-bicyclo[2.2.1]-2'-heptene,
3,4-(6"-iso-butylbenzo)cycloocten-1-one-2-spiro-5'-bicyclo[2.2.1]-2'-heptene,
3,4-(3"-sec-butylbenzo)cycloocten-1-one-2-spiro-5'-bicyclo[2.2.1]-2'-heptene,
3,4-(4"-sec-butylbenzo)cycloocten-1-one-2-spiro-5'-bicyclo[2.2.1]-2'-heptene, 3,4-(5"-sec-butylbenzo)cycloocten-1-one-2-spiro-5'-bicyclo[2.2.1]-2'-heptene,
3,4-(6"-sec-butylbenzo)cycloocten-1-one-2-spiro-5'-bicyclo[2.2.1]-2'-heptene,
3,4-(3"-t-butylbenzo)cycloocten-1-one-2-spiro-5'-bicyclo[2.2.1]-2'-heptene,
3,4-(4"-t-butylbenzo)cycloocten-1-one-2-spiro-5'-bicyclo[2.2.1]-2'-heptene,
3,4-(5"-t-butylbenzo)cycloocten-1-one-2-spiro-5'-bicyclo[2.2.1]-2'-heptene,
3,4-(6"-t-butylbenzo)cycloocten-1-one-2-spiro-5'-bicyclo[2.2.1]-2'-heptene,
3,4-(3"-cyclohexylbenzo)cycloocten-1-one-2-spiro-5'-bicyclo[2.2.1]-2'-heptene,
3,4-(4"-cyclohexylbenzo)cycloocten-1-one-2-spiro-5'-bicyclo[2.2.1]-2'-heptene,
3,4-(5"-cyclohexylbenzo)cyclohepten-1-one-2-spiro-5'-bicyclo[2.2.1]-2'-heptene,
3,4-(6"-cyclohexylbenzo)cycloocten-1-one-2-spiro-5'-bicyclo[2.2.1]-2'-heptene,
3,4-(3"-phenylbenzo)cycloocten-1-one-2-spiro-5'-bicyclo[2.2.1]-2'-heptene,
3,4-(4"-phenylbenzo)cycloocten-1-one-2-spiro-5'-bicyclo[2.2.1]-2'-heptene,
3,4-(5"-phenylbenzo)cycloocten-1-one-2-spiro-5'-bicyclo[2.2.1]-2'-heptene,
3,4-(6"-phenylbenzo)cycloocten-1-one-2-spiro-5'-bicyclo[2.2.1]-2'-heptene,
3,4-(3"-chlorobenzo)cycloheocten-1-one-2-spiro-5'-bicyclo[2.2.1]-2'-heptene,
3,4-(4"-chlorobenzo)cycloocten-1-one-2-spiro-5'-bicyclo[2.2.1]-2'-heptene,
3,4-(4"-chlorobenzo)cycloocten-1-one-2-spiro-5'-bicyclo[2.2.1]-2'-heptene,
3,4-(4"-chlorobenzo)cycloocten-1-one-2-spiro-5'-bicyclo[2.2.1]-2'-heptene,
3,4-(5"-chlorobenzo)cycloocten-1-one-2-spiro-5'-bicyclo[2.2.1]-2'-heptene,
3,4-(6"-chlorobenzo)cycloocten-1-one-2-spiro-5'-bicyclo[2.2.1]-2'-heptene,
3,4-(3"-aminobenzo)cycloocten-1-one-2-spiro-5'-bicyclo[2.2.1]-2'-heptene,
3,4-(4"-aminobenzo)cycloocten-1-one-2-spiro-5'-bicyclo[2.2.1]-2'-heptene,
3,4-(5"-aminobenzo)cycloocten-1-one-2-spiro-5'-bicyclo[2.2.1]-2'-heptene,
3,4-(6"-aminobenzo)cycloocten-1-one-2-spiro-5'-bicyclo[2.2.1]-2'-heptene,
3,4-(3"-methoxybenzo)cycloocten-1-one-2-spiro-5'-bicyclo[2.2.1]-2'-heptene,
3,4-(4"-methoxybenzo)cycloocten-1-one-2-spiro-5'-bicyclo[2.2.1]-2'-heptene,
3,4-(5"-methoxybenzo)cycloocten-1-one-2-spiro-5'-bicyclo[2.2.1]-2'-heptene,
3,4-(6"-methoxybenzo)cycloocten-1-one-2-spiro-5'-bicyclo[2.2.1]-2'-heptene,
3,4-benzocycloocten-1-one-5-spiro-5'-bicyclo[2.2.1]-2'-heptene,
3,4-(3"-methylbenzo)cycloocten-1-one-5-spiro-5'-bicyclo[2.2.1]-2'-heptene,
3,4-(4"-methylbenzo)cycloocten-1-one-5-spiro-5'-bicyclo[2.2.1]-2'-heptene,
3,4-(5"-methylbenzo)cycloocten-1-one-5-spiro-5'-bicyclo[2.2.1]-2'-heptene,
3,4-(6"-methylbenzo)cycloocten-1-one-5-spiro-5'-bicyclo[2.2.1]-2'-heptene,
3,4-(3"-ethylbenzo)cycloocten-1-one-5-spiro-5'-bicyclo[2.2.1]-2'-heptene,
3,4-(4"-ethylbenzo)cycloocten-1-one-5-spiro-5'-bicyclo[2.2.1]-2'-heptene,
3,4-(5"-ethylbenzo)cycloocten-1-one-5-spiro-5'-bicyclo[2.2.1]-2'-heptene,
3,4-(6"-ethylbenzo)cycloocten-1-one-5-spiro-5'-bicyclo[2.2.1]-2'-heptene,
3,4-(3"-n-propylbenzo)cycloocten-1-one-5-spiro-5'-bicyclo[2.2.1]-2'-heptene,
3,4-(4"-n-propylbenzo)cycloocten-1-one-5-spiro-5'-bicyclo[2.2.1]-2'-heptene,
3,4-(5"-n-propylbenzo)cycloocten-1-one-5-spiro-5'-bicyclo[2.2.1]-2'-heptene,
3,4-(6"-n-propylbenzo)cycloocten-1-one-5-spiro-5'-bicyclo[2.2.1]-2'-heptene,
3,4-(3"-iso-propylbenzo)cycloocten-1-one-5-spiro-5'-bicyclo[2.2.1]-2'-heptene,
3,4-(4"-iso-propylbenzo)cycloocten-1-one-5-spiro-5'-bicyclo[2.2.1]-2'-heptene,
3,4-(5"-iso-propylbenzo)cycloocten-1-one-5-spiro-5'-bicyclo[2.2.1]-2'-heptene,
3,4-(6"-iso-propylbenzo)cycloocten-1-one-5-spiro-5'-bicyclo[2.2.1]-2'-heptene,
3,4-(3"-n-butylbenzo)cycloocten-1-one-5-spiro-5'-bicyclo[2.2.1]-2'-heptene,
3,4-(4"-n-butylbenzo)cycloocten-1-one-5-spiro-5'-bicyclo[2.2.1]-2'-heptene,
3,4-(5"-n-butylbenzo)cycloocten-1-one-5-spiro-5'-bicyclo[2.2.1]-2'-heptene,
3,4-(6"-n-butylbenzo)cycloocten-1-one-5-spiro-5'-bicyclo[2.2.1]-2'-heptene,
3,4-(3"-iso-butylbenzo)cycloocten-1-one-5-spiro-5'-bicyclo[2.2.1]-2'-heptene,
3,4-(4"-iso-butylbenzo)cycloocten-1-one-5-spiro-5'-bicyclo[2.2.1]-2'-heptene,
3,4-(5"-iso-butylbenzo)cycloocten-1-one-5-spiro-5'-bicyclo[2.2.1]-2'-heptene,
3,4-(6"-iso-butylbenzo)cycloocten-1-one-5-spiro-5'-bicyclo[2.2.1]-2'-heptene,
3,4-(3"-sec-butylbenzo)cycloocten-1-one-5-spiro-5'-bicyclo[2.2.1]-2'-heptene,
3,4-(4"-sec-butylbenzo)cycloocten-1-one-5-spiro-5'-bicyclo[2.2.1]-2'-heptene,
3,4-(5"-sec-butylbenzo)cycloocten-1-one-5-spiro-5'-bicyclo[2.2.1]-2'-heptene,
3,4-(6"-sec-butylbenzo)cycloocten-1-one-5-spiro-5'-bicyclo[2.2.1]-2'-heptene,
3,4-(3"-t-butylbenzo)cycloocten-1-one-5-spiro-5'-bicyclo[2.2.1]-2'-heptene,
3,4-(4"-t-butylbenzo)cycloocten-1-one-5-spiro-5'-bicyclo[2.2.1]-2'-heptene,
3,4-(5"-t-butylbenzo)cycloocten-1-one-5-spiro-5'-bicyclo[2.2.1]-2'-heptene,
3,4-(6"-t-butylbenzo)cycloocten-1-one-5-spiro-5'-bicyclo[2.2.1]-2'-heptene,
3,4-(3"-cyclohexylbenzo)cycloocten-1-one-5-spiro-5'-bicyclo[2.2.1]-2'-heptene,
3,4-(4"-cyclohexylbenzo)cycloocten-1-one-5-spiro-5'-bicyclo[2.2.1]-2'-heptene,
3,4-(5"-cyclohexylbenzo)cyclohepten-1-one-5-spiro-5'-bicyclo[2.2.1]-2'-heptene,
3,4-(6"-cyclohexylbenzo)cycloocten-1-one-5-spiro-5'-bicyclo[2.2.1]-2'-heptene,
3,4-(3"-phenylbenzo)cycloocten-1-one-5-spiro-5'-bicyclo[2.2.1]-2'-heptene, 3,4-(4"-phenylbenzo)cycloocten-1-one-5-spiro-5'-bicyclo[2.2.1]-2'-heptene,
3,4-(5"-phenylbenzo)cycloocten-1-one-5-spiro-5'-bicyclo[2.2.1]-2'-heptene,
3,4-(6"-phenylbenzo)cycloocten-1-one-5-spiro-5'-bicyclo[2.2.1]-2'-heptene,
3,4-(3"-chlorobenzo)cycloheocten-1-one-5-spiro-5'-bicyclo[2.2.1]-2'-heptene,
3,4-(4"-chlorobenzo)cycloocten-1-one-5-spiro-5'-bicyclo[2.2.1]-2'-heptene,
3,4-(4"-chlorobenzo)cycloocten-1-one-5-spiro-5'-bicyclo[2.2.1]-2'-heptene,
3,4-(4"-chlorobenzo)cycloocten-1-one-5-spiro-5'-bicyclo[2.2.1]-2'-heptene,
3,4-(5"-chlorobenzo)cycloocten-1-one-5-spiro-5'-bicyclo[2.2.1]-2'-heptene,
3,4-(6"-chlorobenzo)cycloocten-1-one-5-spiro-5'-bicyclo[2.2.1]-2'-heptene,
3,4-(3"-aminobenzo)cycloocten-1-one-5-spiro-5'-bicyclo[2.2.1]-2'-heptene,
3,4-(4"-aminobenzo)cycloocten-1-one-5-spiro-5'-bicyclo[2.2.1]-2'-heptene,
3,4-(5"-aminobenzo)cycloocten-1-one-5-spiro-5'-bicyclo[2.2.1]-2'-heptene,
3,4-(6"-aminobenzo)cycloocten-1-one-5-spiro-5'-bicyclo[2.2.1]-2'-heptene,
3,4-(3"-methoxybenzo)cycloocten-1-one-5-spiro-5'-bicyclo[2.2.1]-2'-heptene,
3,4-(4"-methoxybenzo)cycloocten-1-one-5-spiro-5'-bicyclo[2.2.1]-2'-heptene,
3,4-(5"-methoxybenzo)cycloocten-1-one-5-spiro-5'-bicyclo[2.2.1]-2'-heptene,
3,4-(6"-methoxybenzo)cycloocten-1-one-5-spiro-5'-bicyclo[2.2.1]-2'-heptene,
3,4-benzocycloocten-1-one-6-spiro-5'-bicyclo[2.2.1]-2'-heptene,
3,4-(3"-methylbenzo)cycloocten-1-one-6-spiro-5'-bicyclo[2.2.1]-2'-heptene,
3,4-(4"-methylbenzo)cycloocten-1-one-6-spiro-5'-bicyclo[2.2.1]-2'-heptene,
3,4-(5"-methylbenzo)cycloocten-1-one-6-spiro-5'-bicyclo[2.2.1]-2'-heptene,
3,4-(6"-methylbenzo)cycloocten-1-one-6-spiro-5'-bicyclo[2.2.1]-2'-heptene,
3,4-(3"-ethylbenzo)cycloocten-1-one-6-spiro-5'-bicyclo[2.2.1]-2'-heptene,
3,4-(4"-ethylbenzo)cycloocten-1-one-6-spiro-5'-bicyclo[2.2.1]-2'-heptene,
3,4-(5"-ethylbenzo)cycloocten-1-one-6-spiro-5'-bicyclo[2.2.1]-2'-heptene,
3,4-(6"-ethylbenzo)cycloocten-1-one-6-spiro-5'-bicyclo[2.2.1]-2'-heptene,
3,4-(3"-n-propylbenzo)cycloocten-1-one-6-spiro-5'-bicyclo[2.2.1]-2'-heptene,
3,4-(4"-n-propylbenzo)cycloocten-1-one-6-spiro-5'-bicyclo[2.2.1]-2'-heptene,
3,4-(5"-n-propylbenzo)cycloocten-1-one-6-spiro-5'-bicyclo[2.2.1]-2'-heptene,
3,4-(6"-n-propylbenzo)cycloocten-1-one-6-spiro-5'-bicyclo[2.2.1]-2'-heptene,
3,4-(3"-iso-propylbenzo)cycloocten-1-one-6-spiro-5'-bicyclo[2.2.1]-2'-heptene,
3,4-(4"-iso-propylbenzo)cycloocten-1-one-6-spiro-5'-bicyclo[2.2.1]-2'-heptene,
3,4-(5"-iso-propylbenzo)cycloocten-1-one-6-spiro-5'-bicyclo[2.2.1]-2'-heptene,
3,4-(6"-iso-propylbenzo)cycloocten-1-one-6-spiro-5'-bicyclo[2.2.1]-2'-heptene,
3,4-(3"-n-butylbenzo)cycloocten-1-one-6-spiro-5'-bicyclo[2.2.1]-2'-heptene,
3,4-(4"-n-butylbenzo)cycloocten-1-one-6-spiro-5'-bicyclo[2.2.1]-2'-heptene,
3,4-(5"-n-butylbenzo)cycloocten-1-one-6-spiro-5'-bicyclo[2.2.1]-2'-heptene,
3,4-(6"-n-butylbenzo)cycloocten-1-one-6-spiro-5'-bicyclo[2.2.1]-2'-heptene,
3,4-(3"-iso-butylbenzo)cycloocten-1-one-6-spiro-5'-bicyclo[2.2.1]-2'-heptene,
3,4-(4"-iso-butylbenzo)cycloocten-1-one-6-spiro-5'-bicyclo[2.2.1]-2'-heptene,
3,4-(5"-iso-butylbenzo)cycloocten-1-one-6-spiro-5'-bicyclo[2.2.1]-2'-heptene,
3,4-(6"-iso-butylbenzo)cycloocten-1-one-6-spiro-5'-bicyclo[2.2.1]-2'-heptene,
3,4-(3"-sec-butylbenzo)cycloocten-1-one-6-spiro-5'-bicyclo[2.2.1]-2'-heptene,
3,4-(4"-sec-butylbenzo)cycloocten-1-one-6-spiro-5'-bicyclo[2.2.1]-2'-heptene,
3,4-(5"-sec-butylbenzo)cycloocten-1-one-6-spiro-5'-bicyclo[2.2.1]-2'-heptene,
3,4-(6"-sec-butylbenzo)cycloocten-1-one-6-spiro-5'-bicyclo[2.2.1]-2'-heptene,
3,4-(3"-t-butylbenzo)cycloocten-1-one-6-spiro-5'-bicyclo[2.2.1]-2'-heptene,
3,4-(4"-t-butylbenzo)cycloocten-1-one-6-spiro-5'-bicyclo[2.2.1]-2'-heptene,
3,4-(5"-t-butylbenzo)cycloocten-1-one-6-spiro-5'-bicyclo[2.2.1]-2'-heptene,
3,4-(6"-t-butylbenzo)cycloocten-1-one-6-spiro-5'-bicyclo[2.2.1]-2'-heptene,
3,4-(3"-cyclohexylbenzo)cycloocten-1-one-6-spiro-5'-bicyclo[2.2.1]-2'-heptene,
3,4-(4"-cyclohexylbenzo)cycloocten-1-one-6-spiro-5'-bicyclo[2.2.1]-2'-heptene,
3,4-(5"-cyclohexylbenzo)cyclohepten-1-one-6-spiro-5'-bicyclo[2.2.1]-2'-heptene,
3,4-(6"-cyclohexylbenzo)cycloocten-1-one-6-spiro-5'-bicyclo[2.2.1]-2'-heptene,
3,4-(3"-phenylbenzo)cycloocten-1-one-6-spiro-5'-bicyclo[2.2.1]-2'-heptene,
3,4-(4"-phenylbenzo)cycloocten-1-one-6-spiro-5'-bicyclo[2.2.1]-2'-heptene,
3,4-(5"-phenylbenzo)cycloocten-1-one-6-spiro-5'-bicyclo[2.2.1]-2'-heptene,
3,4-(6"-phenylbenzo)cycloocten-1-one-6-spiro-5'-bicyclo[2.2.1]-2'-heptene,
3,4-(3"-chlorobenzo)cycloheocten-1-one-6-spiro-5'-bicyclo[2.2.1]-2'-heptene,
3,4-(4"-chlorobenzo)cycloocten-1-one-6-spiro-5'-bicyclo[2.2.1]-2'-heptene,
3,4-(4"-chlorobenzo)cycloocten-1-one-6-spiro-5'-bicyclo[2.2.1]-2'-heptene,
3,4-(4"-chlorobenzo)cycloocten-1-one-6-spiro-5'-bicyclo[2.2.1]-2'-heptene,
3,4-(5"-chlorobenzo)cycloocten-1-one-6-spiro-5'-bicyclo[2.2.1]-2'-heptene,
3,4-(6"-chlorobenzo)cycloocten-1-one-6-spiro-5'-bicyclo[2.2.1]-2'-heptene,
3,4-(3"-aminobenzo)cycloocten-1-one-6-spiro-5'-bicyclo[2.2.1]-2'-heptene,
3,4-(4"-aminobenzo)cycloocten-1-one-6-spiro-5'-bicyclo[2.2.1]-2'-heptene, 3,4-(5"-aminobenzo)cycloocten-1-one-6-spiro-5'-bicyclo[2.2.1]-2'-heptene,
3,4-(6"-aminobenzo)cycloocten-1-one-6-spiro-5'-bicyclo[2.2.1]-2'-heptene,
3,4-(3"-methoxybenzo)cycloocten-1-one-6-spiro-5'-bicyclo[2.2.1]-2'-heptene,
3,4-(4"-methoxybenzo)cycloocten-1-one-6-spiro-5'-bicyclo[2.2.1]-2'-heptene,
3,4-(5"-methoxybenzo)cycloocten-1-one-6-spiro-5'-bicyclo[2.2.1]-2'-heptene,
3,4-(6"-methoxybenzo)cycloocten-1-one-6-spiro-5'-bicyclo[2.2.1]-2'-heptene 3,4-benzocycloocten-1-one-7-spiro-5'-bicyclo[2.2.1]-2'-heptene,
3,4-(3"-methylbenzo)cycloocten-1-one-7-spiro-5'-bicyclo[2.2.1]-2'-heptene,
3,4-(4"-methylbenzo)cycloocten-1-one-7-spiro-5'-bicyclo[2.2.1]-2'-heptene,
3,4-(5"-methylbenzo)cycloocten-1-one-7-spiro-5'-bicyclo[2.2.1]-2'-heptene,
3,4-(6"-methylbenzo)cycloocten-1-one-7-spiro-5'-bicyclo[2.2.1]-2'-heptene,
3,4-(3"-ethylbenzo)cycloocten-1-one-7-spiro-5'-bicyclo[2.2.1]-2'-heptene,
3,4-(4"-ethylbenzo)cycloocten-1-one-7-spiro-5'-bicyclo[2.2.1]-2'-heptene,
3,4-(5"-ethylbenzo)cycloocten-1-one-7-spiro-5'-bicyclo[2.2.1]-2'-heptene,
3,4-(6"-ethylbenzo)cycloocten-1-one-7-spiro-5'-bicyclo[2.2.1]-2'-heptene,
3,4-(3"-n-propylbenzo)cycloocten-1-one-7-spiro-5'-bicyclo[2.2.1]-2'-heptene,
3,4-(4"-n-propylbenzo)cycloocten-1-one-7-spiro-5'-bicyclo[2.2.1]-2'-heptene,
3,4-(5"-n-propylbenzo)cycloocten-1-one-7-spiro-5'-bicyclo[2.2.1]-2'-heptene,
3,4-(6"-n-propylbenzo)cycloocten-1-one-7-spiro-5'-bicyclo[2.2.1]-2'-heptene,
3,4-(3"-iso-propylbenzo)cycloocten-1-one-7-spiro-5'-bicyclo[2.2.1]-2'-heptene,
3,4-(4"-iso-propylbenzo)cycloocten-1-one-7-spiro-5'-bicyclo[2.2.1]-2'-heptene,
3,4-(5"-iso-propylbenzo)cycloocten-1-one-7-spiro-5'-bicyclo[2.2.1]-2'-heptene,
3,4-(6"-iso-propylbenzo)cycloocten-1-one-7-spiro-5'-bicyclo[2.2.1]-2'-heptene,
3,4-(3"-n-butylbenzo)cycloocten-1-one-7-spiro-5'-bicyclo[2.2.1]-2'-heptene,
3,4-(4"-n-butylbenzo)cycloocten-1-one-7-spiro-5'-bicyclo[2.2.1]-2'-heptene,
3,4-(5"-n-butylbenzo)cycloocten-1-one-7-spiro-5'-bicyclo[2.2.1]-2'-heptene,
3,4-(6"-n-butylbenzo)cycloocten-1-one-7-spiro-5'-bicyclo[2.2.1]-2'-heptene,
3,4-(3"-iso-butylbenzo)cycloocten-1-one-7-spiro-5'-bicyclo[2.2.1]-2'-heptene,
3,4-(4"-iso-butylbenzo)cycloocten-1-one-7-spiro-5'-bicyclo[2.2.1]-2'-heptene,
3,4-(5"-iso-butylbenzo)cycloocten-1-one-7-spiro-5'-bicyclo[2.2.1]-2'-heptene,
3,4-(6"-iso-butylbenzo)cycloocten-1-one-7-spiro-5'-bicyclo[2.2.1]-2'-heptene,
3,4-(3"-sec-butylbenzo)cycloocten-1-one-7-spiro-5'-bicyclo[2.2.1]-2'-heptene,
3,4-(4"-sec-butylbenzo)cycloocten-1-one-7-spiro-5'-bicyclo[2.2.1]-2'-heptene,
3,4-(5"-sec-butylbenzo)cycloocten-1-one-7-spiro-5'-bicyclo[2.2.1]-2'-heptene,
3,4-(6"-sec-butylbenzo)cycloocten-1-one-7-spiro-5'-bicyclo[2.2.1]-2'-heptene,
3,4-(3"-t-butylbenzo)cycloocten-1-one-7-spiro-5'-bicyclo[2.2.1]-2'-heptene,
3,4-(4"-t-butylbenzo)cycloocten-1-one-7-spiro-5'-bicyclo[2.2.1]-2'-heptene,
3,4-(5"-t-butylbenzo)cycloocten-1-one-7-spiro-5'-bicyclo[2.2.1]-2'-heptene,
3,4-(6"-t-butylbenzo)cycloocten-1-one-7-spiro-5'-bicyclo[2.2.1]-2'-heptene,
3,4-(3"-cyclohexylbenzo)cycloocten-1-one-7-spiro-5'-bicyclo[2.2.1]-2'-heptene,
3,4-(4"-cyclohexylbenzo)cycloocten-1-one-7-spiro-5'-bicyclo[2.2.1]-2'-heptene,
3,4-(5"-cyclohexylbenzo)cyclohepten-1-one-7-spiro-5'-bicyclo[2.2.1]-2'-heptene,
3,4-(6"-cyclohexylbenzo)cycloocten-1-one-7-spiro-5'-bicyclo[2.2.1]-2'-heptene,
3,4-(3"-phenylbenzo)cycloocten-1-one-7-spiro-5'-bicyclo[2.2.1]-2'-heptene,
3,4-(4"-phenylbenzo)cycloocten-1-one-7-spiro-5'-bicyclo[2.2.1]-2'-heptene,
3,4-(5"-phenylbenzo)cycloocten-1-one-7-spiro-5'-bicyclo[2.2.1]-2'-heptene,
3,4-(6"-phenylbenzo)cycloocten-1-one-7-spiro-5'-bicyclo[2.2.1]-2'-heptene,
3,4-(3"-chlorobenzo)cycloheocten-1-one-7-spiro-5'-bicyclo[2.2.1]-2'-heptene,
3,4-(4"-chlorobenzo)cycloocten-1-one-7-spiro-5'-bicyclo[2.2.1]-2'-heptene,
3,4-(4"-chlorobenzo)cycloocten-1-one-7-spiro-5'-bicyclo[2.2.1]-2'-heptene,
3,4-(4"-chlorobenzo)cycloocten-1-one-7-spiro-5'-bicyclo[2.2.1]-2'-heptene,
3,4-(5"-chlorobenzo)cycloocten-1-one-7-spiro-5'-bicyclo[2.2.1]-2'-heptene,
3,4-(6"-chlorobenzo)cycloocten-1-one-7-spiro-5'-bicyclo[2.2.1]-2'-heptene,
3,4-(3"-aminobenzo)cycloocten-1-one-7-spiro-5'-bicyclo[2.2.1]-2'-heptene,
3,4-(4"-aminobenzo)cycloocten-1-one-7-spiro-5'-bicyclo[2.2.1]-2'-heptene,
3,4-(5"-aminobenzo)cycloocten-1-one-7-spiro-5'-bicyclo[2.2.1]-2'-heptene,
3,4-(6"-aminobenzo)cycloocten-1-one-7-spiro-5'-bicyclo[2.2.1]-2'-heptene,
3,4-(3"-methoxybenzo)cycloocten-1-one-7-spiro-5'-bicyclo[2.2.1]-2'-heptene,
3,4-(4"-methoxybenzo)cycloocten-1-one-7-spiro-5'-bicyclo[2.2.1]-2'-heptene,
3,4-(5"-methoxybenzo)cycloocten-1-one-7-spiro-5'-bicyclo[2.2.1]-2'-heptene,
3,4-(6"-methoxybenzo)cycloocten-1-one-7-spiro-5'-bicyclo[2.2.1]-2'-heptene,
3,4-benzocycloocten-1-one-8-spiro-5'-bicyclo[2.2.1]-2'-heptene,
3,4-(3"-methylbenzo)cycloocten-1-one-8-spiro-5'-bicyclo[2.2.1]-2'-heptene,
3,4-(4"-methylbenzo)cycloocten-1-one-8-spiro-5'-bicyclo[2.2.1]-2'-heptene,
3,4-(5"-methylbenzo)cycloocten-1-one-8-spiro-5'-bicyclo[2.2.1]-2'-heptene,
3,4-(6"-methylbenzo)cycloocten-1-one-8-spiro-5'-bicyclo[2.2.1]-2'-heptene,
3,4-(3"-ethylbenzo)cycloocten-1-one-8-spiro-5'-bicyclo[2.2.1]-2'-heptene, 3,4-(4"-ethylbenzo)cycloocten-1-one-8-spiro-5'-bicyclo[2.2.1]-2'-heptene,
3,4-(5"-ethylbenzo)cycloocten-1-one-8-spiro-5'-bicyclo[2.2.1]-2'-heptene,
3,4-(6"-ethylbenzo)cycloocten-1-one-8-spiro-5'-bicyclo[2.2.1]-2'-heptene,
3,4-(3"-n-propylbenzo)cycloocten-1-one-8-spiro-5'-bicyclo[2.2.1]-2'-heptene,
3,4-(4"-n-propylbenzo)cycloocten-1-one-8-spiro-5'-bicyclo[2.2.1]-2'-heptene,
3,4-(5"-n-propylbenzo)cycloocten-1-one-8-spiro-5'-bicyclo[2.2.1]-2'-heptene,
3,4-(6"-n-propylbenzo)cycloocten-1-one-8-spiro-5'-bicyclo[2.2.1]-2'-heptene,
3,4-(3"-iso-propylbenzo)cycloocten-1-one-8-spiro-5'-bicyclo[2.2.1]-2'-heptene,
3,4-(4"-iso-propylbenzo)cycloocten-1-one-8-spiro-5'-bicyclo[2.2.1]-2'-heptene,
3,4-(5"-iso-propylbenzo)cycloocten-1-one-8-spiro-5'-bicyclo[2.2.1]-2'-heptene,
3,4-(6"-iso-propylbenzo)cycloocten-1-one-8-spiro-5'-bicyclo[2.2.1]-2'-heptene,
3,4-(3"-n-butylbenzo)cycloocten-1-one-8-spiro-5'-bicyclo[2.2.1]-2'-heptene,
3,4-(4"-n-butylbenzo)cycloocten-1-one-8-spiro-5'-bicyclo[2.2.1]-2'-heptene,
3,4-(5"-n-butylbenzo)cycloocten-1-one-8-spiro-5'-bicyclo[2.2.1]-2'-heptene,
3,4-(6"-n-butylbenzo)cycloocten-1-one-8-spiro-5'-bicyclo[2.2.1]-2'-heptene,
3,4-(3"-iso-butylbenzo)cycloocten-1-one-8-spiro-5'-bicyclo[2.2.1]-2'-heptene,
3,4-(4"-iso-butylbenzo)cycloocten-1-one-8-spiro-5'-bicyclo[2.2.1]-2'-heptene,
3,4-(5"-iso-butylbenzo)cycloocten-1-one-8-spiro-5'-bicyclo[2.2.1]-2'-heptene,
3,4-(6"-iso-butylbenzo)cycloocten-1-one-8-spiro-5'-bicyclo[2.2.1]-2'-heptene,
3,4-(3"-sec-butylbenzo)cycloocten-1-one-8-spiro-5'-bicyclo[2.2.1]-2'-heptene,
3,4-(4"-sec-butylbenzo)cycloocten-1-one-8-spiro-5'-bicyclo[2.2.1]-2'-heptene,
3,4-(5"-sec-butylbenzo)cycloocten-1-one-8-spiro-5'-bicyclo[2.2.1]-2'-heptene,
3,4-(6"-sec-butylbenzo)cycloocten-1-one-8-spiro-5'-bicyclo[2.2.1]-2'-heptene,
3,4-(3"-t-butylbenzo)cycloocten-1-one-8-spiro-5'-bicyclo[2.2.1]-2'-heptene,
3,4-(4"-t-butylbenzo)cycloocten-1-one-8-spiro-5'-bicyclo[2.2.1]-2'-heptene,
3,4-(5"-t-butylbenzo)cycloocten-1-one-8-spiro-5'-bicyclo[2.2.1]-2'-heptene,
3,4-(6"-t-butylbenzo)cycloocten-1-one-8-spiro-5'-bicyclo[2.2.1]-2'-heptene,
3,4-(3"-cyclohexylbenzo)cycloocten-1-one-8-spiro-5'-bicyclo[2.2.1]-2'-heptene,
3,4-(4"-cyclohexylbenzo)cycloocten-1-one-8-spiro-5'-bicyclo[2.2.1]-2'-heptene,
3,4-(5"-cyclohexylbenzo)cyclohepten-1-one-8-spiro-5'-bicyclo[2.2.1]-2'-heptene,
3,4-(6"-cyclohexylbenzo)cycloocten-1-one-8-spiro-5'-bicyclo[2.2.1]-2'-heptene,
3,4-(3"-phenylbenzo)cycloocten-1-one-8-spiro-5'-bicyclo[2.2.1]-2'-heptene,
3,4-(4"-phenylbenzo)cycloocten-1-one-8-spiro-5'-bicyclo[2.2.1]-2'-heptene,
3,4-(5"-phenylbenzo)cycloocten-1-one-8-spiro-5'-bicyclo[2.2.1]-2'-heptene,
3,4-(6"-phenylbenzo)cycloocten-1-one-8-spiro-5'-bicyclo[2.2.1]-2'-heptene,
3,4-(3"-chlorobenzo)cycloheocten-1-one-8-spiro-5'-bicyclo[2.2.1]-2'-heptene,
3,4-(4"-chlorobenzo)cycloocten-1-one-8-spiro-5'-bicyclo[2.2.1]-2'-heptene,
3,4-(4"-chlorobenzo)cycloocten-1-one-8-spiro-5'-bicyclo[2.2.1]-2'-heptene,
3,4-(4"-chlorobenzo)cycloocten-1-one-8-spiro-5'-bicyclo[2.2.1]-2'-heptene,
3,4-(5"-chlorobenzo)cycloocten-1-one-8-spiro-5'-bicyclo[2.2.1]-2'-heptene,
3,4-(6"-chlorobenzo)cycloocten-1-one-8-spiro-5'-bicyclo[2.2.1]-2'-heptene,
3,4-(3"-aminobenzo)cycloocten-1-one-8-spiro-5'-bicyclo[2.2.1]-2'-heptene,
3,4-(4"-aminobenzo)cycloocten-1-one-8-spiro-5'-bicyclo[2.2.1]-2'-heptene,
3,4-(5"-aminobenzo)cycloocten-1-one-6-spiro-5'-bicyclo[2.2.1]-2'-heptene,
3,4-(6"-aminobenzo)cycloocten-1-one-8-spiro-5'-bicyclo[2.2.1]-2'-heptene,
3,4-(3"-methoxybenzo)cycloocten-1-one-8-spiro-5'-bicyclo[2.2.1]-2'-heptene,
3,4-(4"-methoxybenzo)cycloocten-1-one-8-spiro-5'-bicyclo[2.2.1]-2'-heptene,
3,4-(5"-methoxybenzo)cycloocten-1-one-8-spiro-5'-bicyclo[2.2.1]-2'-heptene,
3,4-(6"-methoxybenzo)cycloocten-1-one-8-spiro-5'-bicyclo[2.2.1]-2'-heptene,
4,5-benzocycloocten-1-one-2-spiro-5'-bicyclo[2.2.1]-2'-heptene,
4,5-(3"-methylbenzo)cycloocten-1-one-2-spiro-5'-bicyclo[2.2.1]-2'-heptene,
4,5-(4"-methylbenzo)cycloocten-1-one-2-spiro-5'-bicyclo[2.2.1]-2'-heptene,
4,5-(5"-methylbenzo)cycloocten-1-one-2-spiro-5'-bicyclo[2.2.1]-2'-heptene,
4,5-(6"-methylbenzo)cycloocten-1-one-2-spiro-5'-bicyclo[2.2.1]-2'-heptene,
4,5-(3"-ethylbenzo)cycloocten-1-one-2-spiro-5'-bicyclo[2.2.1]-2'-heptene,
4,5-(4"-ethylbenzo)cycloocten-1-one-2-spiro-5'-bicyclo[2.2.1]-2'-heptene,
4,5-(5"-ethylbenzo)cycloocten-1-one-2-spiro-5'-bicyclo[2.2.1]-2'-heptene,
4,5-(6"-ethylbenzo)cycloocten-1-one-2-spiro-5'-bicyclo[2.2.1]-2'-heptene,
4,5-(3"-n-propylbenzo)cycloocten-1-one-2-spiro-5'-bicyclo[2.2.1]-2'-heptene,
4,5-(4"-n-propylbenzo)cycloocten-1-one-2-spiro-5'-bicyclo[2.2.1]-2'-heptene,
4,5-(5"-n-propylbenzo)cycloocten-1-one-2-spiro-5'-bicyclo[2.2.1]-2'-heptene,
4,5-(6"-n-propylbenzo)cycloocten-1-one-2-spiro-5'-bicyclo[2.2.1]-2'-heptene,
4,5-(3"-iso-propylbenzo)cycloocten-1-one-2-spiro-5'-bicyclo[2.2.1]-2'-heptene,
4,5-(4"-iso-propylbenzo)cycloocten-1-one-2-spiro-5'-bicyclo[2.2.1]-2'-heptene,
4,5-(5"-iso-propylbenzo)cycloocten-1-one-2-spiro-5'-bicyclo[2.2.1]-2'-heptene,
4,5-(6"-iso-propylbenzo)cycloocten-1-one-2-spiro-5'-bicyclo[2.2.1]-2'-heptene, 4,5-(3"-n-butylbenzo)cycloocten-1-one-2-spiro-5'-bicyclo[2.2.1]-2'-heptene,
4,5-(4"-n-butylbenzo)cycloocten-1-one-2-spiro-5'-bicyclo[2.2.1]-2'-heptene,
4,5-(5"-n-butylbenzo)cycloocten-1-one-2-spiro-5'-bicyclo[2.2.1]-2'-heptene,
4,5-(6"-n-butylbenzo)cycloocten-1-one-2-spiro-5'-bicyclo[2.2.1]-2'-heptene,
4,5-(3"-iso-butylbenzo)cycloocten-1-one-2-spiro-5'-bicyclo[2.2.1]-2'-heptene,
4,5-(4"-iso-butylbenzo)cycloocten-1-one-2-spiro-5'-bicyclo[2.2.1]-2'-heptene,
4,5-(5"-iso-butylbenzo)cycloocten-1-one-2-spiro-5'-bicyclo[2.2.1]-2'-heptene,
4,5-(6"-iso-butylbenzo)cycloocten-1-one-2-spiro-5'-bicyclo[2.2.1]-2'-heptene,
4,5-(3"-sec-butylbenzo)cycloocten-1-one-2-spiro-5'-bicyclo[2.2.1]-2'-heptene,
4,5-(4"-sec-butylbenzo)cycloocten-1-one-2-spiro-5'-bicyclo[2.2.1]-2'-heptene,
4,5-(5"-sec-butylbenzo)cycloocten-1-one-2-spiro-5'-bicyclo[2.2.1]-2'-heptene,
4,5-(6"-sec-butylbenzo)cycloocten-1-one-2-spiro-5'-bicyclo[2.2.1]-2'-heptene,
4,5-(3"-t-butylbenzo)cycloocten-1-one-2-spiro-5'-bicyclo[2.2.1]-2'-heptene,
4,5-(4"-t-butylbenzo)cycloocten-1-one-2-spiro-5'-bicyclo[2.2.1]-2'-heptene,
4,5-(5"-t-butylbenzo)cycloocten-1-one-2-spiro-5'-bicyclo[2.2.1]-2'-heptene,
4,5-(6"-t-butylbenzo)cycloocten-1-one-2-spiro-5'-bicyclo[2.2.1]-2'-heptene,
4,5-(3"-cyclohexylbenzo)cycloocten-1-one-2-spiro-5'-bicyclo[2.2.1]-2'-heptene,
4,5-(4"-cyclohexylbenzo)cycloocten-1-one-2-spiro-5'-bicyclo[2.2.1]-2'-heptene,
4,5-(5"-cyclohexylbenzo)cyclohepten-1-one-2-spiro-5'-bicyclo[2.2.1]-2'-heptene,
4,5-(6"-cyclohexylbenzo)cycloocten-1-one-2-spiro-5'-bicyclo[2.2.1]-2'-heptene,
4,5-(3"-phenylbenzo)cycloocten-1-one-2-spiro-5'-bicyclo[2.2.1]-2'-heptene,
4,5-(4"-phenylbenzo)cycloocten-1-one-2-spiro-5'-bicyclo[2.2.1]-2'-heptene,
4,5-(5"-phenylbenzo)cycloocten-1-one-2-spiro-5'-bicyclo[2.2.1]-2'-heptene,
4,5-(6"-phenylbenzo)cycloocten-1-one-2-spiro-5'-bicyclo[2.2.1]-2'-heptene,
4,5-(3"-chlorobenzo)cycloheocten-1-one-2-spiro-5'-bicyclo[2.2.1]-2'-heptene,
4,5-(4"-chlorobenzo)cycloocten-1-one-2-spiro-5'-bicyclo[2.2.1]-2'-heptene,
4,5-(4"-chlorobenzo)cycloocten-1-one-2-spiro-5'-bicyclo[2.2.1]-2'-heptene,
4,5-(4"-chlorobenzo)cycloocten-1-one-2-spiro-5'-bicyclo[2.2.1]-2'-heptene,
4,5-(5"-chlorobenzo)cycloocten-1-one-2-spiro-5'-bicyclo[2.2.1]-2'-heptene,
4,5-(6"-chlorobenzo)cycloocten-1-one-2-spiro-5'-bicyclo[2.2.1]-2'-heptene,
4,5-(3"-aminobenzo)cycloocten-1-one-2-spiro-5'-bicyclo[2.2.1]-2'-heptene,
4,5-(4"-aminobenzo)cycloocten-1-one-2-spiro-5'-bicyclo[2.2.1]-2'-heptene,
4,5-(5"-aminobenzo)cycloocten-1-one-2-spiro-5'-bicyclo[2.2.1]-2'-heptene,
4,5-(6"-aminobenzo)cycloocten-1-one-2-spiro-5'-bicyclo[2.2.1]-2'-heptene,
4,5-(3"-methoxybenzo)cycloocten-1-one-2-spiro-5'-bicyclo[2.2.1]-2'-heptene,
4,5-(4"-methoxybenzo)cycloocten-1-one-2-spiro-5'-bicyclo[2.2.1]-2'-heptene,
4,5-(5"-methoxybenzo)cycloocten-1-one-2-spiro-5'-bicyclo[2.2.1]-2'-heptene,
4,5-(6"-methoxybenzo)cycloocten-1-one-2-spiro-5'-bicyclo[2.2.1]-2'-heptene,
4,5-benzocycloocten-1-one-3-spiro-5'-bicyclo[2.2.1]-2'-heptene,
4,5-(3"-methylbenzo)cycloocten-1-one-3-spiro-5'-bicyclo[2.2.1]-2'-heptene,
4,5-(4"-methylbenzo)cycloocten-1-one-3-spiro-5'-bicyclo[2.2.1]-2'-heptene,
4,5-(5"-methylbenzo)cycloocten-1-one-3-spiro-5'-bicyclo[2.2.1]-2'-heptene,
4,5-(6"-methylbenzo)cycloocten-1-one-3-spiro-5'-bicyclo[2.2.1]-2'-heptene,
4,5-(3"-ethylbenzo)cycloocten-1-one-3-spiro-5'-bicyclo[2.2.1]-2'-heptene,
4,5-(4"-ethylbenzo)cycloocten-1-one-3-spiro-5'-bicyclo[2.2.1]-2'-heptene,
4,5-(5"-ethylbenzo)cycloocten-1-one-3-spiro-5'-bicyclo[2.2.1]-2'-heptene,
4,5-(6"-ethylbenzo)cycloocten-1-one-3-spiro-5'-bicyclo[2.2.1]-2'-heptene,
4,5-(3"-n-propylbenzo)cycloocten-1-one-3-spiro-5'-bicyclo[2.2.1]-2'-heptene,
4,5-(4"-n-propylbenzo)cycloocten-1-one-3-spiro-5'-bicyclo[2.2.1]-2'-heptene,
4,5-(5"-n-propylbenzo)cycloocten-1-one-3-spiro-5'-bicyclo[2.2.1]-2'-heptene,
4,5-(6"-n-propylbenzo)cycloocten-1-one-3-spiro-5'-bicyclo[2.2.1]-2'-heptene,
4,5-(3"-iso-propylbenzo)cycloocten-1-one-3-spiro-5'-bicyclo[2.2.1]-2'-heptene,
4,5-(4"-iso-propylbenzo)cycloocten-1-one-3-spiro-5'-bicyclo[2.2.1]-2'-heptene,
4,5-(5"-iso-propylbenzo)cycloocten-1-one-3-spiro-5'-bicyclo[2.2.1]-2'-heptene,
4,5-(6"-iso-propylbenzo)cycloocten-1-one-3-spiro-5'-bicyclo[2.2.1]-2'-heptene,
4,5-(3"-n-butylbenzo)cycloocten-1-one-3-spiro-5'-bicyclo[2.2.1]-2'-heptene,
4,5-(4"-n-butylbenzo)cycloocten-1-one-3-spiro-5'-bicyclo[2.2.1]-2'-heptene,
4,5-(5"-n-butylbenzo)cycloocten-1-one-3-spiro-5'-bicyclo[2.2.1]-2'-heptene,
4,5-(6"-n-butylbenzo)cycloocten-1-one-3-spiro-5'-bicyclo[2.2.1]-2'-heptene,
4,5-(3"-iso-butylbenzo)cycloocten-1-one-3-spiro-5'-bicyclo[2.2.1]-2'-heptene,
4,5-(4"-iso-butylbenzo)cycloocten-1-one-3-spiro-5'-bicyclo[2.2.1]-2'-heptene,
4,5-(5"-iso-butylbenzo)cycloocten-1-one-3-spiro-5'-bicyclo[2.2.1]-2'-heptene,
4,5-(6"-iso-butylbenzo)cycloocten-1-one-3-spiro-5'-bicyclo[2.2.1]-2'-heptene,
4,5-(3"-sec-butylbenzo)cycloocten-1-one-3-spiro-5'-bicyclo[2.2.1]-2'-heptene,
4,5-(4"-sec-butylbenzo)cycloocten-1-one-3-spiro-5'-bicyclo[2.2.1]-2'-heptene,
4,5-(5"-sec-butylbenzo)cycloocten-1-one-3-spiro-5'-bicyclo[2.2.1]-2'-heptene, 4,5-(6"-sec-butylbenzo)cycloocten-1-one-3-spiro-5'-bicyclo[2.2.1]-2'-heptene,
4,5-(3"-t-butylbenzo)cycloocten-1-one-3-spiro-5'-bicyclo[2.2.1]-2'-heptene,
4,5-(4"-t-butylbenzo)cycloocten-1-one-3-spiro-5'-bicyclo[2.2.1]-2'-heptene,
4,5-(5"-t-butylbenzo)cycloocten-1-one-3-spiro-5'-bicyclo[2.2.1]-2'-heptene,
4,5-(6"-t-butylbenzo)cycloocten-1-one-3-spiro-5'-bicyclo[2.2.1]-2'-heptene,
4,5-(3"-cyclohexylbenzo)cycloocten-1-one-3-spiro-5'-bicyclo[2.2.1]-2'-heptene,
4,5-(4"-cyclohexylbenzo)cycloocten-1-one-3-spiro-5'-bicyclo[2.2.1]-2'-heptene,
4,5-(5"-cyclohexylbenzo)cyclohepten-1-one-3-spiro-5'-bicyclo[2.2.1]-2'-heptene,
4,5-(6"-cyclohexylbenzo)cycloocten-1-one-3-spiro-5'-bicyclo[2.2.1]-2'-heptene,
4,5-(3"-phenylbenzo)cycloocten-1-one-3-spiro-5'-bicyclo[2.2.1]-2'-heptene,
4,5-(4"-phenylbenzo)cycloocten-1-one-3-spiro-5'-bicyclo[2.2.1]-2'-heptene,
4,5-(5"-phenylbenzo)cycloocten-1-one-3-spiro-5'-bicyclo[2.2.1]-2'-heptene,
4,5-(6"-phenylbenzo)cycloocten-1-one-3-spiro-5'-bicyclo[2.2.1]-2'-heptene,
4,5-(3"-chlorobenzo)cycloheocten-1-one-3-spiro-5'-bicyclo[2.2.1]-2'-heptene,
4,5-(4"-chlorobenzo)cycloocten-1-one-3-spiro-5'-bicyclo[2.2.1]-2'-heptene,
4,5-(4"-chlorobenzo)cycloocten-1-one-3-spiro-5'-bicyclo[2.2.1]-2'-heptene,
4,5-(4"-chlorobenzo)cycloocten-1-one-3-spiro-5'-bicyclo[2.2.1]-2'-heptene,
4,5-(5"-chlorobenzo)cycloocten-1-one-3-spiro-5'-bicyclo[2.2.1]-2'-heptene,
4,5-(6"-chlorobenzo)cycloocten-1-one-3-spiro-5'-bicyclo[2.2.1]-2'-heptene,
4,5-(3"-aminobenzo)cycloocten-1-one-3-spiro-5'-bicyclo[2.2.1]-2'-heptene,
4,5-(4"-aminobenzo)cycloocten-1-one-3-spiro-5'-bicyclo[2.2.1]-2'-heptene,
4,5-(5"-aminobenzo)cycloocten-1-one-3-spiro-5'-bicyclo[2.2.1]-2'-heptene,
4,5-(6"-aminobenzo)cycloocten-1-one-3-spiro-5'-bicyclo[2.2.1]-2'-heptene,
4,5-(3"-methoxybenzo)cycloocten-1-one-3-spiro-5'-bicyclo[2.2.1]-2'-heptene,
4,5-(4"-methoxybenzo)cycloocten-1-one-3-spiro-5'-bicyclo[2.2.1]-2'-heptene,
4,5-(5"-methoxybenzo)cycloocten-1-one-3-spiro-5'-bicyclo[2.2.1]-2'-heptene,
4,5-(6"-methoxybenzo)cycloocten-1-one-3-spiro-5'-bicyclo[2.2.1]-2'-heptene,
4,5-benzocycloocten-1-one-6-spiro-5'-bicyclo[2.2.1]-2'-heptene,
4,5-(3"-methylbenzo)cycloocten-1-one-6-spiro-5'-bicyclo[2.2.1]-2'-heptene,
4,5-(4"-methylbenzo)cycloocten-1-one-6-spiro-5'-bicyclo[2.2.1]-2'-heptene,
4,5-(5"-methylbenzo)cycloocten-1-one-6-spiro-5'-bicyclo[2.2.1]-2'-heptene,
4,5-(6"-methylbenzo)cycloocten-1-one-6-spiro-5'-bicyclo[2.2.1]-2'-heptene,
4,5-(3"-ethylbenzo)cycloocten-1-one-6-spiro-5'-bicyclo[2.2.1]-2'-heptene,
4,5-(4"-ethylbenzo)cycloocten-1-one-6-spiro-5'-bicyclo[2.2.1]-2'-heptene,
4,5-(5"-ethylbenzo)cycloocten-1-one-6-spiro-5'-bicyclo[2.2.1]-2'-heptene,
4,5-(6"-ethylbenzo)cycloocten-1-one-6-spiro-5'-bicyclo[2.2.1]-2'-heptene,
4,5-(3"-n-propylbenzo)cycloocten-1-one-6-spiro-5'-bicyclo[2.2.1]-2'-heptene,
4,5-(4"-n-propylbenzo)cycloocten-1-one-6-spiro-5'-bicyclo[2.2.1]-2'-heptene,
4,5-(5"-n-propylbenzo)cycloocten-1-one-6-spiro-5'-bicyclo[2.2.1]-2'-heptene,
4,5-(6"-n-propylbenzo)cycloocten-1-one-6-spiro-5'-bicyclo[2.2.1]-2'-heptene,
4,5-(3"-iso-propylbenzo)cycloocten-1-one-6-spiro-5'-bicyclo[2.2.1]-2'-heptene,
4,5-(4"-iso-propylbenzo)cycloocten-1-one-6-spiro-5'-bicyclo[2.2.1]-2'-heptene,
4,5-(5"-iso-propylbenzo)cycloocten-1-one-6-spiro-5'-bicyclo[2.2.1]-2'-heptene,
4,5-(6"-iso-propylbenzo)cycloocten-1-one-6-spiro-5'-bicyclo[2.2.1]-2'-heptene,
4,5-(3"-n-butylbenzo)cycloocten-1-one-6-spiro-5'-bicyclo[2.2.1]-2'-heptene,
4,5-(4"-n-butylbenzo)cycloocten-1-one-6-spiro-5'-bicyclo[2.2.1]-2'-heptene,
4,5-(5"-n-butylbenzo)cycloocten-1-one-6-spiro-5'-bicyclo[2.2.1]-2'-heptene,
4,5-(6"-n-butylbenzo)cycloocten-1-one-6-spiro-5'-bicyclo[2.2.1]-2'-heptene,
4,5-(3"-iso-butylbenzo)cycloocten-1-one-6-spiro-5'-bicyclo[2.2.1]-2'-heptene,
4,5-(4"-iso-butylbenzo)cycloocten-1-one-6-spiro-5'-bicyclo[2.2.1]-2'-heptene,
4,5-(5"-iso-butylbenzo)cycloocten-1-one-6-spiro-5'-bicyclo[2.2.1]-2'-heptene,
4,5-(6"-iso-butylbenzo)cycloocten-1-one-6-spiro-5'-bicyclo[2.2.1]-2'-heptene,
4,5-(3"-sec-butylbenzo)cycloocten-1-one-6-spiro-5'-bicyclo[2.2.1]-2'-heptene,
4,5-(4"-sec-butylbenzo)cycloocten-1-one-6-spiro-5'-bicyclo[2.2.1]-2'-heptene,
4,5-(5"-sec-butylbenzo)cycloocten-1-one-6-spiro-5'-bicyclo[2.2.1]-2'-heptene,
4,5-(6"-sec-butylbenzo)cycloocten-1-one-6-spiro-5'-bicyclo[2.2.1]-2'-heptene,
4,5-(3"-t-butylbenzo)cycloocten-1-one-6-spiro-5'-bicyclo[2.2.1]-2'-heptene,
4,5-(4"-t-butylbenzo)cycloocten-1-one-6-spiro-5'-bicyclo[2.2.1]-2'-heptene,
4,5-(5"-t-butylbenzo)cycloocten-1-one-6-spiro-5'-bicyclo[2.2.1]-2'-heptene,
4,5-(6"-t-butylbenzo)cycloocten-1-one-6-spiro-5'-bicyclo[2.2.1]-2'-heptene,
4,5-(3"-cyclohexylbenzo)cycloocten-1-one-6-spiro-5'-bicyclo[2.2.1]-2'-heptene,
4,5-(4"-cyclohexylbenzo)cycloocten-1-one-6-spiro-5'-bicyclo[2.2.1]-2'-heptene,
4,5-(5"-cyclohexylbenzo)cyclohepten-1-one-6-spiro-5'-bicyclo[2.2.1]-2'-heptene,
4,5-(6"-cyclohexylbenzo)cycloocten-1-one-6-spiro-5'-bicyclo[2.2.1]-2'-heptene,
4,5-(3"-phenylbenzo)cycloocten-1-one-6-spiro-5'-bicyclo[2.2.1]-2'-heptene,
4,5-(4"-phenylbenzo)cycloocten-1-one-6-spiro-5'-bicyclo[2.2.1]-2'-heptene, 4,5-(5"-phenylbenzo)cycloocten-1-one-6-spiro-5'-bicyclo[2.2.1]-2'-heptene,
4,5-(6"-phenylbenzo)cycloocten-1-one-6-spiro-5'-bicyclo[2.2.1]-2'-heptene,
4,5-(3"-chlorobenzo)cycloheocten-1-one-6-spiro-5'-bicyclo[2.2.1]-2'-heptene,
4,5-(4"-chlorobenzo)cycloocten-1-one-6-spiro-5'-bicyclo[2.2.1]-2'-heptene,
4,5-(4"-chlorobenzo)cycloocten-1-one-6-spiro-5'-bicyclo[2.2.1]-2'-heptene,
4,5-(4"-chlorobenzo)cycloocten-1-one-6-spiro-5'-bicyclo[2.2.1]-2'-heptene,
4,5-(5"-chlorobenzo)cycloocten-1-one-6-spiro-5'-bicyclo[2.2.1]-2'-heptene,
4,5-(6"-chlorobenzo)cycloocten-1-one-6-spiro-5'-bicyclo[2.2.1]-2'-heptene,
4,5-(3"-aminobenzo)cycloocten-1-one-6-spiro-5'-bicyclo[2.2.1]-2'-heptene,
4,5-(4"-aminobenzo)cycloocten-1-one-6-spiro-5'-bicyclo[2.2.1]-2'-heptene,
4,5-(5"-aminobenzo)cycloocten-1-one-6-spiro-5'-bicyclo[2.2.1]-2'-heptene,
4,5-(6"-aminobenzo)cycloocten-1-one-6-spiro-5'-bicyclo[2.2.1]-2'-heptene,
4,5-(3"-methoxybenzo)cycloocten-1-one-6-spiro-5'-bicyclo[2.2.1]-2'-heptene,
4,5-(4"-methoxybenzo)cycloocten-1-one-6-spiro-5'-bicyclo[2.2.1]-2'-heptene,
4,5-(5"-methoxybenzo)cycloocten-1-one-6-spiro-5'-bicyclo[2.2.1]-2'-heptene,
4,5-(6"-methoxybenzo)cycloocten-1-one-6-spiro-5'-bicyclo[2.2.1]-2'-heptene,
4,5-benzocycloocten-1-one-7-spiro-5'-bicyclo[2.2.1]-2'-heptene,
4,5-(3"-methylbenzo)cycloocten-1-one-7-spiro-5'-bicyclo[2.2.1]-2'-heptene,
4,5-(4"-methylbenzo)cycloocten-1-one-7-spiro-5'-bicyclo[2.2.1]-2'-heptene,
4,5-(5"-methylbenzo)cycloocten-1-one-7-spiro-5'-bicyclo[2.2.1]-2'-heptene,
4,5-(6"-methylbenzo)cycloocten-1-one-7-spiro-5'-bicyclo[2.2.1]-2'-heptene,
4,5-(3"-ethylbenzo)cycloocten-1-one-7-spiro-5'-bicyclo[2.2.1]-2'-heptene,
4,5-(4"-ethylbenzo)cycloocten-1-one-7-spiro-5'-bicyclo[2.2.1]-2'-heptene,
4,5-(5"-ethylbenzo)cycloocten-1-one-7-spiro-5'-bicyclo[2.2.1]-2'-heptene,
4,5-(6"-ethylbenzo)cycloocten-1-one-7-spiro-5'-bicyclo[2.2.1]-2'-heptene,
4,5-(3"-n-propylbenzo)cycloocten-1-one-7-spiro-5'-bicyclo[2.2.1]-2'-heptene,
4,5-(4"-n-propylbenzo)cycloocten-1-one-7-spiro-5'-bicyclo[2.2.1]-2'-heptene,
4,5-(5"-n-propylbenzo)cycloocten-1-one-7-spiro-5'-bicyclo[2.2.1]-2'-heptene,
4,5-(6"-n-propylbenzo)cycloocten-1-one-7-spiro-5'-bicyclo[2.2.1]-2'-heptene,
4,5-(3"-iso-propylbenzo)cycloocten-1-one-7-spiro-5'-bicyclo[2.2.1]-2'-heptene,
4,5-(4"-iso-propylbenzo)cycloocten-1-one-7-spiro-5'-bicyclo[2.2.1]-2'-heptene,
4,5-(5"-iso-propylbenzo)cycloocten-1-one-7-spiro-5'-bicyclo[2.2.1]-2'-heptene,
4,5-(6"-iso-propylbenzo)cycloocten-1-one-7-spiro-5'-bicyclo[2.2.1]-2'-heptene,
4,5-(3"-n-butylbenzo)cycloocten-1-one-7-spiro-5'-bicyclo[2.2.1]-2'-heptene,
4,5-(4"-n-butylbenzo)cycloocten-1-one-7-spiro-5'-bicyclo[2.2.1]-2'-heptene,
4,5-(5"-n-butylbenzo)cycloocten-1-one-7-spiro-5'-bicyclo[2.2.1]-2'-heptene,
4,5-(6"-n-butylbenzo)cycloocten-1-one-7-spiro-5'-bicyclo[2.2.1]-2'-heptene,
4,5-(3"-iso-butylbenzo)cycloocten-1-one-7-spiro-5'-bicyclo[2.2.1]-2'-heptene,
4,5-(4"-iso-butylbenzo)cycloocten-1-one-7-spiro-5'-bicyclo[2.2.1]-2'-heptene,
4,5-(5"-iso-butylbenzo)cycloocten-1-one-7-spiro-5'-bicyclo[2.2.1]-2'-heptene,
4,5-(6"-iso-butylbenzo)cycloocten-1-one-7-spiro-5'-bicyclo[2.2.1]-2'-heptene,
4,5-(3"-sec-butylbenzo)cycloocten-1-one-7-spiro-5'-bicyclo[2.2.1]-2'-heptene,
4,5-(4"-sec-butylbenzo)cycloocten-1-one-7-spiro-5'-bicyclo[2.2.1]-2'-heptene,
4,5-(5"-sec-butylbenzo)cycloocten-1-one-7-spiro-5'-bicyclo[2.2.1]-2'-heptene,
4,5-(6"-sec-butylbenzo)cycloocten-1-one-7-spiro-5'-bicyclo[2.2.1]-2'-heptene,
4,5-(3"-t-butylbenzo)cycloocten-1-one-7-spiro-5'-bicyclo[2.2.1]-2'-heptene,
4,5-(4"-t-butylbenzo)cycloocten-1-one-7-spiro-5'-bicyclo[2.2.1]-2'-heptene,
4,5-(5"-t-butylbenzo)cycloocten-1-one-7-spiro-5'-bicyclo[2.2.1]-2'-heptene,
4,5-(6"-t-butylbenzo)cycloocten-1-one-7-spiro-5'-bicyclo[2.2.1]-2'-heptene,
4,5-(3"-cyclohexylbenzo)cycloocten-1-one-7-spiro-5'-bicyclo[2.2.1]-2'-heptene,
4,5-(4"-cyclohexylbenzo)cycloocten-1-one-7-spiro-5'-bicyclo[2.2.1]-2'-heptene,
4,5-(5"-cyclohexylbenzo)cyclohepten-1-one-7-spiro-5'-bicyclo[2.2.1]-2'-heptene,
4,5-(6"-cyclohexylbenzo)cycloocten-1-one-7-spiro-5'-bicyclo[2.2.1]-2'-heptene,
4,5-(3"-phenylbenzo)cycloocten-1-one-7-spiro-5'-bicyclo[2.2.1]-2'-heptene,
4,5-(4"-phenylbenzo)cycloocten-1-one-7-spiro-5'-bicyclo[2.2.1]-2'-heptene,
4,5-(5"-phenylbenzo)cycloocten-1-one-7-spiro-5'-bicyclo[2.2.1]-2'-heptene,
4,5-(6"-phenylbenzo)cycloocten-1-one-7-spiro-5'-bicyclo[2.2.1]-2'-heptene,
4,5-(3"-chlorobenzo)cycloheocten-1-one-7-spiro-5'-bicyclo[2.2.1]-2'-heptene,
4,5-(4"-chlorobenzo)cycloocten-1-one-7-spiro-5'-bicyclo[2.2.1]-2'-heptene,
4,5-(4"-chlorobenzo)cycloocten-1-one-7-spiro-5'-bicyclo[2.2.1]-2'-heptene,
4,5-(4"-chlorobenzo)cycloocten-1-one-7-spiro-5'-bicyclo[2.2.1]-2'-heptene,
4,5-(5"-chlorobenzo)cycloocten-1-one-7-spiro-5'-bicyclo[2.2.1]-2'-heptene,
4,5-(6"-chlorobenzo)cycloocten-1-one-7-spiro-5'-bicyclo[2.2.1]-2'-heptene,
4,5-(3"-aminobenzo)cycloocten-1-one-7-spiro-5'-bicyclo[2.2.1]-2'-heptene,
4,5-(4"-aminobenzo)cycloocten-1-one-7-spiro-5'-bicyclo[2.2.1]-2'-heptene,
4,5-(5"-aminobenzo)cycloocten-1-one-7-spiro-5'-bicyclo[2.2.1]-2'-heptene, 4,5-(6"-aminobenzo)cycloocten-1-one-7-spiro-5'-bicyclo[2.2.1]-2'-heptene,
4,5-(3"-methoxybenzo)cycloocten-1-one-7-spiro-5'-bicyclo[2.2.1]-2'-heptene,
4,5-(4"-methoxybenzo)cycloocten-1-one-7-spiro-5'-bicyclo[2.2.1]-2'-heptene,
4,5-(5"-methoxybenzo)cycloocten-1-one-7-spiro-5'-bicyclo[2.2.1]-2'-heptene,
4,5-(6"-methoxybenzo)cycloocten-1-one-7-spiro-5'-bicyclo[2.2.1]-2'-heptene,
4,5-benzocycloocten-1-one-8-spiro-5'-bicyclo[2.2.1]-2'-heptene,
4,5-(3"-methylbenzo)cycloocten-1-one-8-spiro-5'-bicyclo[2.2.1]-2'-heptene,
4,5-(4"-methylbenzo)cycloocten-1-one-8-spiro-5'-bicyclo[2.2.1]-2'-heptene,
4,5-(5"-methylbenzo)cycloocten-1-one-8-spiro-5'-bicyclo[2.2.1]-2'-heptene,
4,5-(6"-methylbenzo)cycloocten-1-one-8-spiro-5'-bicyclo[2.2.1]-2'-heptene,
4,5-(3"-ethylbenzo)cycloocten-1-one-8-spiro-5'-bicyclo[2.2.1]-2'-heptene,
4,5-(4"-ethylbenzo)cycloocten-1-one-8-spiro-5'-bicyclo[2.2.1]-2'-heptene,
4,5-(5"-ethylbenzo)cycloocten-1-one-8-spiro-5'-bicyclo[2.2.1]-2'-heptene,
4,5-(6"-ethylbenzo)cycloocten-1-one-8-spiro-5'-bicyclo[2.2.1]-2'-heptene,
4,5-(3"-n-propylbenzo)cycloocten-1-one-8-spiro-5'-bicyclo[2.2.1]-2'-heptene,
4,5-(4"-n-propylbenzo)cycloocten-1-one-8-spiro-5'-bicyclo[2.2.1]-2'-heptene,
4,5-(5"-n-propylbenzo)cycloocten-1-one-8-spiro-5'-bicyclo[2.2.1]-2'-heptene,
4,5-(6"-n-propylbenzo)cycloocten-1-one-8-spiro-5'-bicyclo[2.2.1]-2'-heptene,
4,5-(3"-iso-propylbenzo)cycloocten-1-one-8-spiro-5'-bicyclo[2.2.1]-2'-heptene,
4,5-(4"-iso-propylbenzo)cycloocten-1-one-8-spiro-5'-bicyclo[2.2.1]-2'-heptene,
4,5-(5"-iso-propylbenzo)cycloocten-1-one-8-spiro-5'-bicyclo[2.2.1]-2'-heptene,
4,5-(6"-iso-propylbenzo)cycloocten-1-one-8-spiro-5'-bicyclo[2.2.1]-2'-heptene,
4,5-(3"-n-butylbenzo)cycloocten-1-one-8-spiro-5'-bicyclo[2.2.1]-2'-heptene,
4,5-(4"-n-butylbenzo)cycloocten-1-one-8-spiro-5'-bicyclo[2.2.1]-2'-heptene,
4,5-(5"-n-butylbenzo)cycloocten-1-one-8-spiro-5'-bicyclo[2.2.1]-2'-heptene,
4,5-(6"-n-butylbenzo)cycloocten-1-one-8-spiro-5'-bicyclo[2.2.1]-2'-heptene,
4,5-(3"-iso-butylbenzo)cycloocten-1-one-8-spiro-5'-bicyclo[2.2.1]-2'-heptene,
4,5-(4"-iso-butylbenzo)cycloocten-1-one-8-spiro-5'-bicyclo[2.2.1]-2'-heptene,
4,5-(5"-iso-butylbenzo)cycloocten-1-one-8-spiro-5'-bicyclo[2.2.1]-2'-heptene,
4,5-(6"-iso-butylbenzo)cycloocten-1-one-8-spiro-5'-bicyclo[2.2.1]-2'-heptene,
4,5-(3"-sec-butylbenzo)cycloocten-1-one-8-spiro-5'-bicyclo[2.2.1]-2'-heptene,
4,5-(4"-sec-butylbenzo)cycloocten-1-one-8-spiro-5'-bicyclo[2.2.1]-2'-heptene,
4,5-(5"-sec-butylbenzo)cycloocten-1-one-8-spiro-5'-bicyclo[2.2.1]-2'-heptene,
4,5-(6"-sec-butylbenzo)cycloocten-1-one-8-spiro-5'-bicyclo[2.2.1]-2'-heptene,
4,5-(3"-t-butylbenzo)cycloocten-1-one-8-spiro-5'-bicyclo[2.2.1]-2'-heptene,
4,5-(4"-t-butylbenzo)cycloocten-1-one-8-spiro-5'-bicyclo[2.2.1]-2'-heptene,
4,5-(5"-t-butylbenzo)cycloocten-1-one-8-spiro-5'-bicyclo[2.2.1]-2'-heptene,
4,5-(6"-t-butylbenzo)cycloocten-1-one-8-spiro-5'-bicyclo[2.2.1]-2'-heptene,
4,5-(3"-cyclohexylbenzo)cycloocten-1-one-8-spiro-5'-bicyclo[2.2.1]-2'-heptene,
4,5-(4"-cyclohexylbenzo)cycloocten-1-one-8-spiro-5'-bicyclo[2.2.1]-2'-heptene,
4,5-(5"-cyclohexylbenzo)cyclohepten-1-one-8-spiro-5'-bicyclo[2.2.1]-2'-heptene,
4,5-(6"-cyclohexylbenzo)cycloocten-1-one-8-spiro-5'-bicyclo[2.2.1]-2'-heptene,
4,5-(3"-phenylbenzo)cycloocten-1-one-8-spiro-5'-bicyclo[2.2.1]-2'-heptene,
4,5-(4"-phenylbenzo)cycloocten-1-one-8-spiro-5'-bicyclo[2.2.1]-2'-heptene,
4,5-(5"-phenylbenzo)cycloocten-1-one-8-spiro-5'-bicyclo[2.2.1]-2'-heptene,
4,5-(6"-phenylbenzo)cycloocten-1-one-8-spiro-5'-bicyclo[2.2.1]-2'-heptene,
4,5-(3"-chlorobenzo)cycloheocten-1-one-8-spiro-5'-bicyclo[2.2.1]-2'-heptene,
4,5-(4"-chlorobenzo)cycloocten-1-one-8-spiro-5'-bicyclo[2.2.1]-2'-heptene,
4,5-(4"-chlorobenzo)cycloocten-1-one-8-spiro-5'-bicyclo[2.2.1]-2'-heptene,
4,5-(4"-chlorobenzo)cycloocten-1-one-8-spiro-5'-bicyclo[2.2.1]-2'-heptene,
4,5-(5"-chlorobenzo)cycloocten-1-one-8-spiro-5'-bicyclo[2.2.1]-2'-heptene,
4,5-(6"-chlorobenzo)cycloocten-1-one-8-spiro-5'-bicyclo[2.2.1]-2'-heptene,
4,5-(3"-aminobenzo)cycloocten-1-one-8-spiro-5'-bicyclo[2.2.1]-2'-heptene,
4,5-(4"-aminobenzo)cycloocten-1-one-8-spiro-5'-bicyclo[2.2.1]-2'-heptene,
4,5-(5"-aminobenzo)cycloocten-1-one-8-spiro-5'-bicyclo[2.2.1]-2'-heptene,
4,5-(6"-aminobenzo)cycloocten-1-one-8-spiro-5'-bicyclo[2.2.1]-2'-heptene,
4,5-(3"-methoxybenzo)cycloocten-1-one-8-spiro-5'-bicyclo[2.2.1]-2'-heptene,
4,5-(4"-methoxybenzo)cycloocten-1-one-8-spiro-5'-bicyclo[2.2.1]-2'-heptene,
4,5-(5"-methoxybenzo)cycloocten-1-one-8-spiro-5'-bicyclo[2.2.1]-2'-heptene,
4,5-(6"-methoxybenzo)cycloocten-1-one-8-spiro-5'-bicyclo[2.2.1]-2'-heptene.
(ix)
1-oxa-2,3-benzocyclopentene-4-spiro-5'-bicyclo[2.2.1]-2'-heptene,
1-oxa-2,3-(3"-methylbenzo)cyclopentene-4-spiro-5'-bicyclo[2.2.1]-2'-heptene,
1-oxa-2,3-(4"-methylbenzo)cyclopentene-4-spiro-5'-bicyclo[2.2.1]-2'-heptene,
1-oxa-2,3(5"-methylbenzo)cyclopentene-4-spiro-5'-bicyclo[2.2.1]-2'-heptene,
1-oxa-2,3-(6"-methylbenzo)cyclopentene-4-spiro-5'-bicyclo[2.2.1]-2'-heptene,
1-oxa-2,3-(3"-ethylbenzo)cyclopentene-4-spiro-5'-bicyclo[2.2.1]-2'-heptene, 1-oxa-2,3-(4"-ethylbenzo)cyclopentene-4-spiro-5'-bicyclo[2.2.1]-2'-heptene,
1-oxa-2,3-(5"-ethylbenzo)cyclopentene-4-spiro-5'-bicyclo[2.2.1]-2'-heptene,
1-oxa-2,3-(6"-ethylbenzo)cyclopentene-4-spiro-5'-bicyclo[2.2.1]-2'-heptene,
1-oxa-2,3-(3'-n-propylbenzo)cyclopentene-4-spiro-5'-bicyclo[2.2.1]-2'-heptene,
1-oxa-2,3-(4"-n-propylbenzo)cyclopentene-4-spiro-5'-bicyclo[2.2.1]-2'-heptene,
1-oxa-2,3-(5'-n-propylbenzo)cyclopentene-4-spiro-5'-bicyclo[2.2.1]-2'-heptene,
1-oxa-2,3-(6"-n-propylbenzo)cyclopentene-4-spiro-5'-bicyclo[2.2.1]-2'-heptene,
1-oxa-2,3-(3"-iso-propylbenzo)cyclopentene-4-spiro-5'-bicyclo[2.2.1]-2'-heptene,
1-oxa-2,3-(4"-iso-propylbenzo)cyclopentene-4-spiro-5'-bicyclo[2.2.1]-2'-heptene,
1-oxa-2,3-(5"-iso-propylbenzo)cyclopentene-4-spiro-5'-bicyclo[2.2.1]-2'-heptene,
1-oxa-2,3-(6"-iso-propylbenzo)cyclopentene-4-spiro-5'-bicyclo[2.2.1]-2'-heptene,
1-oxa-2,3-(3"-n-butylbenzo)cyclopentene-4-spiro-5'-bicyclo[2.2.1]-2'-heptene,
1-oxa-2,3-(4"-n-butylbenzo)cyclopentene-4-spiro-5'-bicyclo[2.2.1]-2'-heptene,
1-oxa-2,3-(5"-n-butylbenzo)cyclopentene-4-spiro-5'-bicyclo[2.2.1]-2'-heptene,
1-oxa-2,3-(6"-n-butylbenzo)cyclopentene-4-spiro-5'-bicyclo[2.2.1]-2'-heptene,
1-oxa-2,3-(3"-iso-butylbenzo)cyclopentene-4-spiro-5'-bicyclo[2.2.1]-2'-heptene,
1-oxa-2,3-(4"-iso-butylbenzo)cyclopentene-4-spiro-5'-bicyclo[2.2.1]-2'-heptene,
1-oxa-2,3-(5"-iso-butylbenzo)cyclopentene-4-spiro-5'-bicyclo[2.2.1]-2'-heptene,
1-oxa-2,3-(6"-iso-butylbenzo)cyclopentene-4-spiro-5'-bicyclo[2.2.1]-2'-heptene,
1-oxa-2,3-(3"-sec-butylbenzo)cyclopentene-4-spiro-5'-bicyclo[2.2.1]-2'-heptene,
1-oxa-2,3-(4"-sec-butylbenzo)cyclopentene-4-spiro-5'-bicyclo[2.2.1]-2'-heptene,
1-oxa-2,3-(5"-sec-butylbenzo)cyclopentene-4-spiro-5'-bicyclo[2.2.1]-2'-heptene,
1-oxa-2,3-(6"-sec-butylbenzo)cyclopentene-4-spiro-5'-bicyclo[2.2.1]-2'-heptene,
1-oxa-2,3-(3"-t-butylbenzo)cyclopentene-4-spiro-5'-bicyclo[2.2.1]-2'-heptene,
1-oxa-2,3-(4"-t-butylbenzo)cyclopentene-4-spiro-5'-bicyclo[2.2.1]-2'-heptene,
1-oxa-2,3-(5"-t-butylbenzo)cyclopentene-4-spiro-5'-bicyclo[2.2.1]-2'-heptene,
1-oxa-2,3-(6"-t-butylbenzo)cyclopentene-4-spiro-5'-bicyclo[2.2.1]-2'-heptene,
1-oxa-2,3-(3"-cyclohexylbenzo)cyclopentene-4-spiro-5'-bicyclo[2.2.1]-2'-heptene,
1-oxa-2,3-(4"-cyclohexylbenzo)cyclopentene-4-spiro-5'-bicyclo[2.2.1]-2'-heptene,
1-oxa-2,3-(5"-cyclohexylbenzo)cyclopentene-4-spiro-5'-bicyclo[2.2.1]-2'-heptene,
1-oxa-2,3-(6"-cyclohexylbenzo)cyclopentene-4-spiro-5'-bicyclo[2.2.1]-2'-heptene,
1-oxa-2,3-(3"-phenylbenzo)cyclopentene-4-spiro-5'-bicyclo[2.2.1]-2'-heptene,
1-oxa-2,3-(4"-phenylbenzo)cyclopentene-4-spiro-5'-bicyclo[2.2.1]-2'-heptene,
1-oxa-2,3-(5"-phenylbenzo)cyclopentene-4-spiro-5'-bicyclo[2.2.1]-2'-heptene,
1-oxa-2,3-(6"-phenylbenzo)cyclopentene-4-spiro-5'-bicyclo[2.2.1]-2'-heptene,
1-oxa-2,3-(3"-chlorobenzo)cyclopentene-4-spiro-5'-bicyclo[2.2.1]-2'-heptene,
1-oxa-2,3-(4"-chlorobenzo)cyclopentene-4-spiro-5'-bicyclo[2.2.1]-2'-heptene,
1-oxa-2,3-(5"-chlorobenzo)cyclopentene-4-spiro-5'-bicyclo[2.2.1]-2'-heptene,
1-oxa-2,3-(6"-chlorobenzo)cyclopentene-4-spiro-5'-bicyclo[2.2.1]-2'-heptene,
1-oxa-2,3-(3"-aminobenzo)cyclopentene-4-spiro-5'-bicyclo[2.2.1]-2'-heptene,
1-oxa-2,3-(4"-aminobenzo)cyclopentene-4-spiro-5'-bicyclo[2.2.1]-2'-heptene,
1-oxa-2,3-(5"-aminobenzo)cyclopentene-4-spiro-5'-bicyclo[2.2.1]-2'-heptene,
1-oxa-2,3-(6"-aminobenzo)cyclopentene-4-spiro-5'-bicyclo[2.2.1]-2'-heptene,
1-oxa-2,3-(3"-methoxybenzo)cyclopentene-4-spiro-5'-bicyclo[2.2.1]-2'-heptene,
1-oxa-2,3-(4"-methoxybenzo)cyclopentene-4-spiro-5'-bicyclo[2.2.1]-2'-heptene,
1-oxa-2,3-(5"-methoxybenzo)cyclopentene-4-spiro-5'-bicyclo[2.2.1]-2'-heptene,
1-oxa-2,3-(6"-methoxybenzo)cyclopentene-4-spiro-5'-bicyclo[2.2.1]-2'-heptene,
1-oxa-2,3-benzocyclopentene-5-spiro-5'-bicyclo[2.2.1]-2'-heptene,
1-oxa-2,3-(3"-methylbenzo)cyclopentene-5-spiro-5'-bicyclo[2.2.1]-2'-heptene,
1-oxa-2,3-(4"-methylbenzo)cyclopentene-5-spiro-5'-bicyclo[2.2.1]-2'-heptene,
1-oxa-2,3(5"-methylbenzo)cyclopentene-5-spiro-5'-bicyclo[2.2.1]-2'-heptene,
1-oxa-2,3-(6"-methylbenzo)cyclopentene-5-spiro-5'-bicyclo[2.2.1]-2'-heptene,
1-oxa-2,3-(3"-ethylbenzo)cyclopentene-5-spiro-5'-bicyclo[2.2.1]-2'-heptene,
1-oxa-2,3-(4"-ethylbenzo)cyclopentene-5-spiro-5'-bicyclo[2.2.1]-2'-heptene,
1-oxa-2,3-(5"-ethylbenzo)cyclopentene-5-spiro-5'-bicyclo[2.2.1]-2'-heptene,
1-oxa-2,3-(6"-ethylbenzo)cyclopentene-5-spiro-5'-bicyclo[2.2.1]-2'-heptene,
1-oxa-2,3-(3'-n-propylbenzo)cyclopentene-5-spiro-5'-bicyclo[2.2.1]-2'-heptene,
1-oxa-2,3-(4"-n-propylbenzo)cyclopentene-5-spiro-5'-bicyclo[2.2.1]-2'-heptene,
1-oxa-2,3-(5'-n-propylbenzo)cyclopentene-5-spiro-5'-bicyclo[2.2.1]-2'-heptene,
1-oxa-2,3-(6"-n-propylbenzo)cyclopentene-5-spiro-5'-bicyclo[2.2.1]-2'-heptene,
1-oxa-2,3-(3"-iso-propylbenzo)cyclopentene-5-spiro-5'-bicyclo[2.2.1]-2'-heptene,
1-oxa-2,3-(4"-iso-propylbenzo)cyclopentene-5-spiro-5'-bicyclo[2.2.1]-2'-heptene,
1-oxa-2,3-(5"-iso-propylbenzo)cyclopentene-5-spiro-5'-bicyclo[2.2.1]-2'-heptene,
1-oxa-2,3-(6"-iso-propylbenzo)cyclopentene-5-spiro-5'-bicyclo[2.2.1]-2'-heptene,
1-oxa-2,3-(3"-n-butylbenzo)cyclopentene-5-spiro-5'-bicyclo[2.2.1]-2'-heptene,
1-oxa-2,3-(4"-n-butylbenzo)cyclopentene-5-spiro-5'-bicyclo[2.2.1]-2'-heptene, 1-oxa-2,3-(5"-n-butylbenzo)cyclopentene-5-spiro-5'-bicyclo[2.2.1]-2'-heptene,
1-oxa-2,3-(6"-n-butylbenzo)cyclopentene-5-spiro-5'-bicyclo[2.2.1]-2'-heptene,
1-oxa-2,3-(3"-iso-butylbenzo)cyclopentene-5-spiro-5'-bicyclo[2.2.1]-2'-heptene,
1-oxa-2,3-(4"-iso-butylbenzo)cyclopentene-5-spiro-5'-bicyclo[2.2.1]-2'-heptene,
1-oxa-2,3-(5"-iso-butylbenzo)cyclopentene-5-spiro-5'-bicyclo[2.2.1]-2'-heptene,
1-oxa-2,3-(6"-iso-butylbenzo)cyclopentene-5-spiro-5'-bicyclo[2.2.1]-2'-heptene,
1-oxa-2,3-(3"-sec-butylbenzo)cyclopentene-5-spiro-5'-bicyclo[2.2.1]-2'-heptene,
1-oxa-2,3-(4"-sec-butylbenzo)cyclopentene-5-spiro-5'-bicyclo[2.2.1]-2'-heptene,
1-oxa-2,3-(5"-sec-butylbenzo)cyclopentene-5-spiro-5'-bicyclo[2.2.1]-2'-heptene,
1-oxa-2,3-(6"-sec-butylbenzo)cyclopentene-5-spiro-5'-bicyclo[2.2.1]-2'-heptene,
1-oxa-2,3-(3"-t-butylbenzo)cyclopentene-5-spiro-5'-bicyclo[2.2.1]-2'-heptene,
1-oxa-2,3-(4"-t-butylbenzo)cyclopentene-5-spiro-5'-bicyclo[2.2.1]-2'-heptene,
1-oxa-2,3-(5"-t-butylbenzo)cyclopentene-5-spiro-5'-bicyclo[2.2.1]-2'-heptene,
1-oxa-2,3-(6"-t-butylbenzo)cyclopentene-5-spiro-5'-bicyclo[2.2.1]-2'-heptene,
1-oxa-2,3-(3"-cyclohexylbenzo)cyclopentene-5-spiro-5'-bicyclo[2.2.1]-2'-heptene,
1-oxa-2,3-(4"-cyclohexylbenzo)cyclopentene-5-spiro-5'-bicyclo[2.2.1]-2'-heptene,
1-oxa-2,3-(5"-cyclohexylbenzo)cyclopentene-5-spiro-5'-bicyclo[2.2.1]-2'-heptene,
1-oxa-2,3-(6"-cyclohexylbenzo)cyclopentene-5-spiro-5'-bicyclo[2.2.1]-2'-heptene,
1-oxa-2,3-(3"-phenylbenzo)cyclopentene-5-spiro-5'-bicyclo[2.2.1]-2'-heptene,
1-oxa-2,3-(4"-phenylbenzo)cyclopentene-5-spiro-5'-bicyclo[2.2.1]-2'-heptene,
1-oxa-2,3-(5"-phenylbenzo)cyclopentene-5-spiro-5'-bicyclo[2.2.1]-2'-heptene,
1-oxa-2,3-(6"-phenylbenzo)cyclopentene-5-spiro-5'-bicyclo[2.2.1]-2'-heptene,
1-oxa-2,3-(3"-chlorobenzo)cyclopentene-5-spiro-5'-bicyclo[2.2.1]-2'-heptene,
1-oxa-2,3-(4"-chlorobenzo)cyclopentene-5-spiro-5'-bicyclo[2.2.1]-2'-heptene,
1-oxa-2,3-(5"-chlorobenzo)cyclopentene-5-spiro-5'-bicyclo[2.2.1]-2'-heptene,
1-oxa-2,3-(6"-chlorobenzo)cyclopentene-5-spiro-5'-bicyclo[2.2.1]-2'-heptene,
1-oxa-2,3-(3"-aminobenzo)cyclopentene-5-spiro-5'-bicyclo[2.2.1]-2'-heptene,
1-oxa-2,3-(4"-aminobenzo)cyclopentene-5-spiro-5'-bicyclo[2.2.1]-2'-heptene,
1-oxa-2,3-(5"-aminobenzo)cyclopentene-5-spiro-5'-bicyclo[2.2.1]-2'-heptene,
1-oxa-2,3-(6"-aminobenzo)cyclopentene-5-spiro-5'-bicyclo[2.2.1]-2'-heptene,
1-oxa-2,3-(3"-methoxybenzo)cyclopentene-5-spiro-5'-bicyclo[2.2.1]-2'-heptene,
1-oxa-2,3-(4"-methoxybenzo)cyclopentene-5-spiro-5'-bicyclo[2.2.1]-2'-heptene,
1-oxa-2,3-(5"-methoxybenzo)cyclopentene-5-spiro-5'-bicyclo[2.2.1]-2'-heptene,
1-oxa-2,3-(6"-methoxybenzo)cyclopentene-5-spiro-5'-bicyclo[2.2.1]-2'-heptene,
1-oxa-3,4-benzocyclopentene-2-spiro-5'-bicyclo[2.2.1]-2'-heptene,
1-oxa-3,4-(3"-methylbenzo)cyclopentene-2-spiro-5'-bicyclo[2.2.1]-2'-heptene,
1-oxa-3,4-(4"-methylbenzo)cyclopentene-2-spiro-5'-bicyclo[2.2.1]-2'-heptene,
1-oxa-3,4-(5"-methylbenzo)cyclopentene-2-spiro-5'-bicyclo[2.2.1]-2'-heptene,
1-oxa-3,4-(6"-methylbenzo)cyclopentene-2-spiro-5'-bicyclo[2.2.1]-2'-heptene,
1-oxa-3,4-(3"-ethylbenzo)cyclopentene-2-spiro-5'-bicyclo[2.2.1]-2'-heptene,
1-oxa-3,4-(4"-ethylbenzo)cyclopentene-2-spiro-5'-bicyclo[2.2.1]-2'-heptene,
1-oxa-3,4-(5"-ethylbenzo)cyclopentene-2-spiro-5'-bicyclo[2.2.1]-2'-heptene,
1-oxa-3,4-(6"-ethylbenzo)cyclopentene-2-spiro-5'-bicyclo[2.2.1]-2'-heptene,
1-oxa-3,4-(3'-n-propylbenzo)cyclopentene-2-spiro-5'-bicyclo[2.2.1]-2'-heptene,
1-oxa-3,4-(4"-n-propylbenzo)cyclopentene-2-spiro-5'-bicyclo[2.2.1]-2'-heptene,
1-oxa-3,4-(5'-n-propylbenzo)cyclopentene-2-spiro-5'-bicyclo[2.2.1]-2'-heptene,
1-oxa-3,4-(6"-n-propylbenzo)cyclopentene-2-spiro-5'-bicyclo[2.2.1]-2'-heptene,
1-oxa-3,4-(3"-iso-propylbenzo)cyclopentene-2-spiro-5'-bicyclo[2.2.1]-2'-heptene,
1-oxa-3,4-(4"-iso-propylbenzo)cyclopentene-2-spiro-5'-bicyclo[2.2.1]-2'-heptene,
1-oxa-3,4-(5"-iso-propylbenzo)cyclopentene-2-spiro-5'-bicyclo[2.2.1]-2'-heptene,
1-oxa-3,4-(6"-iso-propylbenzo)cyclopentene-2-spiro-5'-bicyclo[2.2.1]-2'-heptene,
1-oxa-3,4-(3"-n-butylbenzo)cyclopentene-2-spiro-5'-bicyclo[2.2.1]-2'-heptene,
1-oxa-3,4-(4"-n-butylbenzo)cyclopentene-2-spiro-5'-bicyclo[2.2.1]-2'-heptene,
1-oxa-3,4-(5"-n-butylbenzo)cyclopentene-2-spiro-5'-bicyclo[2.2.1]-2'-heptene,
1-oxa-3,4-(6"-n-butylbenzo)cyclopentene-2-spiro-5'-bicyclo[2.2.1]-2'-heptene,
1-oxa-3,4-(3"-iso-butylbenzo)cyclopentene-2-spiro-5'-bicyclo[2.2.1]-2'-heptene,
1-oxa-3,4-(4"-iso-butylbenzo)cyclopentene-2-spiro-5'-bicyclo[2.2.1]-2'-heptene,
1-oxa-3,4-(5"-iso-butylbenzo)cyclopentene-2-spiro-5'-bicyclo[2.2.1]-2'-heptene,
1-oxa-3,4-(6"-iso-butylbenzo)cyclopentene-2-spiro-5'-bicyclo[2.2.1]-2'-heptene,
1-oxa-3,4-(3"-sec-butylbenzo)cyclopentene-2-spiro-5'-bicyclo[2.2.1]-2'-heptene,
1-oxa-3,4-(4"-sec-butylbenzo)cyclopentene-2-spiro-5'-bicyclo[2.2.1]-2'-heptene,
1-oxa-3,4-(5"-sec-butylbenzo)cyclopentene-2-spiro-5'-bicyclo[2.2.1]-2'-heptene,
1-oxa-3,4-(6"-sec-butylbenzo)cyclopentene-2-spiro-5'-bicyclo[2.2.1]-2'-heptene,
1-oxa-3,4-(3"-t-butylbenzo)cyclopentene-2-spiro-5'-bicyclo[2.2.1]-2'-heptene,
1-oxa-3,4-(4"-t-butylbenzo)cyclopentene-2-spiro-5'-bicyclo[2.2.1]-2'-heptene,
1-oxa-3,4-(5"-t-butylbenzo)cyclopentene-2-spiro-5'-bicyclo[2.2.1]-2'-heptene, 1-oxa-3,4-(6"-t-butylbenzo)cyclopentene-2-spiro-5'-bicyclo[2.2.1]-2'-heptene,
1-oxa-3,4-(3"-cyclohexylbenzo)cyclopentene-2-spiro-5'-bicyclo[2.2.1]-2'-heptene,
1-oxa-3,4-(4"-cyclohexylbenzo)cyclopentene-2-spiro-5'-bicyclo[2.2.1]-2'-heptene,
1-oxa-3,4-(5"-cyclohexylbenzo)cyclopentene-2-spiro-5'-bicyclo[2.2.1]-2'-heptene,
1-oxa-3,4-(6"-cyclohexylbenzo)cyclopentene-2-spiro-5'-bicyclo[2.2.1]-2'-heptene,
1-oxa-3,4-(3"-phenylbenzo)cyclopentene-2-spiro-5'-bicyclo[2.2.1]-2'-heptene,
1-oxa-3,4-(4"-phenylbenzo)cyclopentene-2-spiro-5'-bicyclo[2.2.1]-2'-heptene,
1-oxa-3,4-(5"-phenylbenzo)cyclopentene-2-spiro-5'-bicyclo[2.2.1]-2'-heptene,
1-oxa-3,4-(6"-phenylbenzo)cyclopentene-2-spiro-5'-bicyclo[2.2.1]-2'-heptene,
1-oxa-3,4-(3"-chlorobenzo)cyclopentene-2-spiro-5'-bicyclo[2.2.1]-2'-heptene,
1-oxa-3,4-(4"-chlorobenzo)cyclopentene-2-spiro-5'-bicyclo[2.2.1]-2'-heptene,
1-oxa-3,4-(5"-chlorobenzo)cyclopentene-2-spiro-5'-bicyclo[2.2.1]-2'-heptene,
1-oxa-3,4-(6"-chlorobenzo)cyclopentene-2-spiro-5'-bicyclo[2.2.1]-2'-heptene,
1-oxa-3,4-(3"-aminobenzo)cyclopentene-2-spiro-5'-bicyclo[2.2.1]-2'-heptene,
1-oxa-3,4-(4"-aminobenzo)cyclopentene-2-spiro-5'-bicyclo[2.2.1]-2'-heptene,
1-oxa-3,4-(5"-aminobenzo)cyclopentene-2-spiro-5'-bicyclo[2.2.1]-2'-heptene,
1-oxa-3,4-(6"-aminobenzo)cyclopentene-2-spiro-5'-bicyclo[2.2.1]-2'-heptene,
1-oxa-3,4-(3"-methoxybenzo)cyclopentene-2-spiro-5'-bicyclo[2.2.1]-2'-heptene,
1-oxa-3,4-(4"-methoxybenzo)cyclopentene-2-spiro-5'-bicyclo[2.2.1]-2'-heptene,
1-oxa-3,4-(5"-methoxybenzo)cyclopentene-2-spiro-5'-bicyclo[2.2.1]-2'-heptene,
1-oxa-3,4-(6"-methoxybenzo)cyclopentene-2-spiro-5'-bicyclo[2.2.1]-2'-heptene.
(x)
1-oxa-2,3-benzocyclohexene-4-spiro-5'-bicyclo[2.2.1]-2'-heptene,
1-oxa-2,3-(3"-methylbenzo)cyclohexene-4-spiro-5'-bicyclo[2.2.1]-2'-heptene,
1-oxa-2,3-(4"-methylbenzo)cyclohexene-4-spiro-5'-bicyclo[2.2.1]-2'-heptene,
1-oxa-2,3-(5"-methylbenzo)cyclohexene-4-spiro-5'-bicyclo[2.2.1]-2'-heptene,
1-oxa-2,3-(5"-methylbenzo)cyclohexene-4-spiro-5'-bicyclo[2.2.1]-2'-heptene,
1-oxa-2,3-(3"-ethylbenzo)cyclohexene-4-spiro-5'-bicyclo[2.2.1]-2'-heptene,
1-oxa-2,3-(4"-ethylbenzo)cyclohexene-4-spiro-5'-bicyclo[2.2.1]-2'-heptene,
1-oxa-2,3-(5"-ethylbenzo)cyclohexene-4-spiro-5'-bicyclo[2.2.1]-2'-heptene,
1-oxa-2,3-(6"-ethylbenzo)cyclohexene-4-spiro-5'-bicyclo[2.2.1]-2'-heptene,
1-oxa-2,3-(3"-n-propylbenzo)cyclohexene-4-spiro-5'-bicyclo[2.2.1]-2'-heptene,
1-oxa-2,3-(4"-n-propylbenzo)cyclohexene-4-spiro-5'-bicyclo[2.2.1]-2'-heptene,
1-oxa-2,3-(5"-n-propylbenzo)cyclohexene-4-spiro-5'-bicyclo[2.2.1]-2'-heptene,
1-oxa-2,3-(6"-n-propylbenzo)cyclohexene-4-spiro-5'-bicyclo[2.2.1]-2'-heptene,
1-oxa-2,3-(3"-iso-propylbenzo)cyclohexene-4-spiro-5'-bicyclo[2.2.1]-2'-heptene,
1-oxa-2,3-(4"-iso-propylbenzo)cyclohexene-4-spiro-5'-bicyclo[2.2.1]-2'-heptene,
1-oxa-2,3-(5"-iso-propylbenzo)cyclohexene-4-spiro-5'-bicyclo[2.2.1]-2'-heptene,
1-oxa-2,3-(6"-iso-propylbenzo)cyclohexene-4-spiro-5'-bicyclo[2.2.1]-2'-heptene,
1-oxa-2,3-(3"-n-butylbenzo)cyclohexene-4-spiro-5'-bicyclo[2.2.1]-2'-heptene,
1-oxa-2,3-(4"-n-butylbenzo)cyclohexene-4-spiro-5'-bicyclo[2.2.1]-2'-heptene,
1-oxa-2,3-(5"-n-butylbenzo)cyclohexene-4-spiro-5'-bicyclo[2.2.1]-2'-heptene,
1-oxa-2,3-(6"-n-butylbenzo)cyclohexene-4-spiro-5'-bicyclo[2.2.1]-2'-heptene,
1-oxa-2,3-(3"-iso-butylbenzo)cyclohexene-4-spiro-5'-bicyclo[2.2.1]-2'-heptene,
1-oxa-2,3-(4"-iso-butylbenzo)cyclohexene-4-spiro-5'-bicyclo[2.2.1]-2'-heptene,
1-oxa-2,3-(5"-iso-butylbenzo)cyclohexene-4-spiro-5'-bicyclo[2.2.1]-2'-heptene,
1-oxa-2,3-(6"-iso-butylbenzo)cyclohexene-4-spiro-5'-bicyclo[2.2.1]-2'-heptene,
1-oxa-2,3-(3"-sec-butylbenzo)cyclohexene-4-spiro-5'-bicyclo[2.2.1]-2'-heptene,
1-oxa-2,3-(4"-sec-butylbenzo)cyclohexene-4-spiro-5'-bicyclo[2.2.1]-2'-heptene,
1-oxa-2,3-(5"-sec-butylbenzo)cyclohexene-4-spiro-5'-bicyclo[2.2.1]-2'-heptene,
1-oxa-2,3-(6"-sec-butylbenzo)cyclohexene-4-spiro-5'-bicyclo[2.2.1]-2'-heptene,
1-oxa-2,3-(3"-t-butylbenzo)cyclohexene-4-spiro-5'-bicyclo[2.2.1]-2'-heptene,
1-oxa-2,3-(4"-t-butylbenzo)cyclohexene-4-spiro-5'-bicyclo[2.2.1]-2'-heptene,
1-oxa-2,3-(5"-t-butylbenzo)cyclohexene-4-spiro-5'-bicyclo[2.2.1]-2'-heptene,
1-oxa-2,3-(6"-t-butylbenzo)cyclohexene-4-spiro-5'-bicyclo[2.2.1]-2'-heptene,
1-oxa-2,3-(3'-cyclohexylbenzo)cyclohexene-4-spiro-5'-bicyclo[2.2.1]-2'-heptene,
1-oxa-2,3-(4"-cyclohexylbenzo)cyclohexene-4-spiro-5'-bicyclo[2.2.1]-2'-heptene,
1-oxa-2,3-(5"-cyclohexylbenzo)cyclohexene-4-spiro-5'-bicyclo[2.2.1]-2'-heptene,
1-oxa-2,3-(6"-cyclohexylbenzo)cyclohexene-4-spiro-5'-bicyclo[2.2.1]-2'-heptene,
1-oxa-2,3-(3"-phenylbenzo)cyclohexene-4-spiro-5'-bicyclo[2.2.1]-2'-heptene,
1-oxa-2,3-(4"-phenylbenzo)cyclohexene-4-spiro-5'-bicyclo[2.2.1]-2'-heptene,
1-oxa-2,3-(5"-phenylbenzo)cyclohexene-4-spiro-5'-bicyclo[2.2.1]-2'-heptene,
1-oxa-2,3-(6"-phenylbenzo)cyclohexene-4-spiro-5'-bicyclo[2.2.1]-2'-heptene,
1-oxa-2,3-(3"-chlorobenzo)cyclohexene-4-spiro-5'-bicyclo[2.2.1]-2'-heptene,
1-oxa-2,3-(4"-chlorobenzo)cyclohexene-4-spiro-5'-bicyclo[2.2.1]-2'-heptene,
1-oxa-2,3-(5"-chlorobenzo)cyclohexene-4-spiro-5'-bicyclo[2.2.1]-2'-heptene,
1-oxa-2,3-(6"-chlorobenzo)cyclohexene-4-spiro-5'-bicyclo[2.2.1]-2'-heptene, 1-oxa-2,3-(3"-aminobenzo)cyclohexene-4-spiro-5'-bicyclo[2.2.1]-2'-heptene,
1-oxa-2,3-(4"-aminobenzo)cyclohexene-4-spiro-5'-bicyclo[2.2.1]-2'-heptene,
1-oxa-2,3-(5"-aminobenzo)cyclohexene-4-spiro-5'-bicyclo[2.2.1]-2'-heptene,
1-oxa-2,3-(6"-aminobenzo)cyclohexene-4-spiro-5'-bicyclo[2.2.1]-2'-heptene,
1-oxa-2,3-(3"-methoxybenzo)cyclohexene-4-spiro-5'-bicyclo[2.2.1]-2'-heptene,
1-oxa-2,3-(4"-methoxybenzo)cyclohexene-4-spiro-5'-bicyclo[2.2.1]-2'-heptene,
1-oxa-2,3-(5"-methoxybenzo)cyclohexene-4-spiro-5'-bicyclo[2.2.1]-2'-heptene,
1-oxa-2,3-(6"-methoxybenzo)cyclohexene-4-spiro-5'-bicyclo[2.2.1]-2'-heptene,
1-oxa-2,3-benzocyclohexene-5-spiro-5'-bicyclo[2.2.1]-2'-heptene,
1-oxa-2,3-(3"-methylbenzo)cyclohexene-5-spiro-5'-bicyclo[2.2.1]-2'-heptene,
1-oxa-2,3-(4"-methylbenzo)cyclohexene-5-spiro-5'-bicyclo[2.2.1]-2'-heptene,
1-oxa-2,3-(5"-methylbenzo)cyclohexene-5-spiro-5'-bicyclo[2.2.1]-2'-heptene,
1-oxa-2,3-(5"-methylbenzo)cyclohexene-5-spiro-5'-bicyclo[2.2.1]-2'-heptene,
1-oxa-2,3-(3"-ethylbenzo)cyclohexene-5-spiro-5'-bicyclo[2.2.1]-2'-heptene,
1-oxa-2,3-(4"-ethylbenzo)cyclohexene-5-spiro-5'-bicyclo[2.2.1]-2'-heptene,
1-oxa-2,3-(5"-ethylbenzo)cyclohexene-5-spiro-5'-bicyclo[2.2.1]-2'-heptene,
1-oxa-2,3-(6"-ethylbenzo)cyclohexene-5-spiro-5'-bicyclo[2.2.1]-2'-heptene,
1-oxa-2,3-(3"-n-propylbenzo)cyclohexene-5-spiro-5'-bicyclo[2.2.1]-2'-heptene,
1-oxa-2,3-(4"-n-propylbenzo)cyclohexene-5-spiro-5'-bicyclo[2.2.1]-2'-heptene,
1-oxa-2,3-(5"-n-propylbenzo)cyclohexene-5-spiro-5'-bicyclo[2.2.1]-2'-heptene,
1-oxa-2,3-(6"-n-propylbenzo)cyclohexene-5-spiro-5'-bicyclo[2.2.1]-2'-heptene,
1-oxa-2,3-(3"-iso-propylbenzo)cyclohexene-5-spiro-5'-bicyclo[2.2.1]-2'-heptene,
1-oxa-2,3-(4"-iso-propylbenzo)cyclohexene-5-spiro-5'-bicyclo[2.2.1]-2'-heptene,
1-oxa-2,3-(5"-iso-propylbenzo)cyclohexene-5-spiro-5'-bicyclo[2.2.1]-2'-heptene,
1-oxa-2,3-(6"-iso-propylbenzo)cyclohexene-5-spiro-5'-bicyclo[2.2.1]-2'-heptene,
1-oxa-2,3-(3"-n-butylbenzo)cyclohexene-5-spiro-5'-bicyclo[2.2.1]-2'-heptene,
1-oxa-2,3-(4"-n-butylbenzo)cyclohexene-5-spiro-5'-bicyclo[2.2.1]-2'-heptene,
1-oxa-2,3-(5"-n-butylbenzo)cyclohexene-5-spiro-5'-bicyclo[2.2.1]-2'-heptene,
1-oxa-2,3-(6"-n-butylbenzo)cyclohexene-5-spiro-5'-bicyclo[2.2.1]-2'-heptene,
1-oxa-2,3-(3"-iso-butylbenzo)cyclohexene-5-spiro-5'-bicyclo[2.2.1]-2'-heptene,
1-oxa-2,3-(4"-iso-butylbenzo)cyclohexene-5-spiro-5'-bicyclo[2.2.1]-2'-heptene,
1-oxa-2,3-(5"-iso-butylbenzo)cyclohexene-5-spiro-5'-bicyclo[2.2.1]-2'-heptene,
1-oxa-2,3-(6"-iso-butylbenzo)cyclohexene-5-spiro-5'-bicyclo[2.2.1]-2'-heptene,
1-oxa-2,3-(3"-sec-butylbenzo)cyclohexene-5-spiro-5'-bicyclo[2.2.1]-2'-heptene,
1-oxa-2,3-(4"-sec-butylbenzo)cyclohexene-5-spiro-5'-bicyclo[2.2.1]-2'-heptene,
1-oxa-2,3-(5"-sec-butylbenzo)cyclohexene-5-spiro-5'-bicyclo[2.2.1]-2'-heptene,
1-oxa-2,3-(6"-sec-butylbenzo)cyclohexene-5-spiro-5'-bicyclo[2.2.1]-2'-heptene,
1-oxa-2,3-(3"-t-butylbenzo)cyclohexene-5-spiro-5'-bicyclo[2.2.1]-2'-heptene,
1-oxa-2,3-(4"-t-butylbenzo)cyclohexene-5-spiro-5'-bicyclo[2.2.1]-2'-heptene,
1-oxa-2,3-(5"-t-butylbenzo)cyclohexene-5-spiro-5'-bicyclo[2.2.1]-2'-heptene,
1-oxa-2,3-(6"-t-butylbenzo)cyclohexene-5-spiro-5'-bicyclo[2.2.1]-2'-heptene,
1-oxa-2,3-(3'-cyclohexylbenzo)cyclohexene-5-spiro-5'-bicyclo[2.2.1]-2'-heptene,
1-oxa-2,3-(4"-cyclohexylbenzo)cyclohexene-5-spiro-5'-bicyclo[2.2.1]-2'-heptene,
1-oxa-2,3-(5"-cyclohexylbenzo)cyclohexene-5-spiro-5'-bicyclo[2.2.1]-2'-heptene,
1-oxa-2,3-(6"-cyclohexylbenzo)cyclohexene-5-spiro-5'-bicyclo[2.2.1]-2'-heptene,
1-oxa-2,3-(3"-phenylbenzo)cyclohexene-5-spiro-5'-bicyclo[2.2.1]-2'-heptene,
1-oxa-2,3-(4"-phenylbenzo)cyclohexene-5-spiro-5'-bicyclo[2.2.1]-2'-heptene,
1-oxa-2,3-(5"-phenylbenzo)cyclohexene-5-spiro-5'-bicyclo[2.2.1]-2'-heptene,
1-oxa-2,3-(6"-phenylbenzo)cyclohexene-5-spiro-5'-bicyclo[2.2.1]-2'-heptene,
1-oxa-2,3-(3"-chlorobenzo)cyclohexene-5-spiro-5'-bicyclo[2.2.1]-2'-heptene,
1-oxa-2,3-(4"-chlorobenzo)cyclohexene-5-spiro-5'-bicyclo[2.2.1]-2'-heptene,
1-oxa-2,3-(5"-chlorobenzo)cyclohexene-5-spiro-5'-bicyclo[2.2.1]-2'-heptene,
1-oxa-2,3-(6"-chlorobenzo)cyclohexene-5-spiro-5'-bicyclo[2.2.1]-2'-heptene,
1-oxa-2,3-(3"-aminobenzo)cyclohexene-5-spiro-5'-bicyclo[2.2.1]-2'-heptene,
1-oxa-2,3-(4"-aminobenzo)cyclohexene-5-spiro-5'-bicyclo[2.2.1]-2'-heptene,
1-oxa-2,3-(5"-aminobenzo)cyclohexene-5-spiro-5'-bicyclo[2.2.1]-2'-heptene,
1-oxa-2,3-(6"-aminobenzo)cyclohexene-5-spiro-5'-bicyclo[2.2.1]-2'-heptene,
1-oxa-2,3-(3"-methoxybenzo)cyclohexene-5-spiro-5'-bicyclo[2.2.1]-2'-heptene,
1-oxa-2,3-(4"-methoxybenzo)cyclohexene-5-spiro-5'-bicyclo[2.2.1]-2'-heptene,
1-oxa-2,3-(5"-methoxybenzo)cyclohexene-5-spiro-5'-bicyclo[2.2.1]-2'-heptene,
1-oxa-2,3-(6"-methoxybenzo)cyclohexene-5-spiro-5'-bicyclo[2.2.1]-2'-heptene,
1-oxa-2,3-benzocyclohexene-6-spiro-5'-bicyclo[2.2.1]-2'-heptene,
1-oxa-2,3-(3"-methylbenzo)cyclohexene-6-spiro-5'-bicyclo[2.2.1]-2'-heptene,
1-oxa-2,3-(4"-methylbenzo)cyclohexene-6-spiro-5'-bicyclo[2.2.1]-2'-heptene,
1-oxa-2,3-(5"-methylbenzo)cyclohexene-6-spiro-5'-bicyclo[2.2.1]-2'-heptene,
1-oxa-2,3-(5"-methylbenzo)cyclohexene-6-spiro-5'-bicyclo[2.2.1]-2'-heptene, 1-oxa-2,3-(3"-ethylbenzo)cyclohexene-6-spiro-5'-bicyclo[2.2.1]-2'-heptene,
1-oxa-2,3-(4"-ethylbenzo)cyclohexene-6-spiro-5'-bicyclo[2.2.1]-2'-heptene,
1-oxa-2,3-(5"-ethylbenzo)cyclohexene-6-spiro-5'-bicyclo[2.2.1]-2'-heptene,
1-oxa-2,3-(6"-ethylbenzo)cyclohexene-6-spiro-5'-bicyclo[2.2.1]-2'-heptene,
1-oxa-2,3-(3"-n-propylbenzo)cyclohexene-6-spiro-5'-bicyclo[2.2.1]-2'-heptene,
1-oxa-2,3-(4"-n-propylbenzo)cyclohexene-6-spiro-5'-bicyclo[2.2.1]-2'-heptene,
1-oxa-2,3-(5"-n-propylbenzo)cyclohexene-6-spiro-5'-bicyclo[2.2.1]-2'-heptene,
1-oxa-2,3-(6"-n-propylbenzo)cyclohexene-6-spiro-5'-bicyclo[2.2.1]-2'-heptene,
1-oxa-2,3-(3"-iso-propylbenzo)cyclohexene-6-spiro-5'-bicyclo[2.2.1]-2'-heptene,
1-oxa-2,3-(4"-iso-propylbenzo)cyclohexene-6-spiro-5'-bicyclo[2.2.1]-2'-heptene,
1-oxa-2,3-(5"-iso-propylbenzo)cyclohexene-6-spiro-5'-bicyclo[2.2.1]-2'-heptene,
1-oxa-2,3-(6"-iso-propylbenzo)cyclohexene-6-spiro-5'-bicyclo[2.2.1]-2'-heptene,
1-oxa-2,3-(3"-n-butylbenzo)cyclohexene-6-spiro-5'-bicyclo[2.2.1]-2'-heptene,
1-oxa-2,3-(4"-n-butylbenzo)cyclohexene-6-spiro-5'-bicyclo[2.2.1]-2'-heptene,
1-oxa-2,3-(5"-n-butylbenzo)cyclohexene-6-spiro-5'-bicyclo[2.2.1]-2'-heptene,
1-oxa-2,3-(6"-n-butylbenzo)cyclohexene-6-spiro-5'-bicyclo[2.2.1]-2'-heptene,
1-oxa-2,3-(3"-iso-butylbenzo)cyclohexene-6-spiro-5'-bicyclo[2.2.1]-2'-heptene,
1-oxa-2,3-(4"-iso-butylbenzo)cyclohexene-6-spiro-5'-bicyclo[2.2.1]-2'-heptene,
1-oxa-2,3-(5"-iso-butylbenzo)cyclohexene-6-spiro-5'-bicyclo[2.2.1]-2'-heptene,
1-oxa-2,3-(6"-iso-butylbenzo)cyclohexene-6-spiro-5'-bicyclo[2.2.1]-2'-heptene,
1-oxa-2,3-(3"-sec-butylbenzo)cyclohexene-6-spiro-5'-bicyclo[2.2.1]-2'-heptene,
1-oxa-2,3-(4"-sec-butylbenzo)cyclohexene-6-spiro-5'-bicyclo[2.2.1]-2'-heptene,
1-oxa-2,3-(5"-sec-butylbenzo)cyclohexene-6-spiro-5'-bicyclo[2.2.1]-2'-heptene,
1-oxa-2,3-(6"-sec-butylbenzo)cyclohexene-6-spiro-5'-bicyclo[2.2.1]-2'-heptene,
1-oxa-2,3-(3"-t-butylbenzo)cyclohexene-6-spiro-5'-bicyclo[2.2.1]-2'-heptene,
1-oxa-2,3-(4"-t-butylbenzo)cyclohexene-6-spiro-5'-bicyclo[2.2.1]-2'-heptene,
1-oxa-2,3-(5"-t-butylbenzo)cyclohexene-6-spiro-5'-bicyclo[2.2.1]-2'-heptene,
1-oxa-2,3-(6"-t-butylbenzo)cyclohexene-6-spiro-5'-bicyclo[2.2.1]-2'-heptene,
1-oxa-2,3-(3'-cyclohexylbenzo)cyclohexene-6-spiro-5'-bicyclo[2.2.1]-2'-heptene,
1-oxa-2,3-(4"-cyclohexylbenzo)cyclohexene-6-spiro-5'-bicyclo[2.2.1]-2'-heptene,
1-oxa-2,3-(5"-cyclohexylbenzo)cyclohexene-6-spiro-5'-bicyclo[2.2.1]-2'-heptene,
1-oxa-2,3-(6"-cyclohexylbenzo)cyclohexene-6-spiro-5'-bicyclo[2.2.1]-2'-heptene,
1-oxa-2,3-(3"-phenylbenzo)cyclohexene-6-spiro-5'-bicyclo[2.2.1]-2'-heptene,
1-oxa-2,3-(4"-phenylbenzo)cyclohexene-6-spiro-5'-bicyclo[2.2.1]-2'-heptene,
1-oxa-2,3-(5"-phenylbenzo)cyclohexene-6-spiro-5'-bicyclo[2.2.1]-2'-heptene,
1-oxa-2,3-(6"-phenylbenzo)cyclohexene-6-spiro-5'-bicyclo[2.2.1]-2'-heptene,
1-oxa-2,3-(3"-chlorobenzo)cyclohexene-6-spiro-5'-bicyclo[2.2.1]-2'-heptene,
1-oxa-2,3-(4"-chlorobenzo)cyclohexene-6-spiro-5'-bicyclo[2.2.1]-2'-heptene,
1-oxa-2,3-(5"-chlorobenzo)cyclohexene-6-spiro-5'-bicyclo[2.2.1]-2'-heptene,
1-oxa-2,3-(6"-chlorobenzo)cyclohexene-6-spiro-5'-bicyclo[2.2.1]-2'-heptene,
1-oxa-2,3-(3"-aminobenzo)cyclohexene-6-spiro-5'-bicyclo[2.2.1]-2'-heptene,
1-oxa-2,3-(4"-aminobenzo)cyclohexene-6-spiro-5'-bicyclo[2.2.1]-2'-heptene,
1-oxa-2,3-(5"-aminobenzo)cyclohexene-6-spiro-5'-bicyclo[2.2.1]-2'-heptene,
1-oxa-2,3-(6"-aminobenzo)cyclohexene-6-spiro-5'-bicyclo[2.2.1]-2'-heptene,
1-oxa-2,3-(3"-methoxybenzo)cyclohexene-6-spiro-5'-bicyclo[2.2.1]-2'-heptene,
1-oxa-2,3-(4"-methoxybenzo)cyclohexene-6-spiro-5'-bicyclo[2.2.1]-2'-heptene,
1-oxa-2,3-(5"-methoxybenzo)cyclohexene-6-spiro-5'-bicyclo[2.2.1]-2'-heptene,
1-oxa-2,3-(6"-methoxybenzo)cyclohexene-6-spiro-5'-bicyclo[2.2.1]-2'-heptene.
(xi)
1,4-dioxa-2,3-benzocyclohexene-5-spiro-5'-bicyclo[2.2.1]-2'-heptene,
1,4-dioxa-2,3-(3"-methylbenzo)cyclohexene-5-spiro-5'-bicyclo[2.2.1]-2'-heptene,
1,4-dioxa-2,3-(4"-methylbenzo)cyclohexene-5-spiro-5'-bicyclo[2.2.1]-2'-heptene,
1,4-dioxa-2,3-(5"-methylbenzo)cyclohexene-5-spiro-5'-bicyclo[2.2.1]-2'-heptene,
1,4-dioxa-2,3-(5"-methylbenzo)cyclohexene-5-spiro-5'-bicyclo[2.2.1]-2'-heptene,
1,4-dioxa-2,3-(3"-ethylbenzo)cyclohexene-5-spiro-5'-bicyclo[2.2.1]-2'-heptene,
1,4-dioxa-2,3-(4"-ethylbenzo)cyclohexene-5-spiro-5'-bicyclo[2.2.1]-2'-heptene,
1,4-dioxa-2,3-(5"-ethylbenzo)cyclohexene-5-spiro-5'-bicyclo[2.2.1]-2'-heptene,
1,4-dioxa-2,3-(6"-ethylbenzo)cyclohexene-5-spiro-5'-bicyclo[2.2.1]-2'-heptene,
1,4-dioxa-2,3-(3"-n-propylbenzo)cyclohexene-5-spiro-5'-bicyclo[2.2.1]-2'-heptene,
1,4-dioxa-2,3-(4"-n-propylbenzo)cyclohexene-5-spiro-5'-bicyclo[2.2.1]-2'-heptene,
1,4-dioxa-2,3-(5"-n-propylbenzo)cyclohexene-5-spiro-5'-bicyclo[2.2.1]-2'-heptene,
1,4-dioxa-2,3-(6"-n-propylbenzo)cyclohexene-5-spiro-5'-bicyclo[2.2.1]-2'-heptene,
1,4-dioxa-2,3-(3"-iso-propylbenzo)cyclohexene-5-spiro-5'-bicyclo[2.2.1]-2'-heptene,
1,4-dioxa-2,3-(4"-iso-propylbenzo)cyclohexene-5-spiro-5'-bicyclo[2.2.1]-2'-heptene,
1,4-dioxa-2,3-(5"-iso-propylbenzo)cyclohexene-5-spiro-5'-bicyclo[2.2.1]-2'-heptene,
1,4-dioxa-2,3-(6"-iso-propylbenzo)cyclohexene-5-spiro-5'-bicyclo[2.2.1]-2'-heptene,
1,4-dioxa-2,3-(3"-n-butylbenzo)cyclohexene-5-spiro-5'-bicyclo[2.2.1]-2'-heptene, 1,4-dioxa-2,3-(4"-n-butylbenzo)cyclohexene-5-spiro-5'-bicyclo[2.2.1]-2'-heptene,
1,4-dioxa-2,3-(5"-n-butylbenzo)cyclohexene-5-spiro-5'-bicyclo[2.2.1]-2'-heptene,
1,4-dioxa-2,3-(6"-n-butylbenzo)cyclohexene-5-spiro-5'-bicyclo[2.2.1]-2'-heptene,
1,4-dioxa-2,3-(3"-iso-butylbenzo)cyclohexene-5-spiro-5'-bicyclo[2.2.1]-2'-heptene,
1,4-dioxa-2,3-(4"-iso-butylbenzo)cyclohexene-5-spiro-5'-bicyclo[2.2.1]-2'-heptene,
1,4-dioxa-2,3-(5"-iso-butylbenzo)cyclohexene-5-spiro-5'-bicyclo[2.2.1]-2'-heptene,
1,4-dioxa-2,3-(6"-iso-butylbenzo)cyclohexene-5-spiro-5'-bicyclo[2.2.1]-2'-heptene,
1,4-dioxa-2,3-(3"-sec-butylbenzo)cyclohexene-5-spiro-5'-bicyclo[2.2.1]-2'-heptene,
1,4-dioxa-2,3-(4"-sec-butylbenzo)cyclohexene-5-spiro-5'-bicyclo[2.2.1]-2'-heptene,
1,4-dioxa-2,3-(5"-sec-butylbenzo)cyclohexene-5-spiro-5'-bicyclo[2.2.1]-2'-heptene,
1,4-dioxa-2,3-(6"-sec-butylbenzo)cyclohexene-5-spiro-5'-bicyclo[2.2.1]-2'-heptene,
1,4-dioxa-2,3-(3"-t-butylbenzo)cyclohexene-5-spiro-5'-bicyclo[2.2.1]-2'-heptene,
1,4-dioxa-2,3-(4"-t-butylbenzo)cyclohexene-5-spiro-5'-bicyclo[2.2.1]-2'-heptene,
1,4-dioxa-2,3-(5"-t-butylbenzo)cyclohexene-5-spiro-5'-bicyclo[2.2.1]-2'-heptene,
1,4-dioxa-2,3-(6"-t-butylbenzo)cyclohexene-5-spiro-5'-bicyclo[2.2.1]-2'-heptene,
1,4-dioxa-2,3-(3'-cyclohexylbenzo)cyclohexene-5-spiro-5'-bicyclo[2.2.1]-2'-heptene,
1,4-dioxa-2,3-(4"-cyclohexylbenzo)cyclohexene-5-spiro-5'-bicyclo[2.2.1]-2'-heptene,
1-oxa-2,3-(5"-cyclohexylbenzo)cyclohexene-5-spiro-5'-bicyclo[2.2.1]-2'-heptene,
1,4-dioxa-2,3-(6"-cyclohexylbenzo)cyclohexene-5-spiro-5'-bicyclo[2.2.1]-2'-heptene, 1,4-dioxa-2,3-(3"-phenylbenzo)cyclohexene-5-spiro-5'-bicyclo[2.2.1]-2'-heptene,
1,4-dioxa-2,3-(4"-phenylbenzo)cyclohexene-5-spiro-5'-bicyclo[2.2.1]-2'-heptene,
1,4-dioxa-2,3-(5"-phenylbenzo)cyclohexene-5-spiro-5'-bicyclo[2.2.1]-2'-heptene,
1,4-dioxa-2,3-(6"-phenylbenzo)cyclohexene-5-spiro-5'-bicyclo[2.2.1]-2'-heptene,
1,4-dioxa-2,3-(3"-chlorobenzo)cyclohexene-5-spiro-5'-bicyclo[2.2.1]-2'-heptene,
1,4-dioxa-2,3-(4"-chlorobenzo)cyclohexene-5-spiro-5'-bicyclo[2.2.1]-2'-heptene,
1,4-dioxa-2,3-(5"-chlorobenzo)cyclohexene-5-spiro-5'-bicyclo[2.2.1]-2'-heptene,
1,4-dioxa-2,3-(6"-chlorobenzo)cyclohexene-5-spiro-5'-bicyclo[2.2.1]-2'-heptene,
1,4-dioxa-2,3-(3"-aminobenzo)cyclohexene-5-spiro-5'-bicyclo[2.2.1]-2'-heptene,
1,4-dioxa-2,3-(4"-aminobenzo)cyclohexene-5-spiro-5'-bicyclo[2.2.1]-2'-heptene,
1,4-dioxa-2,3-(5"-aminobenzo)cyclohexene-5-spiro-5'-bicyclo[2.2.1]-2'-heptene,
1,4-dioxa-2,3-(6"-aminobenzo)cyclohexene-5-spiro-5'-bicyclo[2.2.1]-2'-heptene,
1,4-dioxa-2,3-(3"-methoxybenzo)cyclohexene-5-spiro-5'-bicyclo[2.2.1]-2'-heptene,
1,4-dioxa-2,3-(4"-methoxybenzo)cyclohexene-5-spiro-5'-bicyclo[2.2.1]-2'-heptene,
1,4-dioxa-2,3-(5"-methoxybenzo)cyclohexene-5-spiro-5'-bicyclo[2.2.1]-2'-heptene,
1,4-dioxa-2,3-(6"-methoxybenzo)cyclohexene-5-spiro-5'-bicyclo[2.2.1]-2'-heptene.

(xii)

1-aza-2,3-benzocyclopentene-4-spiro-5'-bicyclo[2.2.1]-2'-heptene,
1-aza-2,3-(3"-methylbenzo)cyclopentene-4-spiro-5'-bicyclo[2.2.1]-2'-heptene,
1-aza-2,3-(4"-methylbenzo)cyclopentene-4-spiro-5'-bicyclo[2.2.1]-2'-heptene,
1-aza-2,3(5"-methylbenzo)cyclopentene-4-spiro-5'-bicyclo[2.2.1]-2'-heptene,
1-aza-2,3-(6"-methylbenzo)cyclopentene-4-spiro-5'-bicyclo[2.2.1]-2'-heptene,
1-aza-2,3-(3"-ethylbenzo)cyclopentene-4-spiro-5'-bicyclo[2.2.1]-2'-heptene,
1-aza-2,3-(4"-ethylbenzo)cyclopentene-4-spiro-5'-bicyclo[2.2.1]-2'-heptene,
1-aza-2,3-(5"-ethylbenzo)cyclopentene-4-spiro-5'-bicyclo[2.2.1]-2'-heptene,
1-aza-2,3-(6"-ethylbenzo)cyclopentene-4-spiro-5'-bicyclo[2.2.1]-2'-heptene,
1-aza-2,3-(3'-n-propylbenzo)cyclopentene-4-spiro-5'-bicyclo[2.2.1]-2'-heptene,
1-aza-2,3-(4"-n-propylbenzo)cyclopentene-4-spiro-5'-bicyclo[2.2.1]-2'-heptene,
1-aza-2,3-(5'-n-propylbenzo)cyclopentene-4-spiro-5'-bicyclo[2.2.1]-2'-heptene,
1-aza-2,3-(6"-n-propylbenzo)cyclopentene-4-spiro-5'-bicyclo[2.2.1]-2'-heptene,
1-aza-2,3-(3"-iso-propylbenzo)cyclopentene-4-spiro-5'-bicyclo[2.2.1]-2'-heptene,
1-aza-2,3-(4"-iso-propylbenzo)cyclopentene-4-spiro-5'-bicyclo[2.2.1]-2'-heptene,
1-aza-2,3-(5"-iso-propylbenzo)cyclopentene-4-spiro-5'-bicyclo[2.2.1]-2'-heptene,
1-aza-2,3-(6"-iso-propylbenzo)cyclopentene-4-spiro-5'-bicyclo[2.2.1]-2'-heptene,
1-aza-2,3-(3"-n-butylbenzo)cyclopentene-4-spiro-5'-bicyclo[2.2.1]-2'-heptene,
1-aza-2,3-(4"-n-butylbenzo)cyclopentene-4-spiro-5'-bicyclo[2.2.1]-2'-heptene,
1-aza-2,3-(5"-n-butylbenzo)cyclopentene-4-spiro-5'-bicyclo[2.2.1]-2'-heptene,
1-aza-2,3-(6"-n-butylbenzo)cyclopentene-4-spiro-5'-bicyclo[2.2.1]-2'-heptene,
1-aza-2,3-(3"-iso-butylbenzo)cyclopentene-4-spiro-5'-bicyclo[2.2.1]-2'-heptene,
1-aza-2,3-(4"-iso-butylbenzo)cyclopentene-4-spiro-5'-bicyclo[2.2.1]-2'-heptene,
1-aza-2,3-(5"-iso-butylbenzo)cyclopentene-4-spiro-5'-bicyclo[2.2.1]-2'-heptene,
1-aza-2,3-(6"-iso-butylbenzo)cyclopentene-4-spiro-5'-bicyclo[2.2.1]-2'-heptene,
1-aza-2,3-(3"-sec-butylbenzo)cyclopentene-4-spiro-5'-bicyclo[2.2.1]-2'-heptene,
1-aza-2,3-(4"-sec-butylbenzo)cyclopentene-4-spiro-5'-bicyclo[2.2.1]-2'-heptene,
1-aza-2,3-(5"-sec-butylbenzo)cyclopentene-4-spiro-5'-bicyclo[2.2.1]-2'-heptene,
1-aza-2,3-(6"-sec-butylbenzo)cyclopentene-4-spiro-5'-bicyclo[2.2.1]-2'-heptene,
1-aza-2,3-(3"-t-butylbenzo)cyclopentene-4-spiro-5'-bicyclo[2.2.1]-2'-heptene,
1-aza-2,3-(4"-t-butylbenzo)cyclopentene-4-spiro-5'-bicyclo[2.2.1]-2'-heptene,
1-aza-2,3-(5"-t-butylbenzo)cyclopentene-4-spiro-5'-bicyclo[2.2.1]-2'-heptene, 1-aza-2,3-(6"-t-butylbenzo)cyclopentene-4-spiro-5'-bicyclo[2.2.1]-2'-heptene,
1-aza-2,3-(3"-cyclohexylbenzo)cyclopentene-4-spiro-5'-bicyclo[2.2.1]-2'-heptene,
1-aza-2,3-(4"-cyclohexylbenzo)cyclopentene-4-spiro-5'-bicyclo[2.2.1]-2'-heptene,
1-aza-2,3-(5"-cyclohexylbenzo)cyclopentene-4-spiro-5'-bicyclo[2.2.1]-2'-heptene,
1-aza-2,3-(6"-cyclohexylbenzo)cyclopentene-4-spiro-5'-bicyclo[2.2.1]-2'-heptene,
1-aza-2,3-(3"-phenylbenzo)cyclopentene-4-spiro-5'-bicyclo[2.2.1]-2'-heptene,
1-aza-2,3-(4"-phenylbenzo)cyclopentene-4-spiro-5'-bicyclo[2.2.1]-2'-heptene,
1-aza-2,3-(5"-phenylbenzo)cyclopentene-4-spiro-5'-bicyclo[2.2.1]-2'-heptene,
1-aza-2,3-(6"-phenylbenzo)cyclopentene-4-spiro-5'-bicyclo[2.2.1]-2'-heptene,
1-aza-2,3-(3"-chlorobenzo)cyclopentene-4-spiro-5'-bicyclo[2.2.1]-2'-heptene,
1-aza-2,3-(4"-chlorobenzo)cyclopentene-4-spiro-5'-bicyclo[2.2.1]-2'-heptene,
1-aza-2,3-(5"-chlorobenzo)cyclopentene-4-spiro-5'-bicyclo[2.2.1]-2'-heptene,
1-aza-2,3-(6"-chlorobenzo)cyclopentene-4-spiro-5'-bicyclo[2.2.1]-2'-heptene,
1-aza-2,3-(3"-aminobenzo)cyclopentene-4-spiro-5'-bicyclo[2.2.1]-2'-heptene,
1-aza-2,3-(4"-aminobenzo)cyclopentene-4-spiro-5'-bicyclo[2.2.1]-2'-heptene,
1-aza-2,3-(5"-aminobenzo)cyclopentene-4-spiro-5'-bicyclo[2.2.1]-2'-heptene,
1-aza-2,3-(6"-aminobenzo)cyclopentene-4-spiro-5'-bicyclo[2.2.1]-2'-heptene,
1-aza-2,3-(3"-methoxybenzo)cyclopentene-4-spiro-5'-bicyclo[2.2.1]-2'-heptene,
1-aza-2,3-(4"-methoxybenzo)cyclopentene-4-spiro-5'-bicyclo[2.2.1]-2'-heptene,
1-aza-2,3-(5"-methoxybenzo)cyclopentene-4-spiro-5'-bicyclo[2.2.1]-2'-heptene,
1-aza-2,3-(6"-methoxybenzo)cyclopentene-4-spiro-5'-bicyclo[2.2.1]-2'-heptene,
1-aza-2,3-benzocyclopentene-5-spiro-5'-bicyclo[2.2.1]-2'-heptene,
1-aza-2,3-(3"-methylbenzo)cyclopentene-5-spiro-5'-bicyclo[2.2.1]-2'-heptene,
1-aza-2,3-(4"-methylbenzo)cyclopentene-5-spiro-5'-bicyclo[2.2.1]-2'-heptene,
1-aza-2,3(5"-methylbenzo)cyclopentene-5-spiro-5'-bicyclo[2.2.1]-2'-heptene,
1-aza-2,3-(6"-methylbenzo)cyclopentene-5-spiro-5'-bicyclo[2.2.1]-2'-heptene,
1-aza-2,3-(3"-ethylbenzo)cyclopentene-5-spiro-5'-bicyclo[2.2.1]-2'-heptene,
1-aza-2,3-(4"-ethylbenzo)cyclopentene-5-spiro-5'-bicyclo[2.2.1]-2'-heptene,
1-aza-2,3-(5"-ethylbenzo)cyclopentene-5-spiro-5'-bicyclo[2.2.1]-2'-heptene,
1-aza-2,3-(6"-ethylbenzo)cyclopentene-5-spiro-5'-bicyclo[2.2.1]-2'-heptene,
1-aza-2,3-(3'-n-propylbenzo)cyclopentene-5-spiro-5'-bicyclo[2.2.1]-2'-heptene,
1-aza-2,3-(4"-n-propylbenzo)cyclopentene-5-spiro-5'-bicyclo[2.2.1]-2'-heptene,
1-aza-2,3-(5'-n-propylbenzo)cyclopentene-5-spiro-5'-bicyclo[2.2.1]-2'-heptene,
1-aza-2,3-(6"-n-propylbenzo)cyclopentene-5-spiro-5'-bicyclo[2.2.1]-2'-heptene,
1-aza-2,3-(3"-iso-propylbenzo)cyclopentene-5-spiro-5'-bicyclo[2.2.1]-2'-heptene,
1-aza-2,3-(4"-iso-propylbenzo)cyclopentene-5-spiro-5'-bicyclo[2.2.1]-2'-heptene,
1-aza-2,3-(5"-iso-propylbenzo)cyclopentene-5-spiro-5'-bicyclo[2.2.1]-2'-heptene,
1-aza-2,3-(6"-iso-propylbenzo)cyclopentene-5-spiro-5'-bicyclo[2.2.1]-2'-heptene,
1-aza-2,3-(3"-n-butylbenzo)cyclopentene-5-spiro-5'-bicyclo[2.2.1]-2'-heptene,
1-aza-2,3-(4"-n-butylbenzo)cyclopentene-5-spiro-5'-bicyclo[2.2.1]-2'-heptene,
1-aza-2,3-(5"-n-butylbenzo)cyclopentene-5-spiro-5'-bicyclo[2.2.1]-2'-heptene,
1-aza-2,3-(6"-n-butylbenzo)cyclopentene-5-spiro-5'-bicyclo[2.2.1]-2'-heptene,
1-aza-2,3-(3"-iso-butylbenzo)cyclopentene-5-spiro-5'-bicyclo[2.2.1]-2'-heptene,
1-aza-2,3-(4"-iso-butylbenzo)cyclopentene-5-spiro-5'-bicyclo[2.2.1]-2'-heptene,
1-aza-2,3-(5"-iso-butylbenzo)cyclopentene-5-spiro-5'-bicyclo[2.2.1]-2'-heptene,
1-aza-2,3-(6"-iso-butylbenzo)cyclopentene-5-spiro-5'-bicyclo[2.2.1]-2'-heptene,
1-aza-2,3-(3"-sec-butylbenzo)cyclopentene-5-spiro-5'-bicyclo[2.2.1]-2'-heptene,
1-aza-2,3-(4"-sec-butylbenzo)cyclopentene-5-spiro-5'-bicyclo[2.2.1]-2'-heptene,
1-aza-2,3-(5"-sec-butylbenzo)cyclopentene-5-spiro-5'-bicyclo[2.2.1]-2'-heptene,
1-aza-2,3-(6"-sec-butylbenzo)cyclopentene-5-spiro-5'-bicyclo[2.2.1]-2'-heptene,
1-aza-2,3-(3"-t-butylbenzo)cyclopentene-5-spiro-5'-bicyclo[2.2.1]-2'-heptene,
1-aza-2,3-(4"-t-butylbenzo)cyclopentene-5-spiro-5'-bicyclo[2.2.1]-2'-heptene,
1-aza-2,3-(5"-t-butylbenzo)cyclopentene-5-spiro-5'-bicyclo[2.2.1]-2'-heptene,
1-aza-2,3-(6"-t-butylbenzo)cyclopentene-5-spiro-5'-bicyclo[2.2.1]-2'-heptene,
1-aza-2,3-(3"-cyclohexylbenzo)cyclopentene-5-spiro-5'-bicyclo[2.2.1]-2'-heptene,
1-aza-2,3-(4"-cyclohexylbenzo)cyclopentene-5-spiro-5'-bicyclo[2.2.1]-2'-heptene,
1-aza-2,3-(5"-cyclohexylbenzo)cyclopentene-5-spiro-5'-bicyclo[2.2.1]-2'-heptene,
1-aza-2,3-(6"-cyclohexylbenzo)cyclopentene-5-spiro-5'-bicyclo[2.2.1]-2'-heptene,
1-aza-2,3-(3"-phenylbenzo)cyclopentene-5-spiro-5'-bicyclo[2.2.1]-2'-heptene,
1-aza-2,3-(4"-phenylbenzo)cyclopentene-5-spiro-5'-bicyclo[2.2.1]-2'-heptene,
1-aza-2,3-(5"-phenylbenzo)cyclopentene-5-spiro-5'-bicyclo[2.2.1]-2'-heptene,
1-aza-2,3-(6"-phenylbenzo)cyclopentene-5-spiro-5'-bicyclo[2.2.1]-2'-heptene,
1-aza-2,3-(3"-chlorobenzo)cyclopentene-5-spiro-5'-bicyclo[2.2.1]-2'-heptene,
1-aza-2,3-(4"-chlorobenzo)cyclopentene-5-spiro-5'-bicyclo[2.2.1]-2'-heptene,
1-aza-2,3-(5"-chlorobenzo)cyclopentene-5-spiro-5'-bicyclo[2.2.1]-2'-heptene,
1-aza-2,3-(6"-chlorobenzo)cyclopentene-5-spiro-5'-bicyclo[2.2.1]-2'-heptene, 1-aza-2,3-(3"-aminobenzo)cyclopentene-5-spiro-5'-bicyclo[2.2.1]-2'-heptene,
1-aza-2,3-(4"-aminobenzo)cyclopentene-5-spiro-5'-bicyclo[2.2.1]-2'-heptene,
1-aza-2,3-(5"-aminobenzo)cyclopentene-5-spiro-5'-bicyclo[2.2.1]-2'-heptene,
1-aza-2,3-(6"-aminobenzo)cyclopentene-5-spiro-5'-bicyclo[2.2.1]-2'-heptene,
1-aza-2,3-(3"-methoxybenzo)cyclopentene-5-spiro-5'-bicyclo[2.2.1]-2'-heptene,
1-aza-2,3-(4"-methoxybenzo)cyclopentene-5-spiro-5'-bicyclo[2.2.1]-2'-heptene,
1-aza-2,3-(5"-methoxybenzo)cyclopentene-5-spiro-5'-bicyclo[2.2.1]-2'-heptene,
1-aza-2,3-(6"-methoxybenzo)cyclopentene-5-spiro-5'-bicyclo[2.2.1]-2'-heptene.
(xiii)
1,4-diaza-2,3-benzocyclohexene-5-spiro-5'-bicyclo[2.2.1]-2'-heptene,
1,4-diaza-2,3-(3"-methylbenzo)cyclohexene-5-spiro-5'-bicyclo[2.2.1]-2'-heptene,
1,4-diaza-2,3-(4"-methylbenzo)cyclohexene-5-spiro-5'-bicyclo[2.2.1]-2'-heptene,
1,4-diaza-2,3-(5"-methylbenzo)cyclohexene-5-spiro-5'-bicyclo[2.2.1]-2'-heptene,
1,4-diaza-2,3-(5"-methylbenzo)cyclohexene-5-spiro-5'-bicyclo[2.2.1]-2'-heptene,
1,4-diaza-2,3-(3"-ethylbenzo)cyclohexene-5-spiro-5'-bicyclo[2.2.1]-2'-heptene,
1,4-diaza-2,3-(4"-ethylbenzo)cyclohexene-5-spiro-5'-bicyclo[2.2.1]-2'-heptene,
1,4-diaza-2,3-(5"-ethylbenzo)cyclohexene-5-spiro-5'-bicyclo[2.2.1]-2'-heptene,
1,4-diaza-2,3-(6"-ethylbenzo)cyclohexene-5-spiro-5'-bicyclo[2.2.1]-2'-heptene,
1,4-diaza-2,3-(3"-n-propylbenzo)cyclohexene-5-spiro-5'-bicyclo[2.2.1]-2'-heptene,
1,4-diaza-2,3-(4"-n-propylbenzo)cyclohexene-5-spiro-5'-bicyclo[2.2.1]-2'-heptene,
1,4-diaza-2,3-(5"-n-propylbenzo)cyclohexene-5-spiro-5'-bicyclo[2.2.1]-2'-heptene,
1,4-diaza-2,3-(6"-n-propylbenzo)cyclohexene-5-spiro-5'-bicyclo[2.2.1]-2'-heptene,
1,4-diaza-2,3-(3"-iso-propylbenzo)cyclohexene-5-spiro-5'-bicyclo[2.2.1]-2'-heptene,
1,4-diaza-2,3-(4"-iso-propylbenzo)cyclohexene-5-spiro-5'-bicyclo[2.2.1]-2'-heptene,
1,4-diaza-2,3-(5"-iso-propylbenzo)cyclohexene-5-spiro-5'-bicyclo[2.2.1]-2'-heptene,
1,4-diaza-2,3-(6"-iso-propylbenzo)cyclohexene-5-spiro-5'-bicyclo[2.2.1]-2'-heptene,
1,4-diaza-2,3-(3"-n-butylbenzo)cyclohexene-5-spiro-5'-bicyclo[2.2.1]-2'-heptene,
1,4-diaza-2,3-(4"-n-butylbenzo)cyclohexene-5-spiro-5'-bicyclo[2.2.1]-2'-heptene,
1,4-diaza-2,3-(5"-n-butylbenzo)cyclohexene-5-spiro-5'-bicyclo[2.2.1]-2'-heptene,
1,4-diaza-2,3-(6"-n-butylbenzo)cyclohexene-5-spiro-5'-bicyclo[2.2.1]-2'-heptene,
1,4-diaza-2,3-(3"-iso-butylbenzo)cyclohexene-5-spiro-5'-bicyclo[2.2.1]-2'-heptene,
1,4-diaza-2,3-(4"-iso-butylbenzo)cyclohexene-5-spiro-5'-bicyclo[2.2.1]-2'-heptene,
1,4-diaza-2,3-(5"-iso-butylbenzo)cyclohexene-5-spiro-5'-bicyclo[2.2.1]-2'-heptene,
1,4-diaza-2,3-(6"-iso-butylbenzo)cyclohexene-5-spiro-5'-bicyclo[2.2.1]-2'-heptene,
1,4-diaza-2,3-(3"-sec-butylbenzo)cyclohexene-5-spiro-5'-bicyclo[2.2.1]-2'-heptene,
1,4-diaza-2,3-(4"-sec-butylbenzo)cyclohexene-5-spiro-5'-bicyclo[2.2.1]-2'-heptene,
1,4-diaza-2,3-(5"-sec-butylbenzo)cyclohexene-5-spiro-5'-bicyclo[2.2.1]-2'-heptene,
1,4-diaza-2,3-(6"-sec-butylbenzo)cyclohexene-5-spiro-5'-bicyclo[2.2.1]-2'-heptene,
1,4-diaza-2,3-(3"-t-butylbenzo)cyclohexene-5-spiro-5'-bicyclo[2.2.1]-2'-heptene,
1,4-diaza-2,3-(4"-t-butylbenzo)cyclohexene-5-spiro-5'-bicyclo[2.2.1]-2'-heptene,
1,4-diaza-2,3-(5"-t-butylbenzo)cyclohexene-5-spiro-5'-bicyclo[2.2.1]-2'-heptene,
1,4-diaza-2,3-(6"-t-butylbenzo)cyclohexene-5-spiro-5'-bicyclo[2.2.1]-2'-heptene,
1,4-diaza-2,3-(3'-cyclohexylbenzo)cyclohexene-5-spiro-5'-bicyclo[2.2.1]-2'-heptene,
1,4-diaza-2,3-(4"-cyclohexylbenzo)cyclohexene-5-spiro-5'-bicyclo[2.2.1]-2'-heptene,
1-diaza-2,3-(5"-cyclohexylbenzo)cyclohexene-5-spiro-5'-bicyclo[2.2.1]-2'-heptene,
1,4-diaza-2,3-(6"-cyclohexylbenzo)cyclohexene-5-spiro-5'-bicyclo[2.2.1]-2'-heptene,
1,4-diaza-2,3-(3"-phenylbenzo)cyclohexene-5-spiro-5'-bicyclo[2.2.1]-2'-heptene,
1,4-diaza-2,3-(4"-phenylbenzo)cyclohexene-5-spiro-5'-bicyclo[2.2.1]-2'-heptene,
1,4-diaza-2,3-(5"-phenylbenzo)cyclohexene-5-spiro-5'-bicyclo[2.2.1]-2'-heptene,
1,4-diaza-2,3-(6"-phenylbenzo)cyclohexene-5-spiro-5'-bicyclo[2.2.1]-2'-heptene,
1,4-diaza-2,3-(3"-chlorobenzo)cyclohexene-5-spiro-5'-bicyclo[2.2.1]-2'-heptene,
1,4-dioxa-2,3-(4"-chlorobenzo)cyclohexene-5-spiro-5'-bicyclo[2.2.1]-2'-heptene,
1,4-dioxa-2,3-(5"-chlorobenzo)cyclohexene-5-spiro-5'-bicyclo[2.2.1]-2'-heptene,
1,4-diaza-2,3-(6"-chlorobenzo)cyclohexene-5-spiro-5'-bicyclo[2.2.1]-2'-heptene,
1,4-diaza-2,3-(3"-aminobenzo)cyclohexene-5-spiro-5'-bicyclo[2.2.1]-2'-heptene,
1,4-diaza-2,3-(4"-aminobenzo)cyclohexene-5-spiro-5'-bicyclo[2.2.1]-2'-heptene,
1,4-diaza-2,3-(5"-aminobenzo)cyclohexene-5-spiro-5'-bicyclo[2.2.1]-2'-heptene,
1,4-diaza-2,3-(6"-aminobenzo)cyclohexene-5-spiro-5'-bicyclo[2.2.1]-2'-heptene,
1,4-diaza-2,3-(3"-methoxybenzo)cyclohexene-5-spiro-5'-bicyclo[2.2.1]-2'-heptene,
1,4-diaza-2,3-(4"-methoxybenzo)cyclohexene-5-spiro-5'-bicyclo[2.2.1]-2'-heptene,
1,4-diaza-2,3-(5"-methoxybenzo)cyclohexene-5-spiro-5'-bicyclo[2.2.1]-2'-heptene,
1,4-diaza-2,3-(6"-methoxybenzo)cyclohexene-5-spiro-5'-bicyclo[2.2.1]-2'-heptene.
(xiv)
spiro[3,4-dihydro-2H-anthracene-1,5'-2'-norbornene],
spiro[5-methyl-3,4-dihydro-2H-anthracene-1,5'-2'-norbornene],
spiro[6-methyl-3,4-dihydro-2H-anthracene-1,5'-2'-norbornene],
spiro[7-methyl-3,4-dihydro-2H-anthracene-1,5'-2'-norbornene],
spiro[8-methyl-3,4-dihydro-2H-anthracene-1,5'-2'-norbornene], spiro[5-ethyl-3,4-dihydro-2H-anthracene-1,5'-2'-norbornene],
spiro[6-ethyl-3,4-dihydro-2H-anthracene-1,5'-2'-norbornene],
spiro[7-ethyl-3,4-dihydro-2H-anthracene-1,5'-2'-norbornene],
spiro[8-ethyl-3,4-dihydro-2H-anthracene-1,5'-2'-norbornene],
spiro[5-n-propyl-3,4-dihydro-2H-anthracene-1,5'-2'-norbornene],
spiro[6-n-propyl-3,4-dihydro-2H-anthracene-1,5'-2'-norbornene],
spiro[7-n-propyl-3,4-dihydro-2H-anthracene-1,5'-2'-norbornene],
spiro[8-n-propyl-3,4-dihydro-2H-anthracene-1,5-f-2'-norbornene],
spiro[5-iso-propyl-3,4-dihydro-2H-anthracene-1,5'-2'-norbornene],
spiro[6-iso-propyl-3,4-dihydro-2H-anthracene-1,5'-2'-norbornene],
spiro[7-iso-propyl-3,4-dihydro-2H-anthracene-1,5'-2'-norbornene],
spiro[8-iso-propyl-3,4-dihydro-2H-anthracene-1,5-f-2'-norbornene],
spiro[9-n-butyl-3,4-dihydro-2H-anthracene-1,5'-2'-norbornene],
spiro[5-n-butyl-3,4-dihydro-2H-anthracene-1,5'-2'-norbornene],
spiro[7-n-butyl-3,4-dihydro-2H-anthracene-1,5'-2'-norbornene],
spiro[8-n-butyl-3,4-dihydro-2H-anthracene-1,5'-2'-norbornene],
spiro[5-iso-butyl-3,4-dihydro-2H-anthracene-1,5'-2'-norbornene],
spiro[6-iso-butyl-3,4-dihydro-2H-anthracene-1,5'-2'-norbornene],
spiro[7-iso-butyl-3,4-dihydro-2H-anthracene-1,5'-2'-norbornene],
spiro[8-iso-butyl-3,4-dihydro-2H-anthracene-1,5'-2'-norbornene],
spiro[9-sec-butyl-3,4-dihydro-2H-anthracene-1,5'-2'-norbornene],
spiro[5-sec-butyl-3,4-dihydro-2H-anthracene-1,5'-2'-norbornene],
spiro[7-sec-butyl-3,4-dihydro-2H-anthracene-1,5'-2'-norbornene],
spiro[8-sec-butyl-3,4-dihydro-2H-anthracene-1,5'-2'-norbornene],
spiro[5-t-butyl-3,4-dihydro-2H-anthracene-1,5'-2'-norbornene],
spiro[6-t-butyl-3,4-dihydro-2H-anthracene-1,5'-2'-norbornene],
spiro[7-t-butyl-3,4-dihydro-2H-anthracene-1,5'-2'-norbornene],
spiro[8-t-butyl-3,4-dihydro-2H-anthracene-1,5'-2'-norbornene],
spiro[5-cyclohexyl-3,4-dihydro-2H-anthracene-1,5'-2'-norbornene],
spiro[6-cyclohexyl-3,4-dihydro-2H-anthracene-1,5'-2'-norbornene],
spiro[7-cyclohexyl-3,4-dihydro-2H-anthracene-1,5'-2'-norbornene],
spiro[8-cyclohexyl-3,4-dihydro-2H-anthracene-1,5'-2'-norbornene],
spiro[5-phenyl-3,4-dihydro-2H-anthracene-1,5'-2'-norbornene],
spiro[6-phenyl-3,4-dihydro-2H-anthracene-1,5'-2'-norbornene],
spiro[7-phenyl-3,4-dihydro-2H-anthracene-1,5'-2'-norbornene],
spiro[8-phenyl-3,4-dihydro-2H-anthracene-1,5'-2'-norbornene],
spiro[5-chloro-3,4-dihydro-2H-anthracene-1,5'-2'-norbornene],
spiro[6-chloro-3,4-dihydro-2H-anthracene-1,5'-2'-norbornene],
spiro[7-chloro-3,4-dihydro-2H-anthracene-1,5'-2'-norbornene],
spiro[8-chloro-3,4-dihydro-2H-anthracene-1,5'-2'-norbornene],
spiro[5-phenyl-3,4-dihydro-2H-anthracene-1,5'-2'-norbornene],
spiro[6-phenyl-3,4-dihydro-2H-anthracene-1,5'-2'-norbornene],
spiro[7-phenyl-3,4-dihydro-2H-anthracene-1,5'-2'-norbornene],
spiro[8-phenyl-3,4-dihydro-2H-anthracene-1,5'-2'-norbornene],
spiro[5-amino-3,4-dihydro-2H-anthracene-1,5'-2'-norbornene],
spiro[6-amino-3,4-dihydro-2H-anthracene-1,5'-2'-norbornene],
spiro[7-amino-3,4-dihydro-2H-anthracene-1,5'-2'-norbornene],
spiro[8-amino-3,4-dihydro-2H-anthracene-1,5'-2'-norbornene],
spiro[5-methoxy-3,4-dihydro-2H-anthracene-1,5'-2'-norbornene],
spiro[6-methoxy-3,4-dihydro-2H-anthracene-1,5'-2'-norbornene],
spiro[7-methoxy-3,4-dihydro-2H-anthracene-1,5'-2'-norbornene],
spiro[8-methoxy-3,4-dihydro-2H-anthracene-1,5'-2'-norbornene],
spiro[3,4-dihydro-1H-anthracene-2,5'-2'-norbornene],
spiro[5-methyl-3,4-dihydro-1H-anthracene-2,5'-2'-norbornene],
spiro[6-methyl-3,4-dihydro-2H-anthracene-2,5'-2'-norbornene],
spiro[7-methyl-3,4-dihydro-1H-anthracene-2,5'-2'-norbornene],
spiro[8-methyl-3,4-dihydro-1H-anthracene-2,5'-2'-norbornene],
spiro[5-ethyl-3,4-dihydro-1H-anthracene-2,5'-2'-norbornene],
spiro[6-ethyl-3,4-dihydro-1H-anthracene-2,5'-2'-norbornene],
spiro[7-ethyl-3,4-dihydro-1H-anthracene-2,5'-2'-norbornene],
spiro[8-ethyl-3,4-dihydro-1H-anthracene-2,5'-2'-norbornene],
spiro[5-n-propyl-3,4-dihydro-1H-anthracene-2,5'-2'-norbornene],
spiro[6-n-propyl-3,4-dihydro-1H-anthracene-2,5'-2'-norbornene],
spiro[7-n-propyl-3,4-dihydro-1H-anthracene-2,5'-2'-norbornene],
spiro[8-n-propyl-3,4-dihydro-1H-anthracene-2,5'-2'-norbornene],
spiro[5-iso-propyl-3,4-dihydro-1H-anthracene-2,5'-2'-norbornene],
spiro[6-iso-propyl-3,4-dihydro-1H-anthracene-2,5'-2'-norbornene], spiro[7-iso-propyl-3,4-dihydro-1H-anthracene-2,5'-2'-norbornene],
spiro[8-iso-propyl-3,4-dihydro-1H-anthracene-2,5'-5'-norbornene],
spiro[5-n-butyl-3,4-dihydro-1H-anthracene-2,5'-2'-norbornene],
spiro[6-n-butyl-3,4-dihydro-1H-anthracene-2,5'-2'-norbornene],
spiro[7-n-butyl-3,4-dihydro-1H-anthracene-2,5'-2'-norbornene],
spiro[8-n-butyl-3,4-dihydro-1H-anthracene-2,5'-2'-norbornene],
spiro[5-iso-butyl-3,4-dihydro-1H-anthracene-2,5'-2'-norbornene],
spiro[6-iso-butyl-3,4-dihydro-1H-anthracene-2,5'-2'-norbornene],
spiro[7-iso-butyl-3,4-dihydro-1H-anthracene-2,5'-2'-norbornene],
spiro[8-iso-butyl-3,4-dihydro-1H-anthracene-2,5'-2'-norbornene],
spiro[5-sec-butyl-3,4-dihydro-1H-anthracene-2,5'-2'-norbornene],
spiro[6-sec-butyl-3,4-dihydro-1H-anthracene-2,5'-2'-norbornene],
spiro[7-sec-butyl-3,4-dihydro-1H-anthracene-2,5'-2'-norbornene],
spiro[8-sec-butyl-3,4-dihydro-1H-anthracene-2,5'-2'-norbornene],
spiro[5-t-butyl-3,4-dihydro-1H-anthracene-2,5'-2'-norbornene],
spiro[6-t-butyl-3,4-dihydro-1H-anthracene-2,5'-2'-norbornene],
spiro[7-t-butyl-3,4-dihydro-1H-anthracene-2,5'-2'-norbornene],
spiro[8-t-butyl-3,4-dihydro-1H-anthracene-2,5'-2'-norbornene],
spiro[5-cyclohexyl-3,4-dihydro-1H-anthracene-2,5'-2'-norbornene],
spiro[6-cyclohexyl-3,4-dihydro-1H-anthracene-2,5'-2'-norbornene],
spiro[7-cyclohexyl-3,4-dihydro-1H-anthracene-2,5'-2'-norbornene],
spiro[8-cyclohexyl-3,4-dihydro-1H-anthracene-2,5'-2'-norbornene],
spiro[5-phenyl-3,4-dihydro-1H-anthracene-2,5'-2'-norbornene],
spiro[6-phenyl-3,4-dihydro-1H-anthracene-2,5'-2'-norbornene],
spiro[7-phenyl-3,4-dihydro-1H-anthracene-2,5'-2'-norbornene],
spiro[8-phenyl-3,4-dihydro-1H-anthracene-2,5'-2'-norbornene],
spiro[5-chloro-3,4-dihydro-1H-anthracene-2,5'-2'-norbornene],
spiro[6-chloro-3,4-dihydro-1H-anthracene-2,5'-2'-norbornene],
spiro[7-chloro-3,4-dihydro-1H-anthracene-2,5'-2'-norbornene],
spiro[8-chloro-3,4-dihydro-1H-anthracene-2,5'-2'-norbornene],
spiro[5-phenyl-3,4-dihydro-1H-anthracene-2,5'-2'-norbornene],
spiro[6-phenyl-3,4-dihydro-1H-anthracene-2,5'-2'-norbornene],
spiro[7-phenyl-3,4-dihydro-1H-anthracene-2,5'-2'-norbornene],
spiro[8-phenyl-3,4-dihydro-1H-anthracene-2,5'-2'-norbornene],
spiro[5-amino-3,4-dihydro-1H-anthracene-2,5'-2'-norbornene],
spiro[6-amino-3,4-dihydro-1H-anthracene-2,5'-2'-norbornene],
spiro[7-amino-3,4-dihydro-1H-anthracene-2,5'-2'-norbornene],
spiro[8-amino-3,4-dihydro-1H-anthracene-2,5'-2'-norbornene],
spiro[5-methoxy-3,4-dihydro-1H-anthracene-2,5'-2'-norbornene],
spiro[6-methoxy-3,4-dihydro-1H-anthracene-2,5'-2'-norbornene],
spiro[7-methoxy-3,4-dihydro-1H-anthracene-2,5'-2'-norbornene],
spiro[8-methoxy-3,4-dihydro-1H-anthracene-2,5'-2'-norbornene].

(xv)
spiro[3,4-dihydroanthracen-1-one-2,5'-2'-norbornene],
spiro[5-methyl-3,4-dihydroanthracen-1-one-2,5'-2'-norbornene],
spiro[6-methyl-3,4-dihydroanthracen-1-one-2,5'-2'-norbornene],
spiro[7-methyl-3,4-dihydroanthracen-1-one-2,5'-2'-norbornene],
spiro[8-methyl-3,4-dihydroanthracen-1-one-2,5'-2'-norbornene],
spiro[5-ethyl-3,4-dihydroanthracen-1-one-2,5'-2'-norbornene],
spiro[6-ethyl-3,4-dihydroanthracen-1-one-2,5'-2'-norbornene],
spiro[7-ethyl-3,4-dihydroanthracen-1-one-2,5'-2'-norbornene],
spiro[8-ethyl-3,4-dihydroanthracen-1-one-2,5'-2'-norbornene],
spiro[5-n-propyl-3,4-dihydroanthracen-1-one-2,5'-2'-norbornene],
spiro[6-n-propyl-3,4-dihydroanthracen-1-one-2,5'-2'-norbornene],
spiro[7-n-propyl-3,4-dihydroanthracen-1-one-2,5'-2'-norbornene],
spiro[8-n-propyl-3,4-dihydroanthracen-1-one-2,5'-2'-norbornene],
spiro[5-iso-propyl-3,4-dihydroanthracen-1-one-2,5'-2'-norbornene],
spiro[6-iso-propyl-3,4-dihydroanthracen-1-one-2,5'-2'-norbornene],
spiro[7-iso-propyl-3,4-dihydroanthracen-1-one-2,5'-2'-norbornene],
spiro[8-iso-propyl-3,4-dihydroanthracen-1-one-2,5'-2'-norbornene],
spiro[5-n-butyl-3,4-dihydroanthracen-1-one-2,5'-2'-norbornene],
spiro[6-n-butyl-3,4-dihydroanthracen-1-one-2,5'-2'-norbornene],
spiro[7-n-butyl-3,4-dihydroanthracen-1-one-2,5'-2'-norbornene],
spiro[8-n-butyl-3,4-dihydroanthracen-1-one-2,5'-2'-norbornene],
spiro[5-iso-butyl-3,4-dihydroanthracen-1-one-2,5'-2'-norbornene],
spiro[6-iso-butyl-3,4-dihydroanthracen-1-one-2,5'-2'-norbornene],
spiro[7-iso-butyl-3,4-dihydroanthracen-1-one-2,5'-2'-norbornene], spiro[8-iso-butyl-3,4-dihydroanthracen-1-one-2,5'-2'-norbornene],
spiro[5-sec-butyl-3,4-dihydroanthracen-1-one-2,5'-2'-norbornene],
spiro[6-sec-butyl-3,4-dihydroanthracen-1-one-2,5'-2'-norbornene],
spiro[7-sec-butyl-3,4-dihydroanthracen-1-one-2,5'-2'-norbornene],
spiro[8-sec-butyl-3,4-dihydroanthracen-1-one-2,5'-2'-norbornene],
spiro[5-t-butyl-3,4-dihydroanthracen-1-one-2,5'-2'-norbornene],
spiro[6-t-butyl-3,4-dihydroanthracen-1-one-2,5'-2'-norbornene],
spiro[7-t-butyl-3,4-dihydroanthracen-1-one-2,5'-2'-norbornene],
spiro[8-t-butyl-3,4-dihydroanthracen-1-one-2,5'-2'-norbornene],
spiro[5-cyclohexyl-3,4-dihydroanthracen-1-one-2,5'-2'-norbornene],
spiro[6-cyclohexyl-3,4-dihydroanthracen-1-one-2,5'-2'-norbornene],
spiro[7-cyclohexyl-3,4-dihydroanthracen-1-one-2,5'-2'-norbornene],
spiro[8-cyclohexyl-3,4-dihydroanthracen-1-one-2,5'-2'-norbornene],
spiro[5-phenyl-3,4-dihydroanthracen-1-one-2,5'-2'-norbornene],
Spiro[6-phenyl-3,4-dihydroanthracen-1-one-2,5'-2'-norbornene],
spiro[7-phenyl-3,4-dihydroanthracen-1-one-2,5'-2'-norbornene],
spiro[8-phenyl-3,4-dihydroanthracen-1-one-2,5'-2'-norbornene],
spiro[5-chloro-3,4-dihydroanthracen-1-one-2,5'-2'-norbornene],
spiro[6-chloro-3,4-dihydroanthracen-1-one-2,5'-2'-norbornene],
spiro[7-chloro-3,4-dihydroanthracen-1-one-2,5'-2'-norbornene],
spiro[8-chloro-3,4-dihydroanthracen-1-one-2,5'-2'-norbornene],
spiro[5-phenyl-3,4-dihydroanthracen-1-one-2,5'-2'-norbornene],
spiro[6-phenyl-3,4-dihydroanthracen-1-one-2,5'-2'-norbornene],
spiro[7-phenyl-3,4-dihydronaphthalen-1-one-2,5'-2'-norbornene],
spiro[8-phenyl-3,4-dihydroanthracen-1-one-2,5'-2'-norbornene],
spiro[5-amino-3,4-dihydroanthracen-1-one-2,5'-2'-norbornene],
spiro[6-amino-3,4-dihydroanthracen-1-one-2,5'-2'-norbornene],
spiro[7-amino-3,4-dihydroanthracen-1-one-2,5'-2'-norbornene],
spiro[8-amino-3,4-dihydroanthracene-2,5'-2'-norbornene],
spiro[5-methoxy-3,4-dihydroanthracen-1-one-2,5'-2'-norbornene],
spiro[6-methoxy-3,4-dihydroanthracen-1-one-2,5'-2'-norbornene],
spiro[7-methoxy-3,4-dihydroanthracen-1-one-2,5'-2'-norbornene],
spiro[8-methoxy-3,4-dihydroanthracen-1-one-2,5'-2'-norbornene],
spiro[2,4-dihydronaphthalen-1-one-3,5'-2'-norbornene],
spiro[5-methyl-2,4-dihydronaphthalen-1-one-3,5'-2'-norbornene],
spiro[6-methyl-2,4-dihydronaphthalen-1-one-3,5'-2'-norbornene],
spiro[7-methyl-2,4-dihydronaphthalen-1-one-3,5'-2'-norbornene],
spiro[8-methyl-2,4-dihydronaphthalen-1-one-3,5'-2'-norbornene],
spiro[5-ethyl-2,4-dihydronaphthalen-1-one-3,5'-2'-norbornene],
spiro[6-ethyl-2,4-dihydronaphthalen-1-one-3,5'-2'-norbornene],
spiro[7-ethyl-2,4-dihydronaphthalen-1-one-3,5'-2'-norbornene],
spiro[8-ethyl-2,4-dihydronaphthalen-1-one-3,5'-2'-norbornene],
spiro[5-n-propyl-2,4-dihydronaphthalen-1-one-3,5'-2'-norbornene],
spiro[6-n-propyl-2,4-dihydronaphthalen-1-one-3,5'-2'-norbornene],
spiro[7-n-propyl-2,4-dihydronaphthalen-1-one-3,5'-2'-norbornene],
spiro[8-n-propyl-2,4-dihydronaphthalen-1-one-3,5'-2'-norbornene],
spiro[5-iso-propyl-2,4-dihydronaphthalen-1-one-3,5'-2'-norbornene],
spiro[6-iso-propyl-2,4-dihydronaphthalen-1-one-3,5'-2'-norbornene],
spiro[7-iso-propyl-2,4-dihydronaphthalen-1-one-3,5'-2'-norbornene],
spiro[8-iso-propyl-2,4-dihydronaphthalen-1-one-3,5'-2'-norbornene],
spiro[5-n-butyl-2,4-dihydronaphthalen-1-one-3,5'-2'-norbornene],
spiro[6-n-butyl-2,4-dihydronaphthalen-1-one-3,5'-2'-norbornene],
spiro[7-n-butyl-2,4-dihydronaphthalen-1-one-3,5'-2'-norbornene],
spiro[8-n-butyl-2,4-dihydronaphthalen-1-one-3,5'-2'-norbornene],
spiro[5-iso-butyl-2,4-dihydronaphthalen-1-one-3,5'-2'-norbornene],
spiro[6-iso-butyl-2,4-dihydronaphthalen-1-one-3,5'-2'-norbornene],
spiro[7-iso-butyl-2,4-dihydronaphthalen-1-one-3,5'-2'-norbornene],
spiro[8-iso-butyl-2,4-dihydronaphthalen-1-one-3,5'-2'-norbornene],
spiro[5-sec-butyl-2,4-dihydronaphthalen-1-one-3,5'-2'-norbornene],
spiro[6-sec-butyl-2,4-dihydronaphthalen-1-one-3,5'-2'-norbornene],
spiro[7-sec-butyl-2,4-dihydronaphthalen-1-one-3,5'-2'-norbornene],
spiro[8-sec-butyl-2,4-dihydronaphthalen-1-one-3,5'-2'-norbornene],
spiro[5-t-butyl-2,4-dihydronaphthalen-1-one-3,5'-2'-norbornene],
spiro[6-t-butyl-2,4-dihydronaphthalen-1-one-3,5'-2'-norbornene],
spiro[7-t-butyl-2,4-dihydronaphthalen-1-one-3,5'-2'-norbornene],
spiro[8-t-butyl-2,4-dihydronaphthalen-1-one-3,5'-2'-norbornene],
spiro[5-cyclohexyl-2,4-dihydronaphthalen-1-one-3,5'-2'-norbornene], spiro[6-cyclohexyl-2,4-dihydronaphthalen-1-one-3,5'-2'-norbornene],
spiro[7-cyclohexyl-2,4-dihydronaphthalen-1-one-3,5'-2'-norbornene],
spiro[8-cyclohexyl-2,4-dihydronaphthalen-1-one-3,5'-2'-norbornene],
spiro[5-phenyl-2,4-dihydronaphthalen-1-one-3,5'-2'-norbornene],
Spiro[6-phenyl-2,4-dihydronaphthalen-1-one-3,5'-2'-norbornene],
spiro[7-phenyl-2,4-dihydronaphthalen-1-one-3,5'-2'-norbornene],
spiro[8-phenyl-2,4-dihydronaphthalen-1-one-3,5'-2'-norbornene],
spiro[5-chloro-2,4-dihydronaphthalen-1-one-3,5'-2'-norbornene],
spiro[6-chloro-2,4-dihydronaphthalen-1-one-3,5'-2'-norbornene],
spiro[7-chloro-2,4-dihydronaphthalen-1-one-3,5'-2'-norbornene],
spiro[8-chloro-2,4-dihydronaphthalen-1-one-3,5'-2'-norbornene],
spiro[5-phenyl-2,4-dihydronaphthalen-1-one-3,5'-2'-norbornene],
spiro[6-phenyl-2,4-dihydronaphthalen-1-one-3,5'-2'-norbornene],
spiro[7-phenyl-2,4-dihydronaphthalen-1-one-3,5'-2'-norbornene],
spiro[8-phenyl-2,4-dihydronaphthalen-1-one-3,5'-2'-norbornene],
spiro[5-amino-2,4-dihydronaphthalen-1-one-3,5'-2'-norbornene],
spiro[6-amino-2,4-dihydronaphthalen-1-one-3,5'-2'-norbornene],
spiro[7-amino-2,4-dihydronaphthalen-1-one-3,5'-2'-norbornene],
spiro[8-amino-2,4-dihydronaphthalen-1-one-3,5'-2'-norbornene],
spiro[5-methoxy-2,4-dihydronaphthalen-1-one-3,5'-2'-norbornene],
spiro[6-methoxy-2,4-dihydronaphthalen-1-one-3,5'-2'-norbornene],
spiro[7-methoxy-2,4-dihydronaphthalen-1-one-3,5'-2'-norbornene],
spiro[8-methoxy-2,4-dihydronaphthalen-1-one-3,5'-2'-norbornene],
spiro[2,3-dihydroanthracen-1-one-4,5'-2'-norbornene],
spiro[5-methyl-2,3-dihydroanthracen-1-one-4,5'-2'-norbornene],
spiro[6-methyl-2,3-dihydroanthracen-1-one-4,5'-2'-norbornene],
spiro[7-methyl-2,3-dihydroanthracen-1-one-4,5'-2'-norbornene],
spiro[8-methyl-2,3-dihydroanthracen-1-one-4,5'-2'-norbornene],
spiro[5-ethyl-2,3-dihydroanthracen-1-one-4,5'-2'-norbornene],
spiro[6-ethyl-2,3-dihydroanthracen-1-one-4,5'-2'-norbornene],
spiro[7-ethyl-2,3-dihydroanthracen-1-one-4,5'-2'-norbornene],
spiro[8-ethyl-2,3-dihydroanthracen-1-one-4,5'-2'-norbornene],
spiro[5-n-propyl-2,3-dihydroanthracen-1-one-3,5'-2'-norbornene],
spiro[6-n-propyl-2,3-dihydroanthracen-1-one-3,5'-2'-norbornene],
spiro[7-n-propyl-2,3-dihydroanthracen-1-one-4,5'-2'-norbornene],
spiro[8-n-propyl-2,3-dihydroanthracen-1-one-4,5'-2'-norbornene],
spiro[5-iso-propyl-2,3-dihydroanthracen-1-one-4,5'-2'-norbornene],
spiro[6-iso-propyl-2,3-dihydroanthracen-1-one-4,5'-2'-norbornene],
spiro[7-iso-propyl-2,3-dihydroanthracen-1-one-4,5'-2'-norbornene],
spiro[8-iso-propyl-2,3-dihydroanthracen-1-one-4,5'-2'-norbornene],
spiro[5-n-butyl-2,3-dihydroanthracen-1-one-4,5'-2'-norbornene],
spiro[6-n-butyl-2,3-dihydroanthracen-1-one-4,5'-2'-norbornene],
spiro[7-n-butyl-2,3-dihydroanthracen-1-one-4,5'-2'-norbornene],
spiro[8-n-butyl-2,3-dihydroanthracen-1-one-4,5'-2'-norbornene],
spiro[5-iso-butyl-2,3-dihydroanthracen-1-one-4,5'-2'-norbornene],
spiro[6-iso-butyl-2,3-dihydroanthracen-1-one-4,5'-2'-norbornene],
spiro[7-iso-butyl-2,3-dihydroanthracen-1-one-4,5'-2'-norbornene],
spiro[8-iso-butyl-2,3-dihydroanthracen-1-one-4,5'-2'-norbornene],
spiro[5-sec-butyl-2,3-dihydroanthracen-1-one-4,5'-2'-norbornene],
spiro[6-sec-butyl-2,3-dihydroanthracen-1-one-4,5'-2'-norbornene],
spiro[7-sec-butyl-2,3-dihydroanthracen-1-one-3,5'-2'-norbornene],
spiro[8-sec-butyl-2,3-dihydroanthracen-1-one-4,5'-2'-norbornene],
spiro[5-t-butyl-2,3-dihydroanthracen-1-one-4,5'-2'-norbornene],
spiro[6-t-butyl-2,3-dihydroanthracen-1-one-4,5'-2'-norbornene],
spiro[7-t-butyl-2,3-dihydroanthracen-1-one-4,5'-2'-norbornene],
spiro[8-t-butyl-2,3-dihydroanthracen-1-one-4,5'-2'-norbornene],
spiro[5-cyclohexyl-2,3-dihydroanthracen-1-one-4,5'-2'-norbornene],
spiro[6-cyclohexyl-2,3-dihydroanthracen-1-one-4,5'-2'-norbornene],
spiro[7-cyclohexyl-2,3-dihydroanthracen-1-one-4,5'-2'-norbornene],
spiro[8-cyclohexyl-2,3-dihydroanthracen-1-one-4,5'-2'-norbornene],
spiro[5-phenyl-2,3-dihydroanthracen-1-one-4,5'-2'-norbornene],
spiro[6-phenyl-2,3-dihydroanthracen-1-one-4,5'-2'-norbornene],
spiro[7-phenyl-2,3-dihydroanthracen-1-one-4,5'-2'-norbornene],
spiro[8-phenyl-2,3-dihydroanthracen-1-one-4,5'-2'-norbornene],
spiro[5-chloro-2,3-dihydroanthracen-1-one-4,5'-2'-norbornene],
spiro[6-chloro-2,3-dihydroanthracen-1-one-4,5'-2'-norbornene],
spiro[7-chloro-2,3-dihydroanthracen-1-one-4,5'-2'-norbornene], spiro[8-chloro-2,3-dihydroanthracen-1-one-4,5'-2'-norbornene],
spiro[5-phenyl-2,3-dihydroanthracen-1-one-4,5'-2'-norbornene],
spiro[6-phenyl-2,3-dihydroanthracen-1-one-4,5'-2'-norbornene],
spiro[7-phenyl-2,3-dihydroanthracen-1-one-4,5'-2'-norbornene],
spiro[8-phenyl-2,3-dihydroanthracen-1-one-4,5'-2'-norbornene],
spiro[5-amino-2,3-dihydroanthracen-1-one-4,5'-2'-norbornene],
spiro[6-amino-2,3-dihydroanthracen-1-one-4,5'-2'-norbornene],
spiro[7-amino-2,3-dihydroanthracen-1-one-4,5'-2'-norbornene],
spiro[8-amino-2,3-dihydroanthracen-1-one-4,5'-2'-norbornene],
spiro[5-methoxy-2,3-dihydroanthracen-1-one-4,5'-2'-norbornene],
spiro[6-methoxy-2,3-dihydroanthracen-1-one-3,5'-2'-norbornene],
spiro[7-methoxy-2,3-dihydroanthracen-1-one-4,5'-2'-norbornene],
spiro[8-methoxy-2,3-dihydroanthracen-1-one-4,5'-2'-norbornene],
spiro[3,4-dihydroanthracen-2-one-1,5'-2'-norbornene],
spiro[5-methyl-3,4-dihydroanthracen-2-one-1,5'-2'-norbornene],
spiro[6-methyl-3,4-dihydroanthracen-2-one-1,5'-2'-norbornene],
spiro[7-methyl-3,4-dihydroanthracen-2-one-1,5'-2'-norbornene],
spiro[8-methyl-3,4-dihydroanthracen-2-one-1,5'-2'-norbornene],
spiro[5-ethyl-3,4-dihydroanthracen-2-one-1,5'-2'-norbornene],
spiro[6-ethyl-3,4-dihydroanthracen-2-one-1,5'-2'-norbornene],
spiro[7-ethyl-3,4-dihydroanthracen-2-one-1,5'-2'-norbornene],
spiro[8-ethyl-3,4-dihydroanthracen-2-one-1,5'-2'-norbornene],
spiro[5-n-propyl-3,4-dihydroanthracen-2-one-1,5'-2'-norbornene],
spiro[6-n-propyl-3,4-dihydroanthracen-2-one-1,5'-2'-norbornene],
spiro[7-n-propyl-3,4-dihydroanthracen-2-one-1,5'-2'-norbornene],
spiro[8-n-propyl-3,4-dihydroanthracen-2-one-1,5'-2'-norbornene],
spiro[5-iso-propyl-3,4-dihydroanthracen-2-one-1,5'-2'-norbornene],
spiro[6-iso-propyl-3,4-dihydroanthracen-2-one-1,5'-2'-norbornene],
spiro[7-iso-propyl-3,4-dihydroanthracen-2-one-1,5'-2'-norbornene],
spiro[8-iso-propyl-3,4-dihydroanthracen-2-one-1,5'-2'-norbornene],
spiro[5-n-butyl-3,4-dihydroanthracen-2-one-1,5'-2'-norbornene],
spiro[6-n-butyl-3,4-dihydroanthracen-2-one-1,5'-2'-norbornene],
spiro[7-n-butyl-3,4-dihydroanthracen-2-one-1,5'-2'-norbornene],
spiro[8-n-butyl-3,4-dihydroanthracen-2-one-1,5'-2'-norbornene],
spiro[5-iso-butyl-3,4-dihydroanthracen-2-one-1,5'-2'-norbornene],
spiro[6-iso-butyl-3,4-dihydroanthracen-2-one-1,5'-2'-norbornene],
spiro[7-iso-butyl-3,4-dihydroanthracen-2-one-1,5'-2'-norbornene],
spiro[8-iso-butyl-3,4-dihydroanthracen-2-one-1,5'-2'-norbornene],
spiro[5-sec-butyl-3,4-dihydroanthracen-2-one-1,5'-2'-norbornene],
spiro[6-sec-butyl-3,4-dihydroanthracen-2-one-1,5'-2'-norbornene],
spiro[7-sec-butyl-3,4-dihydroanthracen-2-one-1,5'-2'-norbornene],
spiro[8-sec-butyl-3,4-dihydroanthracen-2-one-1,5'-2'-norbornene],
spiro[5-t-butyl-3,4-dihydroanthracen-2-one-1,5'-2'-norbornene],
spiro[6-t-butyl-3,4-dihydroanthracen-2-one-1,5'-2'-norbornene],
spiro[7-t-butyl-3,4-dihydroanthracen-2-one-1,5'-2'-norbornene],
spiro[8-t-butyl-3,4-dihydroanthracen-2-one-1,5'-2'-norbornene],
spiro[5-cyclohexyl-3,4-dihydroanthracen-2-one-1,5'-2'-norbornene],
spiro[6-cyclohexyl-3,4-dihydroanthracen-2-one-1,5'-2'-norbornene],
spiro[7-cyclohexyl-3,4-dihydroanthracen-2-one-1,5'-2'-norbornene],
spiro[8-cyclohexyl-3,4-dihydroanthracen-2-one-1,5'-2'-norbornene],
spiro[5-phenyl-3,4-dihydroanthracen-2-one-1,5'-2'-norbornene],
spiro[6-phenyl-3,4-dihydroanthracen-2-one-1,5'-2'-norbornene],
spiro[7-phenyl-3,4-dihydroanthracen-2-one-1,5'-2'-norbornene],
spiro[8-phenyl-3,4-dihydroanthracen-2-one-1,5'-2'-norbornene],
spiro[5-chloro-3,4-dihydroanthracen-2-one-1,5'-2'-norbornene],
spiro[6-chloro-3,4-dihydroanthracen-2-one-1,5'-2'-norbornene],
spiro[7-chloro-3,4-dihydroanthracen-2-one-1,5'-2'-norbornene],
spiro[8-chloro-3,4-dihydroanthracen-2-one-1,5'-2'-norbornene],
spiro[5-phenyl-3,4-dihydroanthracen-2-one-1,5'-2'-norbornene],
spiro[6-phenyl-3,4-dihydroanthracen-2-one-1,5'-2'-norbornene],
spiro[7-phenyl-3,4-dihydroanthracen-2-one-1,5'-2'-norbornene],
spiro[8-phenyl-3,4-dihydroanthracen-2-one-1,5'-2'-norbornene],
spiro[5-amino-3,4-dihydroanthracen-2-one-1,5'-2'-norbornene],
spiro[6-amino-3,4-dihydroanthracen-2-one-1,5'-2'-norbornene],
spiro[7-amino-3,4-dihydroanthracen-2-one-1,5'-2'-norbornene],
spiro[8-amino-3,4-dihydroanthracen-2-one-1,5'-2'-norbornene],
spiro[5-methoxy-3,4-dihydroanthracen-2-one-1,5'-2'-norbornene], spiro[6-methoxy-3,4-dihydroanthracen-2-one-1,5'-2'-norbornene],
spiro[7-methoxy-3,4-dihydroanthracen-2-one-1,5'-2'-norbornene],
spiro[8-methoxy-3,4-dihydroanthracen-2-one-1,5'-2'-norbornene],
spiro[1,4-dihydroanthracen-2-one-3,5'-2'-norbornene],
spiro[5-methyl-1,4-dihydroanthracen-2-one-3,5'-2'-norbornene],
spiro[6-methyl-1,4-dihydroanthracen-2-one-3,5'-2'-norbornene],
spiro[7-methyl-1,4-dihydroanthracen-2-one-3,5'-2'-norbornene],
spiro[8-methyl-1,4-dihydroanthracen-2-one-3,5'-2'-norbornene],
spiro[5-ethyl-1,4-dihydroanthracen-2-one-3,5'-2'-norbornene],
spiro[6-ethyl-1,4-dihydroanthracen-2-one-3,5'-2'-norbornene],
spiro[7-ethyl-1,4-dihydroanthracen-2-one-3,5'-2'-norbornene],
spiro[8-ethyl-1,4-dihydroanthracen-2-one-3,5'-2'-norbornene],
spiro[5-n-propyl-1,4-dihydroanthracen-2-one-3,5'-2'-norbornene],
spiro[6-n-propyl-1,4-dihydroanthracen-2-one-3,5'-2'-norbornene],
spiro[7-n-propyl-1,4-dihydroanthracen-2-one-3,5'-2'-norbornene],
spiro[8-n-propyl-1,4-dihydroanthracen-2-one-3,5-f-2'-norbornene],
spiro[5-iso-propyl-1,4-dihydroanthracen-2-one-3,5'-2'-norbornene],
spiro[6-iso-propyl-1,4-dihydroanthracen-2-one-3,5'-2'-norbornene],
spiro[7-iso-propyl-1,4-dihydroanthracen-2-one-3,5'-2'-norbornene],
spiro[8-iso-propyl-1,4-dihydroanthracen-2-one-3,5'-2'-norbornene],
spiro[5-n-butyl-1,4-dihydroanthracen-2-one-3,5'-2'-norbornene],
spiro[6-n-butyl-1,4-dihydroanthracen-2-one-3,5'-2'-norbornene],
spiro[7-n-butyl-1,4-dihydroanthracen-2-one-3,5-f-2'-norbornene],
spiro[8-n-butyl-1,4-dihydroanthracen-2-one-3,5'-2'-norbornene],
spiro[5-iso-butyl-1,4-dihydroanthracen-2-one-3,5'-2'-norbornene],
spiro[6-iso-butyl-1,4-dihydroanthracen-2-one-3,5'-2'-norbornene],
spiro[7-iso-butyl-1,4-dihydroanthracen-2-one-3,5'-2'-norbornene],
spiro[8-iso-butyl-1,4-dihydroanthracen-2-one-3,5'-2'-norbornene],
spiro[5-sec-butyl-1,4-dihydroanthracen-2-one-3,5'-2'-norbornene],
spiro[6-sec-butyl-1,4-dihydroanthracen-2-one-3,5'-2'-norbornene],
spiro[7-sec-butyl-1,4-dihydronaphthalen-2-one-3,5'-2'-norbornene],
spiro[8-sec-butyl-1,4-dihydroanthracen-2-one-3,5'-2'-norbornene],
spiro[5-t-butyl-1,4-dihydroanthracen-2-one-3,5'-2'-norbornene],
spiro[6-t-butyl-1,4-dihydroanthracen-2-one-3,5'-2'-norbornene],
spiro[7-t-butyl-1,4-dihydroanthracen-2-one-3,5'-2'-norbornene],
spiro[8-t-butyl-1,4-dihydroanthracen-2-one-3,5'-2'-norbornene],
spiro[5-cyclohexyl-1,4-dihydroanthracen-2-one-3,5'-2'-norbornene],
spiro[6-cyclohexyl-1,4-dihydroanthracen-2-one-3,5'-2'-norbornene],
spiro[7-cyclohexyl-1,4-dihydroanthracen-2-one-3,5'-2'-norbornene],
spiro[8-cyclohexyl-1,4-dihydroanthracen-2-one-3,5'-2'-norbornene],
spiro[5-phenyl-1,4-dihydroanthracen-2-one-3,5'-2'-norbornene],
spiro[6-phenyl-1,4-dihydroanthracen-2-one-3,5'-2'-norbornene],
spiro[7-phenyl-1,4-dihydroanthracen-2-one-3,5'-2'-norbornene],
spiro[8-phenyl-1,4-dihydroanthracen-2-one-3,5'-2'-norbornene],
spiro[5-chloro-1,4-dihydroanthracen-2-one-3,5'-2'-norbornene],
spiro[6-chloro-1,4-dihydroanthracen-2-one-3,5'-2'-norbornene],
spiro[7-chloro-1,4-dihydroanthracen-2-one-3,5'-2'-norbornene],
spiro[8-chloro-1,4-dihydroanthracen-2-one-3,5'-2'-norbornene],
spiro[5-phenyl-1,4-dihydroanthracen-2-one-3,5'-2'-norbornene],
spiro[6-phenyl-1,4-dihydroanthracen-2-one-3,5'-2'-norbornene],
spiro[7-phenyl-1,4-dihydroanthracen-2-one-3,5'-2'-norbornene],
spiro[8-phenyl-1,4-dihydroanthracen-2-one-3,5'-2'-norbornene],
spiro[5-amino-1,4-dihydroanthracen-2-one-3,5'-2'-norbornene],
spiro[6-amino-1,4-dihydroanthracen-2-one-3,5'-2'-norbornene],
spiro[7-amino-1,4-dihydroanthracen-2-one-3,5'-2'-norbornene],
spiro[8-amino-1,4-dihydroanthracen-2-one-3,5'-2'-norbornene],
spiro[5-methoxy-1,4-dihydroanthracen-2-one-3,5'-2'-norbornene],
spiro[6-methoxy-1,4-dihydroanthracen-2-one-3,5'-2'-norbornene],
spiro[7-methoxy-1,4-dihydroanthracen-2-one-3,5'-2'-norbornene],
spiro[8-methoxy-1,4-dihydroanthracen-2-one-3,5'-2'-norbornene],
spiro[1,3-dihydroanthracen-2-one-4,5'-2'-norbornene],
spiro[5-methyl-1,3-dihydroanthracen-2-one-4,5'-2'-norbornene],
spiro[6-methyl-1,3-dihydroanthracen-2-one-4,5'-2'-norbornene],
spiro[7-methyl-1,3-dihydroanthracen-2-one-4,5'-2'-norbornene],
spiro[8-methyl-1,3-dihydroanthracen-2-one-4,5'-2'-norbornene],
spiro[5-ethyl-1,3-dihydroanthracen-2-one-4,5'-2'-norbornene],
spiro[6-ethyl-1,3-dihydroanthracen-2-one-4,5'-2'-norbornene],
spiro[7-ethyl-1,3-dihydroanthracen-2-one-4,5'-2'-norbornene], spiro[8-ethyl-1,3-dihydroanthracen-2-one-4,5'-2'-norbornene],
spiro[5-n-propyl-1,3-dihydroanthracen-2-one-4,5'-2'-norbornene],
spiro[6-n-propyl-1,3-dihydroanthracen-2-one-4,5'-2'-norbornene],
spiro[7-n-propyl-1,3-dihydroanthracen-2-one-4,5'-2'-norbornene],
spiro[8-n-propyl-1,3-dihydroanthracen-2-one-4,5'-2'-norbornene],
spiro[5-iso-propyl-1,3-dihydroanthracen-2-one-4,5'-2'-norbornene],
spiro[6-iso-propyl-1,3-dihydroanthracen-2-one-4,5'-2'-norbornene],
spiro[7-iso-propyl-1,3-dihydroanthracen-2-one-4,5'-2'-norbornene],
spiro[8-iso-propyl-1,3-dihydroanthracen-2-one-4,5'-2'-norbornene],
spiro[5-n-butyl-1,3-dihydroanthracen-2-one-4,5'-2'-norbornene],
spiro[6-n-butyl-1,3-dihydroanthracen-2-one-4,5'-2'-norbornene],
spiro[7-n-butyl-1,3-dihydroanthracen-2-one-4,5'-2'-norbornene],
spiro[8-n-butyl-1,3-dihydroanthracen-2-one-4,5'-2'-norbornene],
spiro[5-iso-butyl-1,3-dihydroanthracen-2-one-4,5'-2'-norbornene],
spiro[6-iso-butyl-1,3-dihydroanthracen-2-one-4,5'-2'-norbornene],
spiro[7-iso-butyl-1,3-dihydroanthracen-2-one-4,5'-2'-norbornene],
spiro[8-iso-butyl-1,3-dihydroanthracen-2-one-4,5'-2'-norbornene],
spiro[5-sec-butyl-1,3-dihydroanthracen-2-one-4,5'-2'-norbornene],
spiro[6-sec-butyl-1,3-dihydroanthracen-2-one-4,5'-2'-norbornene],
spiro[7-sec-butyl-1,3-dihydroanthracen-2-one-4,5'-2'-norbornene],
spiro[8-sec-butyl-1,3-dihydroanthracen-2-one-4,5'-2'-norbornene],
spiro[5-t-butyl-1,3-dihydroanthracen-2-one-4,5'-2'-norbornene],
spiro[6-t-butyl-1,3-dihydroanthracen-2-one-4,5'-2'-norbornene],
spiro[7-t-butyl-1,3-dihydroanthracen-2-one-4,5'-2'-norbornene],
spiro[8-t-butyl-1,3-dihydronaphthalen-2-one-4,5'-2'-norbornene],
spiro[5-cyclohexyl-1,3-dihydroanthracen-2-one-4,5'-2'-norbornene],
spiro[6-cyclohexyl-1,3-dihydroanthracen-2-one-4,5'-2'-norbornene],
spiro[7-cyclohexyl-1,3-dihydroanthracen-2-one-4,5'-2'-norbornene],
spiro[8-cyclohexyl-1,3-dihydroanthracen-2-one-4,5'-2'-norbornene],
spiro[5-phenyl-1,3-dihydroanthracen-2-one-4,5'-2'-norbornene],
spiro[6-phenyl-1,3-dihydroanthracen-2-one-4,5'-2'-norbornene],
spiro[7-phenyl-1,3-dihydroanthracen-2-one-4,5'-2'-norbornene],
spiro[8-phenyl-1,3-dihydroanthracen-2-one-4,5'-2'-norbornene],
spiro[5-chloro-1,3-dihydroanthracen-2-one-4,5'-2'-norbornene],
spiro[6-chloro-1,3-dihydroanthracen-2-one-4,5'-2'-norbornene],
spiro[7-chloro-1,3-dihydroanthracen-2-one-4,5'-2'-norbornene],
spiro[8-chloro-1,3-dihydroanthracen-2-one-4,5'-2'-norbornene],
spiro[5-phenyl-1,3-dihydroanthracen-2-one-4,5'-2'-norbornene],
spiro[6-phenyl-1,3-dihydroanthracen-2-one-4,5'-2'-norbornene],
spiro[7-phenyl-1,3-dihydroanthracen-2-one-4,5'-2'-norbornene],
spiro[8-phenyl-1,3-dihydroanthracen-2-one-4,5'-2'-norbornene],
spiro[5-amino-1,3-dihydroanthracen-2-one-4,5'-2'-norbornene],
spiro[6-amino-1,3-dihydroanthracen-2-one-4,5'-2'-norbornene],
spiro[7-amino-1,3-dihydroanthracen-2-one-4,5'-2'-norbornene],
spiro[8-amino-1,3-dihydroanthracen-2-one-4,5'-2'-norbornene],
spiro[5-methoxy-1,3-dihydroanthracen-2-one-4,5'-2'-norbornene],
spiro[6-methoxy-1,3-dihydroanthracen-2-one-4,5'-2'-norbornene],
spiro[7-methoxy-1,3-dihydroanthracen-2-one-4,5'-2'-norbornene],
spiro[8-methoxy-1,3-dihydroanthracen-2-one-4,5'-2'-norbornene].

Among these spiro-form norbornene monomers, preferable from the perspective of availability and easiness of synthesizing the synthesis raw material are:
1,2-benzocyclopentene-3-Spiro-5'-bicyclo[2.2.1]-2'-heptene,
1,2-benzocyclopentene-4-spiro-5'-bicyclo[2.2.1]-2'-heptene,
spiro[3,4-dihydro-2H-naphthalene-1,5'-2'-norbornene],
spiro[3,4-dihydro-1H-naphthalene-2,5'-2'-norbornene],
1,2-benzocyclooctene-3-spiro-5'-bicyclo[2.2.1]-2'-kept ene,
1,2-benzocyclooctene-4-Spiro-5'-bicyclo[2.2.1]-2'-kept ene,
1,2-benzocyclooctene-5-spiro-5'-bicyclo[2.2.1]-2'-kept ene,
2,3-benzocyclopenten-1-one-4-Spiro-5'-bicyclo[2.2.1]-2'-heptene,
2,3-benzocyclopenten-1-one-5-spiro-5'-bicyclo[2.2.1]-2'-heptene,
3,4-benzocyclopenten-1-one-2-spiro-5'-bicyclo[2.2.1]-2'-heptene,
spiro[3,4-dihydronaphthalen-1-one-2,5'-2'-norbornene],
spiro[3,4-dihydronaphthalen-2-one-1,5'-2'-norbornene],
spiro[1,4-dihydronaphthalen-2-one-3,5'-2'-norbornene],
2,3-benzocycloocten-1-one-8-spiro-5'-bicyclo[2.2.1]-2'-heptene,
3,4-benzocycloocten-1-one-2-spiro-5'-bicyclo[2.2.1]-2'-heptene,
3,4-benzocycloocten-1-one-8-spiro-5'-bicyclo[2.2.1]-2'-heptene,
spiro[3,4-dihydro-2H-anthracene-1,5'-2'-norbornene],
spiro[3,4-dihydro-1H-anthracene-2,5'-2'-norbornene],
spiro[3,4-dihydroanthracen-1-one-2,5'-2'-norbornene],
spiro[3,4-dihydroanthracen-2-one-1,5'-2'-norbornene], and
spiro[1,4-dihydroanthracen-2-one-3,5'-2'-norbornene].

A method for obtaining these spiro-form norbornene monomers is not particularly limited. An example thereof includes a method utilizing a reaction represented by the following reaction formula (I):

reaction formula (I)

[Chem. 7]

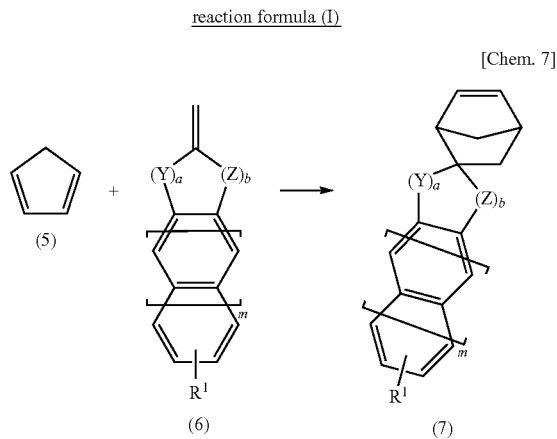

[in the reaction formula (I), $R^1$, Y, Z, a, and b are respectively synonymous with $R^1$, Y, Z, a, and b in the general formula (1)] in which cyclopentadiene represented by the general formula (5) and an exo-methylene compound represented by the general formula (6) are caused to undergo the Diels-Alder reaction to obtain a spiro-form norbornene monomer.

Since the exo-methylene compound represented by the general formula (6) has an electron-accepting substituent, the compound serves as an excellent dienophile in the Diels-Alder reaction. Thus, a desirable reaction rate for industrial production can be achieved by using such an exo-methylene compound represented by the general formula (6). Moreover, such an exo-methylene compound represented by the general formula (6) enables production of a target spiro-form norbornene monomer almost quantitatively even under conditions such as room temperature and no solvent. Further, a method for obtaining such an exo-methylene compound represented by the general formula (6) is not particularly limited, and any publicly-known method can be adopted accordingly. Examples thereof include a method described in Organic Syntheses, Vol. 60, p. 88, and the like.

Examples of the aromatic norbornene monomer represented by the general formula (4) include monomers listed below.

5-phenylbicyclo[2.2.1]-2-heptene, 8-phenyltetracyclo[4.4.1$^{2,5}$.1$^{7,10}$.0]-3-dodecene, 5-(p-t-butylphenyl)bicyclo[2.2.1]-2-heptene, 8-(p-t-butylphenyl)tetracyclo[4.4.1$^{2,5}$.1$^{7,10}$.0]-3-dodecene, 5-(p-aminophenyl)bicyclo[2.2.1]-2-heptene, 8-(p-aminophenyl)tetracyclo[4.4.1$^{2,5}$.1$^{7,10}$.0]-3-dodecene, 5-(o-acetoxyphenyl)bicyclo[2.2.1]-2-heptene, 8-(o-acetoxyphenyl)tetracyclo[4.4.1$^{2,5}$.1$^{7,10}$.0]-3-dodecene, 5-(p-acetoxyphenyl)bicyclo[2.2.1]-2-heptene, 8-(p-acetoxyphenyl)tetracyclo[4.4.1$^{2,5}$.1$^{7,10}$.0]-3-dodecene, 6-bromo-5-phenyl-bicyclo[2.2.1]-2-heptene, 8-phenyl-9-bromotetracyclo[4.4.1$^{2,5}$.1$^{7,1}$.0]-3-dodecene, 5-(p-isopropylphenyl)bicyclo[2.2.1]-2-heptene, 8-(p-isopropylphenyl)tetracyclo[4.4.1$^{2,5}$.1$^{7,10}$.0]-3-dodecene, 5-(m-bromophenyl)bicyclo[2.2.1]-2-heptene, 8-(m-bromophenyl)tetracyclo[4.4.1$^{2,5}$.1$^{7,10}$.0]-3-dodecene, 5-(p-bromophenyl)bicyclo[2.2.1]-2-heptene, 8-(p-bromophenyl)tetracyclo[4.4.1$^{2,5}$.1$^{7,10}$.0]-3-dodecene, 5-(o-bromophenyl)bicyclo[2.2.1]-2-heptene, 8-(o-bromophenyl)tetracyclo[4.4.1$^{2,5}$.1$^{7,10}$.0]-3-dodecene, 6,6-difluoro-5-(p-bromophenyl)bicyclo[2.2.1]-2-heptene, 8-(p-bromophenyl)-9,9-difluorotetracyclo[4.4.1$^{2,5}$.1$^{7,10}$.0]-3-dodecene, 5-(p-chlorophenyl)-5-methylbicyclo[2.2.1]-2-heptene, 8-(p-chlorophenyl)-9-methyltetracyclo[4.4.1$^{2,5}$.1$^{7,10}$.0]-3-dodecene, 5-(o-chlorophenyl)bicyclo[2.2.1]-2-heptene, 8-(o-chlorophenyl)tetracyclo[4.4.1$^{2,5}$.1$^{7,10}$.0]-3-dodecene, 5-(m-chlorophenyl)bicyclo[2.2.1]-2-heptene, 8-(m-chlorophenyl)tetracyclo[4.4.1$^{2,5}$.1$^{7,10}$.0]-3-dodecene, 5-(p-chlorophenyl)bicyclo[2.2.1]-2-heptene, 8-(p-chlorophenyl)tetracyclo[4.4.1$^{2,5}$.1$^{7,10}$.0]-3-dodecene, 5-(m-chloromethylphenyl)bicyclo[2.2.1]-2-heptene, 8-(m-chloromethylphenyl)tetracyclo[4.4.1$^{2,5}$.1$^{7,10}$.0]-3-dodecene, 5-(p-chloromethylphenyl)bicyclo[2.2.1]-2-heptene, 8-(p-chloromethylphenyl)tetracyclo[4.4.1$^{2,5}$.1$^{7,10}$.0]-3-dodecene, 5-(p-cyanomethylphenyl)bicyclo[2.2.1]-2-heptene, 8-(p-cyanomethylphenyl)tetracyclo[4.4.1$^{2,5}$.1$^{7,10}$.0]-3-dodecene, 5-(o-chloromethylphenyl)bicyclo[2.2.1]-2-heptene, 8-(o-chloromethylphenyl)tetracyclo[4.4.1$^{2,5}$.1$^{7,10}$.0]-3-dodecene, 5-(2,6-dichlorophenyl)bicyclo[2.2.1]-2-heptene, 8-(2,6-dichlorophenyl)tetracyclo[4.4.1$^{2,5}$.1$^{7,10}$.0]-3-dodecene, 5-(p-fluorophenyl)-5-methylbicyclo[2.2.1]-2-heptene, 8-(p-fluorophenyl)-9-methyltetracyclo[4.4.1$^{2,5}$.1$^{7,10}$.0]-3-dodecene, 5-(o-fluorophenyl)bicyclo[2.2.1]-2-heptene, 8-(o-fluorophenyl)tetracyclo[4.4.1$^{2,5}$.1$^{7,10}$.0]-3-dodecene, 5-(m-fluorophenyl)bicyclo[2.2.1]-2-heptene, 8-(m-fluorophenyl)tetracyclo[4.4.1$^{2,5}$.1$^{7,10}$.0]-3-dodecene, 5-(p-fluorophenyl)bicyclo[2.2.1]-2-heptene, 8-(p-fluorophenyl)tetracyclo[4.4.1$^{2,5}$.1$^{7,10}$.0]-3-dodecene, 5-(pentafluorophenyl)bicyclo[2.2.1]-2-heptene, 8-(pentafluorophenyl)tetracyclo[4.4.1$^{2,5}$.1$^{7,10}$.0]-3-dodecene, 5-(o-methoxyphenyl)bicyclo[2.2.1]-2-heptene, 8-(o-methoxyphenyl)tetracyclo[4.4.1$^{2,5}$.1$^{7,10}$.0]-3-dodecene, 5-(p-ethoxyphenyl)bicyclo[2.2.1]-2-heptene, 8-(p-ethoxyphenyl)tetracyclo[4.4.1$^{2,5}$.1$^{7,10}$.0]-3-dodecene, 5-(p-phenoxyphenyl)bicyclo[2.2.1]-2-heptene, 8-(p-phenoxyphenyl)tetracyclo[4.4.1$^{2,5}$.1$^{7,10}$.0]-3-dodecene, 5-(p-hydroxymethylphenyl)bicyclo[2.2.1]-2-heptene, 8-(p-hydroxymethylphenyl)tetracyclo[4.4.1$^{2,5}$.1$^{7,10}$.0]-3-dodecene, 5-(p-methoxyphenyl)bicyclo[2.2.1]-2-heptene, 8-(p-methoxyphenyl)tetracyclo[4.4.1$^{2,5}$.1$^{7,10}$.0]-3-dodecene, 5-(o-methylphenyl)bicyclo[2.2.1]-2-heptene, 8-(o-methylphenyl)tetracyclo[4.4.1$^{2,5}$.1$^{7,10}$.0]-3-dodecene, 5-(m-methylphenyl)bicyclo[2.2.1]-2-heptene, 8-(m-methylphenyl)tetracyclo[4.4.1$^{2,5}$.1$^{7,10}$.0]-3-dodecene, 5-(p-methylphenyl)bicyclo[2.2.1]-2-heptene, 8-(p-methylphenyl)tetracyclo[4.4.1$^{2,5}$.1$^{7,10}$.0]-3-dodecene, 5-methyl-5-phenylbicyclo[2.2.1]-2-heptene, 8-methyl-8-phenyltetracyclo[4.4.1$^{2,5}$.1$^{7,10}$.0]-3-dodecene, 6-methyl-5-phenylbicyclo[2.2.1]-2-heptene, 9-methyl-8-phenyltetracyclo[4.4.1$^{2,5}$.1$^{7,10}$.0]-3-dodecene, 5-(m-nitrophenyl)bicyclo[2.2.1]-2-heptene, 8-(m-nitrophenyl)tetracyclo[4.4.1$^{2,5}$.1$^{7,10}$.0]-3-dodecene, 5-(p-nitrophenyl)bicyclo[2.2.1]-2-heptene, 8-(p-nitrophenyl)tetracyclo[4.4.1$^{2,5}$.1$^{7,10}$.0]-3-dodecene, 5-(p-cyanophenyl)bicyclo[2.2.1]-2-heptene, 8-(p-cyanophenyl)tetracyclo[4.4.1$^{2,5}$.1$^{7,10}$.0]-3-dodecene, 5-(p-n-octylphenyl)bicyclo[2.2.1]-2-heptene, 8-(p-n-octylphenyl)tetracyclo[4.4.1$^{2,5}$.1$^{7,10}$.0]-3-dodecene, 5-trimethylsiloxy-5-phenylbicyclo[2.2.1]-2-heptene, 8-(trimethylsiloxy)-8-phenyltetracyclo[4.4.1$^{2,5}$.1$^{7,10}$.0]-3-dodecene, 5-(2,4,6-trimethylphenyl)bicyclo[2.2.1]-2-heptene, 8-(2,4,6-trimethylphenyl)tetracyclo[4.4.1$^{2,5}$.1$^{7,10}$.0]-3-dodecene, 5-(o-methylphenyl)bicyclo[2.2.1]-2-heptene, 8-(o-methylphenyl)tetracyclo[4.4.1$^{2,5}$.1$^{7,10}$.0]-3-dodecene, 5-(m-methylphenyl)bicyclo[2.2.1]-2-heptene, 8-(m-methylphenyl)tetracyclo[4.4.1$^{2,5}$.1$^{7,10}$.0]-3-dodecene, 5-(p-methylphenyl)bicyclo[2.2.1]-2-heptene, 8-(p-methylphenyl)tetracyclo[4.4.1$^{2,5}$.1$^{7,10}$.0]-3-dodecene, 5-(2,4-dimethylphenyl)bicyclo[2.2.1]-2-heptene, 8-(2,4-dimethylphenyl)tetracyclo[4.4.1$^{2,5}$.1$^{7,10}$.0]-3-dodecene, 5-(2,5-dimethylphenyl)bicyclo[2.2.1]-2-heptene, 8-(2,5-dimethylphenyl)tetracyclo[4.4.1$^{2,5}$.1$^{7,10}$.0]-3-dodecene, 5-(2,5-dichlorophenyl)bicyclo[2.2.1]-2-heptene, 8-(2,5-dichlorophenyl)tetracyclo[4.4.1$^{2,5}$.1$^{7,10}$.0]-3-dodecene, 5-(2,6-dichlorophenyl)bicyclo[2.2.1]-2-heptene, 8-(2,6-dichlorophenyl)tetracyclo[4.4.1$^{2,5}$.1$^{7,10}$.0]-3-dodecene, 5-(3,4-dichlorophenyl)bicyclo[2.2.1]-2-heptene, 8-(2,4-dichlorophenyl)tetracyclo[4.4.1$^{2,5}$.1$^{7,10}$.0]-3-dodecene, 5-(o-iodophenyl)bicyclo[2.2.1]-2-heptene, 8-(o-iodophenyl)tetracyclo[4.4.1$^{2,5}$.1$^{7,10}$.0]-3-dodecene, 5-(biphenyl)bicyclo[2.2.1]-2-heptene, 8-(biphenyl)tetracyclo[4.4.1$^{2,5}$.1$^{7,10}$.0]-3-dodecene, 5-(p-sulfophenyl)bicyclo[2.2.1]-2-heptene, 8-(p-sulfophenyl)tetracyclo[4.4.1$^{2,5}$.1$^{7,10}$.0]-3-dodecene, 5-(p-chlorosulfonylphenyl)bicyclo[2.2.1]-2-heptene, 8-(p-chlorosulfonylphenyl)tetracyclo[4.4.1$^{2,5}$.1$^{7,10}$.0]-3-dodecene, 5-(p-carboxyphenyl)bicyclo[2.2.1]-2-heptene, 8-(p-carboxyphenyl)tetracyclo[4.4.1$^{2,5}$.1$^{7,10}$.0]-3-dodecene, 5,6-diphenylbicyclo[2.2.1]-2-heptene, 8,9-diphenyltetracyclo[4.4.1$^{2,5}$.1$^{7,10}$.0]-3-dodecene, 5,5-diphenylbicyclo[2.2.1]-2-heptene, 8,8-diphenyltetracyclo[4.4.1$^{2,5}$.1$^{7,10}$.0]-3-dodecene, 5-(1-naphthyl)bicyclo[2.2.1]-2-heptene, 8-(1-naphthyl)tetracyclo[4.4.1$^{2,5}$.1$^{7,10}$.0]-3-dodecene, 5-(2-naphthyl)bicyclo[2.2.1]-2-heptene, 8-(2-naphthyl)tetracyclo[4.4.1$^{2,5}$.1$^{7,10}$.0]-3-dodecene, 5-(9-anthracenyl)bicyclo[2.2.1]-2-heptene, 8-(9-anthracenyl)tetracyclo[4.4.1$^{2,5}$.1$^{7,10}$.0]-3-dodecene, 5-(m-isopropenylphenyl)-5-methylbicyclo[2.2.1]-2-heptene, 8-(m-isopropenylphenyl)-8-methyltetracyclo[4.4.1$^{2,5}$.1$^{7,10}$.0]-3-dodecene, 5-(p-isopropenylphenyl)-5-methylbicyclo[2.2.1]-2-heptene, 8-(p-isopropenylphenyl)-8-methyltetracyclo[4.4.1$^{2,5}$.1$^{7,10}$.0]-3-dodecene, 5-(p-chlorophenyl)-5-methylbicyclo[2.2.1]-2-heptene, 8-(p-chlorophenyl)-8-methyltetracyclo[4.4.1$^{2,5}$.1$^{7,10}$.0]-3-dodecene, 5-cyano-5-(p-methylphenyl)bicyclo[2.2.1]-2-heptene, 8-cyano-8-(p-methylphenyl)tetracyclo[4.4.1$^{2,5}$.1$^{7,10}$.0]-3-dodecene, 6-methyl-5-phenylbicyclo[2.2.1]-2-heptene, 9-methyl-8-phenyltetracyclo[4.4.1$^{2,5}$.1$^{7,10}$.0]-3-dodecene, 5-(p-methoxyphenyl)-6-methylbicyclo[2.2.1]-2-heptene, 8-(p-methoxyphenyl)-9-methyltetracyclo[4.4.1$^{2,5}$.1$^{7,10}$.0]-3-dodecene, 5-(p-hydroxy-o-methoxyphenyl)-6-methylbicyclo[2.2.1]-2-heptene, 8-(p-hydroxy-o-methoxyphenyl)-9-methyltetracyclo[4.4.1$^{2,5}$.1$^{7,10}$.0]-3-[4.4.1$^{2,5}$.1$^{7,10}$.0]-3-dodecene, 5-(3,4-methylenedioxyphenyl)-6-methylbicyclo[2.2.1]-2-heptene, 8-(3,4-methylenedioxyphenyl)-9-methyltetracyclo[4.4.1$^{2,5}$.1$^{7,10}$.0]-3-dodecene, 6-bromo-5-phenylbicyclo[2.2.1]-2-heptene, 8-phenyl-9-bromotetracyclo[4.4.1$^{2,5}$.1$^{7,10}$.0]-3-dodecene, 6-formyl-5-phenylbicyclo[2.2.1]-2-heptene, 9-formyl-8-phenyltetracyclo[4.4.1$^{2,5}$.1$^{7,10}$.0]-3-dodecene, 6-acetyl-5-phenylbicyclo[2.2.1]-2-heptene, 9-acetyl-8-phenyltetracyclo[4.4.1$^{2,5}$.1$^{7,10}$.0]-3-dodecene, 6-benzoyl-5-phenylbicyclo[2.2.1]-2-heptene, 8-phenyl-9-benzoyltetracyclo[4.4.1$^{2,5}$.1$^{7,10}$.0]-3-dodecene, 6-cyano-5-phenylbicyclo[2.2.1]-2-heptene, 9-cyano-8-phenyltetracyclo[4.4.1$^{2,5}$.1$^{7,10}$.0]-3-dodecene, 6-nitro-5-phenylbicyclo[2.2.1]-2-heptene, 9-nitro-8-phenyltetracyclo[4.4.1$^{2,5}$.1$^{7,10}$.0]-3-dodecene, tetracyclo[8.4.1$^{11,14}$.0$^{1,10}$.0$^{4,9}$]pentadeca-4,6,8,12-tetraene, pentacyclo[7.6.1$^{11,14}$.1$^{1,9}$.0$^{10,15}$.0$^{5,17}$]heptadeca-1,3,5,6,8,12-hexaene, pentacyclo[10.6.1$^{14,17}$.0$^{13,18}$.0$^{1,6}$.0$^{7,12}$]nonadeca-1,3,5,7,9,11,15-heptaene, tetracyclo[7.4.1$^{10,13}$.0$^{1,9}$.0$^{2,7}$]tetradeca-2,4,6,11-tetraene, 2-oxotetracyclo[7.4.1$^{10,13}$.0$^{1,9}$.0$^{3,8}$]tetradeca-3,5,7,11-tetraene, 3-oxotetracyclo[8.4.1$^{11,14}$.0$^{1,10}$.0$^{4,9}$]pentadeca-4,6,8,12-tetraen-2-one, 5-phenyl-6-carboxy(p-methoxyphenyl)bicyclo[2.2.1]-2-heptene, 5-phenyl-6-carboxy(m-methoxyphenyl)bicyclo[2.2.1]-2-heptene, 5-phenyl-6-carboxy(o-methoxyphenyl)bicyclo[2.2.1]-2-heptene, 5-phenyl-6-carboxy(p-methylphenyl)bicyclo[2.2.1]-2-heptene, 5-phenyl-6-carboxy(m-methylphenyl)bicyclo[2.2.1]-2-heptene, 5-phenyl-6-carboxy(o-methylphenyl)bicyclo[2.2.1]-2-heptene, 5-phenyl-6-carboxy(p-chlorophenyl)bicyclo[2.2.1]-2-heptene, 5-phenyl-6-carboxy(m-chlorophenyl)bicyclo[2.2.1]-2-heptene, 5-phenyl-6-carboxy(o-chlorophenyl)bicyclo[2.2.1]-2-heptene, 5-phenyl-6-carboxy(p-nitrophenyl)bicyclo[2.2.1]-2-heptene, 5-phenyl-6-carboxy(m-nitrophenyl)bicyclo[2.2.1]-2-heptene, 5-phenyl-6-carboxy(o-nitrophenyl)bicyclo[2.2.1]-2-heptene, 5-phenyl-6-carboxy(p-bromophenyl)bicyclo[2.2.1]-2-heptene, 5-phenyl-6-carboxy(m-bromophenyl)bicyclo[2.2.1]-2-heptene, 5-phenyl-6-carboxy(o-bromophenyl)bicyclo[2.2.1]-2-heptene, 5-(p-aminophenyl)-6-carboxymethylbicyclo[2.2.1]-2-heptene, 5-(p-aminophenyl)-6-carboxyethylbicyclo[2.2.1]-2-heptene, 5-(p-bromophenyl)-6-carboxybicyclo[2.2.1]-2-heptene, 5-(p-bromophenyl)-6-carboxymethylbicyclo[2.2.1]-2-heptene, 5-(p-bromophenyl)-6-carboxyethylbicyclo[2.2.1]-2-heptene, 5-(o-bromophenyl)-6-carboxybicyclo[2.2.1]-2-heptene, 5-(o-bromophenyl)-6-carboxymethylbicyclo[2.2.1]-2-heptene, 5-(o-bromophenyl)-6-carboxyethylbicyclo[2.2.1]-2-heptene, 5-(m-bromophenyl)-6-carboxybicyclo[2.2.1]-2-heptene, 5-(m-bromophenyl)-6-carboxymethylbicyclo[2.2.1]-2-heptene, 5-(m-bromophenyl)-6-carboxyethylbicyclo[2.2.1]-2-heptene, 5-(p-chlorophenyl)-6-carboxybicyclo[2.2.1]-2-heptene, 5-(p-chlorophenyl)-6-carboxymethylbicyclo[2.2.1]-2-heptene, 5-(p-chlorophenyl)-6-carboxyethylbicyclo[2.2.1]-2-heptene, 5-(m-chlorophenyl)-6-carboxybicyclo[2.2.1]-2-heptene, 5-(m-chlorophenyl)-6-carboxymethylbicyclo[2.2.1]-2-heptene, 5-(m-chlorophenyl)-6-carboxyethylbicyclo[2.2.1]-2-heptene, 5-(o-chlorophenyl)-6-carboxybicyclo[2.2.1]-2-heptene, 5-(o-chlorophenyl)-6-carboxymethylbicyclo[2.2.1]-2-heptene, 5-(o-chlorophenyl)-6-carboxyethylbicyclo[2.2.1]-2-heptene, 5-phenyl-6-carboxybicyclo[2.2.1]-2-heptene, 5-phenyl-6-carboxybenzylbicyclo[2.2.1]-2-heptene, 5-phenyl-6-carboxyethylbicyclo[2.2.1]-2-heptene, 5-phenyl-6-carboxyphenylbicyclo[2.2.1]-2-heptene, 5-phenyl-6-carboxymethylbicyclo[2.2.1]-2-heptene, 5-(p-hydroxyphenyl)-6-carboxybicyclo[2.2.1]-2-heptene, 5-(p-hydroxyphenyl)-6-carboxymethylbicyclo[2.2.1]-2-heptene, 5-(p-hydroxyphenyl)-6-carboxyethylbicyclo[2.2.1]-2-heptene, 5-(o-hydroxyphenyl)-6-carboxybicyclo[2.2.1]-2-heptene, 5-(o-hydroxyphenyl)-6-carboxymethylbicyclo[2.2.1]-2-heptene, 5-(o-hydroxyphenyl)-6-carboxyethylbicyclo[2.2.1]-2-heptene, 5-cyano-5-phenyl-6-carboxybicyclo[2.2.1]-2-heptene, 5-cyano-5-phenyl-6-carboxymethylbicyclo[2.2.1]-2-heptene, 5-cyano-5-phenyl-6-carboxyethylbicyclo[2.2.1]-2-heptene, 5-cyano-5-phenyl-6-carboxycholesterylbicyclo[2.2.1]-2-heptene, 5-(m-hydroxyphenyl)-6-carboxybicyclo[2.2.1]-2-heptene, 5-(m-hydroxyphenyl)-6-carboxymethylbicyclo[2.2.1]-2-heptene, 5-(m-hydroxyphenyl)-6-carboxyethylbicyclo[2.2.1]-2-heptene, 5-phenyl-6-carboxyallylbicyclo[2.2.1]-2-heptene, 5-phenyl-6-carboxyvinylbicyclo[2.2.1]-2-heptene, 5-phenyl-6-carboxycinnamylbicyclo[2.2.1]-2-heptene, 5-(p-chloro-m-nitrophenyl)-6-carboxybicyclo[2.2.1]-2-heptene, 5-(p-chloro-m-nitrophenyl)-6-carboxymethylbicyclo[2.2.1]-2-heptene, 5-(p-chloro-m-nitrophenyl)-6-carboxyethylbicyclo[2.2.1 ]-2-heptene, 5-(2-chloro-5-nitrophenyl)-6-carboxybicyclo[2.2.1]-2-heptene, 5-(2-chloro-5-nitrophenyl)-6-carboxymethylbicyclo[2.2.1]-2-heptene, 5-(2-chloro-5-nitrophenyl)-6-carboxyethylbicyclo[2.2.1 ]-2-heptene, 5-cyano-5-(p-hydroxyphenyl)-6-carboxybicyclo[2.2.1]-2-heptene, 5-cyano-5-(p-hydroxyphenyl)-6-carboxymethylbicyclo[2.2.1]-2-heptene, 5-cyano-5-(p-hydroxyphenyl)-6-carboxyethylbicyclo[2.2.1]-2-heptene, 5-phenyl-6-carboxyIsopropylbicyclo[2.2.1]-2-heptene, 5,6- dibromo-5-phenyl-6-carboxybicyclo[2.2.1]-2-heptene, 5,6-dibromo-5-phenyl-6-carboxymethylbicyclo[2.2.1]-2-heptene, 5,6-dibromo-5-phenyl-6-carboxyethylbicyclo[2.2.1]-2-heptene, 5-(3,4-dimethoxyphenyl)-6-carboxybicyclo[2.2.1]-2-heptene, 5-(3,5-dimethoxyphenyl)-6-carboxymethylbicyclo[2.2.1]-2-heptene, 5-(3,4-dimethoxyphenyl)-6-carboxyethylbicyclo[2.2.1]-2-heptene, 5-(3,5-dimethoxy-4-hydroxyphenyl)-6-carboxybicyclo[2.2.1]-2-heptene, 5-(3,5-dimethoxy-4-hydroxyphenyl)-6-carboxymethylbicyclo[2.2.1]-2-heptene, 5-(3,5-dimethoxy-4-hydroxyphenyl)-6-carboxyethylbicyclo[2.2.1]-2-heptene, 5-(2,5-dimethoxyphenyl)-6-carboxymethylbicyclo[2.2.1]-2-heptene, 5-(2,5-dimethoxyphenyl)-6-carboxymethylbicyclo[2.2.1]-2-heptene, 5-(2,5-dimethoxyphenyl)-6-carboxyethylbicyclo[2.2.1]-2-heptene, 5-(2,3-dimethoxyphenyl)-6-carboxybicyclo[2.2.1]-2-heptene, 5-(2,3-dimethoxyphenyl)-6-carboxymethylbicyclo[2.2.1]-2-heptene, 5-(2,3-dimethoxyphenyl)-6-carboxyethylbicyclo[2.2.1]-2-heptene, 5-(2,4-difluorophenyl)-6-carboxybicyclo[2.2.1]-2-heptene, 5-(2,4-difluorophenyl)-6-carboxymethylbicyclo[2.2.1]-2-heptene, 5-(2,4-difluorophenyl)-6-carboxyethylbicyclo[2.2.1]-2-heptene, 5-(2,4-dimethoxyphenyl)-6-carboxybicyclo[2.2.1]-2-hept ene, 5-(2,4-dimethoxyphenyl)-6-carboxymethylbicyclo[2.2.1]-2-heptene, 5-(2,4-dimethoxyphenyl)-6-carboxyethylbicyclo[2.2.1]-2-heptene, 5-(2,4-dichlorophenyl)-6-carboxybicyclo[2.2.1]-2-heptene, 5-(2,4-dichlorophenyl)-6-carboxymethylbicyclo[2.2.1]-2-heptene, 5-(2,4-dichlorophenyl)-6-carboxyethylbicyclo[2.2.1]-2-heptene, 5-(4-fluorophenyl)-6-carboxybicyclo[2.2.1]-2-heptene, 5-(4-fluorophenyl)-6-carboxymethylbicyclo[2.2.1]-2-heptene, 5-(4-fluorophenyl)-6-carboxyethylbicyclo[2.2.1]-2-hept ene, 5-(2-fluorophenyl)-6-carboxybicyclo[2.2.1]-2-heptene, 5-(2-fluorophenyl)-6-carboxymethylbicyclo[2.2.1]-2-heptene, 5-(2-fluorophenyl)-6-carboxyethylbicyclo[2.2.1]-2-hept ene, 5-(3-fluorophenyl)-6-carboxybicyclo[2.2.1]-2-heptene, 5-(3-fluorophenyl)-6-carboxymethylbicyclo[2.2.1]-2-heptene, 5-(3-fluorophenyl)-6-carboxyethylbicyclo[2.2.1]-2-heptene, 5-(4-hydroxy-3-methoxyphenyl)-6-carboxybicyclo[2.2.1]-2-heptene, 5-(4-hydroxy-3-methoxyphenyl)-6-carboxymethylbicyclo[2.2.1]-2-heptene, 5-(4-hydroxy-3-methoxyphenyl)-6-carboxyethylbicyclo[2.2.1]-2-heptene, 5-(3-hydroxy-4-methoxyphenyl)-6-carboxybicyclo[2.2.1]-2-heptene, 5-(3-hydroxy-4-methoxyphenyl)-6-carboxymethylbicyclo[2.2.1]-2-heptene, 5-(3-hydroxy-4-methoxyphenyl)-6-carboxyethylbicyclo[2.2.1]-2-heptene, 5-(3-methoxyphenyl)-6-carboxybicyclo[2.2.1]-2-heptene, 5-(3-methoxyphenyl)-6-carboxymethylbicyclo[2.2.1]-2-heptene, 5-(3-methoxyphenyl)-6-carboxyethylbicyclo[2.2.1]-2-heptene, 5-(2-methoxyphenyl)-6-carboxybicyclo[2.2.1]-2-heptene, 5-(2-methoxyphenyl)-6-carboxymethylbicyclo[2.2.1]-2-heptene, 5-(2-methoxyphenyl)-6-carboxyethylbicyclo[2.2.1]-2-heptene, 5-(4-methoxyphenyl)-6-carboxybicyclo[2.2.1]-2-heptene, 5-(4-methoxyphenyl)-6-carboxymethylbicyclo[2.2.1]-2-heptene, 5-(4-methoxyphenyl)-6-carboxyethylbicyclo[2.2.1]-2-heptene, 5-(3,4-methylenedioxyphenyl)-6-carboxybicyclo[2.2.1]-2-heptene, 5-(3,4-methylenedioxyphenyl)-6-carboxymethylbicyclo[2.2.1]-2-heptene, 5-(3,4-methylenedioxyphenyl)-6-carboxyethylbicyclo[2.2.1]-2-heptene, 5-(4-methylphenyl)-6-carboxybicyclo[2.2.1]-2-heptene, 5-(4-methylphenyl)-6-carboxymethylbicyclo[2.2.1]-2-heptene, 5-(4-methylphenyl)-6-carboxyethylbicyclo[2.2.1]-2-hept ene, 5-(4-mercaptophenyl)-6-carboxybicyclo[2.2.1]-2-heptene, 5-(4-mercaptophenyl)-6-carboxymethylbicyclo[2.2.1]-2-heptene, 5-(4-mercaptophenyl)-6-carboxyethylbicyclo[2.2.1]-2-heptene, 5-(2-methylphenyl)-6-carboxybicyclo[2.2.1]-2-heptene, 5-(2-methylphenyl)-6-carboxymethylbicyclo[2.2.1]-2-heptene, 5-(2-methylphenyl)-6-carboxyethylbicyclo[2.2.1]-2-hept ene, 5-(3-methylphenyl)-6-carboxybicyclo[2.2.1]-2-heptene, 5-(3-methylphenyl)-6-carboxymethylbicyclo[2.2.1]-2-heptene, 5-(3-methylphenyl)-6-carboxyethylbicyclo[2.2.1]-2-heptene, 5-methyl-5-phenyl-6-carboxybicyclo[2.2.1]-2-heptene, 5-methyl-5-phenyl-6-carboxymethylbicyclo[2.2.1]-2-heptene, 5-methyl-5-phenyl-6-carboxyethylbicyclo[2.2.1]-2-heptene, 5-(3-nitrophenyl)-6-carboxybicyclo[2.2.1]-2-heptene, 5-(3-nitrophenyl)-6-carboxymethylbicyclo[2.2.1]-2-heptene, 5-(3-nitrophenyl)-6-carboxyethylbicyclo[2.2.1]-2-heptene, 5-(4-nitrophenyl)-6-carboxybicyclo[2.2.1]-2-heptene, 5-(4-nitrophenyl)-6-carboxymethylbicyclo[2.2.1]-2-heptene, 5-(4-nitrophenyl)-6-carboxyethylbicyclo[2.2.1]-2-heptene, 5-(2-nitrophenyl)-6-carboxybicyclo[2.2.1]-2-heptene, 5-(2-nitrophenyl)-6-carboxymethylbicyclo[2.2.1]-2-heptene, 5-(2-nitrophenyl)-6-carboxyethylbicyclo[2.2.1]-2-heptene, 5-(4-n-octadecyloxyphenyl)-6-carboxybicyclo[2.2.1]-2-heptene, 5-(4-n-octadecyloxyphenyl)-6-carboxymethylbicyclo[2.2.1]-2-heptene, 5-(4-n-octadecyloxyphenyl)-6-carboxyethylbicyclo[2.2.1]-2-heptene, 5-(4-stearyloxyphenyl)-6-carboxybicyclo[2.2.1]-2-heptene, 5-(4-stearyloxyphenyl)-6-carboxymethylbicyclo[2.2.1]-2-heptene, 5-(4-stearyloxyphenyl)-6-carboxyethylbicyclo[2.2.1]-2-heptene, 5,5-diphenyl-6-carboxybicyclo[2.2.1]-2-heptene, 5,5-diphenyl-6-carboxymethylbicyclo[2.2.1]-2-heptene, 5,5-diphenyl-6-carboxyethylbicyclo[2.2.1]-2-heptene, 5-(3,4,5-trimethoxyphenyl)-6-carboxybicyclo[2.2.1]-2-heptene, 5-(3,4,5-trimethoxyphenyl)-6-carboxymethylbicyclo[2.2.1]-2-heptene, 5-(3,4,5-trimethoxyphenyl)-6-carboxyethylbicyclo[2.2.1]-2-heptene, 5-(2,4,5-trimethoxyphenyl)-6-carboxybicyclo[2.2.1]-2-heptene, 5-(2,4,5-trimethoxyphenyl)-6-carboxymethylbicyclo[2.2.1]-2-heptene, 5-(2,4,5-trimethoxyphenyl)-6-carboxyethylbicyclo[2.2.1]-2-heptene, 5-(3-trifluoromethylphenyl)-6-carboxybicyclo[2.2.1]-2-heptene, 5-(3-trifluoromethylphenyl)-6-carboxymethylbicyclo[2.2.1]-2-heptene, 5-(3-trifluoromethylphenyl)-6-carboxyethylbicyclo[2.2.1]-2-heptene, 5-(3-trifluoromethoxyphenyl)-6-carboxybicyclo[2.2.1]-2-heptene, 5-(3-trifluoromethoxyphenyl)-6-carboxymethylbicyclo[2.2.1]-2-heptene, 5-(3-trifluoromethoxyphenyl)-6-carboxyethylbicyclo[2.2.1]-2-heptene, 5-(2,3,4-trimethoxyphenyl)-6-carboxybicyclo[2.2.1]-2-heptene, 5-(2,3,4-trimethoxyphenyl)-6-carboxymethylbicyclo[2.2.1]-2-heptene, 5-(2,3,4-trimethoxyphenyl)-6-carboxyethylbicyclo[2.2.1]-2-heptene, 5-(4-cyanomethylphenyl)bicyclo[2.2.1]-2-heptene, 8-(4-anomethylphenyl)tetracyclo[4.4.1$^{2,5}$.1$^{7,10}$.0]-3-dodecene, 5,5,6,6-tetraphenylbicyclo[2.2.1]-2-heptene, 8,8,9,9-tetraphenyltetracyclo[4.4.1$^{2,5}$.1$^{7,10}$.0]-3-dodecene, 6-bromo-5,5,6-triphenylbicyclo[2.2.1]-2-heptene, 9-bromo-8,8,9-triphenyltetracyclo[4.4.1$^{2,5}$.1$^{7,10}$.0]-3-dodecene, 5,5,6-triphenylbicyclo[2.2.1]-2-heptene, 8,8,9-triphenyltetracyclo[4.4.1$^{2,5}$.1$^{7,10}$.0]-3-dodecene, and the like.

Moreover, a method for producing these aromatic norbornene monomers is not particularly limited. For example, it is possible to preferably adopt a method utilizing a reaction represented by the following reaction formula (II):

reaction formula (II)

[Chem. 8]

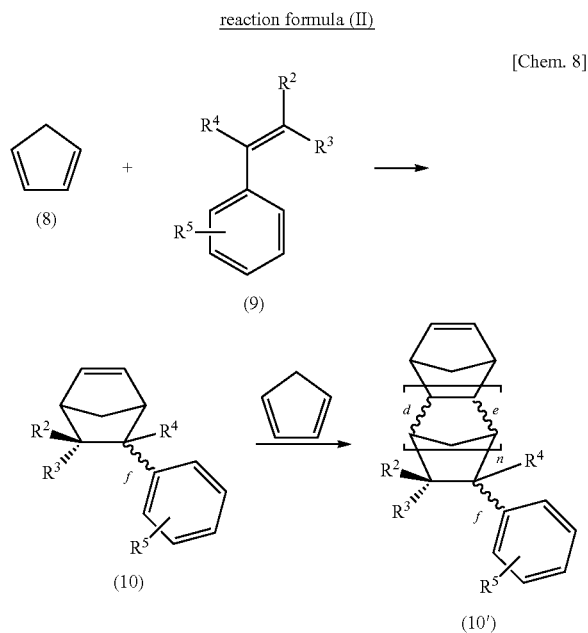

[in the reaction formula (II), $R^2$, $R^3$, $R^4$, $R^5$, d, e, f, and n are respectively synonymous with $R^2$, $R^3$, $R^4$, $R^5$, d, e, f, and n in the general formula (2)]
in which cyclopentadiene represented by the formula (8) and a styrene derivative represented by the formula (9) are caused to undergo the Diels-Alder reaction, and thereby an aromatic norbornene monomer represented by the formula (10) or (10') can be obtained.

Examples of a styrene derivative represented by the general formula (9) include styrene and cinnamic acid. Such styrene derivatives serve as an excellent dienophile in the Diels-Alder reaction, and thus a desirable reaction rate for industrial production can be achieved. To be more specific, under a temperature condition (160 to 200° C.) where cyclopentadiene is produced from a cyclopentadiene precursor (dicyclopentadiene), a target aromatic norbornene monomer can be obtained in good yield by causing the above styrene derivative and cyclopentadiene to react with each other. A method for obtaining such a styrene derivative is not particularly limited. Also, there are industrially produced compounds. Thereby, those are readily obtainable. As for compounds which are not on the market industrially, it is possible to synthesize them according to methods described in text books (Polymer Data Handbook, basic edition; edited by the Society of Polymer Science, Japan; Published in 1986 by BAIFUKAN. Co., LTD, and the like).

Additionally, examples of such a styrene derivative include the following:
4-aminostyrene; 2-acetoxystyrene; 4-acetoxystyrene; β-bromostyrene; 4-tert-butylstyrene; 4-isopropylstyrene; 3-bromostyrene; 4-bromostyrene; 2-bromostyrene; 4-bromo-β,β-difluorostyrene; 4-chloro-α-methylstyrene; 2-chlorostyrene; 3-chlorostyrene; 4-chlorostyrene; m-chloromethylstyrene; p-chloromethylstyrene; cyanomethylstyrene; o-chloromethylstyrene; 2,6-dichlorostyrene; 4-fluoro-α-methylstyrene; 2-fluorostyrene; 3-fluorostyrene; 4-fluorostyrene; pentafluorostyrene; 2-methoxystyrene; 4-ethoxystyrene; p-phenoxystyrene; p-vinylbenzyl alcohol; 4-methoxystyrene; 2-methylstyrene; 3-methylstyrene; 4-methylstyrene; α-methylstyrene; cis-β-methylstyrene; 3-trostyrene; 4-nitrostyrene; 4-cyanostyrene; 4-n-octylstyrene; β-methylstyrene, 2,3,4,5,6-pentafluorostyrene; α-(trimethylsiloxy)styrene; styrene; 2,4,6-trimethylstyrene; o-methylstyrene; m-methylstyrene; p-methylstyrene; 2,4-dimethylstyrene; 2,5-dimethylstyrene; 2,4,6-trimethylstyrene; 2,5-dichlorostyrene; 2,6-dichlorostyrene; 3,4-dichlorostyrene; o-iodostyrene; p-phenylstyrene; p-styrenesulfonic acid; p-styrenesulfonyl chloride; 4-carboxystyrene; cis-stilbene; trans-stilbene; 1,1-diphenylethylene; 1-vinylnaphthalene; 2-vinylnaphthalene; 9-vinylanthracene; m-diisopropenylbenzene; p-diisopropenylbenzene; p-chloro-α-methylstyrene, α-cyano-p-methylstyrene; propenylbenzene; anethole; isoeugenol; isosafrole; β-bromostyrene; cinnamaldehyde; benzalacetone; benzalacetophenone; β-cyanostyrene; β-nitrostyrene; 1,2-dihydronaphthalene; acenaphthylene; phenanthrene; indene; methylenebenzoindene; coumarone; 4-aminocinnamic acid; 4-bromocinnamic acid; 2-bromocinnamic acid; trans-3-bromocinnamic acid; 3,4-dihydroxycinnamic acid; 4-chlorocinnamic acid; trans-cinnamic acid; cinnamic acid benzyl ester; cinnamic acid ethyl ester; cinnamic acid phenyl ester; cinnamic acid methyl ester; trans-4-hydroxycinnamic acid; trans-2-hydroxycinnamic acid; α-cyanocinnamic acid; α-cyanocinnamic acid ethyl ester; trans-cinnamic acid cholesterol ester; trans-3-hydroxycinnamic acid; cinnamic acid allyl ester; cinnamic acid vinyl ester; cinnamic acid cinnamyl ester; 2-chlorocinnamic acid; 3-chlorocinnamic acid; 4-chloro-3-nitrocinnamic acid; 2-chloro-5-nitrocinnamic acid; 4-chlorocinnamic acid methyl ester; α-cyano-4-hydroxycinnamic acid; cinnamic acid isopropyl ester; α,β-dibromocinnamic acid ethyl ester; 3,4-dimethoxycinnamic acid; 3,5-dimethoxy-4-hydroxycinnamic acid; 3,4-dimethoxycinnamic acid; 2,5-dimethoxycinnamic acid; trans-2,3-dimethoxycinnamic acid; 2,4-difluorocinnamic acid; 2,4-dimethoxycinnamic acid; trans-2,4-dichlorocinnamic acid; α,β-dibromocinnamic acid; 3,5-dimethoxy-4-hydroxycinnamic acid; 4-fluorocinnamic acid; 2-fluorocinnamic acid; 3-fluorocinnamic acid; cinnamic acid; trans-4-hydroxy-3-methoxycinnamic acid; 3-hydroxy-4-methoxycinnamic acid; 4-hydroxycinnamic acid; 3-methoxycinnamic acid; trans-2-methoxycinnamic acid; 4-methoxycinnamic acid; 3,4-methylenedioxycinnamic acid; 4-methylcinnamic acid; cis-2-methoxycinnamic acid; 4-mercaptocinnamic acid; 4-methoxycinnamic acid; 2-ethylhexyl ester; 4-methoxycinnamic acid octyl ester; 4-methoxycinnamic acid ethyl ester; 2-methylcinnamic acid; 3-methylcinnamic acid; α-methylcinnamic acid; 3-nitrocinnamic acid; 4-nitrocinnamic acid; 2-nitrocinnamic acid; 4-nitrocinnamic acid ethyl ester; 4-n-octadecyloxycinnamic acid; 4-stearyloxycinnamic acid; α-phenylcinnamic acid; 3,4,5-trimethoxycinnamic acid; 2,4,5-trimethoxycinnamic acid; 3-(trifluoromethyl)cinnamic acid; 3-(trifluoromethoxy)cinnamic acid; 2,3,4-trimethoxycinnamic acid; coumarin; vinylbenzyl cyanide; tetraphenylethylene; 2-bromo-1,1,2-triphenylethylene; triphenylethylene; and the like.

Further, in an aromatic norbornene monomer obtained in this manner, there are an exo isomer and an endo isomer as stereoisomers at a connecting site between an aromatic structure and a bicyclo-ring structure. A proportion of such an exo or endo isomer in a product can be easily changed by, for example, appropriately changing reaction conditions in the production of monomer. Moreover, even after a monomer is produced, the proportion can also be easily changed by applying heat treatment and changing conditions of the heat treatment.

Additionally, a proportion of an exo or endo isomer of the aromatic norbornene monomer in a product can also be adjusted by adding an exo isomer produced separately. Moreover, as a method for selectively producing such an exo isomer of the aromatic norbornene monomer, it is possible to preferably use a method represented by the following reaction formula (III):

reaction formula (III)

[Chem. 9]

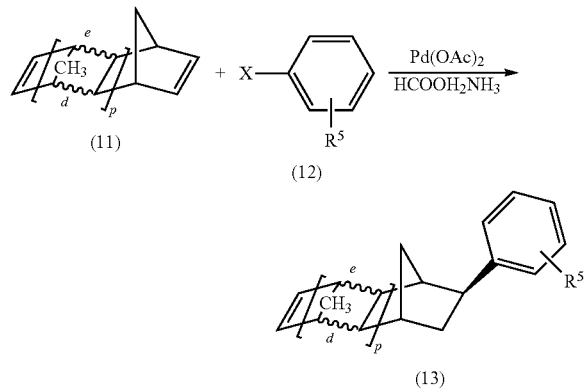

[in the reaction formula (III), p represents an integer of 0 or 1. $R^5$, d, and e are synonymous with $R^5$, d, and e in the general formula (2). X represents a chlorine atom, a bromine atom, or an iodine atom]. A method for selectively obtaining such an exo isomer represented by the reaction formula (III) is a method in which a norbornadiene derivative represented by the general formula (11) and a halogenated benzene derivative represented by the general formula (12) are caused to undergo a reductive Heck reaction to thereby obtain an aromatic norbornene monomer represented by the general formula (13). By such a method, an aromatic norbornene monomer in which a configuration of the benzene ring in the general formula (13) is an exo configuration can be selectively obtained.

Furthermore, in the case where a norbornadiene derivative with the value of p in the general formula (11) of 0 is used in the reaction formula (III) (in the case of norbornadiene), only an aromatic norbornene monomer in which a configuration of the benzene ring in the general formula (13) is exo is obtained. On the other hand, in the case where the value of p in the general formula (11) is 1 (in the case of tetracyclo[4.4.0.$1^{2,5}.1^{7,10}$]-3,8-dodecadiene), although the configuration of the benzene ring is an exo configuration with respect to the norbornene ring as in the case where the value of p is 0, two kinds comprising exo isomer and endo isomer exist as stereoisomers of the site where norbornene rings are linked to each other. As for such isomers, the content percentages can be easily changed by, for example, appropriately changing reaction conditions in the product ion of a norbornadiene derivative represented by the general formula (11). Moreover, even after the production of an aromatic norbornene monomer represented by the general formula (13), the content percentages of the isomers can also be changed by applying isomerization treatment and changing conditions of the isomerization treatment.

Meanwhile, as for a ring-opening polymerization catalyst used in a reaction in which the spiro-form norbornene monomer represented by the general formula (3) and the aromatic norbornene monomer represented by the general formula (4) are subjected to ring-opening copolymerization, a metathesis polymerization catalyst described in Olefin Metathesis and Metathesis Polymerization (K. J. IVIN, J. C. MOL, Academic Press 1997) is used. To be more specific, the catalysts are catalysts comprising a combination of (a) at least one selected from compounds containing W, Mo, Re, V, or Ti, and (b) at least one selected from compounds containing Li, Na, K, Mg, Ca, Zn, Cd, Hg, B, Al, Si, Sn, Pb, or the like, and having a bond between the element and a carbon or a bond between the element and a hydrogen. In this case, an additive agent (c), which will be described later, may be added in order to enhance the catalytic activity. In addition, examples of other catalysts include metathesis catalysts (d), which do not require any auxiliary catalyst, comprising periodic table groups 4 to 8 transition metal-carbene complexes, metallacyclobutene complexes, and the like. Here, representative examples of the compounds containing W, Mo, Re, V, or Ti appropriate for the above (a) component include $WCl_6$, $MoCl_5$, $ReOCl_3$, $VOCl_3$, $TiCl_4$, and the like. Moreover, concrete examples of the compounds used as the (b) component include compounds like n-$C_4H_9Li$, $(C_2H_5)_3Al$, $(C_2H_5)_2AlCl$, $(C_2H_5)_{1.5}AlCl_{1.5}$, $(C_2H_5)AlCl_2$, methylalumoxane, LiH, and the like. Furthermore, as representative examples of the additive agent as the (c) component, alcohols, aldehydes, ketones, amines, and the like can be used. Meanwhile, representative examples of the (d) component include W(=N-2,6-$C_6H_3iPr_2$)(=CHtBu)(OtBu)$_2$, Mo(=N-2,6-$C_6H_3iPr_2$)(=CHtBu)(OtBu)$_2$, Ru(=CHCH=$CPh_2$)(PPh$_3$)$_2Cl_2$, Ru(=CHPh)(PC$_6H_{11}$)$_2Cl_2$ (Grubbs I (first generation) catalyst), Grubbs II (second generation) catalysts, Hoveyda-Grubbs catalysts (first and second generations), and the like.

As a usage amount of such a metathesis catalyst, a proportion between the (a) component and a total amount of the spironorbornene monomer and the aromatic norbornene monomer in molar ratio, [(a) component: total amount of spiro-form norbornene monomer and aromatic norbornene monomer], is preferably in a range from 1:500 to 1:500000, and more preferably in a range from 1:1000 to 1:100000. Moreover, as a proportion between the (a) component and the (b) component in metal atom ratio, [(a) component: (b) component], is preferably in a range from 1:1 to 1:100, and more preferably in a range from 1:2 to 1:50. Furthermore, as a proportion between the (a) component and the (c) component in molar ratio, [(c) component: (a) component], is preferably in a range from 0.005:1 to 15:1, and more preferably in a range from 0.05:1 to 10:1. Meanwhile, as a usage amount of the catalyst (d), a proportion between the (d) component and a total amount of the spiro-form norbornene monomer and the aromatic norbornene monomer in molar ratio, [(d) component: total amount of spiro-form norbornene monomer and aromatic norbornene monomer], is preferably in a range from 1:30 to 1:100000, and more preferably in a range from 1:50 to 1:50000.

Meanwhile, in the reaction in which the aromatic norbornene monomer is subjected to ring-opening polymerization, a method for controlling the molecular weight of an obtained norbornene-based ring-opening copolymer is not particularly limited. Accordingly, for example, a method for appropriately controlling molecular weight by changing a polymerization temperature, a type of catalyst, a type of solvent, and the like may be adopted. Then, as such a method for controlling molecular weight, a method in which a molecular weight controlling agent exists in a reaction system can be preferably adopted. Examples of a preferred molecular weight controlling agent include α-olefins, such as ethylene, propene, 1-butene, 1-pentene, 1-hexene, 1-heptene, 1-octene, 1-nonene, and 1-decene, and styrene. Among these, 1-butene and 1-hexene are especially preferable. These molecular weight controlling agents may be used as a single agent or in combination of two or more kinds. A usage amount of such a molecular weight controlling agent to 1 mol of the total amount of the spiro-form norbornene monomer and the aromatic norbornene monomer is preferably in a range from 0.005 to 1.0 mol, and more preferably in a range from 0.02 to 0.5 mol.

Moreover, as a solvent used in the reaction in which the spiro-form norbornene monomer and the aromatic norbornene monomer are subjected to ring-opening copolymerization, a solvent which dissolve the spiro-form norbornene monomer, the aromatic norbornene monomer, metathesis catalysts, and molecular weight controlling agents is preferable. Examples thereof include alkanes, such as pentane, hexane, heptane, octane, nonane, and decane; cycloalkanes, such as cyclohexane, cycloheptane, cyclooctane, decalin, and norbornane; aromatic hydrocarbons, such as benzene, toluene, xylene, ethylbenzene, and cumene; halogenated alkanes, such as chlorobutane, bromohexane, methylene chloride, dichloroethane, hexamethylene dibromide, chlorobenzene, chloroform, and tetrachloroethylene; compounds, such as aryls; saturated carboxylic esters, such as ethyl acetate, n-butyl acetate, iso-butyl acetate, methyl propionate, dimethoxyethane, and γ-butyrolactone; and ethers, such as dibutyl ether, tetrahydrofuran, and dimethoxyethane. Among these, aromatic hydrocarbons are preferable. These solvents may be used alone or in combination of two or more kinds. As for a usage amount of such a solvent, an amount which satisfies [solvent: total amount of spiro-form norbornene monomer and aromatic norbornene monomer] in mass ratio from 1:1 to 30:1 is preferable, and an amount which satisfies the mass ratio from 1:1 to 20:1 is more preferable.

In addition, the norbornene-based ring-opening copolymer obtained in state of a ring-opening polymer of the spiro-form norbornene monomer represented by the general formula (3) and the aromatic norbornene monomer represented by the general formula (4) is the one containing the structural unit (A), in which $X^1$ in the general formula (1) is a group represented by a formula: —CH=CH—, and the structural unit (B), in which $X^2$ in the general formula (2) is a group represented by a formula: —CH=CH—. The norbornene-based ring-opening copolymer has a vinylene group in the structural units (hereinafter, referred to as a "vinylene group-containing copolymer" in some cases). Such a vinylene group-containing copolymer can be used directly as the retardation film of the present invention for various applications. However, from the perspective of improving heat stability of a retardation film to be obtained, it is preferable to form a norbornene-based ring-opening copolymer containing the structural unit (A), in which $X^1$ in the general formula (1) is a group represented by a formula: —$CH_2CH_2$—, and the structural unit (B), in which $X^2$ in the general formula (2) is a group represented by a formula: —$CH_2CH_2$— by hydrogenating a part or all of vinylene groups in the norbornene-based ring-opening polymer (vinylene group-containing copolymer) (hereinafter, the norbornene-based ring-opening copolymer thus formed refers to as a "hydrogen adduct" in some cases). In such a hydrogen adduct, an aromatic ring of a side-chain of the aromatic norbornene monomer is not substantially hydrogenated. In addition, a percentage of hydrogenation to the vinylene groups is preferably 90% or above, more preferably 95% or above, and especially preferably 98% or above. When a percentage of hydrogenation to vinylene group is higher, heat resistance of an aromatic norbornene-based ring-opening polymer to be obtained is more improved; thus, coloring and deterioration which are caused by heat tend to be sufficiently prevented.

Moreover, a reaction in which the vinylene group-containing copolymer is hydrogenated needs to be carried out under the condition where the aromatic ring of the side-chain is not substantially hydrogenated as described above. Accordingly, the reaction is generally carried out by adding a hydrogenation catalyst to a solution of the vinylene group-containing copolymer, and then applying a hydrogen gas in a rage from an ordinary pressure to 30 MPa, preferably 3 to 20 MPa, at 0 to 200° C., preferably 20 to 180° C.

Moreover, as such a hydrogenation catalyst used in a hydrogenation reaction, those used for a hydrogenation reaction of ordinary olefin compounds can be used. Both heterogeneous catalyst and homogeneous catalyst can be employed. Concrete examples of such heterogeneous catalysts include solid catalysts in which a noble metal catalytic material, such as palladium, platinum, nickel, rhodium, and ruthenium, is supported on a support, such as carbon, silica, alumina, and titania. Meanwhile, concrete examples of the homogeneous catalysts include nickel naphthenate/triethylaluminum, nickel acetylacetonate/triethylaluminum, cobalt octenoate/n-butyllithium, titanocene dichloride/diethylaluminum monochloride, rhodium acetate, chlorotris(triphenylphosphine)rhodium, dichlorotris(triphenylphosphine)ruthenium, chlorohydrocarbonyltris(triphenylphosphine)ruthenium, dichlorocarbonyltris(triphenylphosphine)ruthenium, dichlorocarbonyltris(triphenylphosphine)ruthenium, tricarbonyltris(triphenylphosphine)ruthenium, dihydrocarbonyltris(triphenylphosphine)ruthenium, hydrocarbomethoxycarbonyltris(triphenylphosphine)ruthenium, and the like. The form of such hydrogenation catalysts may be powder or particle.

Furthermore, an additive amount of such a hydrogenation catalyst needs to be adjusted so that the aromatic ring of the side-chain based on the spiro-form norbornene monomer and the aromatic norbornene monomer will not be substantially hydrogenated. Accordingly, such a hydrogenation catalyst is preferably used in an amount so that a ratio of [ring-opening copolymer: hydrogenation catalyst] in weight ratio can be in a range from $1:1\times10^{-6}$ to 1:2.

Moreover, a retardation film of the present invention is the one formed by stretching a film comprising the norbornene-based ring-opening copolymer according to the present invention described above. A method for producing such a film comprising the norbornene-based ring-opening copolymer is not particularly limited, and any publicly-known method can be adopted accordingly. Moreover, in the production of such a film, in a range which does not exceed the gist of the present invention, other polymer molecules, surfactants, high-polymer electrolytes, conductive complexes, silica, alumina, coloring materials, heat stabilizers, ultraviolet absorbers, antistats, anti-blocking agents, lubricants, plasticizers, oils, and the like may be added. In addition, a method for stretching the norbornene-based ring-opening copolymer having been formed into a film is not particularly limited, and any conventionally publicly-known stretching method can be adopted accordingly.

Further, examples of a preferred method for producing such a film of a norbornene-based ring-opening copolymer include publicly-known publicly-used methods, such as a casting method (a solution casting method), a melt extrusion method, a calendaring method, and a compression molding method. Additionally, as a molding apparatus used in such a casting method, a drum-type casting machine, a band-type casting machine, a spin coater, and the like can be used.

Meanwhile, for a melt extrusion method, a T-die method and an inflation method can be cited.

Moreover, concrete examples of a solvent used for the casting method include: cyclic ketones, such as cyclohexanone and cyclopentanone; lactones, such as γ-butyrolactone and δ-valerolactone; aromatic hydrocarbons, such as benzene, toluene, xylene, ethylbenzene, and cumene; halogenated alkanes, such as methylene chloride, dichloroethane, chlorobenzene, dichlorobenzene, chloroform, and tetrachloroethylene; polar solvents including compounds, such as aryls, ethers, such as dibutyl ether, tetrahydrofuran, and dimethoxyethane, N-methylpyrrolidone, N,N-dimethylformamide, N,N-dimethylacetamide, and dimethyl sulfoxide. Among these, aromatic hydrocarbons, halogenated alkanes, and aryls are preferable. Here, these solvents may be used alone or in combination of two or more kinds.

Furthermore, as a method for stretching the norbornene-based ring-opening copolymer having been formed into a film, a tentering method, a tube method, and the like can be cited as a biaxial stretching method, and further a water-tank stretching method, a radiation stretching method, a hot-air heating method, a hot-plate overheating method, a roll heating method, and the like can be cited as a uniaxial stretching method.

The thickness of a retardation film of the present invention thus obtained is not particularly limited, but is preferably in a range from 10 to 500 μm, and more preferably from 30 to 200 μm. If the thickness of the retardation film falls below 10 μm, mechanical characteristics and handling ability in a secondary processing tends to be lowered. On the other hand, if the thickness exceeds 500 μm, a problem tends to arise in terms of flexibility. A stretching magnification for obtaining the retardation film of the present invention is also not particularly limited, but is preferably approximately in a range from 1.1 to 5.0 times.

As for a retardation value of the retardation film of the present invention, it should be selected within a range from 5 to 2000 nm in accordance with the application. In the case of using the retardation film of the present invention as a ½λ plate, a retardation at a visible light having a wavelength of 550 nm is preferably in a range from 200 to 400 nm. In the case of using the retardation film of the present invention as a ¼λ plate, a retardation at a visible light having a wavelength of 550 nm is preferably in a range from 90 to 200 nm.

Furthermore, the retardation film of the present invention may be further provided with a thin film for the purpose of providing functions, such as gas barrier, anti-scratching, chemical resistance, and anti-glare. As a method for forming such a thin film, for example, a method, in which each of various thermoplastic resins, thermosetting resins having an amino group, an imido group, an epoxy resin, a silyl group, or the like, radiation hardening-type resins having an acryloyl group, a methacryloyl group, a vinyl group, or the like, or a mixture of these resins is mixed with a polymerization inhibitor, waxes, a dispersant, a coloring material, a solvent, a plasticizer, an ultraviolet absorber, an inorganic filler, or the like, and the mixture thus obtained is applied to coating by a method, such as a gravure roll coating method, a Meyer bar coating method, a reverse roll coating method, a dip coating method, an air knife coating method, a calendar coating method, a squeeze coating method, a kiss coating method, a fountain coating method, a spray coating method, a spin coating method, can be adopted. In addition, such a thin film may be formed to be a hardened thin-film layer by subjecting the thin film, after being applied to coating, to hardening by a radiation irradiation or thermal hardening by heat if necessary. Meanwhile, in the case where printing is performed during the formation of such a thin film, a method, such as a gravure method, an offset method, a flexo method, and a silk screen method, can be adopted. In addition, the retardation film of the present invention may be further provided with a metal oxide layer mainly comprising aluminum, silicon, magnesium, zinc, or the like for the purpose of providing gas sealing function and the like. Such a metal oxide layer can be formed by a vacuum deposition method, a sputtering method, an ion plating method, a plasma CVD method, and the like.

Moreover, the retardation film of the present invention may be laminated with another film. As such a lamination method, any conventionally publicly-known method can be adopted accordingly. Heat bonding methods, such as a heat sealing method, an impulse sealing method, an ultrasound bonding method, and a high-frequency bonding method, and laminating methods, such as an extrusion laminating method, a hot-melt laminating method, a dry laminating method, a wet laminating method, a solventless bonding laminating method, a thermal laminating method, and a co-extrusion method can be cited as examples of the method. Further, as for a film to be laminated, examples include polyester based resin films, polyvinyl alcohol based resin films, cellulose based resin films, polyvinyl fluoride resin films, polyvinylidene chloride resin films, polyacrylonitrile resin films, nylon based resin films, polyethylene based resin films, polypropylene based resin films, acetate resin films, polyimide resin films, polycarbonate resin films, polyacrylate based resin films, and the like.

Next, a liquid crystal display device of the present invention will be described. To be more specific, the liquid crystal display device of the present invention is the one comprising the above-described retardation film of the present invention.

The above-described retardation film of the present invention is a single-layer film, exhibits reverse dispersion of birefringence wavelength dispersion characteristics, and is additionally a high-quality retardation film with less fisheye. Accordingly, the retardation film of the present invention is useful as a ¼λ plate in a reflective liquid crystal display device, a ½λ plate and a ¼λ plate in a liquid crystal projector apparatus, a ½λ plate and a ¼λ plate in a transmission liquid crystal display device, a protection film for a polarizing film used in a liquid crystal display device, an anti-reflection film, and the like.

Therefore, the liquid crystal display device of the present invention is only required to include the above retardation film of the present invention as a ½λ plate, a ¼λ plate, a protection film, an anti-reflection film, or the like. Accordingly, other configurations may be the same as those of any conventionally publicly-known liquid crystal display device.

Moreover, the retardation film of the present invention can be provided on a surface thereof with a ceramic thin film, such as indium tin oxide and indium zinc oxide, formed by plasma processing using DC or glow discharge, and then be used as a transparent electrode film in a touch panel, a liquid crystal display device, and the like.

EXAMPLES

Hereinafter, the present invention will be more concretely described on the basis of Examples and Comparative Examples. However, the present invention is not limited to the following Examples.

Firstly, a method for evaluating characteristics of polymers respectively obtained in Synthesis Examples and retardation films respectively obtained in Examples will be described.

<Glass Transition Temperature: Tg>

Glass transition temperatures of hydrogenated ring-opening copolymers respectively obtained in Examples were measured by using a differential scanning calorimeter (manufactured by Perkin-Elmer Inc., product name: DSC7) at a temperature-rising speed of 20° C. per minute under nitrogen gas stream.

<Molecular Weight and Molecular Weight Distribution>

By using a gel permeation chromatography (GPC, manufactured by Tosoh Corporation, product name: HLC-8020/4 columns: manufactured by Tosoh Corporation, product name: TSK gel $GMH_{HR}$) as a measurement apparatus, and tetrahydrofuran (THF) as a solvent, a polystyrene-conversion weight-average molecular weight (Mw) and a molecular weight distribution (Mw/Mn) were obtained for individual polymers respectively obtained in Synthesis Examples and individual hydrogenated ring-opening copolymers respectively obtain in Examples. Here, Mn represents a number average molecular weight.

<Structures of Monomer and Polymer Molecules>

By using a superconducting nuclear magnetic resonance absorption apparatus (NMR, manufactured by VARIAN, Inc., product name: UNITY INOVA-600), $^1H$ and $^{13}C$-NMR were measured in deuterated chloroform for individual polymers respectively obtained in Synthesis Examples. Based on obtained data, calculation was performed for an endo/exo ratio of monomer and a hydrogenation percentage of polymer (a percentage of X in a norbornene-based ring-opening copolymer represented by the general formulas (1) and (5) having been converted into a group represented by a formula: —$CH_2CH_2$—), and identification of molecular structure was carried out.

<Evaluations of Retardation and Birefringence, and Evaluation of Wavelength Dispersion Value of Birefringence>

The retardation films respectively obtained in Examples and Comparative Examples were subjected to measurements of retardation (Re) and a wavelength dispersion value of birefringence (D), which are defined by the following formulas, by using a retardation measuring device (manufactured by Oji Scientific Instruments, product name: KOBRA21DH).
retardation (Re): Re=(nx−ny)×d
nx: refractive index in a stretching direction
ny: refractive index in a direction perpendicular to the stretching direction
d: film thickness (nm)
wavelength dispersion value of birefringence (D): D=Δ n (λ=481 nm)/Δn (Δ=589 nm).

(Synthesis Example 1: Synthesis of Aromatic Norbornene Monomer A)

4-t-butylstyrene (76.92 g: 0.48 mol), dicyclopentadiene (38.34 g: 0.29 mol), 4-t-butylcatechol (3.99 g: 0.024 mol), and toluene (20 ml) were put into a 0.2 L autoclave to obtain a mixture. Then, the mixture was heated while being stirred at 180° C. for 4 hours. After termination of the heating, the autoclave was opened after its temperature was naturally lowered to room temperature (25° C.), and a reactant was taken out. Note that, although a pressure was indicated to be 0.4 MPa in the early stage of the reaction of the mixture in the heating and stirring, it gradually decreased as time passed, and finally a pressure of 0.2 MPa was indicated.

Next, the reactant thus obtained was subjected to precise distillation using a distillation column with 20 theoretical plates, and a fraction in a range from 118 to 120° C./1 mmHg was obtained. The yield of the fraction thus obtained was 52.23 g (yield rate of 48%, based on 4-t-butylstyrene). Moreover, according to results of gas chromatographic analysis and NMR analysis performed on the fraction, it was confirmed that the product was 5-(p-t-butylphenyl)bicyclo[2.2.1]-2-heptene having an exo/endo ratio (isomer ratio) of 20/80 (aromatic norbornene monomer A), and the purity thereof was 98%.

(Synthesis Example 2: Synthesis of Aromatic Norbornene Monomer B)

In reference to methods described in "Angew. Chem. Int. Ed., vol. 39," issued in 2000, p. 1946 and "ibid., vol. 34," issued in 1995, p. 1844, an exo-aromatic norbornene B was synthesized. To be more specific, firstly, 4-t-butyliodobenzene (5.00 g: 19.22 mmol), norbornadiene (5.66 g: 61.50 mmol), trans-di(μ-acetonato)bis[o-(di-o-tolyl-phosphino)benzyl]dipalladium(II) (90 mg: 0.5 mol %), dimethyl sulfoxide (DMSO: 82 ml), triethylamine ($NEt_3$: 6.22 g: 61.5 mmol), and formic acid (2.26 g: 49.2 mmol) were put into a 3 L three-neck flask, and heated while being stirred at 120° C. for 16 hours to obtain a reaction solution. Next, the obtained reaction solution was cooled down, then poured into 300 ml of ice water, and then subjected to extraction with 50 ml of n-hexane using a separating funnel three times (50 ml×3 times) to obtain a n-hexane solution (extraction liquid). Thereafter, the extraction liquid was washed with a saturated saline solution, and then dried with anhydrous magnesium sulfate. By filtering and concentrating the extraction liquid, 3.62 g of a crude product was obtained. Consecutively, the obtained crude product was purified by distillation, and a fraction of 104° C./1 mmHg was obtained. The yield of the fraction was 2.45 g (yield rate of 55%). Moreover, according to results of gas chromatographic analysis and NMR analysis performed on the fraction, it was confirmed that the product was 5-(p-t-butylphenyl)bicyclo[2.2.1]-2-heptene having an exo/endo ratio (isomer ratio) of 100/0 (aromatic norbornene monomer B).

(Synthesis Example 3: Synthesis of Spiro-Form Norbornene Monomer A)

Firstly, according to a method described in "Organic Syntheses, Vol. 60," p. 88, α-tetralone, paraformaldehyde, and N-methylanilinium trifluoroacetate were caused to react with each other, and 2-methylene-1-oxo-1,2,3,4-tetrahydronaphthalene was synthesized (yield rate of 54%). Next, 2-methylene-1-oxo-1,2,3,4-tetrahydronaphthalene (15.82 g, 0.10 mol) was mixed with cyclopentadiene (13.22 g, 0.20 mol) to obtain a mixture. Consecutively, under conditions of nitrogen atmosphere and room temperature (25° C.), the mixture was stirred for 20 hours, and excessive cyclopentadiene was removed with a rotary evaporator. Thereby, an oily substance was obtained. Next, the oily substance thus obtained was purified by distillation with a Kugelrohr (150° C./1 mmHg), and 22.00 g of a pale yellowish liquid substance was obtained (yield rate of 980). According to a result of NMR analysis performed on the liquid substance thus obtained, it was confirmed that the product was spiro[3,4-dihydronaphthalen-1-one-2,5'-2'-norbornene] (spiro-form norbornene monomer A).

(Synthesis Example 4: Synthesis of Spiro-Form Norbornene Monomer B)

Firstly, to a 100 ml recovery flask, 9.81 g (0.10 mol) of α-methylene-γ-butyrolactone and 13.22 g (0.20 mol) cyclopentadiene were fed, and stirred under a nitrogen atmosphere at room temperature for 24 hours. Then, unreacted cyclopentadiene was removed with a rotary evaporator, and an oily substance was obtained. Next, the oily substance thus obtained was distilled with a Kugelrohr (95° C./1 mmHg), and 16.1 g of a transparent colorless liquid substance was obtained (yield rate of 96%). According to NMR analysis performed on the liquid substance thus obtained, it was confirmed that the product was 4,5-dihydrofuran-2-one-3-spiro-5'-bicyclo[2.2.1]-2'-heptene (spiro-form norbornene monomer B).

Example 1

Firstly, 30.00 g of the aromatic norbornene monomer A obtained in Synthesis Example 1 (5-(p-t-butylphenyl)bicyclo[2.2.1]-2-heptene having an exo/endo ratio (isomer ratio) of 20/80) was dissolved into 150 mL of methanol by heating under a condition of 50° C., and naturally cooled down to obtain 18.02 g of crystal of 5-(p-t-butylphenyl)bicyclo[2.2.1]-2-heptene having an exo/endo ratio of 15/85 (aromatic norbornene monomer C). The purity of the crystal of the aromatic norbornene monomer C thus obtained was 99%.

Next, under a nitrogen atmosphere, the aromatic norbornene monomer C (9.17 g: 40.5 mmol), the spiro-form norbornene monomer A obtained in Synthesis Example 3 (1.01 g: 4.5 mmol), an anhydrous toluene solution (18 ml), 1-hexene (10.0 μl: 0.2 mol %), and an anhydrous toluene solution (18 ml) of a Grubbs I catalyst (18.5 mg: 0.05 mol %) were added into a 100 ml three-neck flask, and stirred at 60° C. for 4 hours to obtain a viscous polymer solution. Consecutively, the polymer solution was diluted with 200 ml of toluene, and then put into 6000 ml of methanol. A resultant precipitate was filtered. Thereafter, the obtained precipitate was dried by use of a vacuum drier, and 9.57 g of a ring-opening copolymer of 5-(p-t-butylphenyl)bicyclo[2.2.1]-2-heptene/spiro[3,4-dihydronaphthalen-1-one-2,5'-2'-norbornene] (norbornene-based ring-opening copolymer (I)) was obtained (yield rate of 94%). The norbornene-based ring-opening copolymer (I) thus obtained was examined by GPC. As the result, a polystyrene-conversion weight-average molecular weight (Mw) was 146,200, and Mw/Mn was 2.3.

Next, the norbornene-based ring-opening copolymer (I) was hydrogenated. In the hydrogenation, firstly, 9.00 g of the norbornene-based ring-opening copolymer (I), 60 ml of toluene, and 22.5 mg of RuHCl(CO)(PPh$_3$)$_3$ were fed to an autoclave having a capacity of 0.2 L, and a mixture was obtained. Then, an inside of the autoclave was replaced by nitrogen. Consecutively, under conditions of a hydrogen gas pressure of 10 MPa and a temperature of 165° C., the mixture was heated for 4 hours in the autoclave, and a hydrogenation reaction was performed on the norbornene-based ring-opening copolymer (I) to obtain a reaction solution. Next, the reaction solution was naturally cooled to 30° C., and then the pressure of the hydrogen gas in the autoclave was released. Consecutively, the obtained reaction solution was poured into 6000 ml of methanol, and a resultant precipitate was separated and collected. Thereafter, the obtained precipitate was dried, and 8.29 g of a hydrogen adduct of the ring-opening copolymer of 5-(p-t-butylphenyl)bicyclo[2.2.1]-2-heptene/spiro[3,4-dihydronaphthalen-1-one-2,5'-2'-norbornene] (hydrogenated norbornene-based ring-opening copolymer (I)) was obtained (yield rate of 92%).

A hydrogenation percentage of olefinic unsaturated bonds was measured by using NMR for the hydrogenated norbornene-based ring-opening copolymer (I) thus obtained. The obtained NMR chart is shown in the drawing. As a result of such measurement, it was observed that the hydrogenation percentage in the hydrogenated norbornene-based ring-opening copolymer (I) was 100%. In addition, from the obtained NMR chart, it was observed that, in the hydrogenated norbornene-based ring-opening copolymer (I), the aromatic ring was not substantially hydrogenated. Furthermore, the hydrogenated norbornene-based ring-opening copolymer (I) was examined by GPC and DSC, and it was found that a polystyrene-conversion weight-average molecular weight (Mw) was 141,100, Mw/Mn was 2.2, and Tg was 111° C. Table 1 shows Mw and Tg of the hydrogenated norbornene-based ring-opening copolymer (I).

Next, the hydrogenated norbornene-based ring-opening copolymer (I) was used to produce a retardation film of the present invention. To be more specific, firstly, a chlorobenzene solution containing the hydrogenated norbornene-based ring-opening copolymer (I) at a concentration of 5 wt % was prepared, and filtered with a 0.2 μm filter. Next, the chlorobenzene solution was flow-casted on a glass plate to form a film by a casting method such that the film after drying would have a thickness of 100 μm to 200 μm, and that was dried naturally for 72 hours to obtain the film. Consecutively, the film was detached from the glass plate, and then dried until a residual solvent concentration of 1.0% by weight or below was achieved by use of a vacuum drier maintained at a temperature lower, by 10° C., than Tg of the hydrogenated norbornene-based ring-opening copolymer (I) used as a material of the film (Tg-10° C.). Thus, a dry film was obtained. Next, the obtained dry film was cut into strips (size: 5.0×4.0 cm), and uniaxial stretching was performed with a stretching magnification of 200% (2.0-fold) at a temperature condition higher, by 10° C., than Tg of the hydrogenated norbornene-based ring-opening copolymer (I) used as the material of the film (Tg+10° C.) at a stretching speed of 50 mm/minute by using a biaxial stretching apparatus (manufactured by Shibayama Scientific Co., Ltd.: SS-60 model). Thus, a retardation film was obtained.

A retardation and a wavelength dispersion value of the retardation film thus obtained were measured using the methods described in the above evaluation method. Table 1 shows the results.

Example 2

A retardation film was obtained through ring-opening copolymerization of an aromatic norbornene monomer D and the spiro-form norbornene monomer A, hydrogenation of the ring-opening polymer, film formation, and stretching of the film, by adopting the same method as that adopted in Example 1 except that 5-(p-t-butylphenyl)bicyclo[2.2.1]-2-heptene having an exo/endo ratio=25/75 (aromatic norbornene monomer D) obtained by mixing 46.88 g of the aromatic norbornene monomer A and 3.12 g of the aromatic norbornene monomer B was used in place of the aromatic norbornene monomer C, and that a mixing ratio between the aromatic norbornene monomer D (11.32 g: 50 mmol) and the spiro-form norbornene monomer A was 90/10 in molar ratio. A molecular weight, a molecular weight distribution and Tg of the hydrogenated norbornene-based ring-opening copolymer thus obtained are shown in Table 1. A retardation and a wavelength dispersion value of the obtained retardation film are also shown in Table 1.

Example 3

A retardation film was obtained in the same manner as in Example 2 except that the mixing ratio (molar ratio) between the aromatic norbornene monomer D (11.32 g: 50 mmol) and the spiro-form norbornene monomer A was changed to 80/20. A molecular weight, a molecular weight distribution and Tg of the hydrogenated norbornene-based ring-opening copolymer thus obtained are shown in Table 1. A retardation and a wavelength dispersion value of the obtained retardation film are also shown in Table 1.

Example 4

A retardation film was obtained in the same manner as in Example 2 except that the mixing ratio (molar ratio) between the aromatic norbornene monomer D (11.32 g: 50 mmol) and the spiro-form norbornene monomer A was changed to 75/25. A molecular weight, a molecular weight distribution and Tg of the hydrogenated norbornene-based ring-opening copolymer thus obtained are shown in Table 1. A retardation and a wavelength dispersion value of the obtained retardation film are also shown in Table 1.

Example 5

A retardation film was obtained through ring-opening copolymerization of an aromatic norbornene monomer E and the spiro-form norbornene monomer A, hydrogenation of the ring-opening polymer, and film formation, by adopting the same method as that adopted in Example 1 except that 5-(p-t-butylphenyl) bicyclo[2.2.1]-2-heptene having an exo/endo ratio=50/50 (aromatic norbornene monomer E) obtained by mixing 6.25 g of the aromatic norbornene monomer A with 3.75 g of the aromatic norbornene monomer B was used in place of the aromatic norbornene monomer C, and that a mixing ratio between the aromatic norbornene monomer E and the spiro-form norbornene monomer A was 90/10 in molar ratio. A molecular weight, a molecular weight distribution and Tg of the hydrogenated norbornene-based ring-opening copolymer thus obtained are shown in Table 1. A retardation and a wavelength dispersion value of the obtained retardation film are also shown in Table 1.

Comparative Example 1

A retardation film for comparison was obtained through hydrogenation of a ring-opening polymer of the aromatic norbornene monomer D, film formation, and stretching of the film, by adopting the same method as that adopted in Example 1 except that the ring-opening polymer of the aromatic norbornene monomer D obtained by adopting a method described below was used in place of the norbornene-based ring-opening copolymer (I). A molecular weight, a molecular weight distribution and Tg of the thus-obtained hydrogenated ring-opening polymer of the aromatic norbornene monomer D are shown in Table 1. A retardation and a wavelength dispersion value of the obtained retardation film are also shown in Table 1. Note that the obtained retardation film had a D value of 0.95, exhibiting reverse dispersion characteristics, but had a small Tg value of 106° C.

<Method for Preparing Ring-Opening Polymer of Aromatic Norbornene Monomer D>

Under a nitrogen atmosphere, 10.19 g of 5-(p-t-butylphenyl)bicyclo[2.2.1]-2-heptene having an exo/endo ratio of 25/75 (aromatic norbornene monomer D), an anhydrous toluene solution (18 ml), and an anhydrous toluene solution (18 ml) of 1-hexene (10.0 µl: 0.2 mol %) and a Grubbs I catalyst (18.5 mg: 0.05 mol %) were added into a 100 ml three-neck flask, and stirred at room temperature for 24 hours to obtain a viscous polymer solution. Next, the polymer solution was diluted with 200 ml of toluene, and put into 6000 ml of methanol. A resultant precipitate was filtered. Thereafter, the obtained precipitate was dried by use of a vacuum drier, and 9.58 g of a ring-opening polymer of the aromatic norbornene monomer D was obtained (yield rate of 94%).

Here, the thus-obtained ring-opening polymer of the aromatic norbornene monomer D was examined by GPC. As the result, a polystyrene-conversion weight-average molecular weight (Mw) was 139,000, and Mw/Mn was 2.1.

Comparative Example 2

A retardation film was obtained through ring-opening copolymerization of an aromatic norbornene monomer F, hydrogenation of the ring-opening polymer, film formation, and stretching of the film, by adopting the same method as that adopted in Comparative Example 1 except that, 5-(p-t-butylphenyl)bicyclo[2.2.1]-2-heptene having an exo/endo ratio of 45/55 (aromatic norbornene monomer F) obtained by mixing 6.88 g of the aromatic norbornene monomer A and 3.12 g of the aromatic norbornene monomer C was used in place of the aromatic norbornene monomer D. A molecular weight, a molecular weight distribution and Tg of the thus-obtained hydrogenated ring-opening polymer of the aromatic norbornene monomer F are shown in Table 1. A retardation and a wavelength dispersion value of the obtained retardation film are also shown in Table 1.

Comparative Example 3

A retardation film was obtained through ring-opening copolymerization of the aromatic norbornene monomer D and the spiro-form norbornene monomer A, hydrogenation of the ring-opening polymer, film formation, and stretching of the film, in the same manner as in Example 1 except that the aromatic norbornene monomer D was used in place of the aromatic norbornene monomer C, and that the mixing ratio between the aromatic norbornene monomer D and the spiro-form norbornene monomer A obtained in Synthesis Example 3 was 40/60 in molar ratio. Note that, in preparing the ring-opening copolymer of the aromatic norbornene monomer D and the spiro-form norbornene monomer A (norbornene-based ring-opening copolymer (II)), a proportion of a total amount of an exo isomer of the aromatic norbornene monomer D and the spiro-form norbornene monomer A was 70 mol % of all the monomers. In addition, a molecular weight, a molecular weight distribution and Tg of the hydrogenated norbornene-based ring-opening copolymer (II) thus obtained are shown in Table 1. A retardation and a wavelength dispersion value of the obtained retardation film are also shown in Table 1.

Comparative Example 4

A retardation film was obtained through ring-opening copolymerization of the aromatic norbornene monomer C and the spiro-form norbornene monomer A, hydrogenation of the ring-opening polymer, film formation, and stretching of the film, in the same manner as in Example 1 except that a mixing ratio between the aromatic norbornene monomer C and the spiro-form norbornene monomer A obtained in Synthesis Example 3 was changed 95/5 in molar ratio. Note that, in preparing the ring-opening copolymer of the aromatic norbornene monomer C and the spiro-form norbornene monomer A (norbornene-based ring-opening copolymer (III)), a proportion of a total amount of an exo isomer of the aromatic norbornene monomer C and the spiro-form norbornene monomer A was 19.2 mol % of all the monomers. In addition, a molecular weight, a molecular weight distribution and Tg of the hydrogenated norbornene-based ring-opening copolymer (III) thus obtained are shown in Table 1. A retardation and a wavelength dispersion value of the obtained retardation film are also shown in Table 1.

Comparative Example 5

A retardation film was obtained through ring-opening copolymerization of the aromatic norbornene monomer D and the spiro-form norbornene monomer B, hydrogenation of the ring-opening polymer, film formation, and stretching of the film, in the same manner as in Example 1 except that the aromatic norbornene monomer D was used in place of the aromatic norbornene monomer C, that the spiro-form norbornene monomer B obtained in Synthesis Example 4 was used in place of the spiro-form norbornene monomer A, and further that the mixing ratio between the aromatic norbornene monomer D and the spiro-form norbornene monomer B was 75/25 in molar ratio. A molecular weight, a molecular weight distribution and Tg of the thus-obtained hydrogenated ring-opening copolymer of the aromatic norbornene monomer D and the spiro-form norbornene monomer B are shown in Table 1. A retardation and a wavelength dispersion value of the obtained retardation film are also shown in Table 1. Note that, in preparing the ring-opening copolymer of the aromatic norbornene monomer D and the spiro-form norbornene monomer B (norbornene-based ring-opening copolymer (IV)), a proportion of a total amount of an exo isomer of the aromatic norbornene monomer D and the spiro-form norbornene monomer B was 43.8 mol % of all the monomers.

reverse dispersion, but Tg of the hydrogenated aromatic norbornene-based ring-opening polymers used was below 110° C. From such results, it was found out that the retardation films (Examples 1 to 5) of the present invention had a more sufficient heat resistance than the retardation films obtained in Comparative Examples 1 and 2, and were capable of suppressing problems such as reduction in contrast and color unevenness at higher levels when actually used in, for example, a liquid crystal panel and the like.

Meanwhile, as for the retardation film (Comparative Example 3) in which the total amount of the structural unit originated from the spiro-form norbornene monomer and the exo-form structural unit originated from the exo isomer of the aromatic norbornene monomer exceeded 60 mol % of all the structural units, although Tg was sufficiently high, the birefringence wavelength dispersion characteristics were not exhibited to be reverse dispersion, but normal dispersion characteristics were exhibited. Accordingly, a reverse dispersion retardation film was not obtained, and a film exhibiting unique optical characteristics was not obtained. Further, as for the retardation film (Comparative Example 4) in which the total amount of the structural unit originated from the spiro-form norbornene monomer and the exo-form structural unit originated from the exo isomer of the aromatic norbornene

TABLE 1

| | exo/endo*[1] | Ratio of monomers*[2] | Total amount of exo isomers and spiro compound*[3] (mol %) | Mw (Mw/Mn) | Tg (° C.) | D*[4] |
|---|---|---|---|---|---|---|
| Example 1 | 15/85 | 90/10 | 23.5 | 141,000 (2.2) | 111 | 0.94 |
| Example 2 | 25/75 | 90/10 | 32.5 | 137,900 (2.5) | 110 | 0.91 |
| Example 3 | 25/75 | 80/20 | 40.0 | 114,000 (2.2) | 113 | 0.83 |
| Example 4 | 25/75 | 75/25 | 43.8 | 117,200 (2.1) | 115 | 0.68 |
| Example 5 | 50/50 | 90/10 | 55.0 | 161,500 (2.6) | 110 | 0.16 |
| Comparative Example 1 | 25/75 | 100/0 | 25.0 | 141,500 (2.0) | 106 | 0.95 |
| Comparative Example 2 | 45/55 | 100/0 | 45.0 | 156,100 (2.1) | 105 | 0.85 |
| Comparative Example 3 | 25/75 | 40/60 | 70.0 | 148,000 (2.3) | 132 | 1.15 |
| Comparative Example 4 | 15/85 | 95/5 | 19.2 | 139,600 (2.7) | 108 | 0.96 |
| Comparative Example 5 | 25/75 | 75/25 | 43.8 | 128,100 (2.4) | 120 | 1.01 |

*[1] to *[4] in Table represent the following contents.
*[1] a ratio of an exo isomer to an endo isomer of the configuration of an aromatic ring of a side-chain of an aromatic norbornene monomer
*[2] a ratio of a content of an aromatic norbornene monomer and a content of a spiro-form norbornene monomer (aromatic norbornene monomer:spiro-form norbornene monomer)
*[3] a proportion of a total amount of an exo isomer of an aromatic norbornene monomer and a spiro-form monomer to all monomers
*[4] a wavelength dispersion value [Δn (@481 nm)/Δn (@589 nm)]

As apparent from the results shown in Table 1, the retardation films (Examples 1 to 5) of the present invention were confirmed to be retardation films exhibiting reverse dispersion of birefringence wavelength dispersion characteristics and having a sufficiently high heat resistance (Tg of the copolymers is not lower than 110° C.).

On the other hand, as for the retardation films (Comparative Examples 1 and 2) comprising the hydrogenated aromatic norbornene-based ring-opening polymers obtained by using the respective aromatic norbornene monomers singly, the birefringence wavelength dispersion characteristics were monomer was below mol % of all the structural units, although the birefringence wavelength dispersion characteristics were exhibited to be reverse dispersion, Tg of the hydrogenated norbornene-based ring-opening copolymer used was as low as below 110° C. (108° C.). From such results of Examples 1 to 5 and Comparative Examples 3 and 4, it was found out that by setting a specific proportion for the proportion of the total amount of the spiro-form norbornene monomer and the exo isomer of the aromatic norbornene monomer, it became possible to achieve both reverse dispersion characteristics and heat resistance.

Furthermore, as for the retardation film (Comparative Example 5) using the spiro-form norbornene monomer having no aromatic ring, although Tg was sufficient, the birefringence wavelength dispersion characteristics was not exhibited to be reverse dispersion but normal dispersion. It is speculated that since the spiro-form norbornene monomer B used in the production contained no aromatic ring, the wavelength dispersion characteristics of such a retardation film obtained in Comparative Example 5 was normal dispersion.

From the results as described above, it was confirmed that both the reverse dispersion characteristics and the heat resistance can be achieved at high levels by containing a structural unit originated from a specific spiro-form norbornene monomer containing an aromatic ring (structural unit (A)) and a specific aromatic norbornene monomer with a side-chain having an aromatic ring (structural unit (B)), and by setting a proportion of a total amount of the structural unit originated from the spiro-form norbornene monomer and a structural unit originated from an exo isomer of the aromatic norbornene monomer (i.e., exo-form structural unit in terms of the configuration of an aromatic ring of a side-chain) in a specific range.

INDUSTRIAL APPLICABILITY

As described above, according to the present invention, it is possible to provide a reverse dispersion retardation film exhibiting reverse dispersion of birefringence wavelength dispersion characteristics and being capable of sufficiently preventing deterioration caused by water content in air and capable of exhibiting the reverse dispersion characteristics and heat resistance at high levels in a balanced manner even in a single layer; and a liquid crystal display device using the reverse dispersion retardation film.

Hence, the reverse dispersion retardation film of the present invention is especially useful as a ½λ plate, a ¼λ plate, a protection film, an anti-reflection film, and the like which are used in a liquid crystal display device and the like.

The invention claimed is:
1. A reverse dispersion retardation film, formed by stretching a film comprising
  a norbornene-based ring-opening copolymer containing a structural unit (A) represented by the following general formula (1):

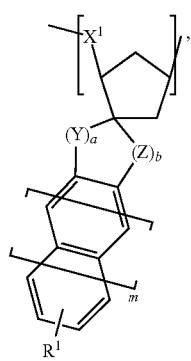

wherein in the formula (1),
  m represents an integer of any one of 0 and 1,
  $R^1$ represents any one of atoms and groups selected from the group consisting of: a hydrogen atom; halogen atoms; substituted or unsubstituted hydrocarbon groups, each of which may include at least one linking group selected from the group consisting of an oxygen atom, a nitrogen atom, a sulfur atom, and a silicon atom, and which has 1 to 30 carbon atoms; and polar groups,
  $X^1$ represents any one of groups selected from the group consisting of a group represented by a formula: —CH=CH— and a group represented by a formula: —CH$_2$CH$_2$—,
  a and b each independently represent an integer of 0 to 6,
  Y, which may be the same or different when provided in plurality in the single structural unit, represents at least one group selected from the group consisting of a methylene group, a carbonyl group, an oxy group, and alkylimino groups having 1 to 5 carbon atoms, and
  Z, which may be the same or different when provided in plurality in the single structural unit, represents at least one group selected from the group consisting of a methylene group, a carbonyl group, an oxy group, and alkylimino groups having 1 to 5 carbon atoms and
  a structural unit (B) represented by the following general formula (2):

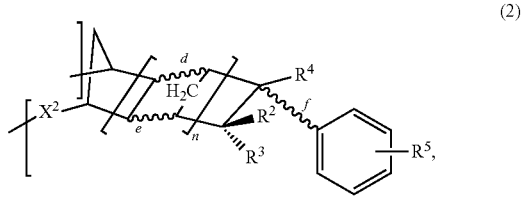

wherein in the formula (2),
  n represents an integer of any one of 0 and 1,
  $X^2$ represents any one of groups selected from the group consisting of a group represented by a formula: —CH=CH— and a group represented by a formula: —CH$_2$CH$_2$—,
  $R^2$, $R^3$, $R^4$, and $R^5$ each independently represent any one of atoms and groups selected from the group consisting of: a hydrogen atom; halogen atoms; substituted or unsubstituted hydrocarbon groups, each of which may include at least one linking group selected from the group consisting of an oxygen atom, a nitrogen atom, a sulfur atom, and a silicon atom, and which has 1 to 30 carbon atoms; and polar groups,
  wavy lines d and e each represent a configuration of any one of an endo and an exo, and
  a wavy line f represents a configuration of any one of an endo and an exo, wherein
  a total amount of the structural unit (A) and an exo-form structural unit, in which the wavy line f represents the exo configuration, among the structural units (B) is not less than 20 mol % but not more than 65 mol % of all the structural units.

2. The reverse dispersion retardation film according to claim 1, wherein, in the general formula (1),
  m is 0, and
  $R^1$ is at least one selected from the group consisting of a hydrogen atom and alkyl groups having 1 to 6 carbon atoms.

3. The reverse dispersion retardation film according to claim 1, wherein, in the general formula (1),
  m is 0, and
  $R^1$ is a hydrogen atom.

4. The reverse dispersion retardation film according to claim 1, wherein, in the general formula (2), $R^2$, $R^3$, and $R^4$ are each independently at least one selected from the group consisting of a hydrogen atom, a methyl group, and a phenyl group.

5. The reverse dispersion retardation film according to claim 1, wherein, in the general formula (2), $R^5$ is at least one selected from the group consisting of a methyl group, a propyl group, a butyl group, a 2-methyl propan-2-yl group, a cyclohexyl group, and a phenyl group.

6. The reverse dispersion retardation film according to claim 1, wherein a content of the structural unit (A) is not less than 6 mol % but not more than 40 mol % of all the structural units in the norbornene-based ring-opening polymer.

7. The reverse dispersion retardation film according to claim 1, wherein a total amount of a structural unit, in which $X^1$ is a group represented by a formula: —$CH_2CH_2$—, among the structural units (A) and a structural unit, in which $X^2$ is a group represented by a formula: —$CH_2CH_2$—, among the structural units (B) is not less than 90 mol % of all the structural units in the norbornene-based ring-opening polymer.

8. The reverse dispersion retardation film according to claim 1, wherein the total amount of the structural unit (A) and the exo-form structural unit, in which the wavy line f represents the exo configuration, among the structural units (B) is not less than 25 mol % but not more than 50 mol % of all the structural units.

9. A liquid crystal display device comprising the reverse dispersion retardation film according to claim 1.

\* \* \* \* \*